US009413906B2

(12) United States Patent
Shlimovich

(10) Patent No.: US 9,413,906 B2
(45) Date of Patent: Aug. 9, 2016

(54) METHOD FOR MAKING RELEVANT CONTENT PROPOSALS BASED ON INFORMATION GLEANED FROM AN IMAGE-BASED PROJECT CREATED IN AN ELECTRONIC INTERFACE

(71) Applicant: Interactive Memories, Inc., Palo Alto, CA (US)

(72) Inventor: Mark Alexander Shlimovich, Palo Alto, CA (US)

(73) Assignee: Interactive Memories Inc., Palo Alto, CA (US)

( * ) Notice: Subject to any disclaimer, the term of this patent is extended or adjusted under 35 U.S.C. 154(b) by 508 days.

(21) Appl. No.: 13/771,992

(22) Filed: Feb. 20, 2013

(65) Prior Publication Data

US 2014/0096022 A1    Apr. 3, 2014

Related U.S. Application Data

(60) Provisional application No. 61/707,007, filed on Sep. 28, 2012.

(51) Int. Cl.
*G06F 3/00* (2006.01)
*H04N 1/00* (2006.01)
*G06F 3/0484* (2013.01)
(Continued)

(52) U.S. Cl.
CPC ............ *H04N 1/00161* (2013.01); *G06F 3/048* (2013.01); *G06F 3/0484* (2013.01); *G06F 3/04842* (2013.01); *G06F 3/04845* (2013.01); *G06F 3/1204* (2013.01); *G06F 3/1205* (2013.01); *G06F 3/1242* (2013.01); *G06F 3/1272* (2013.01); *G06F 3/1287* (2013.01); *G06F 17/243* (2013.01); *G06F 17/3028* (2013.01); *H04L 51/14* (2013.01); *H04L 67/16* (2013.01); *H04L 67/42* (2013.01); *H04N 1/00* (2013.01); *G06F 3/0483* (2013.01); *G06F 3/126* (2013.01); *H04N 1/0044* (2013.01); *H04N 1/00456* (2013.01)

(58) Field of Classification Search
CPC .............. G06F 3/03845; G06F 3/1242; G06Q 30/0603; G06Q 30/0641; G06Q 30/0643
USPC .................................. 715/717–723, 738, 753
See application file for complete search history.

(56) References Cited

U.S. PATENT DOCUMENTS 5,493,677 A * 2/1996 Balogh ............... G06F 17/3025
382/305
5,751,286 A * 5/1998 Barber ................ G06F 17/3025
382/209

(Continued)

*Primary Examiner* — Dino Kujundzic
(74) *Attorney, Agent, or Firm* — American Patent Agency PC; Daniar Hussain

(57) ABSTRACT

A system for creating image and or text-based projects includes a server, the server having access to a processor, a data repository, and a non-transitory physical medium. Software running from the non-transitory physical medium provides a first function for establishing a server connection between the server and a computing appliance, a second function for initiating and maintaining a data session with a user, a third function for gathering information in a project, a fourth function for analyzing the information gathered and developing a list of keywords, a fifth function for searching one or more data sources for images and other assets using one or more of the primary keywords developed by the fourth function, and a sixth function for dynamically presenting one or more digital assets found in the search to the one or more users working on the project.

20 Claims, 62 Drawing Sheets

(51) Int. Cl.
  *G06F 3/048* (2013.01)
  *H04L 29/06* (2006.01)
  *G06F 17/30* (2006.01)
  *H04L 12/58* (2006.01)
  *G06F 17/24* (2006.01)
  *H04L 29/08* (2006.01)
  *G06F 3/12* (2006.01)
  *G06F 3/0483* (2013.01)

(56) References Cited

U.S. PATENT DOCUMENTS

| | | | | |
|---|---|---|---|---|
| 5,802,361 A * | 9/1998 | Wang | G06F 17/30256 | 379/202.01 |
| 5,893,110 A * | 4/1999 | Weber | A63F 3/10 | |
| 6,108,674 A * | 8/2000 | Murakami | G06F 17/24 | 707/999.104 |
| 6,202,062 B1 * | 3/2001 | Cameron | G06F 17/30876 | |
| 6,813,618 B1 * | 11/2004 | Loui | G06F 17/30256 | |
| 7,051,019 B1 * | 5/2006 | Land | G06F 17/30265 | |
| 7,636,450 B1 * | 12/2009 | Bourdev | G06F 17/30256 | 382/100 |
| 7,644,373 B2 * | 1/2010 | Jing | G06F 17/30274 | 715/838 |
| 7,831,601 B2 * | 11/2010 | Oral | G06F 17/30696 | 707/722 |
| 2003/0105589 A1 * | 6/2003 | Liu | G06F 17/30017 | 702/1 |
| 2004/0054659 A1 * | 3/2004 | McIntyre | G06F 17/30247 | |
| 2006/0251338 A1 * | 11/2006 | Gokturk | G06F 17/30253 | 382/305 |
| 2006/0271434 A1 * | 11/2006 | Ruttenberg et al. | | 705/14 |
| 2007/0053571 A1 * | 3/2007 | Hayashi | G06F 17/30265 | 382/131 |
| 2007/0070217 A1 * | 3/2007 | Ebihara | G06F 17/30256 | 348/231.2 |
| 2008/0226174 A1 * | 9/2008 | Hua | G06K 9/6251 | 382/190 |
| 2009/0028434 A1 * | 1/2009 | Vanhoucke | G06Q 30/02 | 382/182 |
| 2009/0204609 A1 * | 8/2009 | Labrou | G06F 17/3064 | |
| 2009/0234707 A1 * | 9/2009 | Perez et al. | | 705/10 |
| 2009/0254539 A1 * | 10/2009 | Wen | G06F 17/30247 | |
| 2010/0046842 A1 * | 2/2010 | Conwell | G06F 17/30265 | 382/218 |
| 2010/0220929 A1 * | 9/2010 | Misawa | G06F 17/30274 | 382/190 |
| 2010/0232656 A1 * | 9/2010 | Ryu | G06F 17/218 | 382/118 |
| 2010/0250601 A1 * | 9/2010 | Takata | H04N 9/8205 | 707/780 |
| 2010/0325581 A1 * | 12/2010 | Finkelstein | G06F 17/30 | 715/810 |
| 2011/0258053 A1 * | 10/2011 | Lee et al. | | 705/14.69 |

* cited by examiner

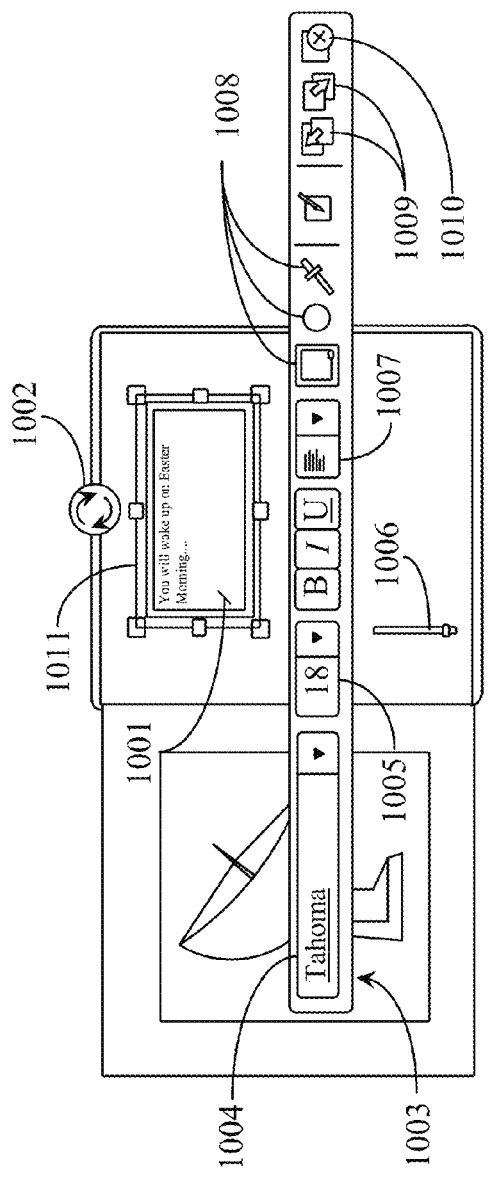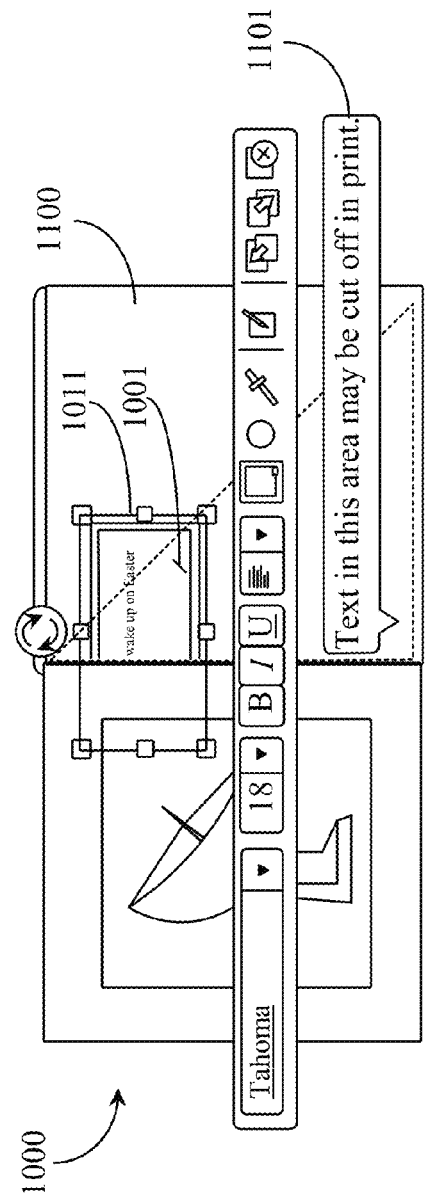
Fig. 10
Fig. 11

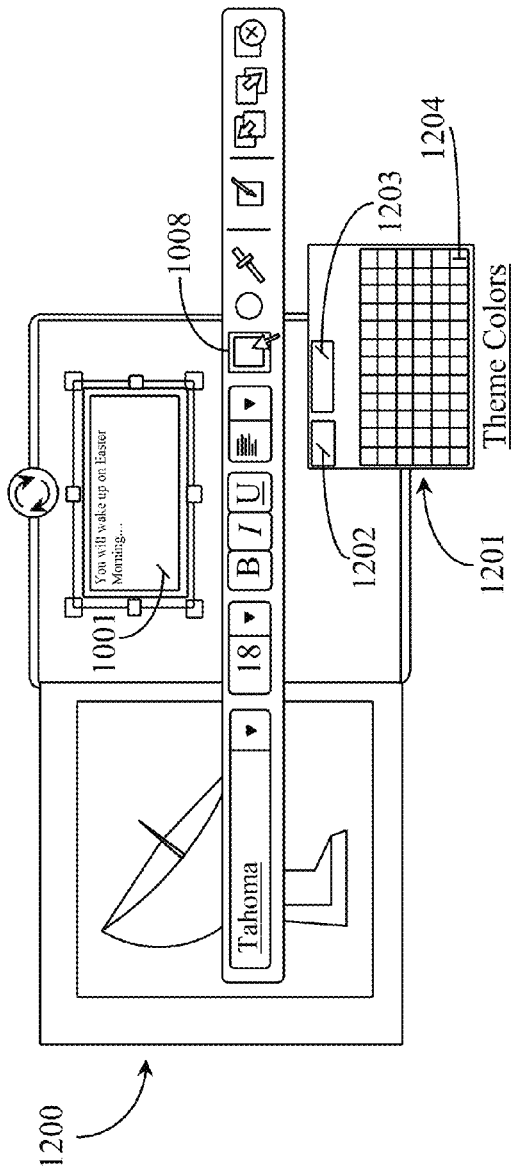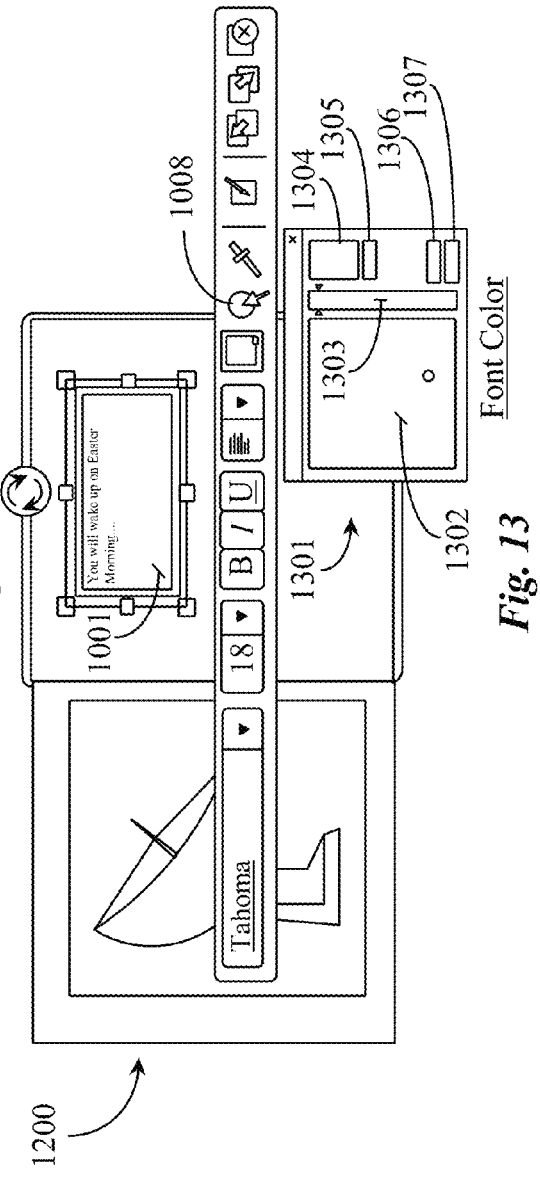

METHOD FOR MAKING RELEVANT CONTENT PROPOSALS BASED ON INFORMATION GLEANED FROM AN IMAGE-BASED PROJECT CREATED IN AN ELECTRONIC INTERFACE

CROSS-REFERENCE TO RELATED DOCUMENTS

The present invention claims priority to a U.S. provisional patent application 61/707,007, filed Sep. 28, 2012 and entitled "Method and Apparatus for Creating Photobooks", disclosure of which is incorporated herein in its entirety at least by reference.

BACKGROUND OF THE INVENTION

1. Field of the Invention

The present invention is in the field of electronic commerce and pertains particularly to methods and apparatus for streamlining creation and editing of photo-based projects using a graphics user interface on a data network.

2. Discussion of the State of the Art

In the field of electronic commerce also known as ecommerce, there are project-oriented Websites where users may create and edit works including models, poems, art, and photo-based products. Websites catering to photo-based editing promote online publishing and online transacting relative to printed works. The current state of such electronic services leaves much to be desired. Many of these services have fixed templates and multiple interfaces for project editing, making it tedious to get the desired output.

Other problems with the current state of photo-based services include inflexibility of the editor interface relative to process steps for editing content. Most such processes are not transparent and could lead to errors in printing and therefore in the final output product. Furthermore, each typical project is initiated from scratch in a way that does not promote efficiency from start to finish of a project.

The inventors are aware of a graphics user interface (GUI) for creating and editing photo-based projects over a data network that provides creation and editing tools to users through a single interface. The interface and supporting back-end system provides some automated and semi-automated processes, which users may take advantage of to enhance their experience with the mechanics of creating and editing an image-based product such as a photo book for example.

It has occurred to the inventor that there are still many opportunities to improve upon existing system functionality and to expand the reach of the system to provide additional functionalities not only relevant to the aspects of creating and editing projects through the interface, but also relevant to other aspects of a user's experience and of system back-end operations including network activities undertaken to fulfill client orders of created projects.

Therefore, what is needed are new methods for further streamlining creation, editing, and printing of photo-based project using a graphics user interface over a digital network.

SUMMARY OF THE INVENTION

In one embodiment of the invention, a system for creating and editing image and or text-based projects is provided. The system includes a server connected to a network, the server having access to least one processor and a data repository, the server including a non-transitory physical medium, and software running from the non-transitory physical medium, the software providing a first function for establishing a client server connection between the server and at least one user-operated computing appliance connected to the network, a second function for initiating and maintaining an active data session between one or more users involved in project creation and or in project editing through a graphics user interface (GUI), a third function for gathering information in a project being worked on, a fourth function for analyzing the information gathered and developing a primary list of keywords used in the project or relevant to the project, a fifth function for searching one or more data sources for images and other assets using one or more of the primary keywords developed by the fourth function, and a sixth function for dynamically presenting one or more digital assets found in the search to the one or more users working on the project.

In one embodiment, the network is the Internet network. In one embodiment, gathering components include text parsing components, snapshot components, screen scraping components, pattern recognition components, or file reading components. In one embodiment, the one or more data sources searched are third-party data sources. In one embodiment, the searched assets include audio assets.

BRIEF DESCRIPTION OF THE DRAWING FIGURES

FIG. 10 is an elevation view of a photo spread of a photobook project exhibiting a dynamically editable text box according to an embodiment of the present invention.

FIG. 11 is an elevation view of the photo spread of FIG. 10 with the text box moved to a position of conflict relative to a print parameter applied to a printing process for the photobook.

FIG. 12 is an elevation view of a photo spread of a project illustrating real-time text color application using theme colors.

FIG. 13 is an elevation view of photo spread of the same project illustrating real-time font color change using system colors.

DETAILED DESCRIPTION

The inventors provide a unique network-based graphics-manipulation system along with a set of novel manual and automated methods and processes that enable users operating network-capable computing appliances to efficiently create a variety of image and or text-based products with or without collaborative effort. The systems and methods of the present invention are described in enabling detail using the following examples, which may represent more than one embodiment of the invention.

System Architecture

Figure 1:
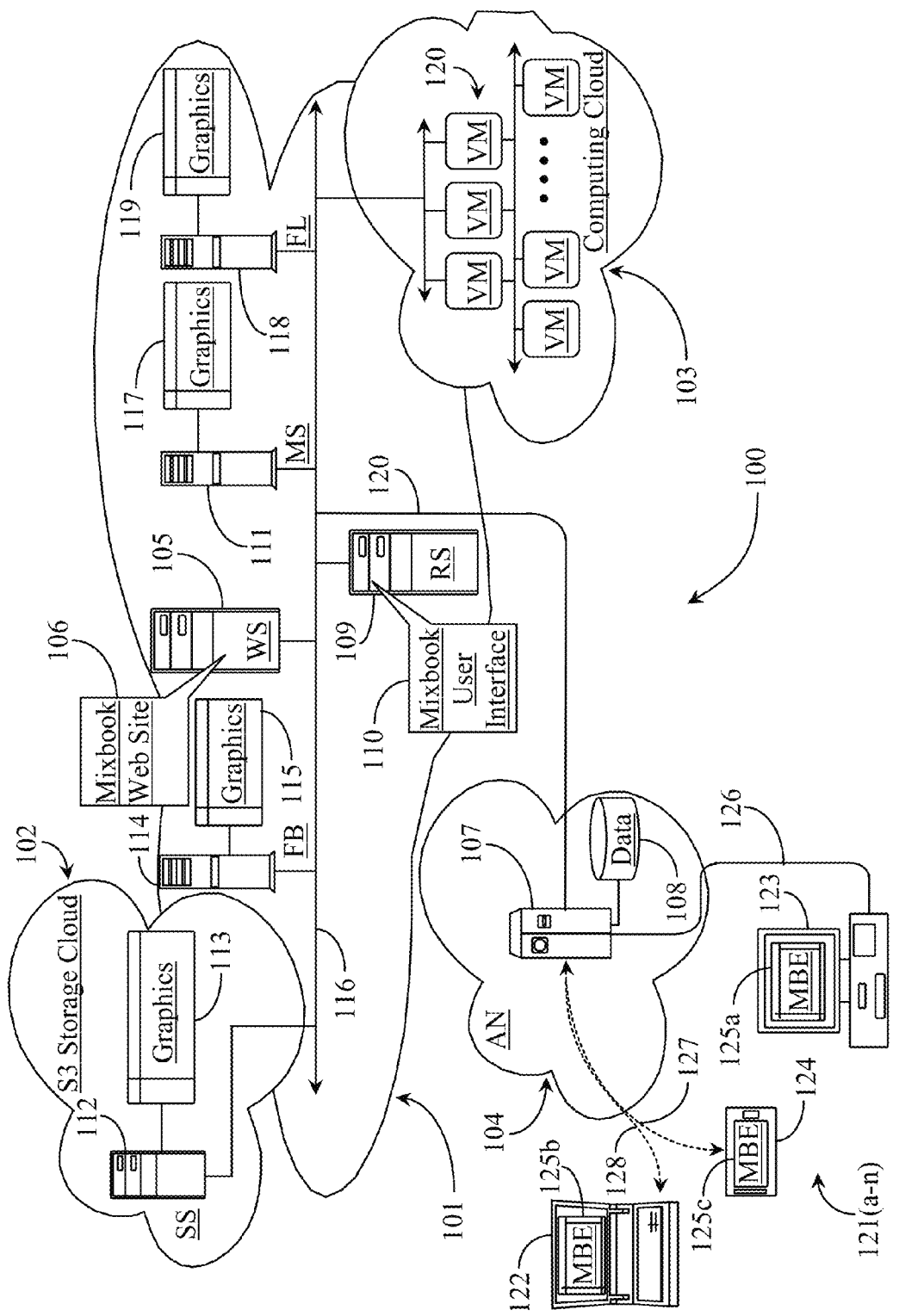
FIG. 1 is an architectural overview of a communications network supporting network-based graphics manipulation and production of image and or text-based products according to embodiments of the present invention.

FIG. 1 is an architectural overview of a communications network 100 supporting network-based graphics manipulation and production of image and or text-based products according to embodiments of the present invention. Communications network 100 includes a wide-area-network (WAN) that is in most embodiments the well-known Internet network. WAN 101 may be a private, corporate, or publicly-accessible data network without departing from the spirit and scope of the present invention. WAN 101 may be referred to throughout this specification as the Internet 101. Internet 101 is further illustrated by way of a network backbone 116, which represents all of the lines, equipment, and access points that make up the World Wide Web (WWW) as a whole including any connected sub-networks. Therefore, there are no geographic limits to practice of the present invention.

Internet backbone 116 supports a Web server (WS) 105. It is noted herein that all network-capable computing appliances such as physical computers, servers, and other computing machines discussed in this specification shall be assumed to contain, be coupled to, or otherwise have accessible thereto, one or more digital mediums adapted to contain the data and software required to support and enable the primary function or functions (in the case of multi-task machines) of the computing appliance.

WS 105 is an electronic information server connected to Internet 101 and adapted to serve information pages or Web pages as they are known in the art. WS 105 may be maintained by a third party that provides a Website hosting service. In one embodiment a service provider providing the service of the present invention owns and maintains WS 105. WS 105 hosts a Website 106, through which, users may access elements of the present invention. Website 106 is adapted to provide authenticated access to users who create, publish, print, and purchase image and or text-based products such as photo-books, photo-cards, photo-calendars, photo-posters, and related products.

Because all of the products are image and or text-based and created using a graphics manipulation system provided by the inventors as a network-based software application, the relative term descriptive of the overall process and for the providing company is Mixbook™. The term Mixbook™ may be used throughout this specification to describe the overall image and or text-based product creation and editing process of the invention, the Website through which the process is made accessible to authorized users, and the service-providing company.

Communications network 100 also includes an access network (AN) 104, which may represent any data network adapted to provide access to Internet network 101. AN 104 may be a public-switched-telephone-network (PSTN) or some other public or private telephony network. AN 104 may be a local wireless network, a cellular time division multiple access (CDMA) network, a Wireless Fidelity (WiFi) network, or any other candidate access network through which one may access Internet 101.

User may access WS 105, more particularly Mixbook™ Website 106, through an Internet access facility 107 in access network (AN) 104 and an Internet access line 120. Internet access facility 107 may be maintained and operated by an Internet service provider (ISP) or by a wireless Internet service provider (WISP), which ever is appropriate for any particular Internet connection. Users who might access WS 105 are represented herein as network-capable computing appliances, more particularly, a laptop computer 122, a desktop computer 123, and a smart telephone 124. Each mentioned appliance may be assumed to be Internet-capable by way of one or more network browsing applications residing thereon and executable there from.

Desktop computer 123 is connected to an Internet-connection server 107 by way of an Internet access line 126. Desktop computer 123, once connected, may access Website 106 hosted on WS 105. Desktop computer 123 has one or more input devices (not illustrated) coupled thereto such as a keyboard, a mouse, and a microphone for (Speech-to-Text Commands). Smart phone 124 may connect wirelessly via a wireless link 127 to an Internet service provider (also represented by machine 107) that establishes a wireless Internet connection like public WiFi for example. Smart phone 124 may or may not include a keyboard input device. In one embodiment smartphone 124 has a touch-screen display. Laptop 122 is illustrated as connected wirelessly to Internet 101 via WISP 107 using wireless link 128. Laptop 122 includes a keyboard and/or other input devices as may be appropriate.

Laptop 122, desktop 123, and smartphone 124 each include an Internet browser application (not illustrated) for accessing and navigating network 101. Backbone 116 supports a runtime server (RS) 109 adapted to host a Mixbook™ user-interface 110. User interface 110 is accessible to all Website visitors for the purpose of creating, manipulating, and printing image and or text-based products such as a photo collage book, for example. Users accessing Website 106 who are ready to create a product may be re-directed to RS 109.

Each user authorized to create and publish an image and or text-based product using the site may receive a small download containing a compact editing package known as the Mixbook™ editor (MBE) to the inventors. MBE 125*a* is installed as a browser-based extension or plug-in in one embodiment on desktop computer 123. Laptop 122 has an instance of MBE 125b installed as a browser-based extension or plug-in. Smartphone 124 has an instance of MBE 125c installed as a browser-based extension or plug-in. An instance of MBE may be customized for any computing appliance that may access the Internet and through which a user may see and edit content. Therefore, MBE instances 125 (a-c), though the same basic extension or plug-in, may contain differences based on host requirements. In one embodiment of the present invention there are no software downloads required in order to practice the present invention. In this case the Mixbook™ editing SW may be server hosted only. In another embodiment, the Mixbook™ editing SW may be ported to a desktop application such as Adobe Air™ and thus be operated as a desktop application. In one embodiment the SW is included as an add-on feature to any suitable desktop application and may be installed on a computing host with that desktop application from a removable medium such as a CD ROM, for example.

Service provider facility 107 includes a connected data repository 108 labeled Data. Data repository 108 contains all of the customer contact and billing information for the Internet service provider. One with skill in the art will appreciate the many possible internet connection schemes. It is preferred in most embodiments that user have a high speed Internet connection for the purpose of manipulating and editing graphics, which can be bandwidth intensive. The inventors provide one or more innovative solutions for saving bandwidth while editing images and image products online making the entire experience more efficient and easier for users practicing the invention.

The Mixbook™ Website 106 establishes a community-based portal and social interaction site that revolves around creating, editing, sharing publishing, printing, and purchasing image and or text-based products created online by one or more user working in collaboration together. Users such as those operating appliances 122-124 connect online and navigate to WS 105 to access Website 106. When any user determines to create an image and or text-based product like a photo album, for example, they are directed to an appropriate portal server like RS 109 hosting Mixbook™ user interface (UI) 110. UI 110 is adapted to provide all of the assets needed to create and publish complete image and or text-based products. Image and or text-based products created through Website 106 include products containing images uploaded by one or more authorized users. Any work in progress or completed is termed a project. A project may be initiated by one user whereby other users are then invited by the initiating to join the creative experience in collaboration and those users may contribute their own photos to the project. Such a project may be published for viewing by all or some of the community. Finished projects may be printed and distributed as "hard products" available for purchase by members of the community.

In one embodiment persistent storage of graphics uploaded by community members to be included into projects is obtained (leased) through a third-party storage provider. In this example a simple storage service (s3) data storage cloud 102 is illustrated and made available for use by a third-party service provider such as Amazon™. A storage server 112 is illustrated within s3 cloud 102 and has connection to Internet backbone 116. SS 112 may be one of many servers including associated mass data repositories connected to SS 112 such as repository 113 contained within storage cloud 102. In this logical representation all of the graphics (photos) that are uploaded to insert into projects are stored in a repository such as repository 113 in storage cloud 102. Repository 113 may be an optical, magnetic, or some other type of data storage facility. In one embodiment the mass computations required for real-time and transparent editing and collaborating on multiple projects are performed by virtual machine instances 120 in a computing cloud 103. In another embodiment the service host may maintain one or more powerful computing machines and storage devices for performing computations and for storing graphics for users of the service.

In use of the present invention a user such as one operating one of computing appliances 122-124 connects online and accesses Mixbook™ Website 106 and logs into the site. If the user has already registered and created a project, a Web page personalized to that user is served that includes all of that user's projects in the latest states of progress. The user may enter any project for which she or he has authorization to contribute to and may review, edit, or otherwise work those projects. Photos uploaded by the user to include into projects may be stored in cloud 102 and served to the projects when needed by the system. Any computing such as editing resizing, alterations, and so on may be handled in cloud 103. A user may, through Website 106, authorize other users registered with the service of the invention to collaborate on a project initiated by that user. In one embodiment a user having a project initiated may invite other potential users to the site so they may, with permissions, enter the site and collaborate with that user.

In one embodiment of the present invention photos that are stored on the Internet can be represented in any online project provided the user has authorized access to those photos. For example, a user who has one or more accounts to third-party social interaction networks like MySpace™, Facebook™, Photobucket™, Flickr™, or similar sites may use photos of registered friends that they are allowed to access in their own personal projects. These photos do not have to be uploaded to the service of the present invention. Rather, these photos can be accessed from their present storage locations anywhere on the Internet provided that the storage system is online.

Internet backbone 116 supports a Facebook™ server (FB) 114 coupled to a data repository 115 for storing images and other graphics. Internet backbone 116 supports a Myspace™ server (MS) 111 coupled to a data repository 117 adapted to store images and other graphics. Backbone 116 supports a Flickr™ server (FL) 118 coupled to a data repository 119 adapted to store images and other graphics. Any of these images can be served to an active project by the respective servers directly from their storage locations. Any of these images that are altered during project work or collaboration may be subsequently saved to third-party s3 storage cloud 102 in repository 113 controlled by SS 112.

In one embodiment of the present invention Mixbook™ Website 106 includes or has working access to a SW print engine (not illustrated here) that is adapted to render any Mixbook™ project for professional printing. In one embodiment printing is performed by a third-party provider who may also ship or distribute finished products for a price. In one embodiment a user may access the service through Website 106 and may initiate and complete a project that will be printed for that user for a static price for that particular product.

It is noted herein that a project created on Mixbook™ may be efficiently gathered for print in virtually any print format. Likewise, content originally laid out in one format or aspect ratio may be efficiently converted to another layout before printing in an automated process that incorporates the typical size and layout changes necessary to convert from one layout to another automatically. Furthermore, content assembled for a particular layout and product type may be automatically converted for print output in another layout and product type. These and other unique advantages over current systems will be made apparent in the following examples.

Figure 2:
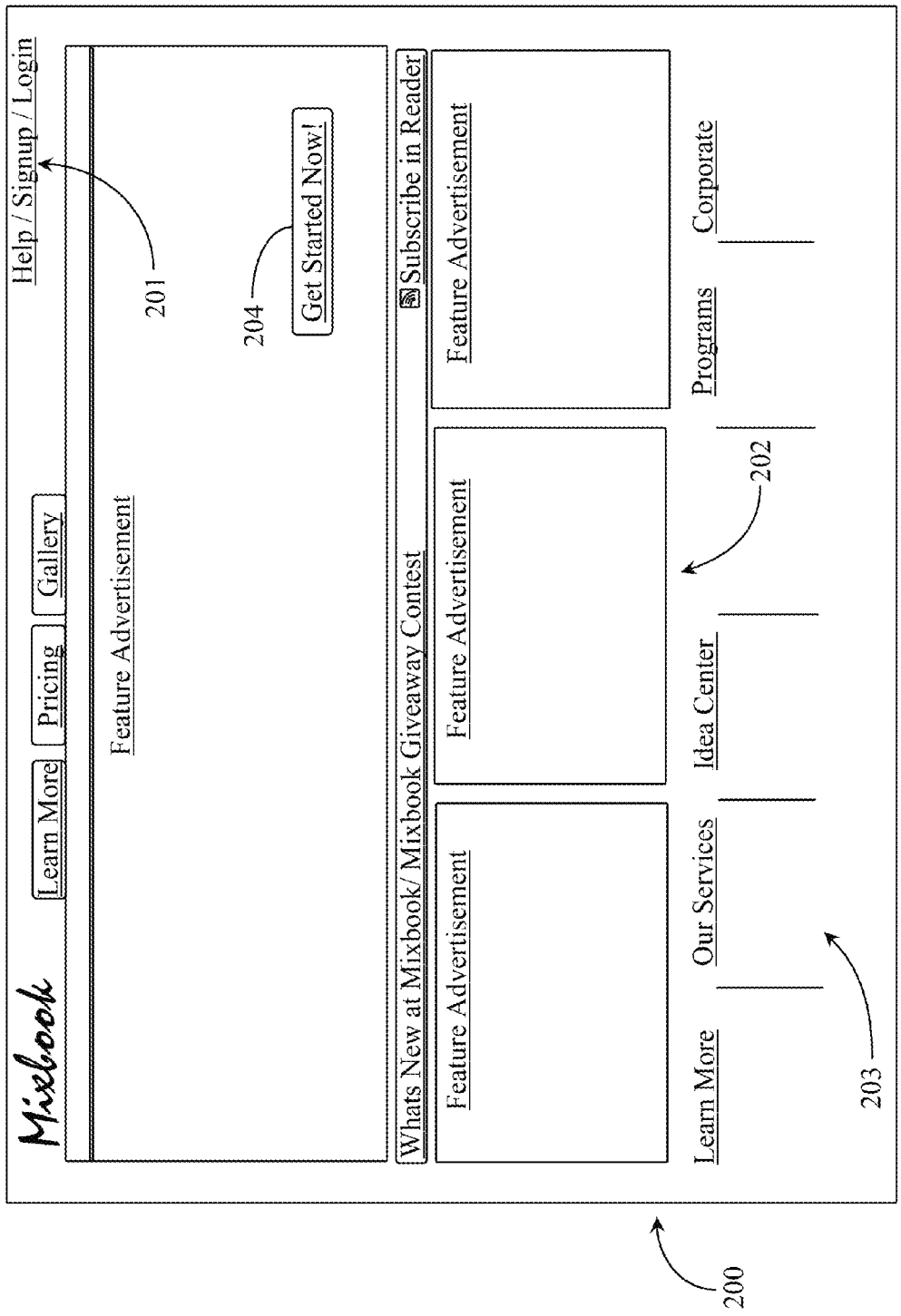
FIG. 2 is an exemplary screen shot of an introduction page of Website of FIG. 1 according to an embodiment of the present invention.

FIG. 2 is an exemplary screen shot of an introduction page 200 of Website 106 of FIG. 1 according to an embodiment of the present invention. Introduction page 200 includes interactive indicia 201, which includes an option for retrieving help, signing up for service, and for logging into the service. On the same title bar containing the interactive indicia 201 for signing up or signing into the process, there are the navigation options Learn More; Pricing; and Gallery. The option "learn more" leads to additional information about the services provided, such as product quality, use cases, etc. The pricing option brings up one or more complete pricing structures for the available products that can be created and printed. The option Gallery is an option that provides access to completed projects authorized for public viewing.

Page 200 contains more than one feature advertisement 202. Each feature advertisement may comment or provide some input, access to, or information about a feature of the service or fact about the providing company. In the first feature advertisement (center top) there is an interactive option 204 for getting started now. Invocation of this interactive link may launch a registration or sign-up process followed by an opportunity to begin a Mixbook™ project. Hyperlinked information is provided on introduction page 200 under categories such as Learn More, Our Services, Idea Center, Programs, and Corporate.

In one embodiment, page 200 includes an option "try it now", which may be replace option 204. Invoking such an option may take the "guest" to a Mixbook Editor™ without requiring them to login or have an account with the site. Transparent to the user, the system creates a temporary account for them. If the new guest user attempts to save any work on the site they are asked to register as a user.

Figure 3:
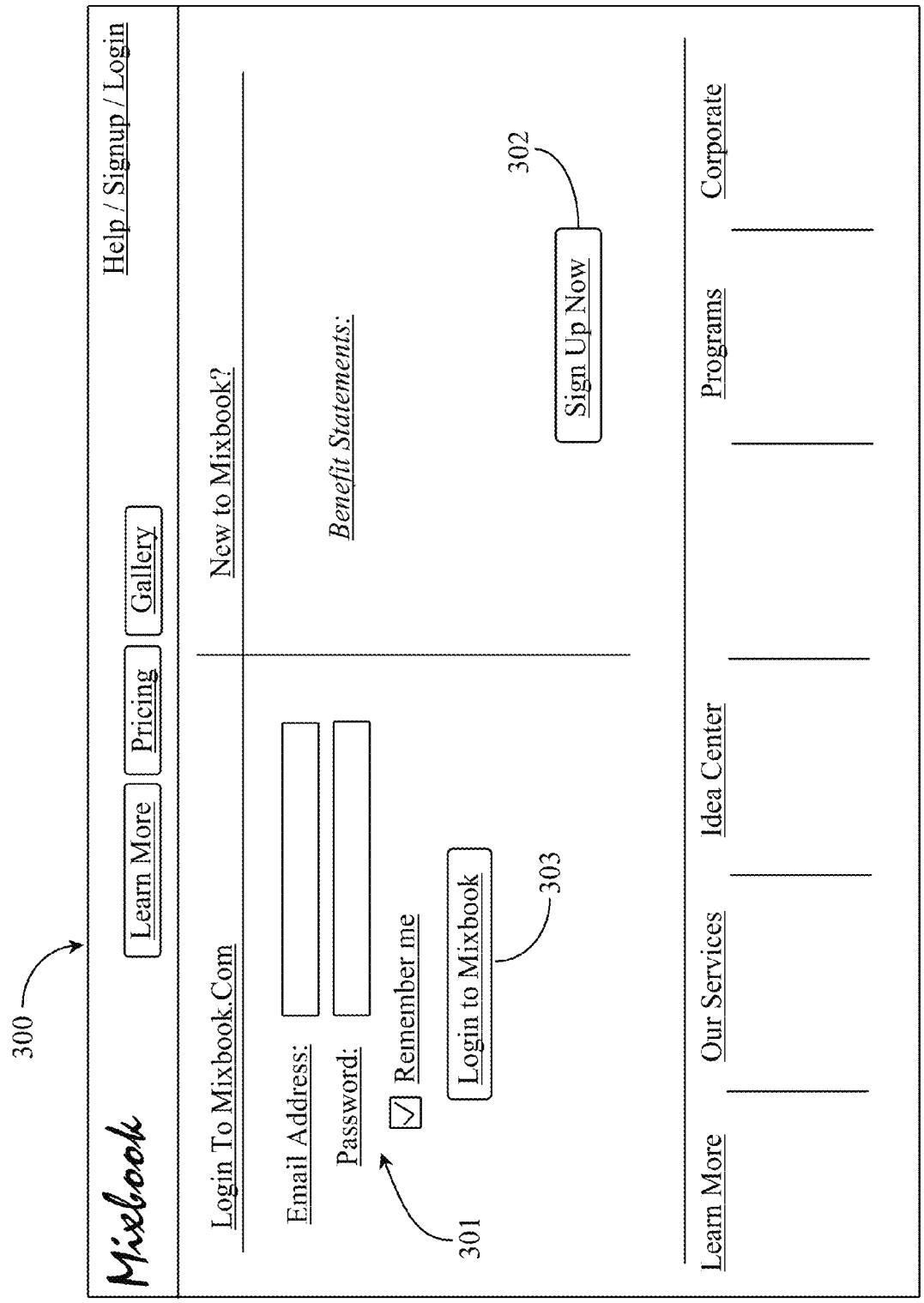
FIG. 3 is an exemplary screen shot of a login/sign-up page presented to a user as a result of interaction with the introduction page.

FIG. 3 is an exemplary screen shot of a login/sign-up page 300 presented to a user as a result of interaction with the introduction page. Login/sign-up page 300 includes a log-in interface 301 for entering an email address and password for authenticating the user to use the site. A login button 303 is provided for submitting the authentication data and logging onto the site. If a user has reached page 300 and has not yet signed up for the service of the present invention, the user may be presented with various benefit statements and a signup now button, which when invoked calls up a registration interface.

Figure 4:
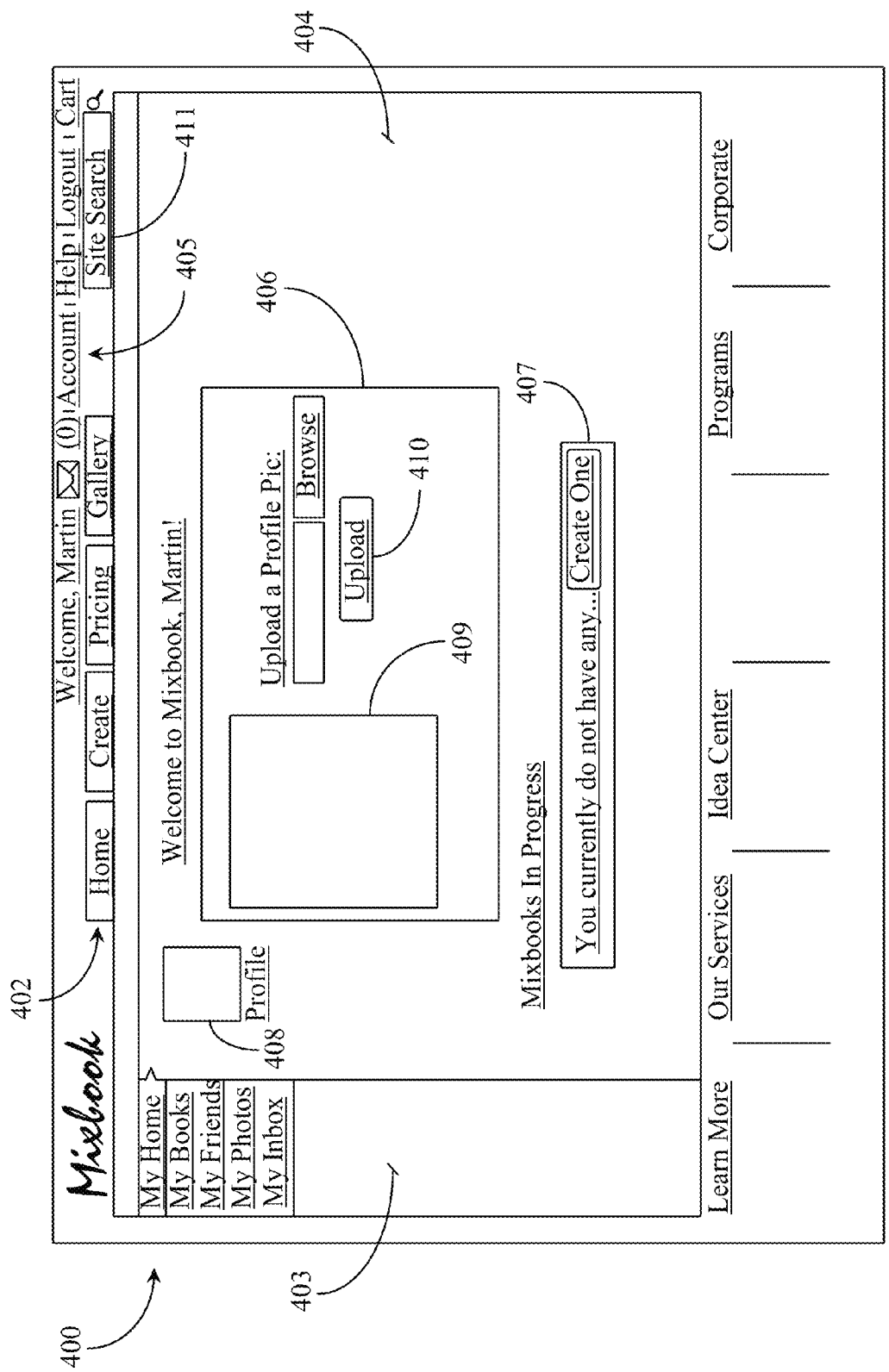
FIG. 4 is an exemplary screen shot of a welcome page presented to a user as a result of successful login to the site.

FIG. 4 is an exemplary screen shot of a welcome page 400 presented to a user as a result of successful login to the site. Page 400 is a welcome home page personalized for the user. Page 400 includes navigation options 402 including the locations Home, Create, Pricing, and Gallery. The link Pricing takes a user to a pricing page detailing different prices for ordered products. The Link Gallery take a user to a gallery of public Mixbook™ products created by community members who have given permission to view their created products.

Page 400 includes a personal welcome and may also include information 405 including status indication of an email account provided to the user as part of the service. Information 405 also includes account information, a Help option, an option for logging out, and a link to a shopping cart for purchasing Mixbook™ products. A user may purchase products created by that user or products created by others that the user is authorized to purchase. Page 400 includes a sidebar area 403 that includes several navigation links such as My Home, My Books, My Friends, My Photos (uploaded) and My Inbox (provided mail account).

Page 400 includes a workspace window 404 that contains an interface 406 for uploading a picture for creating a profile. Interface 406 includes a data entry field to enter the path of a picture or the user may browse the commuting appliance for a profile picture. An upload button is provided to effect upload of a profile picture. A place holder 409 is provided to display the uploaded picture. After creating a profile and uploading a profile picture, the profile picture appears as a profile link 408. Page 400 has a site search button 411 adapted to enable that user to search the Website using a keyword or phrase.

Page 400 includes a status report or listing 407 that tells the user what projects are active or available to the user. This may include projects created by the user and any projects initiated by others that the user has authorized access to. In this example, the user has yet to create a Mixbook™ product. Listing 407 includes an interactive command option (Create One) for creating a product such as a photo-book for example.

Figure 5:
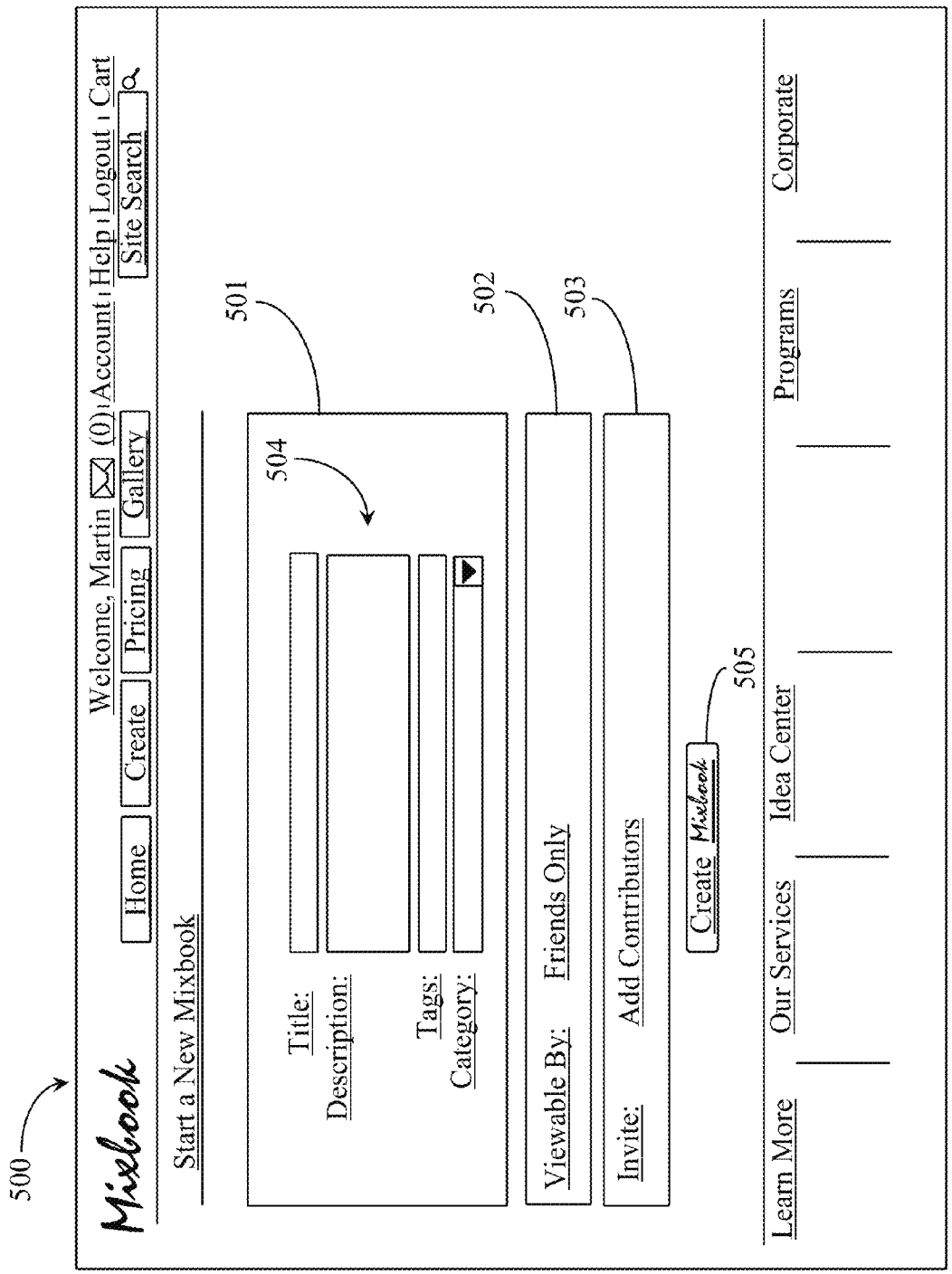
FIG. 5 is an exemplary screen shot of a project configuration page presented to the user as a result of interaction with the Create option of the page of FIG. 4.

FIG. 5 is an exemplary screen shot of a project configuration page 500 presented to the user as a result of interaction with the Create option of the page of FIG. 4. Page 500 includes a workspace window 501 for entering information about a project that a user wants to initiate. Information fields 504 include a project title field, a project description field, a field for entering tags for the project, which may be used later by friends of the user or by other community members to search for the project. Fields 504 also include a category field for selecting a category of a project.

A configuration option 502 is provided for electing who may view the proposed project. In this example the project will be viewable by friends of the user. An invitation window 503 is provided for enabling the user to invite or add contributors to the project. A contributor is any of the user's friends or any other community member that the user invites to contribute. In one embodiment a project may be initiated by a user and may be designated open to all contributors or all of the site's community members. Online community members represent an active network established to aid book creation.

The inventors emphasize the idea of a community that develops around creating projects such as photo book. More importantly the system streamlines the act of starting projects by creating a social interaction network on the site to help propagate book creation. For example, by linking with friends and family on the site, the user can utilize the platform for inviting other site users to collaborate on a project such as a photo book with them, rather than having to enter their email addresses. Members of this network are community members termed "Friends" from the perspective of an inviting user.

When the user begins a project such as a photo book and enters book information, the user is enabled to select members from his network (friends) already registered with the site to help work on it. This allows the user to quickly select the appropriate members to contribute material to the book without having to enter their email addresses.

The system of the present invention enables real-time collaboration. Users may interact with one another in real time as they collaborate on a project. A user may be a contributor without necessarily collaborating in real time with the creator or other users on a project. The transparency of collaboration is such that users may communicate with each other while working on a particular book and may also view real-time editing and creation of that book while it is happening.

As multiple contributors work on a multi-page project such as a photo-book for example, they are able to view the edits made by other users in real time such as adding, changing, and removing pictures and text. For example, a user that is viewing a page that a contributor is working on will see a picture move or some other changes happening on the page in real time.

The system supports presence reporting so any user can see real-time status of all the other current contributors or editors of the project and may invite any of them to collaborate on the page(s) the user is working on. When two users are on a same page, they can annotate and change the page in real time, and see each other's mouse cursors in real time as they move across the screen. When a user selects friends and/or family to contribute to a project such as a photo book at the time project initiation or by selecting the collaboration feature after the book as been started, those selected friends or family will be sent automated invitations to contribute to the selected book. Once a friend or family member accepts such an invitation they will automatically be approved as become a contributor of the book.

Members of the network who are contributors to a project will be able to add various materials to the project including but not limited to photos, videos, text, and pages that have already been created on the site. When a new project is created the creator and/or contributors of the new project such as a photo book may take pages from other existing photo books on the site and may use them in the new book. In this way, many different projects may use the same project pages. When members become contributors to a book they have the option of adding any pages that they have previously created on the site in addition to pages of their friends that they have permission to use and any publicly available pages on the site. Adding pages from other projects can be done two different ways.

In one embodiment a same page added to a project that exists in one or more other projects may be referenced so that any changes made to that page affect every project that has this page present. In another embodiment a same page found in another project and contributed to the new project is copied so that any changes made to the copy will not propagate to the original page. Members of the site may search public projects and pages and may use any public pages they find on the site. A public page is a page created by a member of the site that is allowed to be used by any member in any book. Users will have the option to use these pages in any book that they create or contribute to. In one embodiment part of a project may be public while other parts of the project are held private. A public page may be embedded in a project that has pages private pages not made public.

A server such as RS 109 of FIG. 1 facilitates transfer of information between users collaborating in real time on a project. For example, if five collaborators are in the process of editing a book, the server can use open socket connections to read when each user is making a change and then push the change data in an unobtrusive way to the other collaborators. The Mixbook™ editor (MBE) enables live messaging between users or friends that are currently collaborating on a project whereby all of the users are using the MBE. In this way users may exchange ideas, tips and other information as they edit a project together.

Invitation window 503 may be expanded to enable a user to view any of the user's friends that are registered with the service as "friends" of that user. In one embodiment those friends are flagged as being "Online" or "Offline" using a suitable presence protocol. In both instances, a user may invite any of the "online" or "offline" friends to contribute or collaborate in real time on a project. One invitation may be sent to multiple users. When a user receives an invitation to collaborate on a project, the invitation may appear as a pop-up window, or some other visual that identifies the sender and the nature of the project. An invitation may also contain a text body describing the project and what type of collaboration is desired. A create Mixbook™ button is provided to continue the process of book creation. Invoking button 505 calls up a next screen adapted to enable the creator to select the size (form factor) of the project.

In one embodiment users may form groups around areas of interest. In this embodiment a user that belongs to a group created around a subject of interest may start a new project such as a photo book relating to the subject around which the group was founded by clicking on a "start new book" button on a main page established on the site by the group. The group project initiation automatically included the group members as collaborators. This represents yet an additional way the community network is leveraged as way to propagate more project creation.

Figure 6:
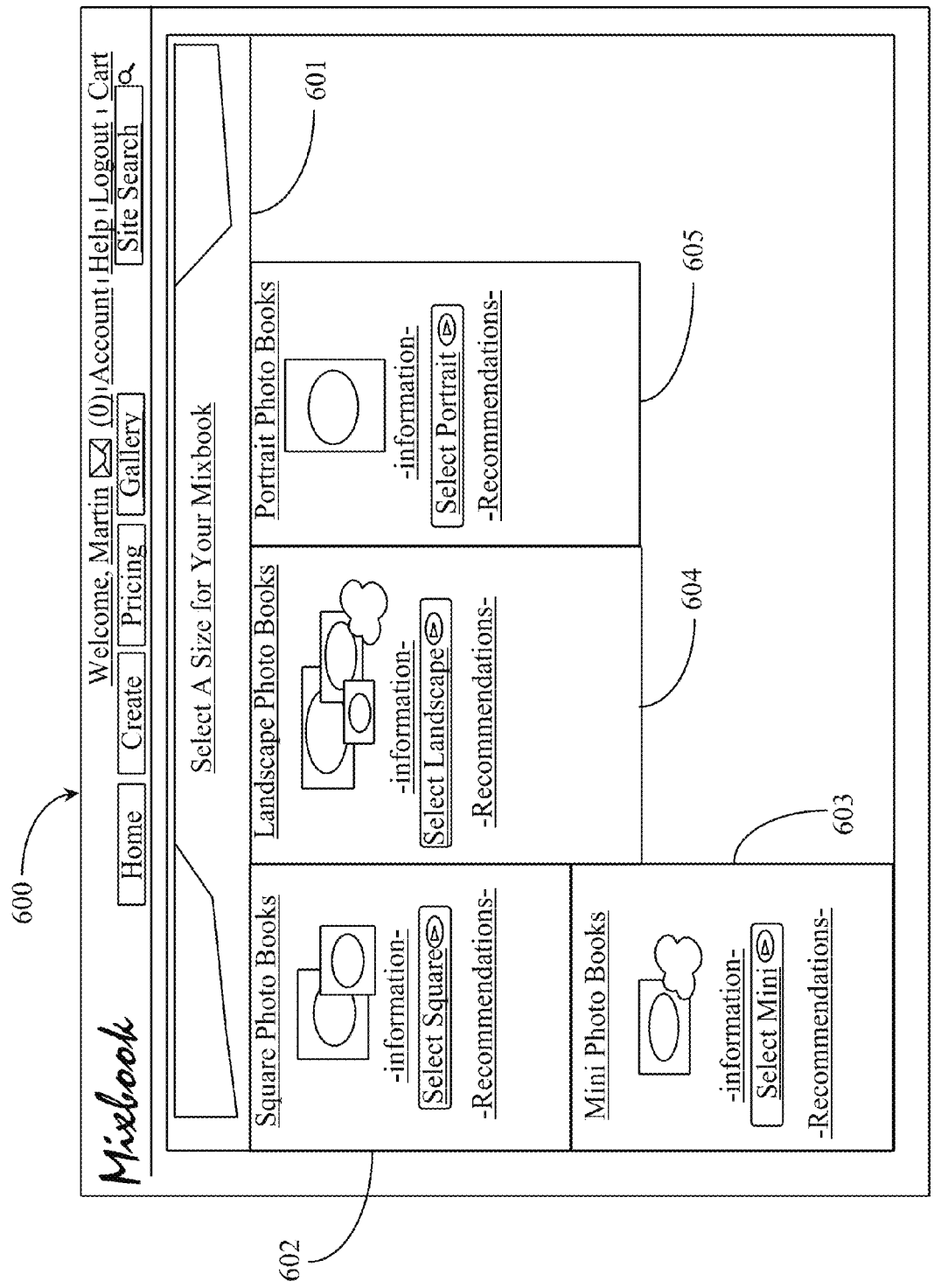
FIG. 6 is an exemplary screenshot of size-selection page for selecting an initial orientation and size for a project.

FIG. 6 is an exemplary screenshot of size-selection page 600 for selecting an initial orientation and size for a project. In this example, all of the project options are for multiple page photo books. Other project options may be made available to a user without departing from the spirit and scope of the present invention such as a photo card, a poster board, or some other type of publication that utilizes photos and/or and text.

A banner feature advertisement 601 states the intent of page 600 of helping the user to select a size for a Mixbook™. The feature advertisement may include text information (not illustrated) that informs the user that the service is free for creating and publishing a project and that printed materials begin at a specific price range. A user may also click on "Pricing" at the top of the page to determine what the current prices are for printed projects.

Page 600 includes an option 602 for selecting a square photo book that can be printed in two available sizes. Although not illustrated, the exact sizes which are exemplary only are twelve inches square and eight and one-half inches square for a square photo book. Other sizes may be offered for a square book without departing from the spirit and scope of the present invention. Option 602 includes information that the book may be ordered in soft or hard cover. Option 602 includes recommendations that are not specified in this example but may include what the system recommends selection of a square book is best for such as, best for a storybook (baby), a digital scrapbook, or a photo book that is shared online.

Page 600 includes an option 603 for selecting a mini-photo book that is a landscape orientation and that is only available in one printed size. Although not illustrated here the exact size of the mini photo book is six inches by four inches. Option 603 includes information that the book may be ordered in soft cover only. Option 603 includes recommendations that are not specified in this example but may include what the system recommends selection of a mini book is best for such as, family brag book, portable photo album, or gifts. An additional piece of information is represented by an information cloud adjacent to the mini-book sample. In one embodiment this additional piece of information may be pricing information. The information contained in the information cloud may also be some other type of useful information without departing from the spirit and scope of the present invention.

Page 600 includes an option 604 for selecting a landscape photo book that can be printed in three available sizes. Although not illustrated here the exact sizes which are exemplary only are fourteen inches by eleven inches, eleven inches by eight and one-half inches, and eight inches by six inches. Option 604 includes information that the book is available in hard cover or in soft cover. Option 604 includes recommendation by the system that selecting a landscape book is best for wedding photo books, guest photo books, or a photography photo book. An additional piece of information is provided in an information cloud associated with the medium sized landscape sample illustrated in option 604. In one embodiment the information in the cloud designates the sample as the most popular size of landscape book. Other types of information may be tagged to the samples using an information cloud without departing from the spirit and scope of the present invention.

Page 600 includes an option 605 for selecting a portrait photo book that can be printed in one size of eight and one-half inches by eleven inches. Option 605 includes recommendation by the system that selecting a portrait size is best for creating a class yearbook, a team or group yearbook, or a child's storybook. It should be noted herein that the offered sizes in the different orientations are not intended to be limiting in any way. A number of other sizes might be envisioned for print for any orientation without departing from the spirit and scope of the invention.

Figure 7:
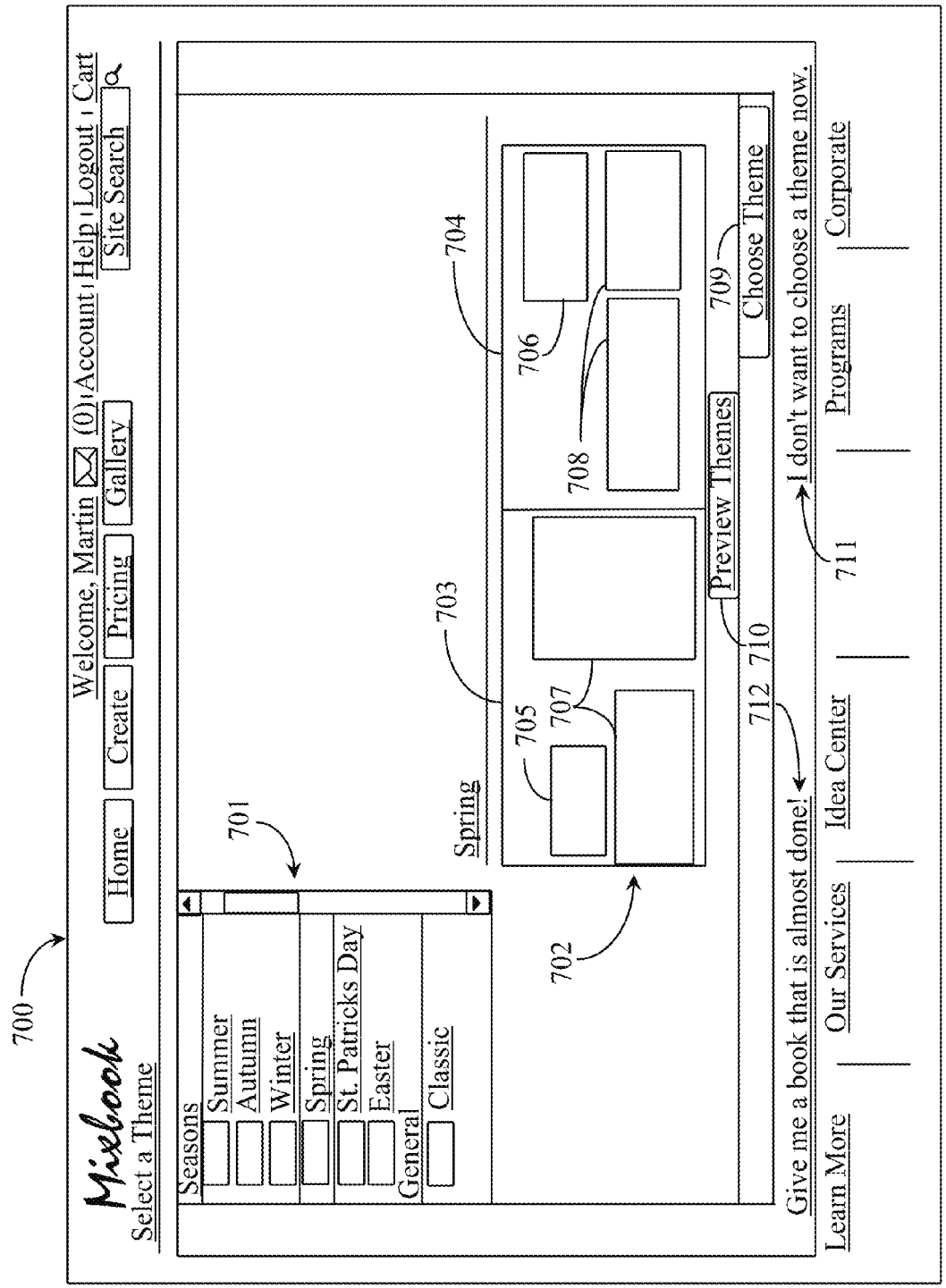
FIG. 7 is an exemplary screen shot of a theme-selection page for selecting an initial theme for a project.

FIG. 7 is an exemplary screen shot of a theme-selection page 700 for selecting an initial theme for a project. Theme-selection page 700 includes a scroll menu 701 that contains a number of themes that a user may select from for use in a project. In typical order, theme selection may take place immediately after size and orientation selection when configuring project parameters. Illustrated in the visible portion of the window are themes for "Season" including Summer, Autumn, Winter, Spring, Saint Patrick's Day, and Easter. Themes listed under "General" include Classic. Other theme categories might include Wedding, Travel, Baby, Family, Occasion, Holiday, Romance, and Education among many other possibilities. In one embodiment a user may create a new theme.

In this example the theme Spring under the category Seasons is selected. Page 700 includes a preview pane 702 adapted to show the theme layout suggested for the size and orientation of the project being created. A layout in the preview pane 702 includes a page 703 on the left and a page 704 on the right. On page 703 there are two photos 707 and one text box 705. On page 704 there are two photos 708 and a text Box 706. All of the photos are those that come with the sample that the user has selected from menu 701 (sample photos).

A user may select preview theme by invoking option 710 to view a theme in the form of the intended product. The user may then select another theme from theme pool 701 for preview until the user selects a theme they want. A user may choose a theme by invoking a choose theme button on the Website. When the user invokes this option the theme will be incorporated into the project template. A user may invoke option 710, which is an option not to select a theme. A user may also invoke an option 712, which requests that the system load a project of the selected size orientation and theme with suggested stickers, backgrounds, and photos (if applicable). Invoking the choose theme option 709 moves the project to the editing stage.

Figure 8:
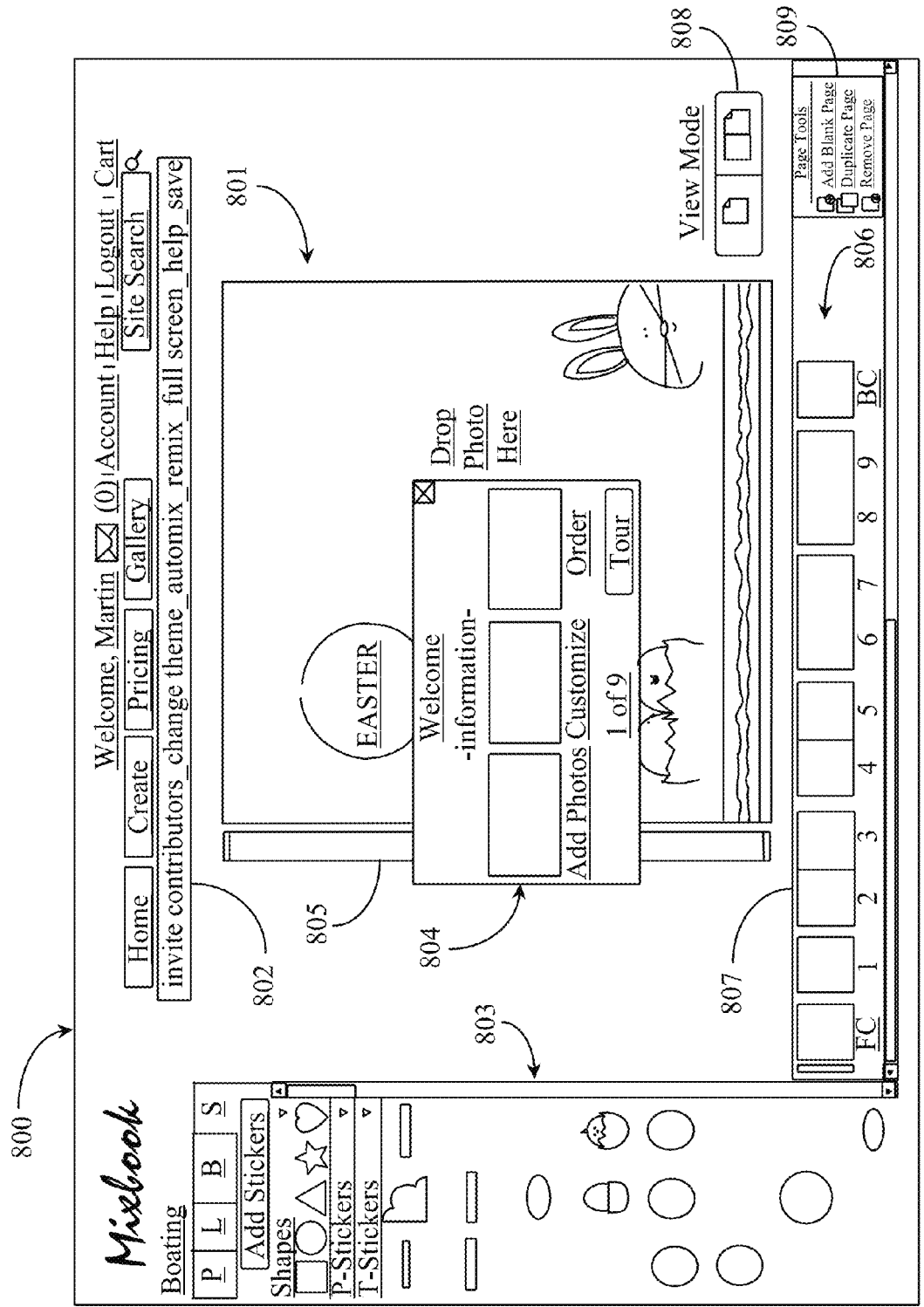
FIG. 8 is an exemplary screen shot of a Mixbook Editor™ (MBE) user interface (UI) for editing a project in progress according to an embodiment of the present invention.

FIG. 8 is an exemplary screen shot of a Mixbook™ Editor (MBE) user interface (UI) 800 for editing a project in progress according to an embodiment of the present invention. UI 800 includes some of the options presented on previous pages including a personalized welcome, an inbox mail indicator, an account option, a help option, a logout option, and a link to a shopping cart. Also present from previous pages are the navigation links to Home, Create, Pricing, Gallery, and Site Search.

An information bar 802 contains an array of selectable options invite contributors, change theme, automix, full screen, help, and save. It is noted herein that the system of the present invention initiates and completes auto saves to a user's Mixbook™ project at opportune moments such as when the user changes pages within the project when editing. In this way the most data a user may lose is data on one project page.

By triggering a save event on specific actions the system mitigates a user's loss of data in the event of software crashes and other catastrophic events. This system works by persisting the canvas (page) data to the runtime server from the client via a client/server communication channel such as an Action-Script Message Format (AMF) remote framework, which transfers AMF data between the client and the server. This pull system mitigates the amount of work a user could potentially lose on a project to just one canvas page worth of data. It also drastically simplifies the process of creation by removing a recurring step.

In one embodiment, the auto-save feature activates whenever a page is swapped out in the viewing window or "viewport" of the GUI editor. Various other auto-save triggers may be configured and triggered according to established rules. In one example, the auto-save feature triggers when a specific amount of time elapses while they are working within the editor. In one embodiment the auto-save feature triggers when a pushed event is received by the client that informs the client that the site is going down or for any reason. In one embodiment the auto-save feature triggers when a specific copious amount of changes are made on a single page without save, a threshold established to define the amount or weight of the changes made.

The automix option in information bar 802 is an automated process driven by an algorithm. Automix takes the user's photos and dynamically creates new pages based on the project's theme and the size, orientation, and metadata of the user's photos. UI 800 has a side bar area 803 that contains assets that may be used in creating the project. Sidebar 803 is scrollable and includes at least four interactive presentation controls, each representing a category of assets, which when invoked provide access to certain assets under each category represented. The control furthest to the left of the FIG. labeled P for photos. Invoking Photos loads all of the user's uploaded photos into the scrollable area for use in the project. The next control to the right labeled L is for layouts.

A layout is a page or spread configuration containing photo slots and text boxes along with shapes and stickers that go with the theme of the project. Under layouts, there are subcategories for project layouts, theme layouts, and recommended layouts. A layout may be a system provided layout or one that is created by a user from scratch elements. A next control over to the right is labeled B for backgrounds.

A background is a page background that underlies the added content. When a background image is stored by the system, the system, in one embodiment, creates a mirror image of that background by default. This unique process is termed background "flipping" by the inventor. By default, all background images are stored as "mirrored images" (original and flipped version). In this way when a user selects a particular background image for two adjacent pages, the flipped image is used as the second background image and may be auto-inserted onto the page. For assets that display one or more asymmetric aspects, background flipping provides a more aesthetic look to a two-page photo book spread. Flipping of assets (storage of mirrored images) may be practiced by default on backgrounds, layouts, photos, and stickers without departing from the spirit and scope of the present invention.

In one embodiment, an algorithm drives the background flipping process by first identifying a background image that is asymmetrical in characteristic such as having an asymmetric coloring, texture, pattern, etc. Any images that qualify are flipped meaning that a mirrored-image copy of the original is created and stored alongside the original. In addition, the system automatically serves a "flipped" image where useful such as when a two-page photo book spread will use the same background image. The left canvas would contain the original background image while the right canvas would contain the mirrored image auto-inserted when the background was selected by the user for application to the spread.

The next control furthest to the right is labeled S for stickers. The system maintains clip-art called stickers comprising shapes and other clipart images used as content to dress a layout on a page. The category of stickers includes shapes, project stickers and theme stickers. Project stickers are those that are currently being used in a given project and theme stickers are those that are considered relevant to a project theme. Sidebar area 803 serves as a content interface within UI 800 that provides access to all content whether it is system-provided or user-provided.

In one embodiment the system of the invention includes a recommendation engine driven by several different algorithms that intelligently recommends content according to several different criteria. For example, certain theme-related stickers might be recommended to a user based on the theme selected for a project. If the project theme is babies, then baby related stickers known to the system would be displayed to the user ahead of any other sticker types. In another embodiment a hierarchal recommendation system is provided whereby the system makes suggestions or recommendations of content based on number of times the content is used by others, commented on by others, ranked by others, and so on. Using a recommendation system helps expedite the project creation process by displaying the most relevant or used content assets to the user first so that the user does not have to search or browse for relevant content assets to include in a project.

In one embodiment a method for selecting a photo from a plurality of photos placed in the project by a project contributor for recommendation includes (a) accessing the contributor's project photos stored in the database, (b) weighting data associated with each photo used in the project against one or more business rules, (c) selecting one or more photos based on the weighting results of step (b); and (d) recommending one or more photo products containing one or more photos selected at step (c) to the contributor at an appropriate time.

In a preferred embodiment, stickers such as shapes may be adapted as photo-viewing windows or "photo-slots" complete with all of the unique properties of a photo-slot such as access to the photo panning tool, photo-edit tool, and other tools for editing. Shapes may also be used as text boxes. There are many possibilities.

UI 800 includes a content storyboard 807 that displays all of the pages and, or "spreads" 806 of a project in sequence at the current edited states of those pages or spreads. A spread is simply two or more single pages connected as a spread of pages. Storyboard 807 is scrollable and may contain as many pages as are included in any project. A user may click on any of the pages or spreads in storyboard 807 to bring it up for active display and editing. A user may select a viewing mode 808 (bottom right) for viewing a single page or for viewing a page spread. A page tools interface 809 is provided in UI 800 to enable simple page manipulations such as adding a blank page, duplicating an existing page, and removing an existing page from the storyboard.

In this example the front cover 801 and the spine 805 of a photo book are displayed for edit in UI 800. The front and back cover are considered pages but are not numbered in this example. Spine 805 is also considered a page. Interface 800 includes a welcome message 804 that may appear on display when the user invokes the editing process. The welcome message includes a warm welcome to the user followed by some general information about the service and expectations. The pop-up may prompt a user to add photos to the relative project, customize the project, and when satisfied with the project, order one or more printed copies of the project. In one embodiment a themed page already containing stickers and photo-slots can be added.

In one embodiment a user may remix a project that is in progress or finished. A page may be remixed by interacting with a remix option provided in toll bar 802. Remixing can be undertaken to change the various aspects of a page including but not limited to changes in layout of the page, changes to the background of the page, changes to the fonts of the page, and changes to the styles of items on the page. Remixing a page may also include adding or removing page items like stickers, photos, text boxes, and shapes. Remixing a page may also include changing effects or the current cropping of items on the page.

In one aspect all of a user's remixing efforts are undoable by clicking on an editing undo button or dialog box. A user may remix any number of pages any number of times. During the remix operation, a user may be enabled to include photo effects such as B&W, sepia, antique, and so on to all page photos. The user may also be enabled to include mean brightness and contrast adjustments on all of the photos in the remix and application of font on the page may be included to match as well. A layout change may source from a pool of layouts stored by the system. A layout change may also originate from an automated layout algorithm that automatically lays out all of the items on a page.

The automated layout algorithm described above may select a special layout and then may convert a group of photos into a canvas page. A specific layout may be chosen based on the corresponding photo group data by the algorithm which further minimizes the amount of zooming or scaling that must be afforded the photos. By minimizing the amount of scaling required, the resulting canvas page fits the photos into photo slots of similar orientation and subsequently requires very little zooming of the photos. This lends to higher quality output once a user chooses to purchase a created project in a high-dot per inch (DPI) output.

In one embodiment a flash tool for creating books is embedded in the editing system of the present invention. The flash window expands automatically to fill up the user's browser space when the user increases the size of the window. The flash window contracts to fit as well if the user decreases the size of the browser space. Using JavaScript on Resize events, the page creation canvas is adjusted in size to either zoom in to or out of the created book page as the user resizes their browser.

In one embodiment the system may access data quickly for display while uploading a bandwidth intensive file like a high resolution photo. Bandwidth is a precious resource on the Internet. Photos typically use a lot of bandwidth during transfer from one network location to another. While a user uploads photos, the system has the capability of accessing enough of the data using FP 10 to create stand-in thumbnails of the uploading photos so that a user does not have to wait before resuming the editing process. Once the photos are uploaded, they automatically replace the thumbnails and take on all of the attributes applied to the thumbnails in the absence of the real photos. In this way user will be enabled to work on a group of uploaded photos immediately using the thumbnails as a stand-in.

Figure 9:
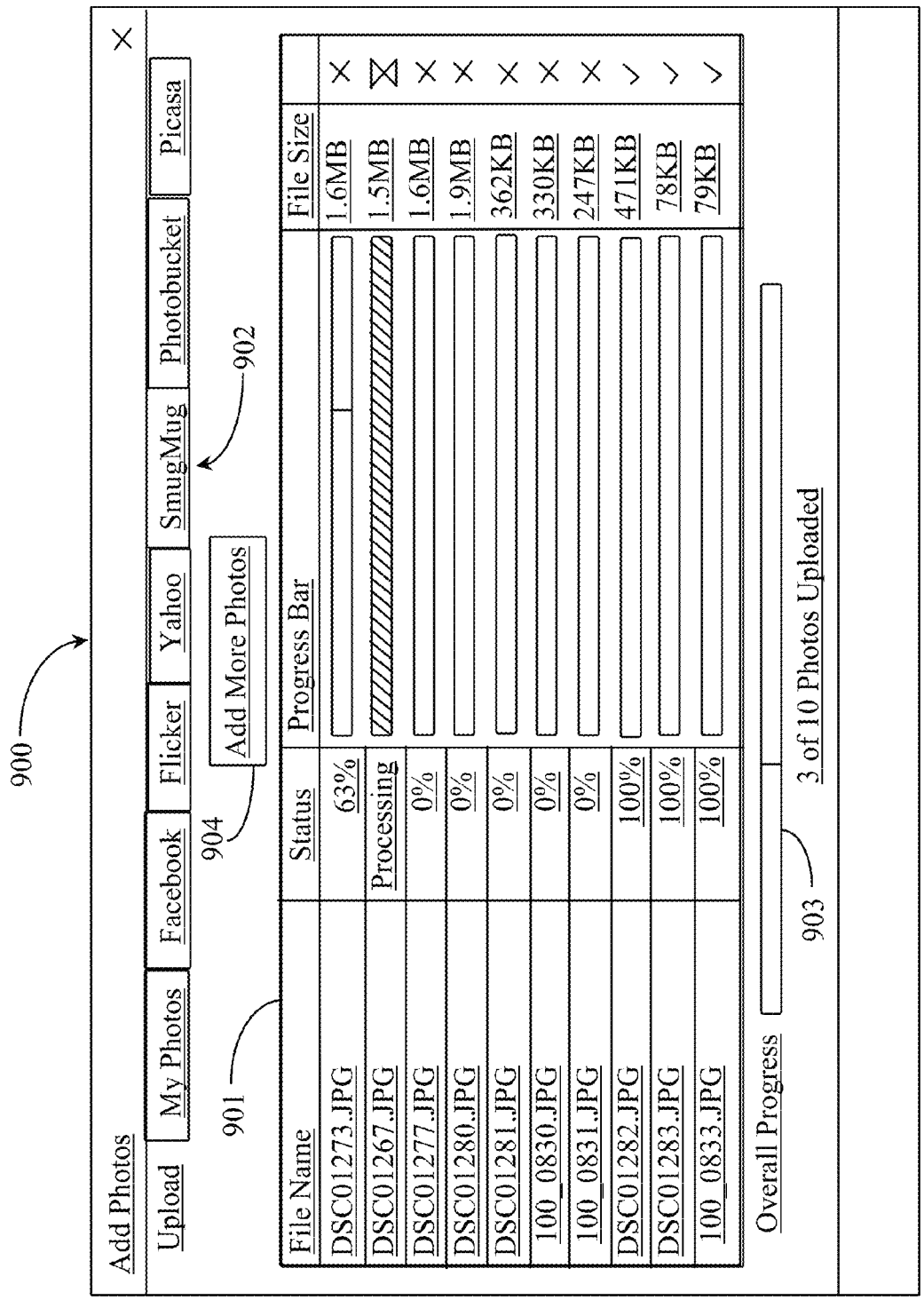
FIG. 9 is an exemplary screen shot of an add-photo page for acquiring photos to add to a project according to an embodiment of the present invention.

FIG. 9 is an exemplary screen shot of an add-photo page for acquiring photos to add to a Mixbook™ project according to an embodiment of the present invention. Page 900 appears as a result of the user clicking on "add photos" within the Mixbook™ editor UI. Page 900 functions much like an interface for downloading songs from a music site with the exception that the user is uploading and/or physically referencing photos stored at a remote location accessible to the service provider. An option bar 902 is provided within page 900 and includes many separate links to popular network service locations where photos may be acquired for a project.

At the far left of the options bar, the option upload is invoked. In this case the user is uploading photos from a local hard drive or from some other digital medium accessible to the operating appliance hosting the activity. Photos may be uploaded from any internal memory or from any external memory such as a connected thumb drive, a connected compact disk, a connected camera, or through some other removable memory that can be coupled to the user's computing appliance. In one embodiment the system may "capture" photos from media such as a video clip that is played back on the user's computing appliance. In one embodiment the system may also upload any photos that are scanned into the user's computing appliance using any type of image scanning device.

Page 900 includes a status window 901 that is divided into columns and rows. From left to right, the columns in status window 901 are labeled File Name, Status, Progress Bar, and File Size. An unlabeled column at far right contains either an X or a check mark indicating that the associated photo is not yet uploaded (X), or that the photo is already uploaded (check mark). There are ten rows illustrated in this example indicating that ten photos are to be uploaded. A user may upload one photo art a time or the user may upload a group of photos by using group selection techniques such as control click or using a shift and hold option.

It can be seen in this example that three of the ten photos being uploaded are completely uploaded into the system as indicated in the status column (100%) and by an overall progress bar 903 at the bottom of the window. One photo (DSC01273.JPG) is 63% complete while another (DSC01267) is being processed just after upload to determine optimal display size and perhaps other factors for the UI. In one embodiment photo-add page 900 is a window that appears within the UI of the Mixbook™ editor. In this embodiment as the photo status for a particular photo indicates that upload and processing are complete for the photo then it will display within the side bar area of the UI under the category Photos.

Add-photo page 900 includes links for acquiring photos from a plurality of photo hosting locations on the Internet. The location My Photos is the collection of all of the photos that the user has already uploaded to the service. The user may click My Photos to view those photos and select one or more of those photos for transfer to the current project. A user may acquire photos from virtually any Internet-connected repository that the user has authorized access to directly or through a hosting service account. Examples of such accounts where photos may be located include Facebook™, Flickr™, Yahoo™ SmugMug™, Photobucket™, and Picasa™. There may be fewer or more photo-location options (Hosts) referenced within page 900 than are illustrated in this example without departing from the spirit and scope of the present invention.

If a user has a Facebook™ account that user may acquire any photo that user has authorized access to including those photos of family and friends on Facebook™. The same is true for all of the other photo-locations listed in bar 902. A user may, if desired, physically download photos from these third-party-controlled photo-hosting services. However, the inventors provide a unique data structure for photo data transfer that permits use of the photo in online and in printed projects but does not include a requirement for literally possessing the photo. The data structure represents a photo and enables partners to transfer photos without performing a physical upload.

The generic data structure includes an array of photo sizes. Each image size has at least three fields. These are a value for the photo width in pixels, a value for the photo height in pixels, and the network location (URL/URI) of the image or photo. The address is the address where the photo is stored. In a preferred embodiment each of the selectable photo sizes for a single photo has the same aspect ratio. The term aspect ratio refers to the ratio of width to height of a photo. If a partner site has three sizes for a photo like small, medium, and large, these sizes must have the same aspect ratio for selectable representation of the image without requiring physical upload of the photo.

An algorithm enables the system to determine the best photo-display size from the available partner-configured photo sizes for use in Mixbook™ projects. The algorithm loops through the available photo sizes in the generic image data structure describing the remote photo. The system leverages an algorithm for photo display of the remote photo that automatically selects the optimal photo size to display out of the array of partner-configured sizes provided the photo display on the partner site. For example, if the service of the invention has three available photo sizes (small, medium, and large), and the platform partner, such as Facebook™ for example, has only two image sizes available (medium and large), the algorithm considers the two available sizes in the best light. The result may be that the small photo size allowed by the service would be replaced with the medium photo size allowed for the photo at the partner site.

The algorithm automatically fits the image into the photo slot. To do this the algorithm determines the limiting dimension either the width or the height. To find the limiting dimension, the algorithm takes the first element in the size array and creates two ratios. The first ratio created is a width ratio which is equal to the width of the first element in the size array divided by the width of the display slot. The second ratio created is the height ratio which is equal to the height of the first element in the size array divided by the height of the photo slot. If the width ratio is greater than the height ratio, then the limiting dimension is the height. If the height ratio is greater than the width ratio the limiting dimension is the width.

The algorithm orders the sizes by the limiting dimension, which is ascending order. Beginning with the first and second sizes, the algorithm compares the sizes on their limiting dimension with the size of the photo slot on its limiting dimension. If the size of the display slot is bigger than the second size, then the algorithm continues on to the next size grouping, the second and third sizes. The algorithm continues until one of two sizes is greater than the size of the display slot. At this point, the algorithm will intelligently choose which size to display.

The photo is displayed in the same manner as other photos that were physically uploaded to the service with an exception that the photo is accessible only when the link from the service to the photo is active. A user could potentially build and print a photo book that contains only remote photos that are never uploaded physically to the service. In one embodiment option bar 902 is scrollable in the case that more partners are listed than can be displayed at one time in the window.

The system of the invention includes a partner platform and application programming interface (API) that enables partners to integrate their applications (desktop or web-based applications) with the service of the present invention. This platform allows partners to implement code within their applications that can transfer data to and from Mixbook™ servers including, but not limited to user data, photos, and project data (books, calendars, posters, prints, mugs, mouse pads, and other photo gift or collage items). In one aspect of the present invention the system includes an application program interface API for enabling partners to access user accounts and make contributions to those user accounts. Usage of partner aliases helps to distinguish such partners from other users when they are on the site. The system creates an "alias" for each object that a partner application needs to access within the collage editing platform. The created alias will be stored within the system to enable quick and easy access to objects stored in the system. Aliases can be defined by the partner, so that the partner can use existing data in their own system to reference data in the Mixbook™ partner platform. The system will automatically detect attempted duplication of a partner alias. If a partner attempts to create a duplicate partner alias, the alias will not be created. Rather, the existing alias may be updated with any change in information passed in the associated action.

In order to create an alias for a given object, a partner must have access through that user by having authenticated access to that user account. If a partner does not have an alias connected to a given object, there is no way for it to access that object. This makes it easy for a given partner to create and manage "private" and "secure" data through the partner platform without worrying about having others accessing that same data.

Partners may create user accounts on Mixbook by passing an alias with which they will be able to access the user in the future. If the email address is already registered on Mixbook, the partner must authenticate the user by sending that user to a Mixbook log-in interface and to their account. Once the user logs in, the alias relationship will be created with that user for the requesting partner.

FIG. 10 is an elevation view of a photo spread 1000 of a photo-book project exhibiting a dynamically editable text box according to an embodiment of the present invention. FIG. 11 is an elevation view of photo spread 1000 of FIG. 10 with the text box moved to a position of conflict relative to a print parameter applied to a printing process for the photo-book.

Referring now to FIG. 10, photo spread 1000 is exemplary of any photo spread or project page that may be used in a project. In this example photo spread 1000 is part of a photo-book project. Photo spread 1000 includes two pages whereby the page on the right of the spread includes a text box 1001. Text box 1001 is an asset provided by the system for users to insert text information relative to project theme and photos. In this example, a user has clicked on the text box 1001 to dynamically edit the text within.

A sizing frame 1011 is visible about text box 1001 in this example. When a user clicks on text box 1001 anywhere on or within the boxed area a text box re-sizing frame 1011 dynamically appears. A text editing tool bar 1003 and a text box rotation tool 1002 also appear in synchronization with the text box re-sizing frame. Frame 1011 enables a user to resize textbox 1001 by grabbing any one of the corner handles or side handles and dragging the handle to change the box footprint. Text box 1001 can be stretched taller or stretched wider by grabbing and dragging a top/bottom resize handle or a left side/right side resize handle on frame 1011. Text box 1001 may be made larger or smaller while retaining the same aspect ratio using any of the corner-located resize handles on frame 1011. In one embodiment resizing the text box after text is inserted into the box results in stretching of the text. In another embodiment resizing the text box with inserted text does not change the font size.

Text box rotation tool 1002 appears dynamically when the user clicks on box 1001 or anywhere within the box. Rotation tool 1002 may be grabbed and manipulated by the user to rotate text box 1001 about its center to the left or to the right at any angle desired. In one embodiment an additional window may be visible that provides the amount of rotation in degrees in real time as the box is rotated by the user. Text editing toolbar 1003 includes a font style selection menu 1004. Menu 1004 contains a field that can be used to type in a known font style or a drop-down feature in the menu may be leveraged to select from a list of included styles available to the editor.

In live editing, an auto-preview feature is provided whereby a user may mouse over a font style exposed from the drop down menu and see the font change in text window 1001. When the user slides the mouse pointer off of the selection, the font reverts back to the original font. The user may type over or type a font within the font window of menu 1004 and see the font change within text window 1001 once the system recognizes the font selection. Auto-preview is also provided for other types of edits including but not limiting to font size, font color, font presentation (italics, caps, bold, etc), and font justification (left, right, center). A user generally selects or highlights a text item within a project. This action may cause automatic display of a text editing toolbar, the toolbar including controls for at least editing font style, font size, font justification, and font color and selecting one of the controls of step (b) and mousing over a menu option. For auto-previewing graphics the user selects or highlights a graphic within the project. As a result of this action, the system automatically displays a graphics editing toolbar, the toolbar including a styles interface having controls for applying at least, shadow effect, reflective effect, border style, blur effect, transparency effect, shapes effect, color saturation, hue, brightness, and contrast. The user selects one of the presented controls and mouses over a menu option to preview the option.

Toolbar 1003 includes a font sizing menu 1005 that is adapted to enable a user to efficiently select an optimum size for the font in text window 1001. Like the font style menu, the font sizing menu contains a field and a drop down list feature. A user may click the downward arrow causing a font list to be presented to the user. This list contains all of the allowable font sizes. A user may mouse over a font size in the list and see the size change take place in real time within window 1001 (auto-preview). When a user selects the font resizing tool 1005, a separate slider bar 1006 appears adjacent to the menu.

A user may grab the slider handle of the bar 1006 and move it up or down (vertical slider) or left and right (horizontal slider) to make the font in window 1001 larger or smaller according to the allowed font size increments that can otherwise be selected or ordered in menu 1005. Auto-preview enables a user operating slider bar 1006 to see the font changing in real time within window 1001 as the user moves the slider handle. In one embodiment of the present invention, a user may operate a set of directional arrows to change the font size. For example, clicking on the up arrow may increase font size by allowed increments while clicking on the down arrow may reduce the font size by allowable increment. Altogether there are four ways of manipulating the size of the font in text box 1001. These four methods include moving a slider, clicking sizing arrows, entering a number into a field, and selecting a font size from a drop-down menu. Auto-preview is supported by all of the text resizing methods and interfaces.

In one embodiment, the system may provide code enabling a three-part text resizing tool analogous to, from a visual and mechanical perspective, to font sizing menu 1005 of toolbar 1003 and slider bar control 1006. The floating instance of the tool may be created by pulling the menu (1005) off of the toolbar 1003 using a drag and drop operation. An instance of the tool may also be spawned by linking to the server-hosted or client hosted .exe file to any area where a user may input text such as in a text box, caption box, subject line, dialog balloon, object wrapped text, or any other location in the layout or in an item within the layout that a user may place text.

During an active data session between one or more users involved in working with the image and/or text-based projects through a graphics user interface (GUI), the system aided by software may dynamically or statically link a three-part text resizing tool to one or more user-input actions on one or more text-based assets added to or pre-existing on a page layout. When a user initiates a text input action in a linked area, the system retrieving and presenting the text-resizing tool in the GUI. In all embodiments, the text sizing slider bar is invisible to the user unless invoked from the tool bar or when the user attempts to input text in a linked area of the canvas or workspace.

Toolbar 1003 includes a text Bold, Italicize, and Underline tool and a paragraph/justification formatting tool for adjusting the way the paragraph is presented. Anytime the text parameter controls such as Bold, Underline, and Italicize are moused over, the user can see the effect on the text in text box 1001 in real time using the auto-preview feature. Toolbar 1003 includes a font color management interface 1008 that includes three different ways to manage the color of the font within text box 1001.

In one embodiment, individual parts of the multi-part sizing tool are plug-in modules that can be individually linked to and invoked individually based on link address. In a variation of this embodiment, upon detection of text input into a text box, the slider bar is displayed for manual resizing of the input text.

Quick Card Editor

In one embodiment, a scaled down version of the text slider bar 1006 is provided in a user interface (UI) for editing text in a quick card editor. In a quick card editor, which is a lightweight editor, it is desired that the user may easily change font sizes with a live preview so that they may add more characters to a text box that is limited in capacity (number of characters) at a default or previously ordered font size. For example, if a textbox was designed to fit 4 letters into it at a certain font size and then a user wants to add 7 letters into the same box, they can utilize a simple popup with a horizontal slider to adjust the font size of the text and receive a live preview of the text as it is shrinking in font size so that they can easily choose the exact size for the text to fit the text box.

Interface 1008 includes a rectangular color grid control that calls up a thumbnail selection interface containing all of the allowable theme colors in the form of selectable thumbnails when invoked. Interface 1008 includes an annular color palette control that calls up a system color palette that enables a user to pick a color from a field of blended colors or from a color bar of blended colors. Interface 1008 includes a color picker tool that when selected and or invoked provides a pixel color reader to the user's input device in the form of a color dropper that can be placed over any color manifested on the user display monitor to read a color.

The color of the text in text box 1001 may be changed to any color visible in the user interface that is read from a pixel by the color input tool. A user may operate the color selection tool to perform operations such as save a color, apply a color to all of a specific type of item, and so on. Moreover, an extension may be provided to the color picking tool to enable a user to blend or mix colors, or to select multiple colors in order of priority and save the colors to a personal color swatch or palette.

The method can be practiced by selecting or invoking a color reading tool; moving the tool over the display monitor to read and preview colors using mouse movement; and selecting a color read by the tool. The selected color may be applied to a single item or to multiple items. In one embodiment the color picking tool is used to select colors to save to a color palette or to a color mixing tool. In one embodiment a recommendation system is in use during color picking and can make recommendations to the user as to the popularity of any color read by the tool at the time of reading.

Such a category may be segmented according to various criteria such as by collaboration group, by friends of the user, by all site users, and so on. Other interesting statistical data may also be provided to the user relative to a selected or read color in the form of a pop-up or other visible message. For example the color picker may read a specific color and in preview mode a message appears that ranks the color and mentions one or more other colors that go well with the read or selected color. There are many possibilities.

Each of these font color application tools of interface 1008 is supported by auto-preview so that the user may see the text color changing before saving the text in a particular color. More detail about application of colors to font is described further below.

Toolbar 1003 includes a layering tool 1009 containing two controls. One control brings an item forward to overlay another item and the other control operates to send an item back one layer behind another item in the window. A unique aspect of interface 1009 is that the system "remembers" what layers items reside on and assumes that all items on the canvas that do not overlap are on the same layer. The tool will skip intermediate layers if an item is selected to "move forward" to overlap or "move backward" to hide behind another item that is more than one layer away from the item moved. In this way the user always sees the visual effect of moving an item forward or sending an item backward relative to the other items. The layering system is driven by algorithm and also detects which items are being intersected with and replaces depth level values attached to those items. In one embodiment, items or assets may be grouped on a page and may be incrementally brought forward or sent backward as a group of items. Toolbar 1003 includes a delete control 1010 for removing any items on the page or canvas.

Referring now to FIG. 11, text box 1001 has been inadvertently moved toward the gutter area of the spread by grabbing onto frame 1011 and dragging it toward the center of the spread. The system of the invention includes a user alert system for warning a user anytime a text box is moved to a position where some of the text might be cut off because it intersects or overlaps a print boundary such as print boundary 1100 made visible to the user as part of the alert process. A visual dialog box 1101 appears while the user is in process of moving text box 1001 in real time. The dialog box contains a warning to the user that the movement of the text box into the print boundary may result in a cut off of text during printing.

The print boundaries are based on the output dimensions for the printed output boundaries. The boundaries and text dialog alert box appear only when the user has moved text too close to a boundary edge. A buffer boundary area might be observed in some embodiments to cover outputs in slightly different aspect ratios. That is to say that the warning would occur if a user brought the text box across the buffer boundary even though text did not cross the actual print boundary of a particular output format. Much work is reduced by providing this early warning system way back in the editing process and well before the printing process.

FIG. 12 is an elevation view of a photo spread 1200 of a project illustrating real-time text color application using theme colors. FIG. 13 is an elevation view of photo spread 1200 of the same project illustrating real-time font color change using system colors.

Referring now to FIG. 12, as described further above, font color management may be accomplished using a font color management interface 1008. In this example a user has selected the theme colors control of interface 1008 as evidenced by the illustrated mouse pointer during a process of changing font color of the font in text box 1001. A theme color grid 1201 immediately appears upon selection of the control. Theme color grid 1201 contains all of the theme colors 1204 that are generic to the theme the user or the system (in some cases) has selected for the project. In one embodiment, the theme color grid may include colors that the user has previously used in the project or colors that the user has saved to his or her account on Mixbook. Color pallet 1201 includes a color swatch containing the current font color of the text in text box 1001. An adjacent box 1203 includes the code name for that particular color. Auto-preview allows the user to see the font color change as the user mouses over any of the theme colors before actually committing to any one color.

Referring now to FIG. 13, as described further above, font color management may be accomplished using a font color management interface 1008. In this example a user has selected the system colors control of interface 1008 as evidenced by the illustrated mouse pointer during a process of changing font color of the font in text box 1001. A system color palette 1301 immediately appears upon selection of the control. System color palette 1301 contains all of the system colors 1302 that are available to the user by moving a pixel reading icon (circle, square, etc.) over the area of the palette to read the colors.

In addition to color palette 1302, a color strip 1303 presents all of the same colors from the top to the bottom of the strip. Color strip 1303 has a slider bar that a user may grab and drag over the blended color strip to determine a best color for the font. Like theme color grid 1201, interface 1301 includes a color swatch 1304 that contains the current color that is being moused over or selected and an information box that contains the code name for that color. An interactive option 1306 for cancelling a color selection is provided as is an interactive option 1307 for accepting the new color for the font in text box 1001.

Figure 14:
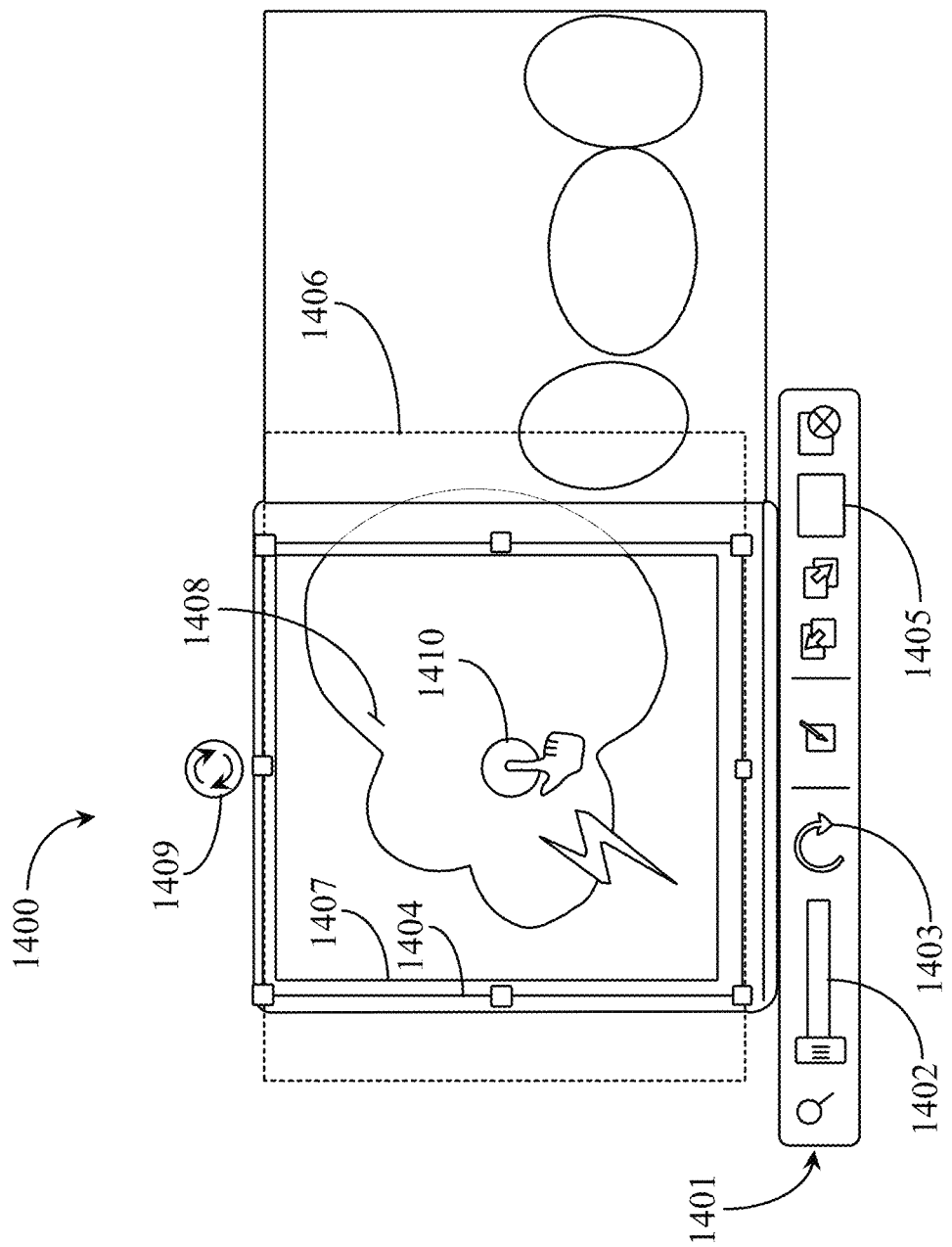
FIG. 14 is an elevation view of a photo spread illustrating a photo-editing frame and intuitive photo panning interface according to an embodiment of the present invention.

FIG. 14 is an elevation view of a photo spread 1400 illustrating a photo-editing frame and intuitive photo panning interface according to an embodiment of the present invention. Photo spread 1400 contains a photo slot 1407 on the left page of the photo spread. A photo 1408 has been inserted into photo slot 1407 by a user building the project. Photo slot 1407 automatically hides any part of photo 1408 that extends past its boundaries. The portion of the photo extending past the boundary is invisible to the user until the user grabs the photo for the purpose of panning the photo to improve the position of the photo within the photo slot.

The above process is illustrated by a mouse grab-hand controlled by computer input device (mouse). When the user drops photo 1408 onto photo slot 1407 an algorithm automatically sizes the photo so that its top and bottom edges or its left side and right side edges align exactly with the corresponding boundaries of the photo slot in accordance to whichever dimension of the photo is a closer fit to the corresponding dimension of the photo slot (width or length). In this example the top and bottom edges of photo 1408 align to the top and bottom edges of photo slot 1407. A user may then grab photo 1408 in the center using a grab operation and move or "pan" the photo to the left or to the right. The rest of the photo extending past the slot boundaries (left edge and right edge) is visible at some level of transparency as photo boundary 1406. When the user lets go of the photo, the portion of the photo 1406 is hidden completely providing a convenient and innovative virtual photo cropping capability.

In one embodiment the photo slot is an image display window of a predefined geometric configuration disposed on a project page for containing and displaying an image that has been placed thereon. In this example the user may grab the photo by interacting with an image handle associated with the image container, the image handle visible on highlight or selection of the image within the image container or display window. Again if one or more dimensions of the image exceed the dimensions of the image container or photo slot, a user may grab the contained image by the image handle and may move the image about within the container in any direction to present the best view of the image. Parts of the image that are hidden behind the page canvas become visible to the user when the image is grabbed enabling the user to see what parts of the image are cropped by the predefined geometry of the image container as described further above.

A photo sizing frame, similar to the text box sizing frame described further above includes side grab handles and corner grab handles to facilitate sizing. A photo-slot rotation tool 1409 is provided above the photo resize frame for rotating the photo clockwise or counter clockwise. Optimal sizing constraints are applied in the algorithm used to optimally fit photo 1408 to photo slot 1407 such that photo zooming or scaling requirements are kept to a minimum to increase the efficiency of the overall process of building a project.

A photo-editing toolbar 1401 is provided to enable a user to make edits to photo 1408. Toolbar 1401 appears along with the sizing frame 1404 when the user selects photo 1408 for editing. Toolbar 1401 contains a photo zoom interface 1402 for enlarging and reducing the photo size. Zoom interface 1402 is a horizontal slider. The photo placed in the photo slot is optimally sized so that the bar on zoom slider 1402 is all the way to the left. A user may grab the bar on slider 1402 and drag it to the right to enlarge or "zoom in" the photo. Enlarging a photo causes the unseen portion of the photo outside the photo slot to expand beyond the boundary edges of the photo slot. After enlarging a photo, a user may re-pan the photo to ensure that the best part of the photo is viewable through the photo viewing window or photo slot.

Photo editing tool 1402 includes a rotation tool 1403 that rotates the photo counter clockwise by an angle of 90 degrees. Photo editing toolbar 1405 contains a spread feature for extending a photo over onto the next page of the spread. A user may place the photo in the gutter portion of the spread and click onto control 1405 to facilitate a view of the photo spanning across the two pages of the spread. Another click on the control cuts off the content of the photo that is bleeding over onto the second page. In this case the second page is simply the page that the photo was initially absent from before proceeding to span the photo.

Figure 15:
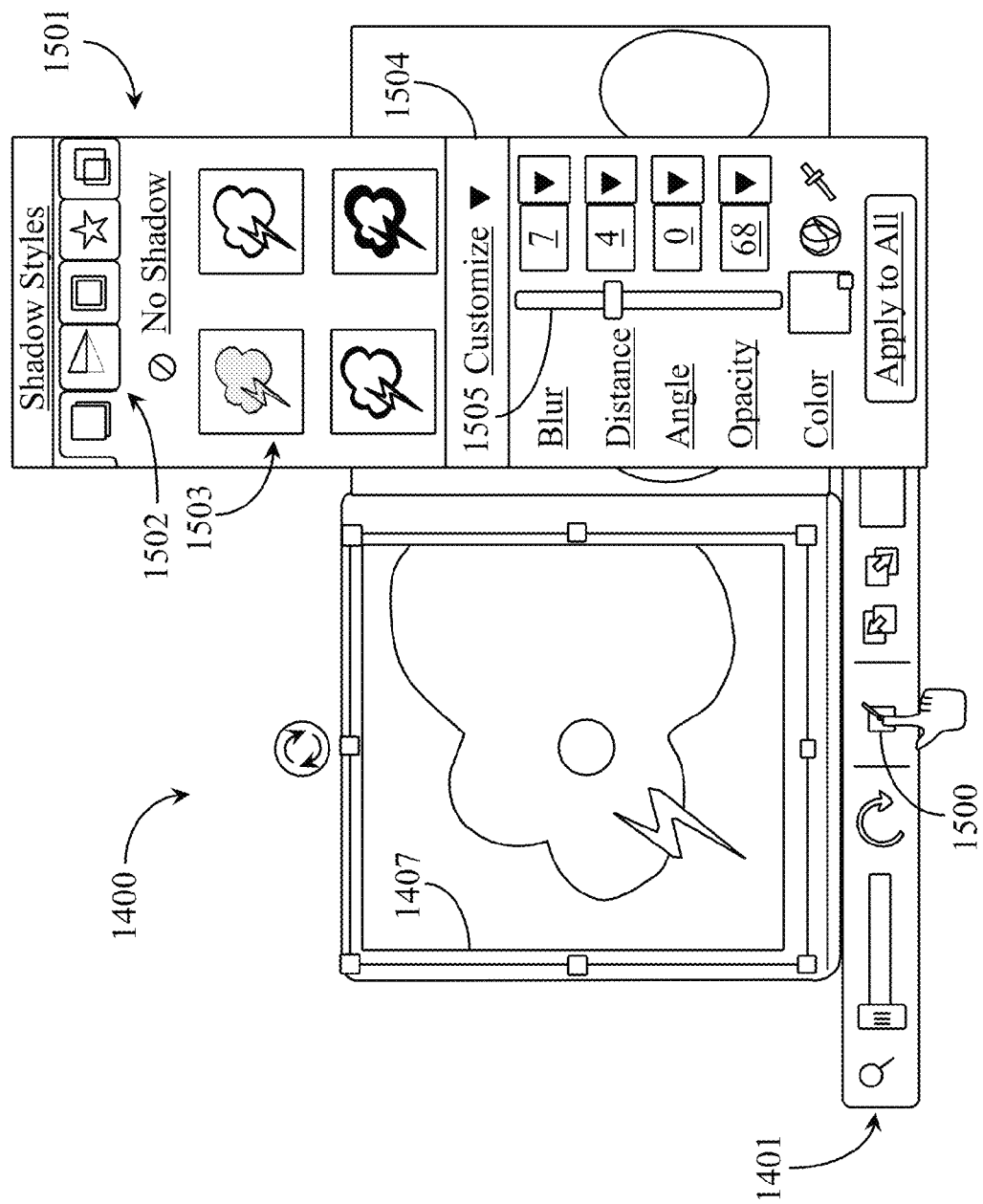
FIG. 15 is an elevation view of the photo spread of FIG. 14 with a style editing interface 1501 invoked from photo editing toolbar according to an embodiment of the present invention.

FIG. 15 is an elevation view of photo spread 1400 of FIG. 14 with a styles editing interface 1501 invoked from photo editing toolbar 1401 according to an embodiment of the present invention. A user may invoke a styles editing interface 1501 by clicking on a control 1500 as illustrated via a mouse or other input method. Styles interface 1501 is an extension of tool bar 1401. Interface 1501 is also available on text editing toolbar 1003 described further above in the description of FIG. 10. Styles editing interface 1501 includes effect application options 1502 for enhancing photos.

Options 1502 visited from left to right include a shadow selection interface control that when invoked produces shadow levels 1503 from no shadow to heavy shadow. Next to the right is a control option that when invoked calls up a reflection interface to apply a level of reflection to the photo. A border control is provided to the right of the reflection interface and provided a variety of borders to select from for bordering photos and text boxes. Next to the border control is a shape control. The shape control provides a menu of shapes (stars, hearts, etc) that can be used as innovative photo crops by dropping them into a photo-slot. The final styles option is a transparency interface control that brings up a transparency level interface where a user may select from different levels of transparence for a photo.

It is noted herein that all of the same style editing controls are present in the styles editing interface for text boxes that can be executed from toolbar 1003 described further above. Those controls produce the same selections for shadow, reflection border, shapes, and transparency. Further all of these controls include auto-preview options so the user may see the effect in the photo or text before saving the effects. In addition to the effects listed as options 1502 in styles editor 1501, other photo effects and editing tools might be included as options in the interface without departing from the spirit and scope of the present invention such as a brightness control, contrast control, color saturation control, hue control, and other standard photo editing options.

Automatically previewing edits to graphics items within the image-based project involves selecting or highlighting a graphic within the project to automatically display photo-editing toolbar 1401 inclusive of styles editing interface 1501, which may include controls for applying at least, shadow effect, reflective effect, border style, blur effect, transparency effect, shapes effect, color saturation, hue, brightness, and contrast. A user may select any of the controls and mouse over the menu option to preview an effect.

Before applying any effect to a canvas component like a photo or sticker a user may preview how the effect may appear on an object in the styles editor. The items current effects are considered saved effects. When a user desires to change the effect or style of an item they first select the item on the canvas, which automatically opens a toolbar with the styles and effects editing interface. In one embodiment a display of the selected item is provided in preview mode where the display is of the actual item or a representation of the item.

In one embodiment a user may click on an effect for an item and then mouse over the item in preview mode to see how the effect will appear on the item. Mousing off of an item returns the appearance of the item back to its saved state. If the user clicks on one of the preview displays in the case of multiple displays as in the styles editing interface, the styles or effects represented by that display will be applied to the selected item and those styles or effects will be saved, such that the saved state now includes those settings.

Interface 1501 includes a customize option that incorporates a slider bar 1505 that is shared relative to a plurality of editing options including Blur; Distance; Angle; and Opacity. A user may select any one of the just-mentioned options and then use slider bar 1505 to scale the level of effect of the selected option. Furthermore, each listed option has a text value menu where a user may type in a desired value, or select a listed value from a dropdown menu. At the very bottom of styles editing interface 1501, a color editing interface similar or identical to interface 1008 described previously is provided that includes a control for bringing up a grid of theme colors, a control for bringing up a color palette and/or a color strip, and a control for picking a color using a pixel color reader in the form of a ink dropper that replaces the mouse pointer when picking a color. Any pixel that is visible in the user display may be read and its color may be used to recolor any item of the photo book. At the bottom of interface 1501 an interactive option is provided enables the user to apply a change to all items on photo spread 1400.

Figure 16:
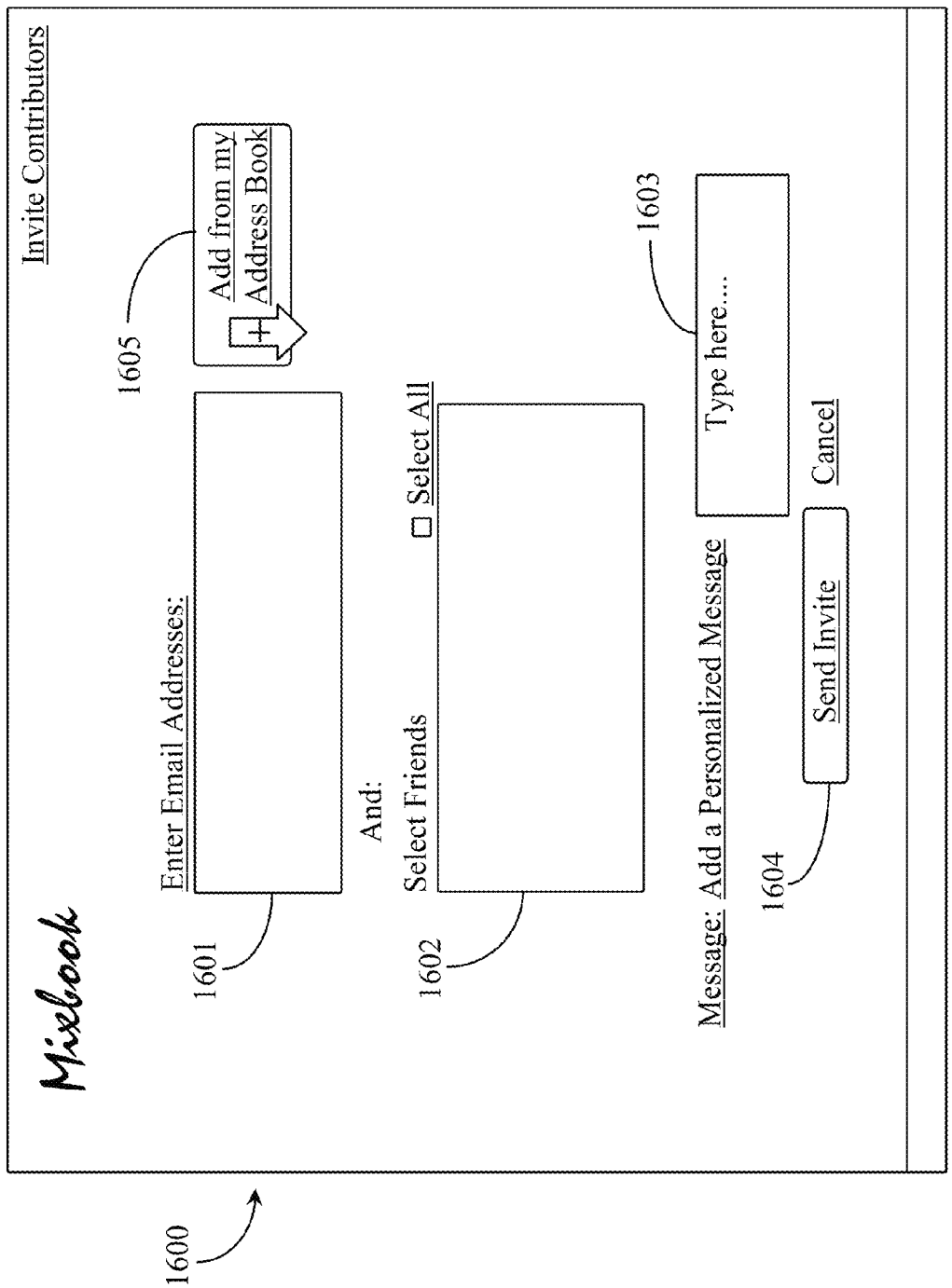
FIG. 16 is an exemplary screen shot of a contributor invitation interface according to an embodiment of the present invention.

FIG. 16 is an exemplary screen shot of a contributor invitation interface 1600 according to an embodiment of the present invention. The system of the present invention enables a user to initiate a project as a creator or project host and then to invite other users to help work on the project or contribute assets to the project. Interface 1600 appears as a result of the user clicking on "add contributors" when first starting a new project as described further above with reference to FIG. 5.

Interface 1600 includes a text field 1601 for entering the email addresses of other users that the hosting user wishes to invite to contribute to the project. These other users may already be registered on Mixbook™ or they may not be community members yet. Users who are invited to contribute to a project but are nor members of the service may be directed to a membership page to register as a user before being allowed to contribute to a member's project. Interface 1600 includes a second text field for selecting friends from a list of friends that are already known to the system. If the friends are already known, the list is presented each time the user clicks on the feature. An option for selecting all of the listed friends is provided at the top right corner of text field 1004.

Once the invitees are selected, the user may elect to provide a personal message to the group of friends invited. A text field 1603 enables a user to type in a text message, which will be sent to the users. Such a message may explain the project and the reasons for establishing or at least inviting contributors. For the purpose of term definition as it applies to this specification, a contributor to a project can be any person that is able to contribute creative assets to an existing project either in collaboration or singularly. A contributor may be a friend or family member already registered to the site. A contributor may also be a family member or friend that is treated as an invited guest that has not yet signed up for the service.

Once the contributors are identified either by email address and name or both, the invitations are automatically sent as email, short message service (SMS), Instant Message (IM) or some other invitation message to those users. Interface 1600 includes a widget 1605 for enabling a user to browse an address book to add users. Once friends are registered with the site, the user need not enter any email address information to invite them to be contributors. Contributors may also be collaborators that help the user work on a project in real time. In this case, the collaborators may already be online as detected by presence reporting or monitoring. The user simply selects those that are online from the list in text field 1602. An icon may be provided next to the name of a friend to indicate whether that friend is online or offline.

The inventors emphasize that the system of the invention is designed to make it easy for multiple users to work on and share projects with one another in a manner that promotes use of pages from different projects to contribute to a project in the works. In this way users may contribute pages from other projects to one they are currently collaborating on. An option for making a project open to all community members registered with the site is provided at the start of a project. In some cases projects created by one or a group of community members may be copied by another user whereby the new creator edits the original work to make it personal to the new user. In this scenario many different projects may contain many of the same photos and other creative assets that were originally copied.

Figure 17:
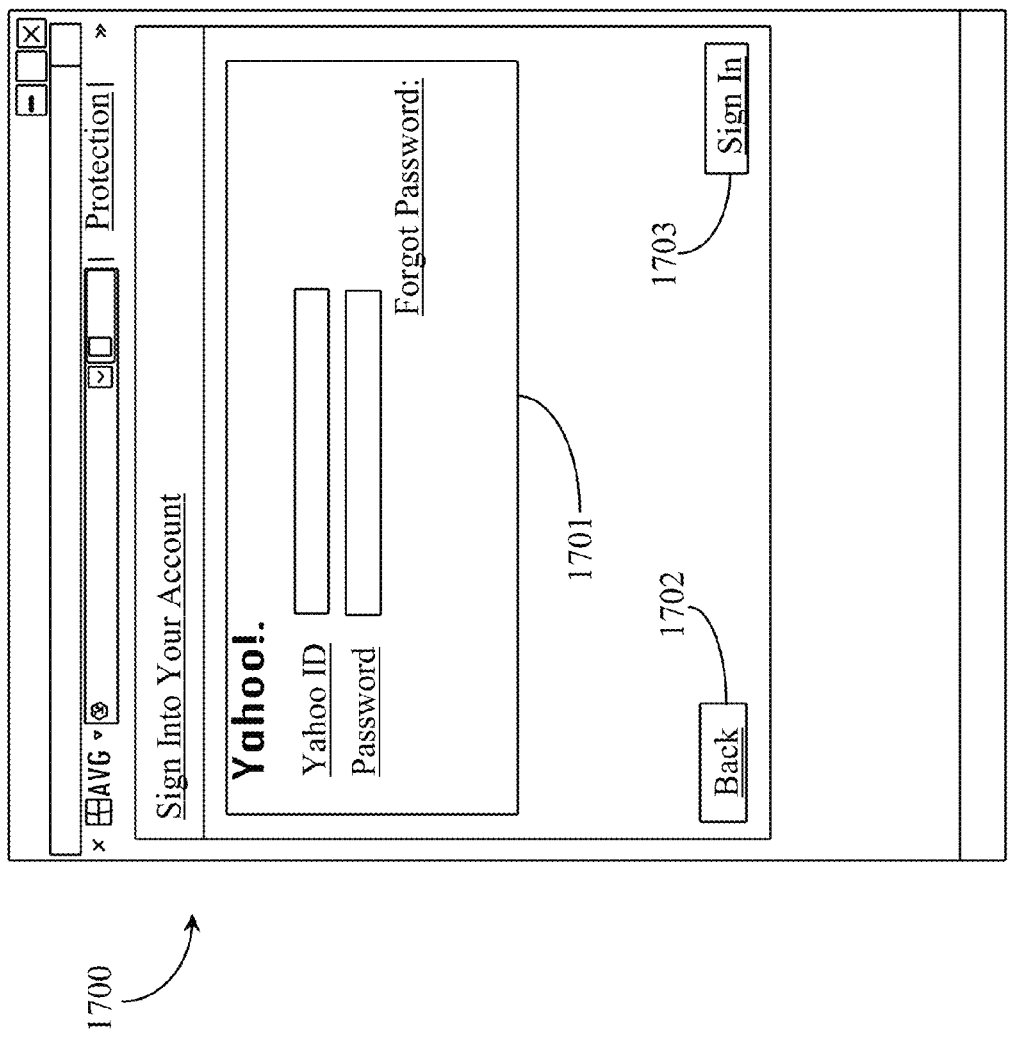
FIG. 17 is an exemplary screenshot of a proxy-login interface that enables a user or contributor to gain access to a personal account to link to or otherwise acquire access to photos available through the personal account.

FIG. 17 is an exemplary screenshot of a proxy-login interface 1700 that enables a user or contributor to gain access to a personal account to link to or otherwise acquire access to photos available through the personal account. In this example, the login interface is for logging into a Yahoo™ account where that user may have access to photos stored remotely at the service. Interface 1700 includes the traditional fields for entering a user name or email and password pair. A back button 1702 is provided on interface 1700 for navigating back to the previous page. A sign in or login button 1703 is provided for submitting the information.

Navigation to the user's personal account takes place through the Mixbook™ server by proxy. Once logged in to the account, the system finds the photos associated with the account and allows the user to select and transfer a photo or simply establish an active link to the photo so that the photo may be used in a project without a physical upload to the service. This is accomplished by a data structure that includes a URL to the photo as described previously. It is noted herein that the exact look of the log-in page may vary and may include a sign-up option for signing up with the service through Mixbook™.

Figure 18:
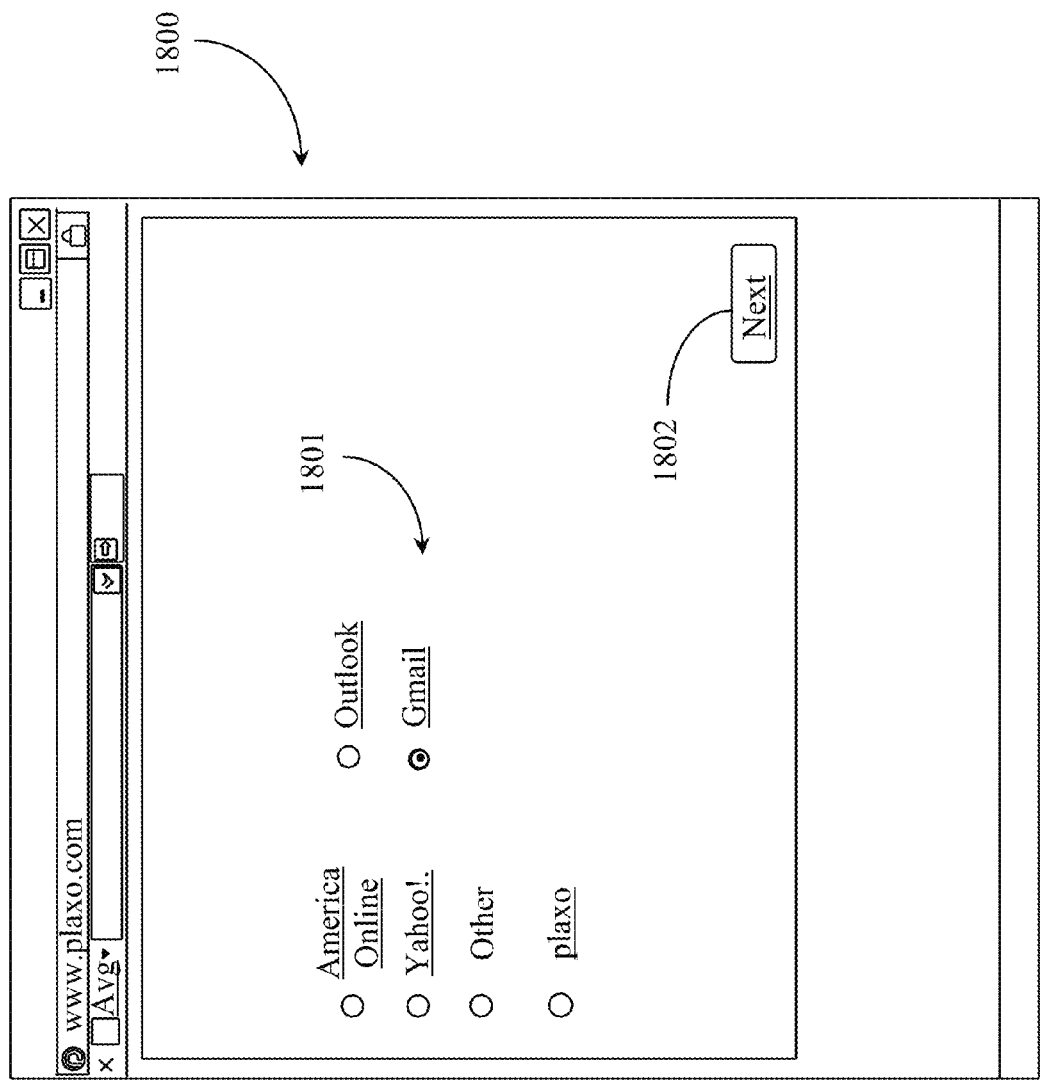
FIG. 18 is an exemplary screen shot of an add friends interface for adding friends to the service of the present invention.

FIG. 18 is an exemplary screen shot of an add friends interface 1800 for adding friends to the service of the present invention. Interface 1800 includes a plurality of email services 1801 that a user may have accounts with. The user may select any of these services to locate contacts of the user that the user may wish to invite to become friends on the Mixbook™ site. As previously described the service of the invention collects a list of invitees and sends emails, IMs or SMS messages to invite them to the service on behalf of their friend. Once the invitees have registered for the service they are included as friends of the inviting user and members of the Mixbook™ community as a whole.

Once a user has indicated one or more services to access contacts from, the user may select the next button 1802 to proceed to gather the email contacts of each of the selected services. In one embodiment the contacts are in a list resident on the user's computing appliance. In the case of Instant Messaging Access Protocol (IMAP) accounts such as Gmail for example, the proxy log-in interface of FIG. 17 might be used to access the contact list for that service.

Figure 19:
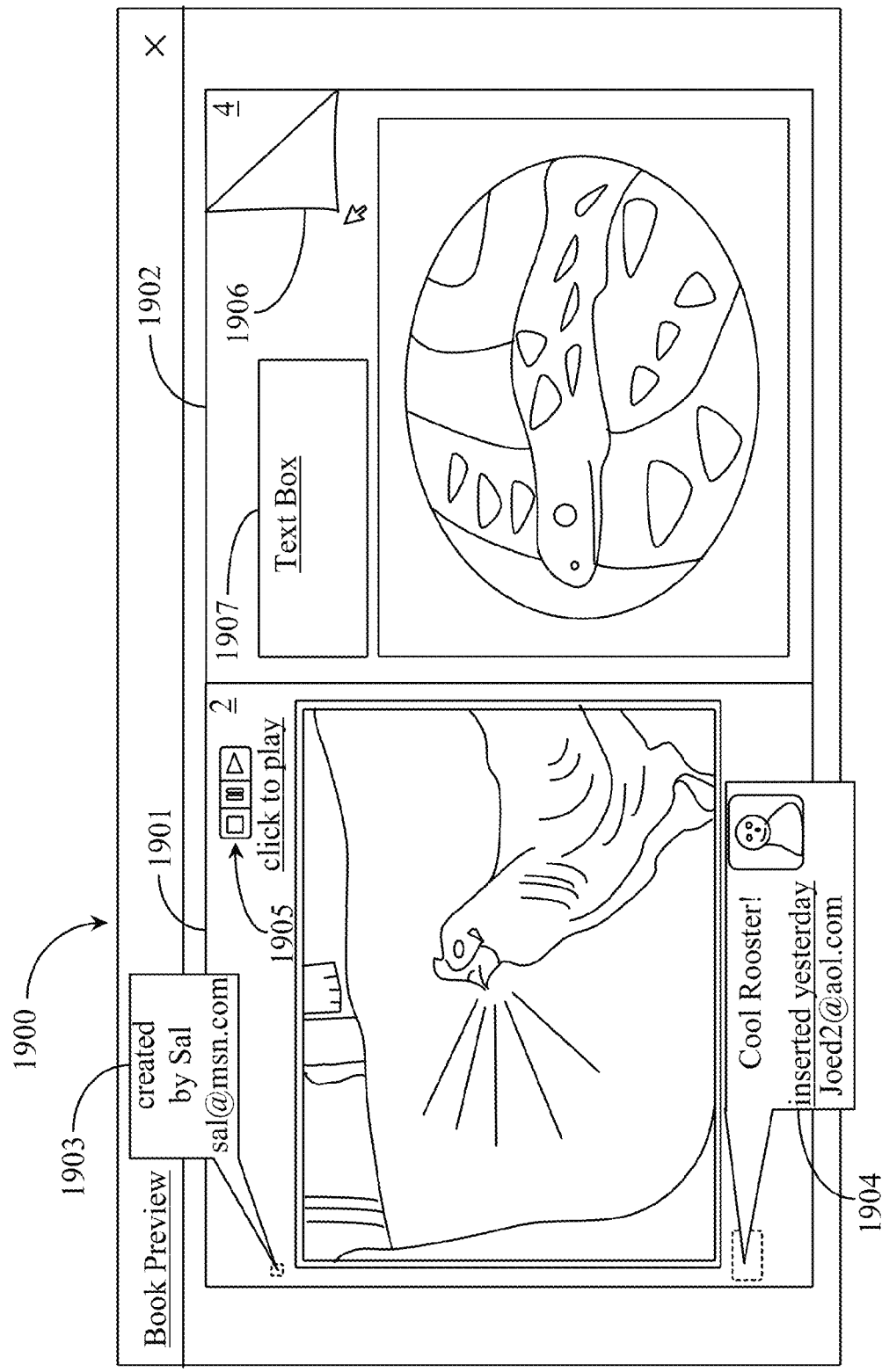
FIG. 19 is an exemplary screen shot of a preview interface for previewing a finished project according to an embodiment of the present invention.

FIG. 19 is an exemplary screen shot of a preview interface 1900 for previewing a finished project according to an embodiment of the present invention. Interface 1900 enables a user to preview an online project or other users to view a project they might have access to on the system. In this example the preview interface is in the form of a book that has multiple pages with photos and text. In one embodiment a play book widget is provided that enables viewing of a photo book in the form of an interactive slide show or a form correct book preview as is illustrated in the example.

Interface 1900 includes a number of pages in addition to a front cover, back cover and spine (not illustrated). Pages two and three of the photo book are visible and are given the element numbers 1901 (page 2) and 1902 (page 3). Referring now to page 1901, a user may configure a slide show or automated presentation of a Mixbook™ that includes comments such as comment 1904 made by other users. Comment 1904 includes the user's email address and time that it was inserted. The system enables users to view their books as an online slideshow that displays all the pages of the book along with additional multimedia content that can be added. Users will have the ability to add music or any type of sound track to one or more pages within the book or to the widget to play in the background while the book is being viewed as a slide show.

In one embodiment interface 1900 enables automated panning and zooming of the pages of the previewed book. A small information box 1903 shows the user that created page 1901 with a very simple statement and email address. If more than one user contributed to a single page then two information balloons might be presented, each citing one of the creators. It is noted herein that a user may turn off automatic display of user information related to contributors. Interface 1900 enables users who have viewed the project to leave comments embedded on pages of the book. In this example a comment is present on page 1901 from a user Joed2 @ aol.com. A profile picture of the commenter is illustrated in text balloon 1904. If many comments are present, they may not all display at once so as not to obstruct viewing.

In one embodiment of the present invention, users may add music or soundtracks to the system and may associate those to particular projects or to particular pages of a project. In one embodiment the granularity of adding multi-media content extends to a photo. For example if a photo in a project themed as a barnyard is a rooster, then a multimedia clip of a rooster crowing might be provided and embedded on the page containing the photo of the rooster. When the page showing the user is played, the clip of the rooster crowing automatically plays as well. In another embodiment the entire slideshow might be set to some background music that would play or loop back for the entire time the slideshow is running. In one embodiment a static clip associated with a page or a photo on a page might include a small control panel such as control panel 1905. Control panel 1905 enables the user to stop the clip, play the clip again manually or pause the clip momentarily. In one embodiment a user would be able to interact with items on the page to trigger multi-media "actions" including but not limited to playing a video, playing an animation, moving various items around the page, playing a sound or music, or moving to another page in the project.

In one embodiment of the present invention, a preview interface such as interface 1900 and a slideshow window for viewing an automated presentation of the book are two different interfaces. In another embodiment both the playback widget and slideshow widget are one in the same. In this respect the interface "look" may be different depending on which process the user is engaging, previewing a book or viewing a finished book in the form of a slide show. There are many possibilities. In one embodiment a photo slot might be associated with more than one photo such that each photo slot in a slideshow could be a small slideshow of two or three photos for example.

In an embodiment where a slideshow of a book is to be viewed through a single presentation window having a footprint smaller than a two-page book spread, an algorithm analyzes the content of each page of the book and dynamically generates a path of traversal through the page content including photos, text, and other media. Page transitions between the last traversed content on one page and the first traversed content on the next page may be statically ordered or dynamically selected by the algorithm from a pool of possibilities.

In one embodiment the algorithm considers for each page of the book, the state of the previous page and the state of the next page relative to the location or position of the navigable content and then determines the optimal mode of traversing the page using the single presentation window used to present the slide show and subsequently determines the best available transition option to get to the next page. The algorithm creates a tree of possibilities and selects the best fit path of traversal for a page and the best transition to the next from the tree of possibilities. The traversal path over a page of a project book may be defined by the current X and Y coordinates of the window on the page and the current zoom level of the window. It is noted herein that in slideshow presentation mode, which may be different from book preview mode, the playback widget is able to zoom in and out and pan the content of the pages during the presentation.

In one embodiment where a slideshow of a project book is viewed, the playback widget will allow the dynamic display of user comments about the book. While the Play Book Widget is traversing a page, comments made on that area of the page, or comments that are relevant to a particular area of a page will be displayed, along with information about the user including but not limited to a profile picture, first name, last name and headline or quote.

In one embodiment of the invention the system incorporates a persistent message board for each photo book project termed a book wall or project wall by the inventor. A book wall allows users to post messages to each other about an entire project. When a user makes a note on a page of a photo book the note will be posted to the book wall as well and may include a link to the page. A book wall may be opened from anywhere in the book. The book wall may be a section that may be navigated to and opened from within a Mixbook™ editor. In one aspect an additional section might be created where a user working on a project with multiple collaborators could propose ideas and suggestions for collaborators. Collaborators may be allowed to comment or edit the creator's comments.

In one embodiment, a project feed such as a Rich Site Summary (RSS) feed may be provided as a subscriber feed for users to follow certain projects or collaborators. For example, if a user was working on a page in a book, they could say something like "I need some help trying to match the background with the different fonts", and then it would appear on the feed that the other contributors are getting as well. Also, we could display this broadcast of messages to onlookers who are observing the progress of the book as it gets made.

In one embodiment friends and family members of a user or collaborator could get updated project information on their social interaction page such as Facebook™.

Messages could be time stamped indicating the time and date of the message. Each message could contain information such as the project identification and project page the commenter is on. In one embodiment, information relative to the state of the project at the time of a comment is included in forum message, RSS feed or on a project wall. Likewise, multi-media screen shots might be embedded in comments from users and collaborators. In one embodiment, users might create short video/audio clips that discuss and ask questions from other users relative to one or more projects the author is involved with.

In one embodiment, a project wall is accessible from within the project. In another embodiment, the wall is accessible through a separate interface. Potential collaborators and reviewers could be redirected to YouTube™ to watch videos relative to collaborative comments, instructions, responses, etc. A project wall typically revolves around a single project. However, a toggle could be provided to switch the feed to include more than one project, or all public projects in process. A feed could be configured to follow certain individuals or groups as they work on projects.

In one embodiment the wall is a bi-directional messaging system for selective publishing of text messages with or without graphics. Software supporting the messaging function running from a non-transitory medium on a server may include at least a function for linking the electronic messaging system to the image-based project accessible through an electronic interface, a function for facilitating calling the message system from within the image-based project by executing a link resulting from execution of the first function to receive a messaging interface, a function for detecting and monitoring any online collaborators working on the image-based project and any online web visitors allowed to view the image-based project under construction, a function for assigning for each message submitted, at least a collaborator identification stamp, a digital time stamp, and a digital location of the collaborator within the project at the time the message was submitted, and a function for publishing the aggregated messages in one or more live broadcast to relevant online collaborators and project visitors.

Figure 20:
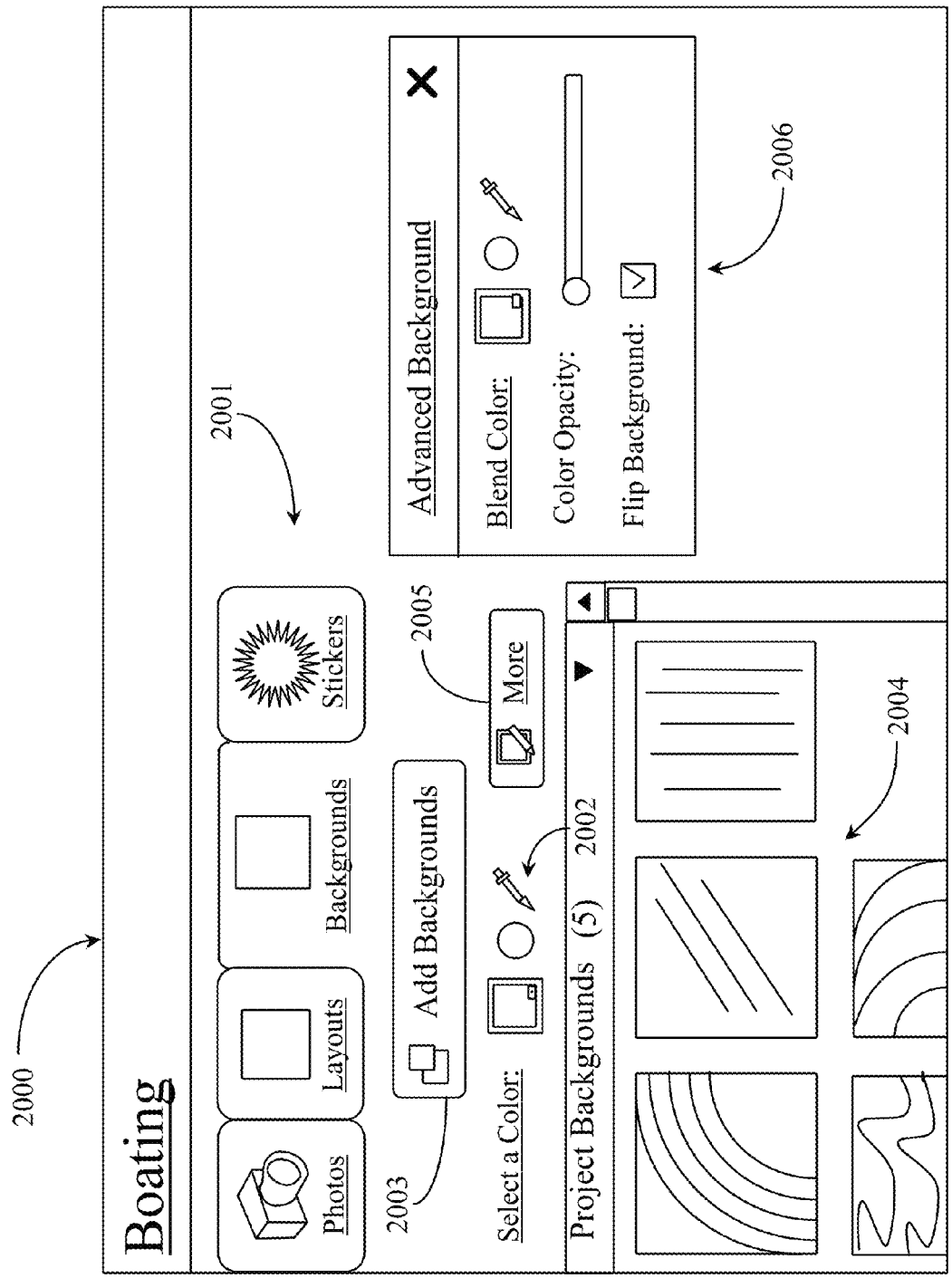
FIG. 20 is an exploded screenshot of the background selection portion of the user interface of FIG. 8 including an advanced background touch-up section according to an embodiment of the present invention.

FIG. 20 is an exploded screenshot of the background selection portion 2000 of the user interface of FIG. 8 including an advanced background touch-up section according to an embodiment of the present invention. The system of the present invention provides a unique color touch-up interface 2006 for modifying pre-existing or newly created backgrounds that can underlie page content in a project. Color interface 2006 appears when a user clicks on interactive control 2005 labeled more.

An interactive control 2003 for acquiring backgrounds is provided. Control 2003 opens a navigation window that the user may use to browse background images stored on the user's system for upload to the service of the present invention. The navigation window also provides access to any backgrounds the user has previously saved as personal backgrounds (My Backgrounds) and other backgrounds from other project themes (Theme Backgrounds).

Many backgrounds might have some textured surfaces like backgrounds designed to emulate paneling materials, brick and mortar, wood grain, and the like. Many backgrounds have asymmetric characteristics that can be flipped so that a pair of background images is created where each image is a mirror of the other in the pair.

Color interface 2006 provides advanced background coloring, color opacity adjustment, and color blending. One unique aspect of color blending in the system of the present invention is that pre-existing background images created by system designers and by some Mixbook™ users that exhibit textural characteristics such as wood grains or brick patterns, for example, can be enhanced with application of pure and blended colors to enhance and personalize them to newer users. The applications do not overwrite the original files such as system-provided theme backgrounds for example.

Figure 21:
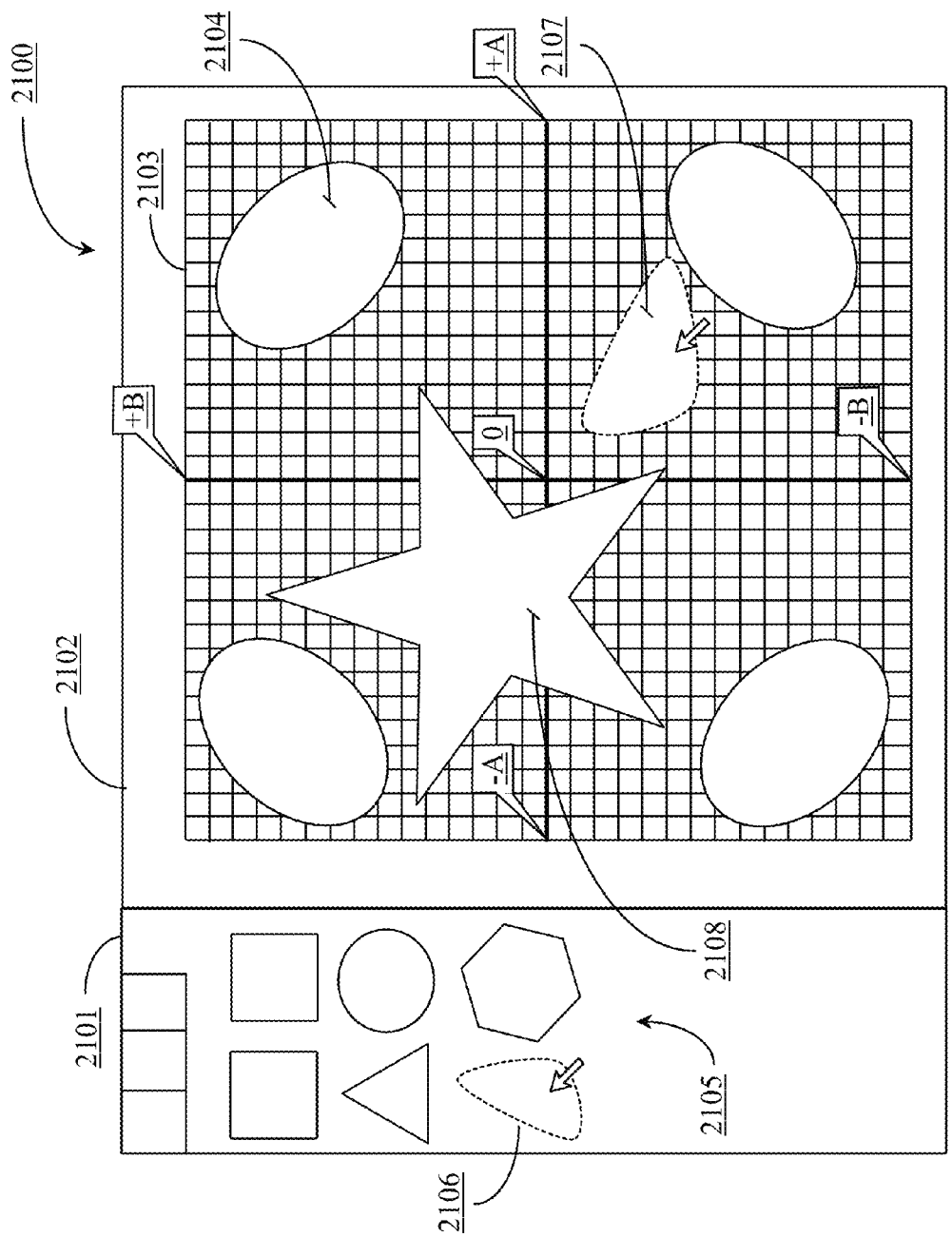
FIG. 21 is a page-on-canvas view illustrating a relative page coordinate system according to an embodiment of the present invention.

FIG. 21 is a page-on-canvas view illustrating a relative page coordinate system according to an embodiment of the present invention. Interface 2100 logically represents a single page 2103 on a canvas 2102. Page 2103 is square in this embodiment so it has an aspect ratio of 1:1. Page 2103 has a page size that is stored using relative units. For landscape or portrait pages the length of the shortest edge is assumed to be 1 and the length of the longest edge is equal to the value derived by dividing the length of the longest edge by the length of the shortest edge. For example, if the aspect ratio of a page is 4:3, then the height has a measurement of 1 unit and the width has a measurement of 1.33333 (landscape). The page also uses a relative coordinate system that originates from the absolute center of the page.

The grid pattern of the relative coordinate system may be rendered visible to a user or may remain invisible to a user. In one embodiment the grid pattern may be displayed to the user, but at some level of transparency. The 0 point on the grid is the absolute center point of the page.

The coordinate system is used for describing the position, size, and orientation of inserted items like photos, text boxes, stickers, shapes, and so on. Other information about the content like display styles and effects on those items including but not limited to border, shadow, glow, fill, rounding of corners, reflection, photo cropping, font size, and font style is also stored relative to the position, size and orientation of the items.

Page 2103 has a plurality of elliptical shapes (2104) placed thereon generally located one per page corner. A star shape 2108 is located left of center and slightly above the midline of page 2103. All of the described shapes could be photo slots that are used as photo viewing/panning windows. Shapes might be used in other ways on page 2103 as well, such as stickers, or text boxes in one embodiment. The page size in this example is square so it is described by the relative coordinate system as −A to +A for width and −B to +B for height.

To establish a relative coordinate system on a page the 0 point or absolute center is established first. From the absolute center of the page, the system scales a number of relative units along the width direction and height direction from 0 to a negative limit and from 0 to a positive limit for both dimensions wherein a unit is an equal division of the total value from the negative limit to the positive limit for width and height.

Canvas 2102 includes a sidebar area 2101 containing the options for adding creative assets to the project like photos, layouts, stickers and backgrounds. Additional shapes 2105 are displayed for selection by the user. The system is aware at all times of the most current state of each page of a project. Logic is provided that enables the system to map the sizes, positions, and orientations of all of the items on a given page. This information is available to the system in real time as a user continues to add shapes to page 2103.

A shape 2106 may be a next shape selected for insert onto page 2103 as is illustrated in this example by a broken border and input device arrow. As the shape is dragged off of the sidebar and dropped onto the canvas as is illustrated in this example, an algorithm automatically sizes the shape and places it on the page in an optimum position based on the real-time data about the current positioning, orientation and sizes of the assets already on the page. The inserted shape is shape 2107 having undergone a resizing and reorientation before being placed on page 2103.

In one aspect of the invention a user may auto flow content onto a page using a unique grouping algorithm adapted to fit a plurality of photos in the project into logical groupings. The algorithm creates logical photo groupings based on timestamp information and other metadata information from each photo. Using a wide variety of mathematical distributions (i.e. normal, beta), the algorithm determines which photos are related and then logically groups those photos on one page. The metadata may include date and time that the photos were taken, titles, and other types of data. Additional inputs into the function include, but are not limited to, the average and standard deviation of the number of photos in a group and priorities and weightings of various metadata information for use in grouping.

At various times throughout project creation, display, and output processes, it becomes necessary to convert the relative coordinates in the page data structure described above into physical measurements. The conversion process allows the display of the content at any size, either on a display such as a computer monitor, mobile device such as a phone or tablet, or television display, or in a physical printed format such as a printed photo book or poster. By allowing for the translation of the relative coordinates and values into physical measurements, the system enables notification to users if any items on a page might not look acceptable in print. For example, the system can detect if a photo will display at a size in print that is too large based on the size that was originally uploaded or added via partner site integrations or otherwise. By storing the data in an abstract data structure with relative positioning and coordinates, created content can be used across a plurality of products and sizes.

Figure 22:
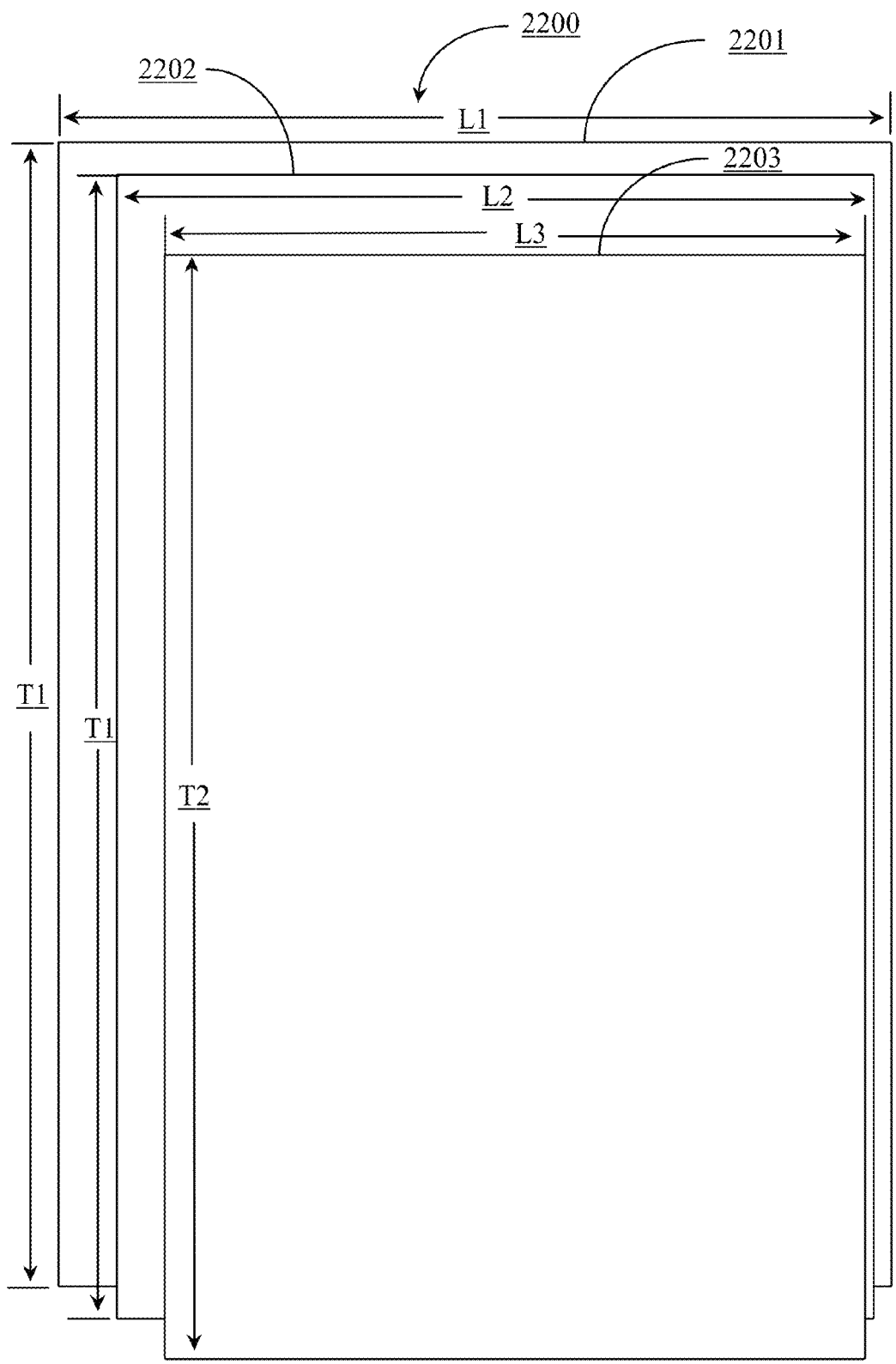
FIG. 22 is a block diagram illustrating a grouping of portrait page sizes exhibiting similar aspect ratios.

FIG. 22 is a block diagram illustrating a grouping 2200 of portrait page sizes exhibiting similar aspect ratios. An aspect ratio grouping (ARG) is a paradigm or pattern whereby two or more output or print sizes in a given orientation are grouped together to form a grouping. A grouping of similar aspect ratios for a given orientation includes the available specific output sizes that a project may be printed in without requiring any content editing by the creator before print. This innovative aspect of the system enables users to output a project to a print size within the grouping that is consistent with the orientation of that grouping.

Grouping 2200 includes three portrait-oriented page sizes in this example. These are a page 2201 having a width of L1 and a height of T1; a page 2202 having a width of L2 and the same height of T1; and a page 2203 having a width of L3 and a Width of T2. Grouping 2200 comprises pages of portrait orientation. Another grouping is available for landscape orientation and still another grouping is available for square orientation. The aspect ratios of each of the pages are very similar. An algorithm assigns a "core" aspect ratio to a project for display that is formulated as a core aspect ratio value derived from analysis of the aspect ratios of the pages in group 2200. All page content in the same orientation as an aspect ratio grouping is displayed at the core aspect ratio. More particularly, all page content intended to be printed at a specific page size (say 2201) will be displayed at the core aspect ratio of that specific page size's aspect ratio grouping.

In a preferred embodiment an algorithm is provided for displaying content at a core aspect ratio that may be printed to output end products like books, posters, calendars, and so on in the same orientation without any explicit resizing steps or data repositioning steps required of the user. A canvas described herein as an output canvas has a width and a height, bleed areas, and in most aspects, a gutter area. The page content is presented online in display during project creation using a "core" aspect ratio that is derived from analyzing the different aspect ratios in grouping 2200.

The algorithm determines from the canvas measurements what the optimum aspect ratio of the page content will be to ensure a minimum loss of content that would be cut off in the printing process. If the page content aspect ratio is taller than the available output canvas aspect ratio, content will be fit to the canvas such that the left and right edges of the page content fit exactly into the viewable area (left and right edges) minus a gutter allowance. The area on top and bottom of the page content will be cut off. On the other hand, if the page content aspect ratio is wider than the available output canvas aspect ratio, content will be fit to the canvas such that the top and bottom edges of the content fit exactly into the viewable area. The page content is positioned on the canvas such that the left or right content edge (depending on which page) is aligned to the gutter edge and content on the opposite edge which would include the bleed area of the page is cut off. In this way, page content can be optimally fitted to a variety of different output formats like two or more different portrait sizes for a portrait aspect ratio or two or more different sizes for landscape aspect ratio. In general, for an aspect ratio grouping that contains square-formatted output sizes, the ratio is ~1. For an aspect ratio grouping that contains portrait-formatted output sizes, the ratio is <1. For an aspect ratio grouping that contains landscape-formatted output sizes, the ratio is >1.

The algorithm translates the core aspect ratio of the project to one of the selected sizes in a related aspect grouping. For example, a user might create an eight by six (landscape) pocket photo book using the SW of the present invention. The user may opt to print and purchase a photo book that is a classic landscape size like eleven by eight and one-half. The algorithm places the original page content for each page of the book onto the output canvas as the correct 11×8.5 classic landscape print size without requiring the user to edit any of the original content or to manually position the original content on the page. The algorithm performs the sizing adjustment during the output process in the background transparent to the user and no hard changes to stored data are necessary.

In practice, the system, aided by algorithm, determines for each page size in the group, the viewable area of each page, the aspect ratios of the viewable areas are recorded. The total amount of error present amongst the available aspect ratios relative to comparison with a given aspect ratio may be determined or quantified. Using a mathematical program, process, or automated calculation tool, the effective aspect ratio that minimizes the function and hence the total error value is found. The project page may then be displayed at the effective core or effective aspect ratio.

In one embodiment, the system determines to "find" an effective aspect ratio (EAR) for display during editing. EAR shall be analogous with core aspect ratio (CAR) in this specification. Both acronyms carry the same meaning. Given the following three candidate aspect ratios of 1.5, 1.38, and 1.65, the problem is to derive the aspect ratio that would best fit each of the candidate aspect ratios. In this case R shall equal EAR. R will fall somewhere in a range bounded by 1.38 and 1.65. The total error E can be represented using the following equation $$E = \sum_{i=1}^{n} E_i$$

where n=the total number of output sizes and where i=1. $E_i$ can be represented a number of different ways. In one example, $E_i=\min(E_{iw},E_{ih})$ wherein $E_{iw}$ and $E_{ih}$ represent the error when the effective aspect ratio (EAR) denoted as R in this case, fits the height exactly, but spills over in the horizontal direction and wherein the reverse is also true, namely that R fits the width exactly but spills over in the vertical direction. R will best fit the aspect ratio in one of the two ways identified. $E_{ih}$ can be represented by $$E_{ih} = \left| \frac{w_i}{R} - H_i \right|$$

and $E_{iw}$ can be represented by $E_{iw}=|H_iR-w_i|$. Therefore, using the original equation $$E = \sum_{i=1}^{n} E_i$$

we get . . . .

$$E = \sum_{i=1}^{n} \min\left( \left| \frac{w_i}{R} - H_i \right|, |H_iR - w_i| \right).$$

In other embodiments $E_{iw}$ and $E_{ih}$ may be represented in other ways as well. In one embodiment a constant could be added to the derived equation and the system could multiply through the errors. In this case we might have an equation like $$E = \prod_i \left( \min\left( |H_iR - w_i|, \left| \frac{w_i}{R} - H_i \right| \right) + K \right)$$

where K could be any number >1. In one embodiment the algorithm fires automatically any time a new product grouping of available output sizes is established. All projects electing a group of output product sizes are displayed at the CAR for that group.

Figure 23:
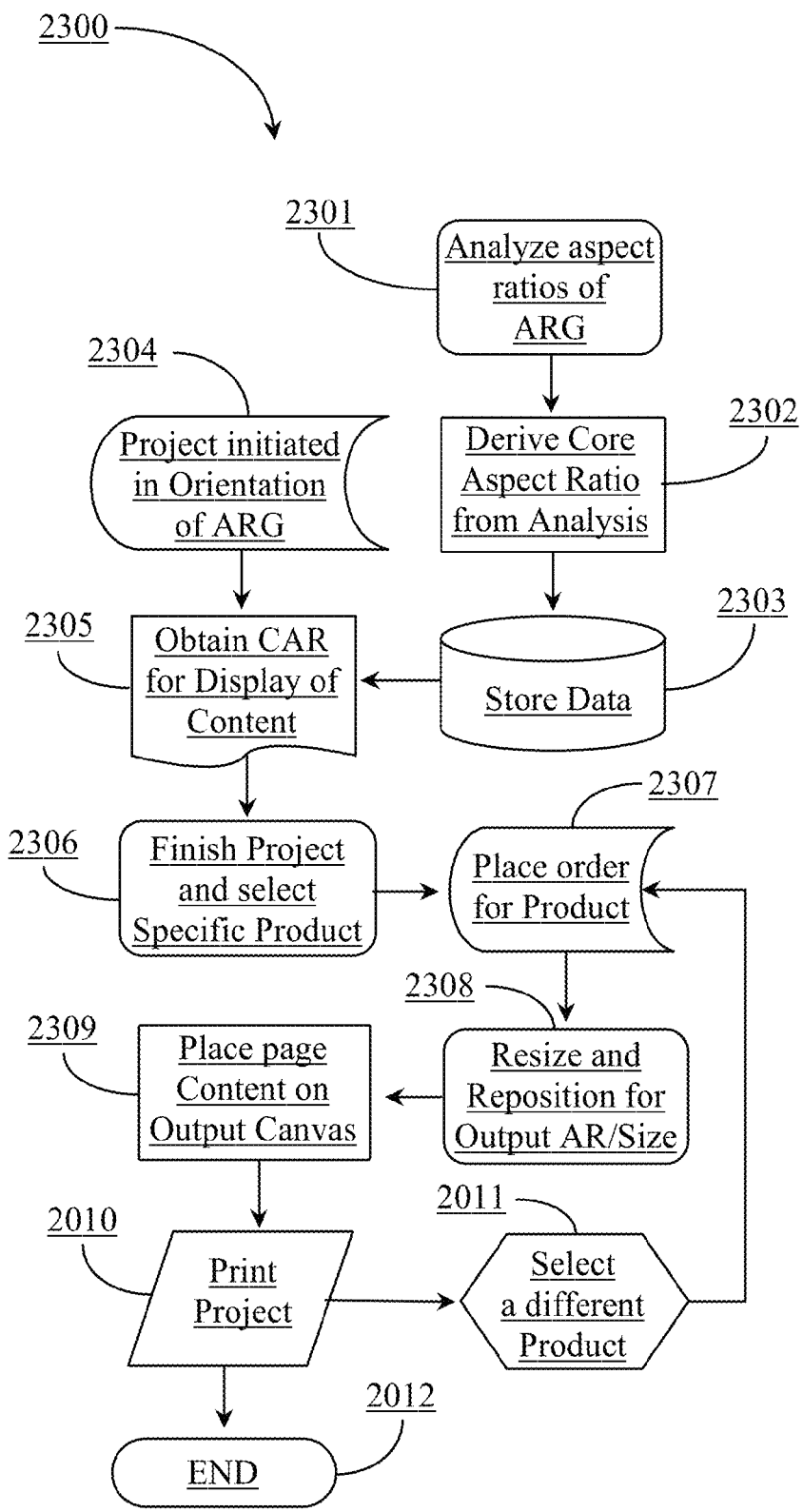
FIG. 23 is a process flow chart illustrating steps for displaying project page content at a core aspect ratio and optimizing the content for printing at a specified size.

FIG. 23 is a process flow chart 2300 illustrating steps for displaying project page content at a core aspect ratio and optimizing the content for printing at a specified size. As described further above, an algorithm drives the process of optimally sizing and placing content onto an output canvas of a specific size and orientation for printing. Products that may be purchased and printed are grouped by orientation (landscape, portrait, or square) and by similar aspect ratios that translate to specific output print sizes. The content that is displayed online during editing and content viewing or previewing has a core aspect ratio derived from the differing aspect ratios of the specific products in a grouping.

At step 2301 the aspect ratios of the specific products in an aspect ratio grouping (ARG) are analyzed. The core aspect ratio value can be derived by first defining a set list of end product sizes for a specified aspect ratio grouping. Each end product in the grouping has a viewable page area after allocation is made for the gutter area. For example, 0.5 inches may be allocated for the gutter making the viewable width area 8 inches for a page width of 8.5 inches. Therefore an 8.5×11 inch page has a viewable area of 8×11 inches.

The above definition is made for every product in the same ARG. Once a width and height dimension of the viewable area for each end product in the group is established the system can mathematically determine a best core aspect ratio for the group. The core aspect ratio is the aspect ratio that best fits all of the viewable areas (width and height pairs) in the group. To determine a best fit CAR, in one embodiment, the system runs sample CAR values against the group values (2301) to quantify mean percentage overlap errors for the group for each sample value input into the formula. At step 2302 the algorithm derives a core aspect ratio from the analysis of step 2301. The sample CAR exhibiting the smallest mean error is the best fit CAR for the group. As each end product is considered the system determines a percentage of overlap (left/right and/or top/bottom) for the difference between the sample ratio and the end product ratio. The system squares the resulting error value for each product in the group giving each product an error value and then takes the mean error value for the group for that sample CAR value. The sample resulting in the smallest mean error value becomes the accepted CAR for the group. All content is displayed at this CAR while editing, previewing, or viewing. The data is stored for latter access in step 2303.

In an independent thread, a user initiates a project at step 2304 (create project) in the same orientation of the ARG of step 2301. The product data in that grouping includes the output format data for all of the sizes included in that grouping. An ARG may include two or more than two products with similar but differing aspect ratios whereby all of those products are of different print sizes. At step 2305 the user MBE obtains the correct core aspect ratio (CAR) from storage for the content display that was derived at step 2302.

By step 2306 the user has finished the project and places an order for the project at step 2307. The order will include a specific output size that is available in the grouping of products, which are all of the same basic orientation. At step 2308 the same or a different algorithm performs a content resize and reposition if necessary for the exact aspect ratio and size of the selected output product. This step is transparent to the creator of the project or to any user ordering the output format of the project.

At step 2309 the algorithm loads the page content or "places the content" on the output canvas. At step 2010 the project is printed. In one aspect of the invention printing is carried out by a third-party service where the final output is delivered to the printer in a format that is print ready so no configuring need be performed at the printer. If no other products are to be printed from the output at step 2010, the process may end at step 2012. If the user decides to select a different product to print from the same ARG for the same project, the process may loop back to step 2307 for placing the new order for the different product included in the ARG product data. Steps 2308, 2309, and 2310 are then repeated in sequence and the process may end at step 2312 unless a different product is then selected from the grouping for print.

Figure 24:
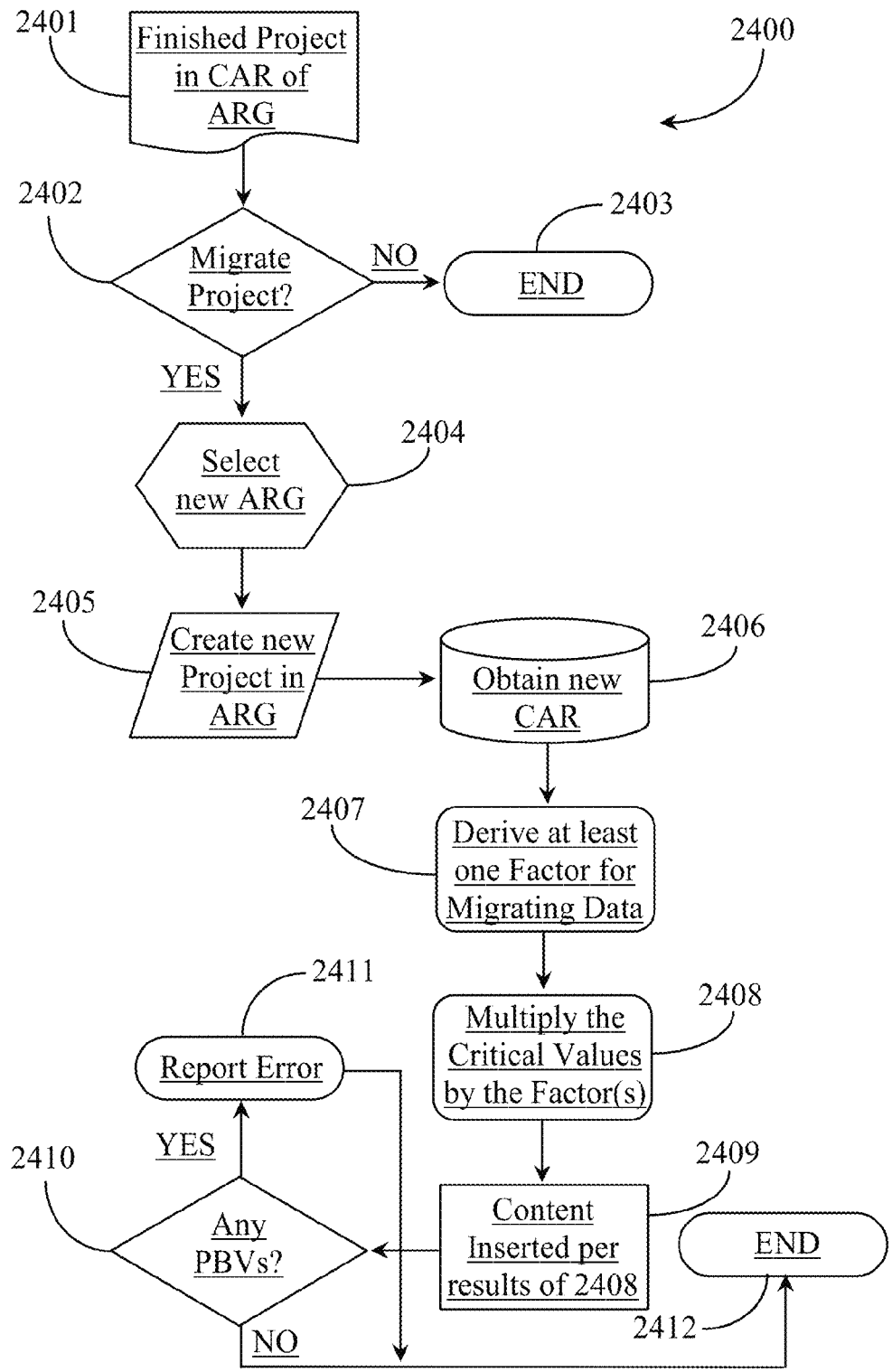
FIG. 24 is a process flow chart illustrating steps for migrating content from one aspect ratio grouping to another aspect ratio grouping.

FIG. 24 is a process flow chart 2400 illustrating steps for migrating content from one aspect ratio grouping to another aspect ratio grouping. The system of the present invention has a mechanism driven by algorithm for migrating project data from one aspect ratio grouping to another. Project data migration from one aspect ratio grouping to another is performed in a manner that ensures that no created content is lost because of boundary issues in the process.

At step 2401, a user has a finished project created for a specific aspect ratio grouping (ARG) and displayed using a core aspect ratio (CAR). At step 2402 a user decides whether or not the project data will be migrated to a new project in a different ARG. For example, the original project may be presented as a portrait book and the user wants to create a landscape book using all of the same information and effects.

If at step 2402 the user decides not to migrate an existing project, the process does not start and simply ends at step 2403 with no action taken. If the user determines to create a new project in a different ARG then the user may select a new ARG at step 2404. As previously described, an ARG is a grouping of projects of different sizes but the same page orientation.

At step 2405 the user creates a new project in the new ARG. This is accomplished working within a project editing interface (Mixbook™ Editor). In one aspect an option for migrating project data between differing formats might be made available to users as a static option accessible from the Web page or on a toolbar or drop-down menu of the interface.

At step 2406 the algorithm obtains a new core aspect ratio (CAR) from the destination ARG and creates a new project space observing the CAR of the ARG. The algorithm then derives at least one multiplication factor in step 2407 for translating the current project data in the original CAR to the project workspace under the new CAR. The algorithm multiplies the original project data critical values by the derived multiplication factor or factors at step 2408. This may include project data and content data including the width and height of the pages, the width and height of items, the position of items on the pages, and many different pieces of data for effects on the items on the page.

At step 2409, the content is inserted per results obtained at step 2408 according to the new CAR. The result is that all of the original project data gets translated to the new format without losing any content due to intersection of content with a print boundary. At step 2410, the system determines if any of the new content has violated any of the print boundaries (print boundary violation (PBV) in the new format. If the process runs successfully and no conflicts occur, then the process ends at step 2412. If there is a boundary violation (PBV) detected at step 2410, then the process may move to step 2411 whereby the system reports an error in the translation, which may be conveyed to the user.

In a preferred application if there are any PBVs that occur they are detected during the translation process and shown to the user in an auto-preview information alert that informs the user of the exact nature of the issue such as what the issue is and what page if not on all pages the issue is present in the new format. The algorithm is designed to ensure that no violations will occur during the translation of content to the new format so a determination of a violation at step 2410 would be rare given the controlled environment for translating the data. Auto-preview mode ensures that any error would be detected in real time during the translation process and the process would suspend or pause before the offending error were realized in the new format giving the user the best opportunity to resolve the error.

Figure 25:
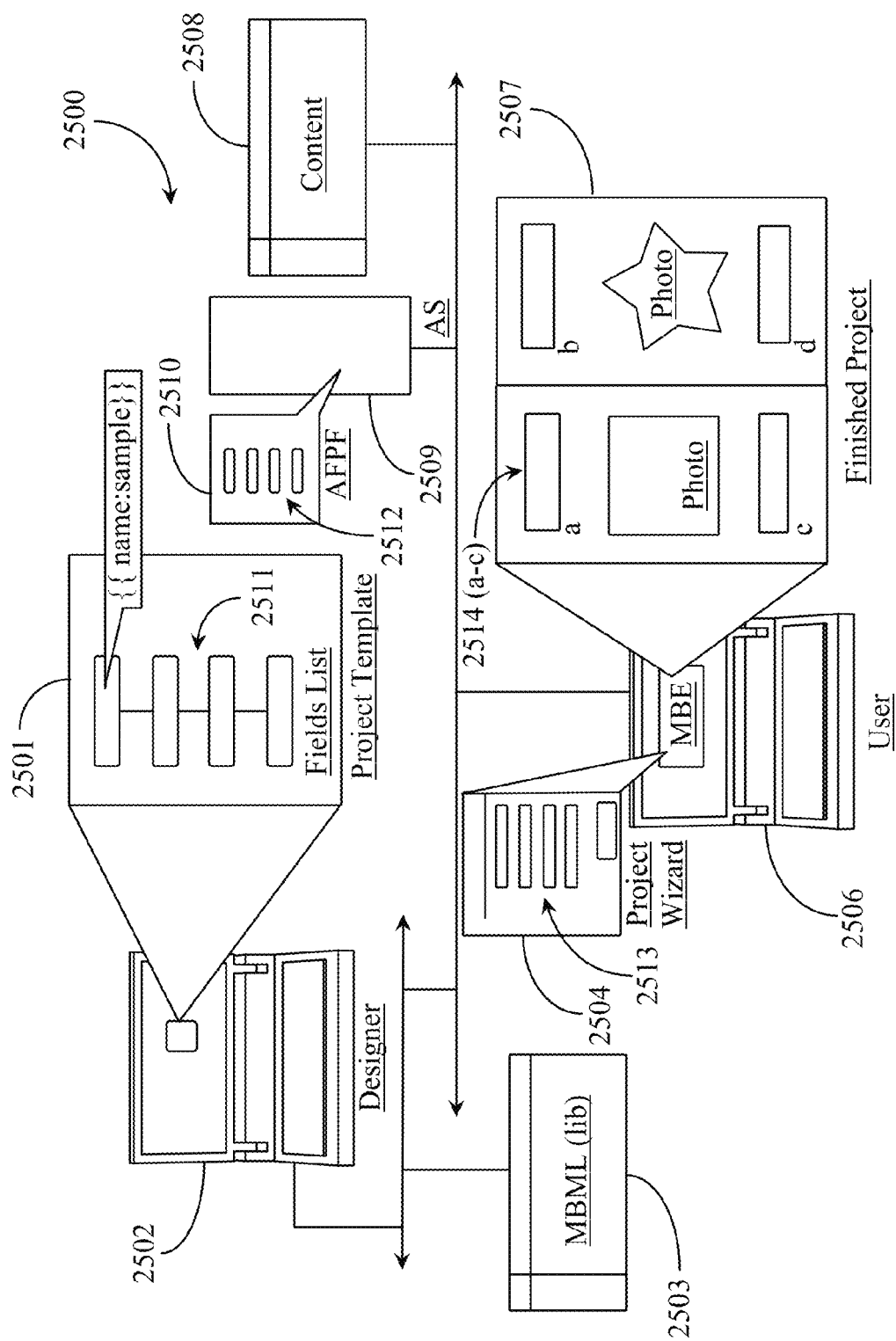
FIG. 25 is a block diagram illustrating system architecture for interpolating sample and default data into a project template using a special markup language according to an embodiment of the present invention.

FIG. 25 is a block diagram illustrating system architecture 2500 for interpolating sample and default data into a project template using a special markup language according to an embodiment of the present invention. Custom photo-based projects that are theme oriented contain text boxes that are ordered based on a pre-designed project template such as a project template 2501 that is created for a theme by a designer 2502.

Designer 2502 is connected via network to runtime server (RS) 2509, which may be analogous to AS 109 of FIG. 1 above. Server 2509 has access via data network to a data repository 2508 adapted to contain content such as pre-designed project templates, themes, and other components that are integral to the process of the present invention. Any finished project such as project 2507 is created from a project template like template 2501. Template 2501 includes a fields list 2511 that identifies all of the system-provided fields that are part of project template 2501. At the onset, all of these fields are blank with no content data, field definition data, position data, location data, orientation data, or size data included. The designer may provide all of the descriptive data about these fields in template 2501 so that when a project is opened for editing all of the stock fields are located in the proper places in the project. The field sequence (order of appearance of the fields when navigating the project), and field default or sample text, which are instructions prompting the user to add a specific piece of information to the field when editing a project.

In this example, the designer defines each dedicated field including what type of data should be inserted into each field by an eventual user of the theme-based template. The designer has access to a proprietary markup language termed Mixbook™ Markup Language (MBML). Designer 2502 may use MBML supported by a MBML (lib) 2503 connected to the designers network to define and dedicate text fields 2511 and to automatically populate end product fields that correspond to these template fields with default or sample text. Defining a text field may be accomplished by tagging the field with MBML. MBML allows designers of templates to input "default" or "sample" text that will guide the user on what to enter in a given field.

MBML is used in one application by inserting double brackets ("{{") to start the MBML, followed by the name of the field being defined. Optionally, the name of the field may be followed by a colon (":"), with the "Prompt Text" that will be displayed to the user in a project wizard such as project wizard 2504 in order that the user to understand what should be entered in each field. The MBML tag may be closed for a specific data field by double closing brackets ("}}"). It is noted herein that differing syntax may be used to define MBML markup fields or variables other than double brackets without departing from the spirit and scope of the present invention. For example, in one embodiment the MBML fields could be represented by HTML-type tags rather than double brackets. Furthermore, a user-friendly designer interface (not illustrated here) could be provided for convenience as is the case with other markup such as Dreamweaver™ for HTML, for example.

Two or more MBML tags may be associated to one field box without departing from the spirit and scope of the present invention depending on what the nature of the definition of that field box is. A date and time MBML tag pair can be used to mark baby birthdates in a baby photo book. A designer might specify a date and a time using two associated tags, for example, {{date:Date Baby Was born}} at {{time:Time Baby Was Born}}. MBML is extensible, such that new field "types" could be defined that perform other functions, such as inserting a page number, the current date and time, the name of the user, the title of the project, and so on.

In one embodiment, an automatic field population form (AFPF) 2510 running on AS 2509 is invoked by default whenever a user invokes a project template by initiating a specific project. In this embodiment AFPF 2510 takes the appropriate MBML embedded field list 2512 and auto-populates the fields 2513 of project wizard 2504 in display before a user with the prompt text that tells the user what data should be entered into each field. The user may then enter the appropriate data specified by the MBML "prompt" data of each field into project wizard field boxes 2513, which results in auto-population of the data in the corresponding project fields 2514 (*a-d*) of finished project 2507. It is noted herein that one template field might correlate with two or more project fields in a finished project. Repeated fields in a finished project that are adapted to contain the same data are represented by a single field in the project wizard and template.

In this example AFPF 2510 may be generated at the point of the user invoking project wizard 2504 to enter data into project 2507. AFPF 2510 auto populates fields 2513 with the correct prompt text. Another AFPF like AFPF 2510 may be generated to auto-populate fields 2514 (*a-d*) in finished project 2507 when the user finishes entering all of the correct data in fields 2513 in project wizard 2504. In one embodiment an auto-preview feature similar to that described further above is provided to project wizard 2504 that informs user 2506 if any data is entered incorrectly into any of fields 2513. In another embodiment no project wizard is necessary and AFPF 2512 auto-populates fields 2514 (*a-c*) with the sample or prompt text that informs user 2506 what type of data should be entered into each field. In all embodiments the entered field data are persisted along with the project as part of the project.

It is noted herein that MBML defines variables such as different data strings that are interpreted as sample or instructional text that lets the user or the system understand what data is supposed to be inserted in the end project field. A project field shall be defined as any feature on a project being edited that may accept text as input and display the text. A project field may include but not be limited to a text box, a title bar, a photo caption, a number field, a date field, an address field, a header, and footer. Moreover, such project fields that may be automatically populated include those residing in any portion of any type of project whether the project is in the form of a book, a card, a calendar, a mouse pad, or any other product.

Figure 26:
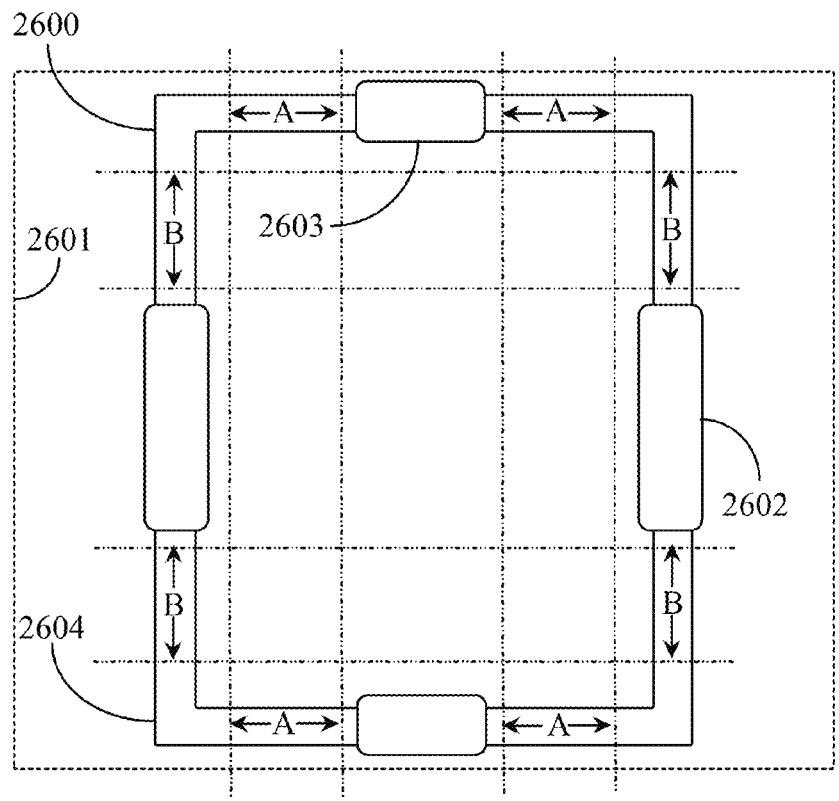
FIG. 26 is a front view of a photo frame that can be automatically sized to fit a photo according to an embodiment of the present invention.
Figure 27:
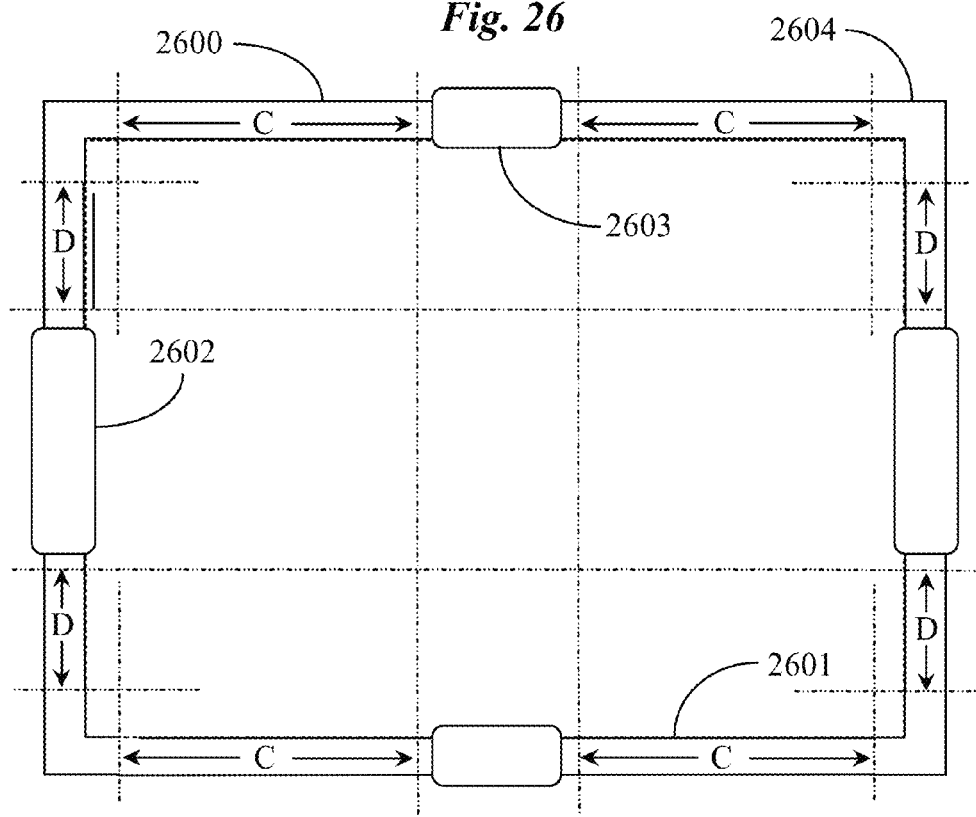
FIG. 27 is a front view of photo frame automatically-sized about a photo.

FIG. 26 is a front view of a photo frame 2600 that can be automatically sized to fit a photo according to an embodiment of the present invention. FIG. 27 is a front view of photo frame 2600 automatically-sized about a photo. Referring now to FIG. 26, photo frame 2600 may be stored using relative size units and may be automatically sized about photos of differing aspect ratios and sizes. In this view photo frame 2600 is not sized for fitting a photo 2601 illustrated herein as a broken rectangle. Typical resizable photo frames have four static components (corners) on the frame that do not change when the photo is resized. Photo frame 2600 includes four static corners 2604 and four static ornamental components 2602.

A one image photo frame cannot be expanded outside of the frame's original aspect ratio without stretching and distorting the frame. Frame 2600 has expandable regions A and B. Expandable regions A and B are areas on the frame that may be expanded by repeating dimensionally in the same direction. Added static components 2602 (right and left sides) and 2603 (top and bottom sides) represent ornamental attributes of the frame that would not look right if distorted by stretching or expanding. Therefore, the system determines the current size and aspect ratio of photo 2601 and calculates the amount of dimensional expansion required in each of the expandable areas of the frame.

Referring now to FIG. 27, photo frame 2600 is automatically fitted about photo 2601 in this example. Static components 2604 (corners), 2602 and 2603 are not changed in the auto-fitted frame. Expandable areas previously described as areas A and B are illustrated in this example after expansion as areas C and D. In this example frame 2600 has been automatically sized to fit photo 2601 with no sizing change required of the photo. By adding symmetrical expandable areas on all sides of the photo frame the system may use more complex ornamental photo frames without distorting the ornamental aspects or characteristics of those photo frames. The static portions of the frame remain the same in any size or aspect ratio. Only the expandable areas C and D are changed during the process. The system detects the photo size and current frame size before the process and then an algorithm determines the calculations required to produce the correct sized frame for the existing photo. When auto-flowing or remixing content in a project, the frames accompanying the photos are also automatically incorporated into the process.

Figure 28:
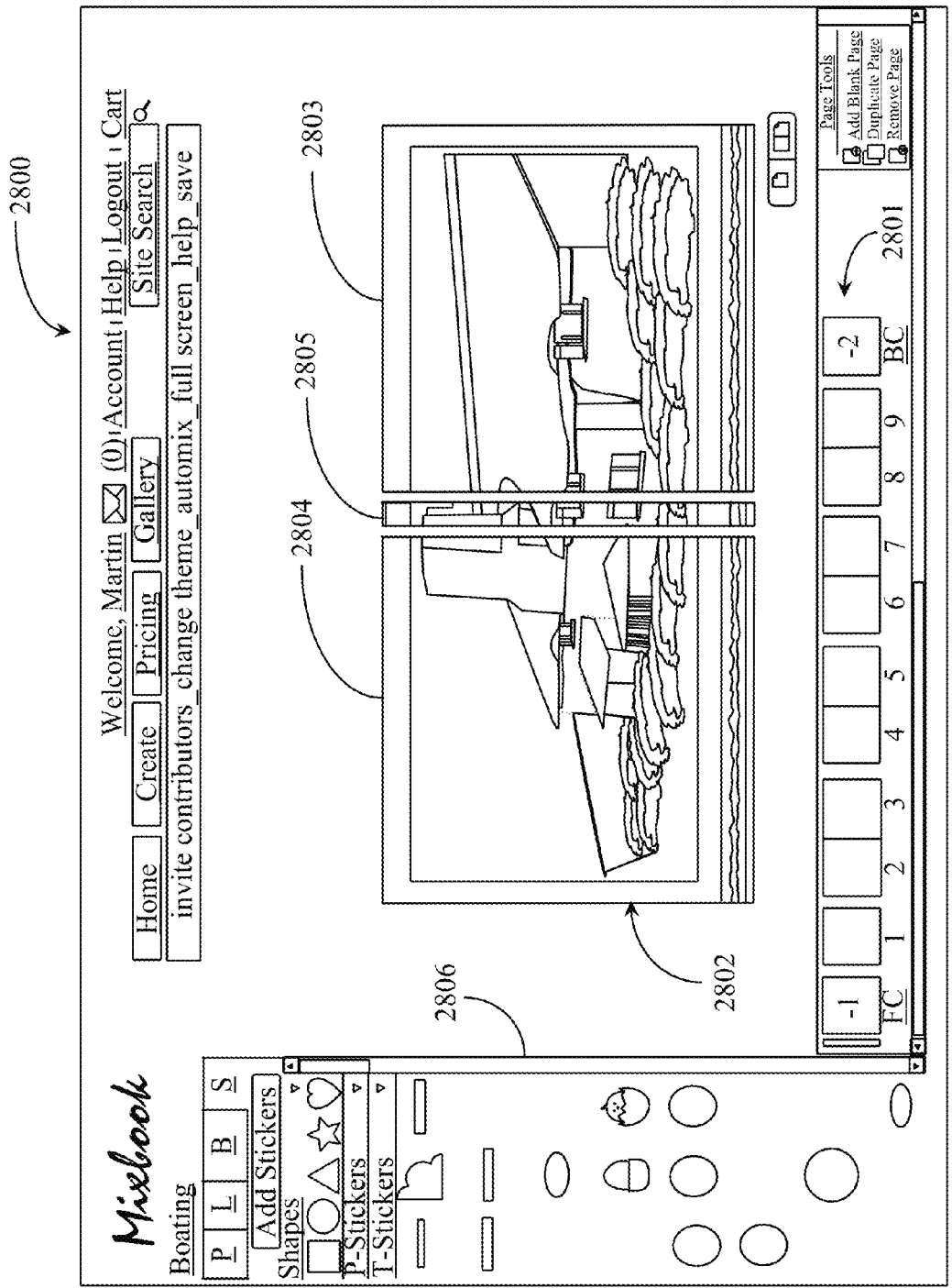
FIG. 28 is an exemplary screenshot of an editing interface displaying a photo spread across multiple pages (front cover, back cover, and spine) according to an embodiment of the present invention.

FIG. 28 is an exemplary screenshot of an editing interface 2800 displaying a photo-spread including a front cover, back cover, and spine according to an embodiment of the present invention. Editing interface 2800 is analogous to interface 800 described previously. Interface 2800 has a storyboard display 2801 that includes all of the pages of the photo book being created. The inventors provide a unique paradigm for relating items across multiple pages including special pages, in this case, the front cover 2803, the back cover 2804, and the spine of the book 2805. When a user edits a spread that contains more than one page, the photos, shapes and stickers can be "overflowed" from one page to other pages within the spread. When the items are overflowing, they are linked together such that when an item changes on one page, its linked item gets updated reflectively on the other page.

In this example the related item is a single landscape photo 2802 that is spread or wrapped around three special pages namely, front cover 2803, back cover 2804, and the spine 2805. In the case of photo 2802, it actively occupies all three designated special pages and editing of the photo from any of the special pages results in changes to the photo appearing on all three pages. For example, if a user pans photo 2802 the results of positional change are seen on all of the pages that the photo occupies. If each of the pages has one or more related items that appear on all of the pages for example, and editing performed on one of the related items may be propagated to all of the related items on other pages automatically.

Related items may also be moved over to one page completely, so that original item is not showing whatsoever on the other page. When this occurs, the item will be removed from the page it is no longer visible on. In one embodiment a user may take an item that exists on a last page, for example, and may "sweep" the item off of that page to automatically create a next page with the same layout and theme that is hosting the related item.

In one aspect of the present invention a pages position may be reflected using signed integers, which may also be used to model a special pattern. In this example, signed integers are used to describe positioning of the front cover 2803 (signed integer −1) and back cover 2804 (signed integer −2). Other special pages like foldable poster spreads (within a book) and inside cover jackets may also be positioned using signed integers. There may be a number of different position types to consider including number (any position value >0), special position, group position, pattern opposition, and function position.

It is duly noted herein that every product available to create at the service site like books, cards, calendars, and photo books, is a compilation of pages. A page is the fundamental canvas unit observed by the service although other unit definitions may be observed. A book is a collection of many pages. "Pages" is not just a reference to the insides of a book, but it can also refer to the cover pieces. The front cover, spine, and back cover are each pages which can be stitched together.

Many times in the process of creating a project, it makes sense to associate certain pages together. When a user edits a foldable card, for example, the user may want to be able to move an item from the bottom portion to the top part of the card. From the perspective of the back end data, the foldable card comprises two different canvas units pieced together.

Figure 29:
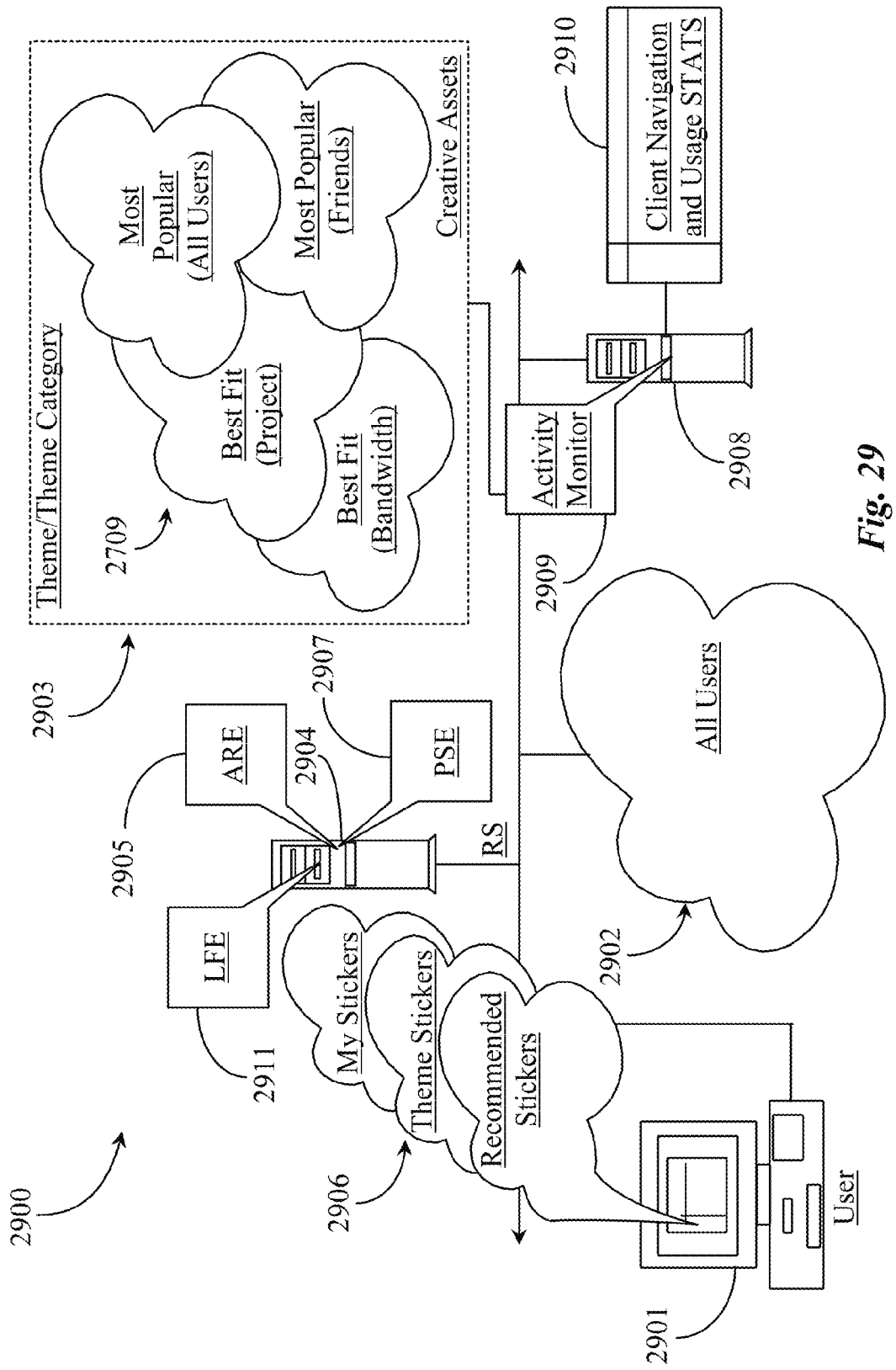
FIG. 29 is a block diagram illustrating an asset recommendation system according to an embodiment of the present invention.

FIG. 29 is a block diagram illustrating an asset recommendation system according to an embodiment of the present invention. In one embodiment of the present invention, asset recommendations are made to a user who is editing a current project using the Mixbook™ collage editor. System architecture 2900 includes a user 2901 that is currently online with runtime server 2904 running an asset recommendation engine (ARE) 2905. The system of the invention has access to all of the assets that have been designed by system designers, users whom may be registered as asset contributors, and any other user contributions to the system. Creative assets 2903 include all of the stickers, shapes, backgrounds, layouts, photos, and any other accessible imagery.

When a user edits a project, and selects a theme, theme-based assets become accessible to that user's Mixbook™ editor as illustrated previously in FIG. 8. In the canvas-editing interface (MBE), one can create a hierarchical recommendation system for presenting users with content to use in their current and future projects. By using themes as the building blocks for this hierarchal asset recommendation system, we can then link a theme to a project and utilize the creative content of the project as the basis for the theme.

In one embodiment, a project can be used by the system as a basis for theme creation in order to facilitate creation of more projects based on the theme. This theme creation process can be leveraged by bundling all forms of creative assets from a user-created project into a theme. If the creator of the project so chooses, all of the assets in the project can serve as the basis for a theme, which then serves as the creative basis for creating future projects. For example, if a user creates a "Mother's Day" project in the form of a photo book, they can use this project as the basis for a theme called "Mother's Day Theme." This "Mother's Day Theme" can then serve as the basis for users across the site to create their own "Mother's Day" projects. They will be able to utilize the canvas pages and all other creative assets that were added to the original "Mother's Day" project that was used to create the theme.

In one embodiment the assets are related to a specific theme a user has selected for a project. Creative assets like backgrounds stickers, layouts, and so on appear in the interface as thumbnails along with the user's photos, etc. In one embodiment asset recommendation engine 2905 is adapted to list recommendations by relativity. For example, if a user like user 2901 is working a project that is baby themed, then the stickers relating to that theme would appear in the user's editing interface. For example, hierarchical recommendation may take the form of sticker categories 2906. Categories 2906 include "My Stickers" as the top level of stickers (the first to appear in the interface). "My stickers" would include the stickers added directly to the project by contributors to the project. "Theme stickers" would next appear and would include the system-provided theme stickers that go with that particular theme. "Recommended Stickers" may include other theme stickers used in the projects from the themes that this project's theme shares a theme category with (Baby Themes).

Creative assets may be recommended on a contextual basis as well. For example, if a user is editing a specific page that has baby stickers on it and clicks the sticker tab other baby stickers will be shown to the user, including the ones used on that page. Other recommendation schemas may be practiced in accordance with the present invention without departing from the spirit and scope of the present invention.

A cloud labeled All Users 2902 may represent all of the users currently editing projects, or all of the users registered with the system. Assets may be recommended to user 2901 based on what all of the current users or based on what all of the users have determined to be the best or most used or most popular assets like theme-based stickers. In creative assets 2903 clouds 2709 represent possible recommendation genres. For example, if the asset is stickers, a recommendation might be the most popular stickers based on use count among all users. Another category might be the most popular stickers based on use count of only the friends of the user receiving the recommendation. Another category might be recommendation of the stickers that might best fit a specific project (contextual). Yet another category might be a recommendation of creative assets based on bandwidth considerations. There are many varied possibilities. Any type of creative asset might be considered for recommendation using contextual or hierarchical recommendation using ARE 2905. Recommendations may be made to users according to analyzed usage counts, friend relationships among the content creators, and content characteristics like width and heights or content meta-data such as photo data.

In one embodiment a single asset recommendation system analogous to ARE 2905 is provided for recommending creative assets stored by the system to users editing a project or a project page. Assets may include but are not limited to the categories of stickers, shapes, backgrounds, layouts, and frames. In a preferred embodiment the asset recommendation system is implemented in software and integrated with the GUI for recommending creative assets. In one embodiment the asset recommendation engine is a back-end data process that works in the background to rank creative assets and serve relevant assets according to ranking order. In this case each creative asset considered has a score card that may reflect a final score or value based on one or more conditions or "weightings".

The system is adapted to receive server calls relative to user GUI activity and to parse information about creative assets stored for use. A ranking function is provided that ranks creative assets based on filtered and/or or unfiltered statistical data known about usage and characteristics of the asset input against one or more pre-set rules for ranking the appeal of that asset. The system includes a server function for serving the recommended assets into the GUI. In this way the most relevant assets may appear in the interface closer to the top followed by the lower ranked assets and so on per asset category. The process is driven by algorithm and may fire each time the user clicks on an asset category to browse available creative assets stored by the system of the invention.

Both hierarchical and contextual recommendations can be made in concert to users operating the GUI. When a user clicks on an existing project to resume editing, the project's creative assets are loaded into the project pages as described further above. These creative assets are also listed in hierarchical order in the asset selection interface, typically the sidebar area of the editing GUI. In one aspect the hierarchy is My Stickers, followed by Theme Stickers, followed by Recommended Stickers. The ranking portion of the engine ranks My Stickers or "Project Stickers" as being most relevant to the project because they are already established in the project by the project contributors. Therefore, these already used stickers will be stickers that have the greatest probability of being re-used in the project.

The ranking engine ranks theme stickers as the next level of importance because these stickers are designed to be used in the theme that the user's project falls under. Now, the ranking engine looks at stickers that are stored that have been used in other user-created projects sharing the same theme or belonging to the same theme category but that have not yet been used in the instant project. The system ranks these stickers according to a weighting algorithm that calculates the appeal of each qualifying sticker according to one or a combination of parameter constraints.

In one example, the recommended stickers sent to a user for display in the recommended stickers' window might be the highest ranking stickers based on a use statistic filtered by user type. For example, this user's friends prefer the following recommended stickers based on the number of times they have been used in projects sharing the same theme or even the same theme category. On the other hand, the system may rank the stickers based on some other preset condition that is relevant to the situation at hand or may rank stickers based on likeness to stickers already selected for use in a project or on a project page.

In one embodiment the asset recommendation requirements are a receiving function for receiving server calls relative to user GUI activity being monitored, a weighting function for ranking creative assets based on input against one or more rules for ranking asset appeal, and a server function for serving the recommended assets into a GUI. In simple practice of the invention includes (a) receiving an indication of a user selection of a project or project page for edit at an asset recommendation engine; (b) calculating or updating current scores for the assets that qualify for service based on project, project page, and theme-based characteristics; and (c) serving the assets into the GUI asset browsing windows with the most relevant assets based on analyzed score served first followed by lesser relevant assets.

In one embodiment, the system of the present invention can select one or more photos from a user's project for recommendation in a new product. The system stores the in-depth page positioning information for all of the items placed in a user's project. The metadata about each of the user's photos, for example, is persisted along with the in-depth positioning information with each item stored for use in the project.

The system may therefore make intelligent recommendations regarding the importance and relevance of photos and other assets to a user. Through this analysis, the system can make automated suggestions of single or multiple photo products that the user may have an interest in purchasing.

By analyzing asset usage information and other data the system can access the items stored for a specific project that may contain, for example, hundreds of photos and select one photo or a few photos that would qualify for application to single or multi-photo products like canvas prints, coffee mugs or mouse pads and so on.

Referring now back to FIG. 29, the system may use ARE 2905 to make an assessment of which image or photo assets in a product are good candidates for isolation for a single or multi-photo product. The term multi-photo refers to a product with two to several photos, for example, where the user had many photos in the project pool. A coffee mug may include a photo wrapped around the mug or several photos positioned about the mug. There are many different possibilities.

The ARE may first access the creator's project photos stored in the database. Then the system might weigh data associated with each photo used in the project against one or more business rules. After weighing the results, ARE 2905 may select one or more than one photo based on weighted score. In one aspect each item has a score card. The system may finally suggest or recommend one or more than one photo product as an up sell at such time the user wishes to make a purchase. A unique aspect of the recommendation is that the system may present one or more views of the suggested product already loaded with the creator's photos selected by the system.

ARE 2905 analyzes any tags attributed to photos and the descriptions of and captions associated with those photos. ARE 2905 might consider the actual size of images for certain product types like canvas prints, for example. If a photo is a background that spans two pages in a photo book, it may be a good candidate for a canvas print. ARE 2905 can consider the number of times a photo is used in the same project. The recommendation may be updated as a user edits a project such that when a user is ready to purchase the project in print form the system might also recommend that the user purchase another product that can be displayed to the user through the GUI with the recommended photos in place on the product. The system might offer an up sell option of one or more than one product exhibiting the selected photos.

Figure 30:
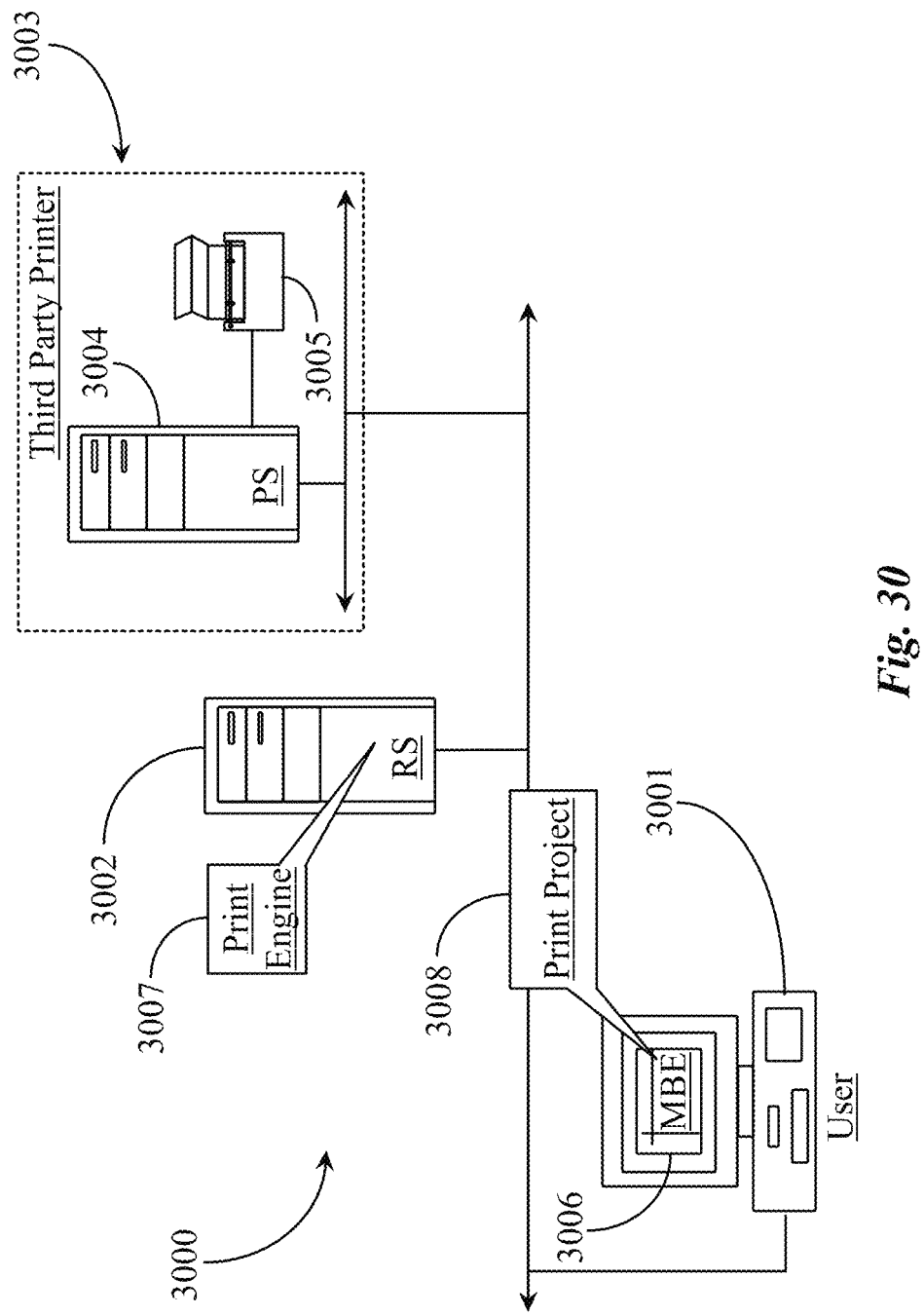
FIG. 30 is an architectural diagram illustrating a printing network according to an embodiment of the present invention.

FIG. 30 is an architectural diagram illustrating a printing network 3000 according to an embodiment of the present invention. Printing network 3000 includes a user 3001 connected online to a runtime server 3002. Runtime server 3002 is analogous to runtime servers previously described in this specification. Runtime server 3002 includes a digital medium coupled thereto and adapted to contain all of the SW and data required to enable server function.

When user 3001 is editing a project using a Mixbook™ editor (MBE) such as MBE 3006, for example, the user is connected in session with server 3002. As such, the user may decide to print a finished project such as a photo book by invoking a printing option such as print project option 3008 illustrated in exploded view. Such an action invokes a printing engine 3007 that is responsible for rendering the user's project in a ready state for printing according to a final end product selected by the user.

The printing engine sends output files for printing to a third-party printing service 3003. Printing service 3003 represents any online printing service. Third-party printer 3003 includes a printing server 3004 and a connected printer 3005 representing printing capability. Printing engine 3007 is a flash based that is enhanced to produce high resolution output files to print. Print engine 3007 is a single print engine that is involved from the point of creating a project to the point of printing out the project.

A flash-based print engine has some drawbacks that need to be overcome in order to print larger high resolution files. Outputting large format prints for printing from a flash based editor is very difficult to do. The inventors provide enhancements that enable the system to take flash content and produce a near pixel-perfect reproduction of a user's work in the high resolution formats that professional printers normally require. Traditionally print systems take the back end data and then recreate the content for printing through a second engine such as a Java-based print engine or a C-application. Print engine 3007 is a point for point engine and can re-create content at any dots per inch (DPI) required by the printer.

In one embodiment gutter areas of printed products are optimized for view after print. In most situations a traditional printed book having a gutter area will have content sucked into the gutter area where it is hard to view, or there will be a color strip applied to the gutter area whereby the color strip appears somewhat unprofessional. Print engine 3007 functions to solve the above problems by optimizing the size of the gutter area and content displayed on a page before printing. In particular, the system of the invention implements a unique method of gutter size calculation and content display logic for printable products.

Based on other content optimization algorithmic results, a gutter calculation algorithm calculates the best size for the gutter based in part on the aspect ratio grouping. The gutter area is intelligently sized in order to minimize the amount of content that is not viewable on printed book products due to the glue that lies in the gutter between two pages on a given spread.

The gutter sizing algorithm works in conjunction with a content sizing algorithm to balance the two extremes, one being no gutter allowance, and the other being too much gutter allowance. No gutter allowance results in content hidden by the glued area in between pages. Too much allowance causes the area defined as gutter to be displayed visibly to the user.

Figure 31:
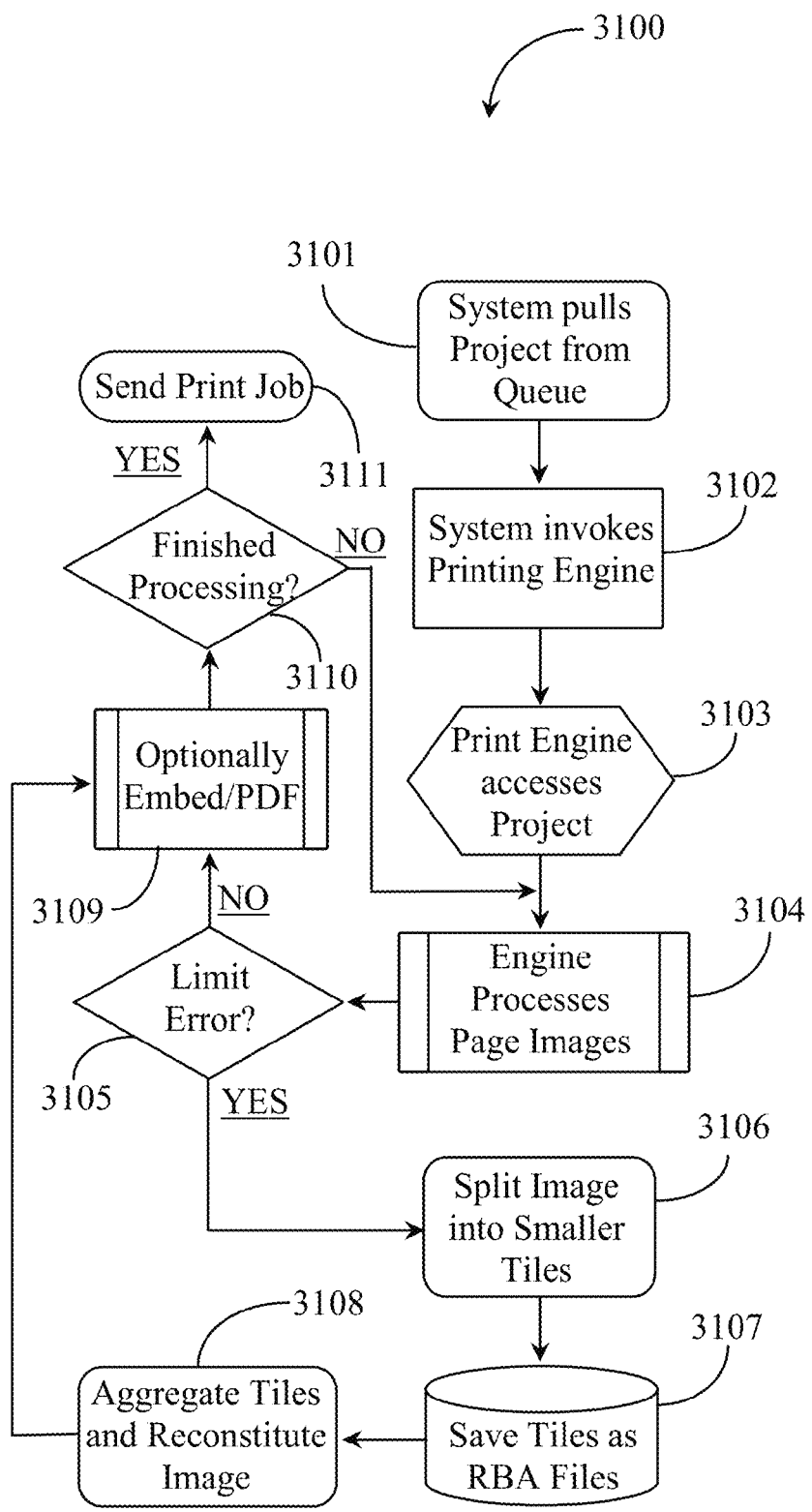
FIG. 31 is a process flow chart illustrating steps for printing large output images according to an embodiment of the present invention.

FIG. 31 is a process flow chart illustrating steps for printing large output images according to an embodiment of the present invention. At step 3101, the system pulls a project for print from a print queue. Users that order printed products are taken through an ordering process after which their print jobs are queued for servicing. A project for print may be a calendar, a wedding book, a baby book, or any photo-based product with one or more pages. At step 3102, the system invokes a printing engine analogous to Flash print engine 3007 described previously. At step 3103 the printing engine accesses or otherwise acquires the project for print. Pages of the project are the canvases that contain the photos, stickers, shapes, and text. A book spine is also considered a special page as described earlier in this specification.

At step 3104 the print engine processes the project pages and encodes the pages for printing. In this step the print engine reads the page and attempts to render the page as a snapshot encoded in some image format like a bitmap image, PNG image (Microsoft), or a jpeg image format. During processing of any of the project pages the system determines at step 3105 if there are any problems with the process so far like any limit errors regarding overall page size or weight. This step is required because there are specific limitations using a Flex/Flash-based printer that prevents snapshot taking of images at higher resolutions or if the snapshot is allowed it results in a huge drain on computing resources (low memory error). In most instances any content sizing or resolution issues with the individual photos in the project pages are resolved through a print warning system described further above that is part of the MBE. Therefore, any issues with any of the atomic elements within the project like content and print boundary conflicts should have been resolved before pre-processing for print begins.

Typically, in a generic process an output image would be rendered normally and then a snapshot of the image would be taken for print. However, quality would downgrade with larger images printed using a non-optimized printer and printing process. Likewise, scaling down the image or image content on a page would reduce print quality. For example, a 12×12 image for print at 300 DPI (desired resolution for quality in print) would require roughly 3600×3600 pixels. If at step 3105 the system determines that there are no errors the system may optionally embed the page images into a PDF document for printing from the PDF format at step 3109. The output image could be embedded into some other application like MS Word without departing from the spirit and scope of the present invention.

It is noted herein that the print engine prepares all of the pages in batch before releasing the materials for printing. The system then determines at step 3110 if the pre-printing process has been completed for that project. If the system determines that the page pre-processing is not complete for all of the pages of a project, then the process falls back to step 3104 until all of the pages are pre-processed including special pages like the front cover, back cover, spine, inside jackets, and any other 'special' pages within the project. When the system determines that all of the processing is complete for all of the project pages, then the print engine releases the project as a print job to be sent to the end printing system at step 3111.

If at step 3105 the system determines that there are one or more limit errors preventing the print engine from taking a single snapshot of the entire page, the offending page may be tiled into two or more image tiles of smaller size at step 3106. The print engine may be adapted to perform this task. In one embodiment this task may be passed on to another application for tiling and stitching photos. The smaller tiles (snapshots) created in step 3106 may be saved to memory by the print engine as uncompressed raw byte array (RBA) files for each page in a given project that was required to be split at step 3105. In one embodiment an image tiling module is provided and integrated with the print engine. The print engine may automatically sense if the pixel size of an image is greater than a pre-defined image size threshold for high resolution printing and if so tiles the image and saves the individual image tiles to memory for later reconstitution.

In a preferred embodiment, the print engine is adapted to detect images that require tiling by algorithm. In one embodiment, the algorithm calculates the threshold for any image submitted for printing by leveraging a mathematical formula that includes the size (width and height) of the print area of the image and the limit value for the print engine to take a single snapshot. In a preferred embodiment the print engine is a Flash print engine. In one embodiment the threshold is expressed in dots per inch (DPI). Using the algorithm, a 12×12 image would have a DPI threshold of about 340 DPI over which tiling would be required to maintain a good quality print. For a 14×11 inch page, the DPI threshold would be about 330 DPI. It will be understood by one with skill in the art of mathematics that there may be more than one mathematical approach that could be implemented to derive the threshold limit value for determining if an image for print needs to be tiled without departing from the spirit and scope of the present invention.

The smaller tiles created at step 3107 are reconstituted back into a single page image at step 3108 using an outside image stitching tool. Optionally, the process resolves back to step 3109 where the page image is embedded into a PDF file for print. In one embodiment, PDF files are generated by the print engine with layers and vectors. The print engine is able to rasterize certain portions of a PDF file while generating other portions of the file in vector to retain the best print quality for page content. The process requires embedding of fonts.

At step 3110 the system determines if processing is finished for all of the pages in the project. If the system determines that processing is not complete at step 3110, then the process jumps back to step 3104. The process typically runs for a batch if there is more than one page image in a project.

With a normal effects filter like a shadow effect filter, flash will prevent the effect from appearing about the page image or other content on the page image like photos and shapes at higher resolution required for quality printing. For example, if a user has a large full-page photo with a drop shadow effect around it the effect would not be visible at all at higher resolutions required for printing. Other effects are treated similarly such as glow, reflection, and so on. Filter effects will not be visible if the filter area is greater than about 15,000,000 pixels. The system enabled by the print engine provides a smaller version of each ordered filter and renders those into bitmap images. This bitmap image (one per filter) is then scaled up to the filters perceived size.

In one embodiment the printing system may tile the background of a page image by mirroring it on all edges to create a buffer zone around a trimable area of a printed project. If book trimming ever invades this area the mirrored effect is considered more aesthetic than viewing a blank white strip around the edges. In one embodiment of the present invention users may configure a project to print using one or more dimensional ink printing techniques on certain content contained within their projects or on whole page images. In one embodiment certain dimensional ink printing effects may be preordered by the system by default.

In one embodiment the print configuration engine is implemented in software and is integrated with the Mixbook™ editor (GUI) and includes a communications link to a compatible print server and printer connected to the data network. In one embodiment tasks are deposited in a print queue. An effect filter size reduction module is provided for reducing the filter size. In this case, the print engine automatically senses via the effects filter size-reduction module if the area of a filter is greater than a pre-defined threshold and if so produces a smaller filter embedded into a bitmap image after which the bitmap image is scaled back up to the filters original size.

Figure 32:
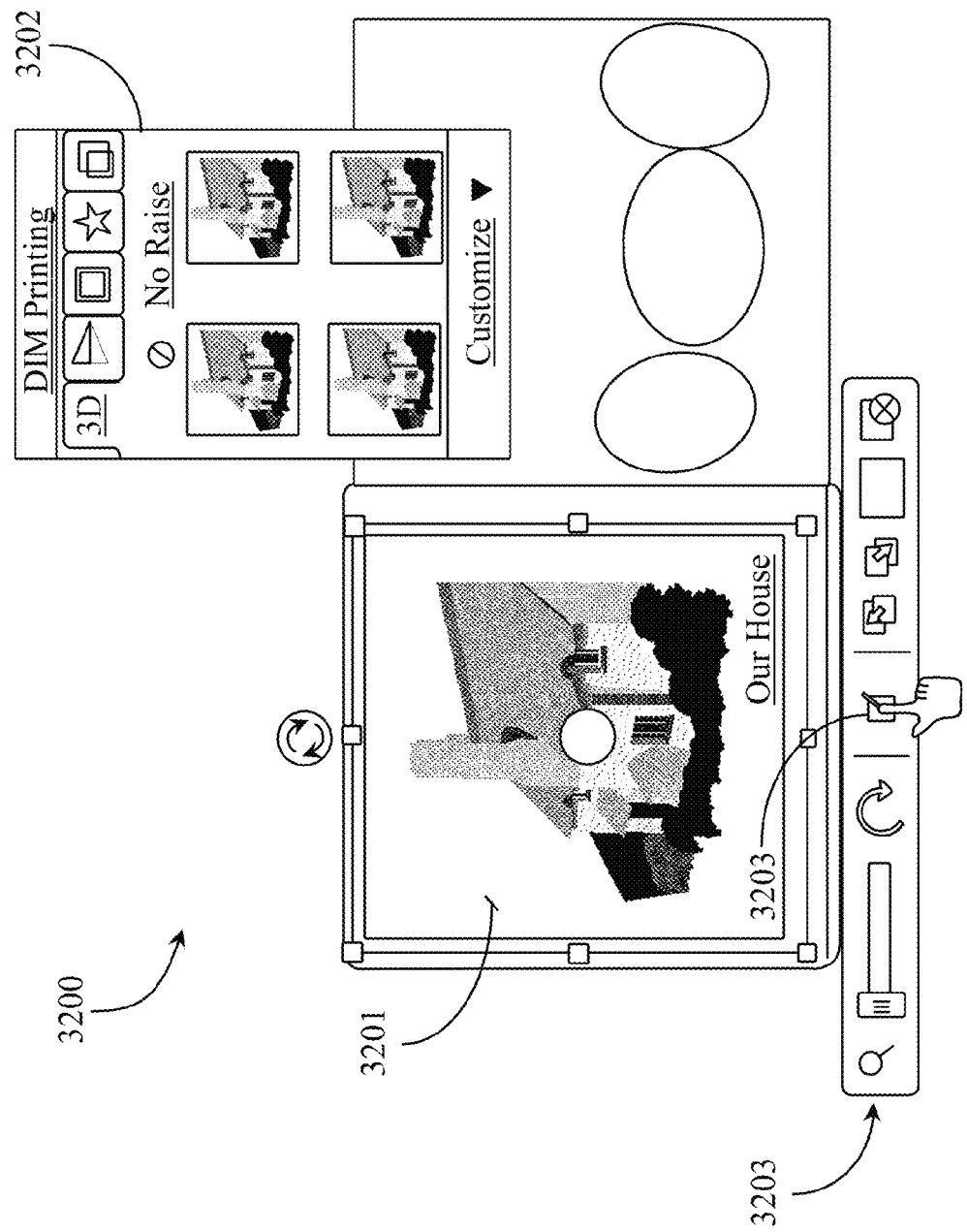
FIG. 32 is an elevation view of a photo book project undergoing editing for dimensional printing according to an embodiment of the present invention.

FIG. 32 is an elevation view of a photo book project 3200 undergoing editing for dimensional printing according to an embodiment of the present invention. Dimensional ink printing is a relatively new technology that enables three-dimensional effects to be produced in print relative to photos, shapes, stickers, borders, and text content within a project. More particularly, dimensional printing allows various areas on the printed canvas to have a "raised" or "3D" look to them. Dimensional printing today is generally accomplished by using a Kodak Nexpress™ printer, and providing a secondary map to the original image which instructs the printer on which areas to "rise" and by how much.

While the end printer is enabled for three dimensional printing, the print engine in conjunction with the Mixbook Editor™ creates the three dimensional print instructions or "maps", which are layered over the associated content to instruct the end printer what areas should be raised and by what depth to print the effects. In a preferred application all products are configured for print and then sent to a third-party printing service to be printed out.

Referring now to FIG. 32, project 3200 is assumed to be presented within the Mixbook Editor™ (MBE) of the present invention. Project 3200 is a photo book in this example, but could be any other type of project such as calendar or poster without departing from the spirit and scope of the present invention. Photo book 3200 includes a page containing one large photo 3201 placed in a photo slot as evidenced by the panning control circle in the center of the photo. As described further above, when a user clicks on photo 3201 editing toolbar 3203 immediately appears to allow a variety of edit options including calling up an additional styles interface 3202. Styles interface 3202 includes an option for pre-configuring photo 3201 to be printed using dimensional ink to produce a three-dimensional (3D) effect on the printed version.

In this example, styles editing interface 3202 includes various editing options including an option labeled 3D for dimensional printing. A user may invoke interface 3202 by clicking on an icon 3203 in the automatic editing toolbar 3202. In this example, a user clicks on 3D (DIM Printing) to invoke an algorithm that "reads" the photo color histogram and/or perhaps other photo data and creates several thumbnail images of photo 3201 for preview whereby each thumbnail exhibits a different stock dimensional print effect as it would look on photo 3201. In this embodiment the default raised levels may be previewed in styles editor 3202 visually in the preview panel. The user may select or mouse over any thumbnail in the auto-preview panel to see the effect on photo 3201.

It may be difficult to "see" the raised effect just by looking at a thumbnail. Therefore, in one embodiment color that is indicative of areas that will be raised by default in each preview thumbnail is applied to each of the thumbnails to point out in each case where the raised areas are. The intensity of such a color may indicate degree or depth of the 3D effect applied.

In one embodiment the algorithm changes every pixel in the "raised" area of photo 3201 to produce a shadow effect. In this case areas that are more raised will appear lighter in color and the areas that are less raised or not raised will appear darker. Areas with more height will cast shadows across the areas with less height using the shadow effect. Other methods to denote to a user that specific areas of an item have been raised are also possible.

A project may be configured simply by displaying in the editor, a page canvas for editing; selecting or highlighting an image or item on the page canvas, invoking a dimensional print effect configuration interface by selecting an interactive button on a toolbar displayed automatically, or by implementing keyboard shortcut to execute the interface, and selecting an option for applying one or more three dimensional effects from the interface. In one embodiment dimensional print settings include automatic generation of a three dimensional print effect whereby the automatic process is responsible for analyzing color data of the image, consulting one or more rules relative to the analysis of color data, and determining from the consultation which areas of the image should be raised and to what depth. A depth map is generated for the image, the depth map instructing a printer which portions of the image to raise and by what additional depth to achieve the three dimensional print effect.

In one embodiment, a method for configuring a project for three dimensional printing includes displaying in the editor, a page canvas for editing, selecting or highlighting an image or item on the page canvas, invoking a dimensional print effect configuration interface by selecting an interactive button on a toolbar displayed automatically as a result of the previous item selection or by implementing keyboard shortcut to execute the interface, and finally selecting an option for applying one or more three dimensional effects from the interface to the item. The effects may be automatically previewed in the editor.

In one embodiment a user may further click on customize to open a drop-down section that may contain a slider and one preview pane. In such a case, a user may be enabled to select pre-defined or mapped portions of a photo by mouse input and then operate the slider to intensify or detensify the effect (raise or lower) the depth level of dimensional printing associated with the specific area of the photo. The algorithms used to adjust content for dimensional printing rely on a series of pre-defined rules that govern what items may be dimensionally printed and how items are analyzed for "best fit" dimensional printing. In one embodiment, the subsystem parses a selected item and then suggests or recommends a style and depth of dimensional printing for an item like a photo for example.

When a user accepts a dimensional printing option for an item the algorithm creates a depth map for the image page or photo that is applied as a layer over the photo image. Depth map options might include having a higher raise at the edges, having a higher raise on one edge vs. another edge, raising certain areas of the image, etc. In one embodiment the system denotes to the user which areas of an item like photo 3201 will be raised by application of one of several possible interfacing methods like applying 3D shading to the item, a glowing effect, an icon next to the item, a highlight, outlines, and many more options. Project templates that include stock items like photos shapes, stickers, and text boxes could be created by designers to include default settings for dimensional printing applied to individual ones or all of the items available with the template.

In another embodiment an algorithm intelligently selects which areas of a page or item should be raised in print to produce an optimum 3D effect based on one or more pre-defined rules. When a user selects auto-raise for example, the algorithm may analyze all of the items on the page including shapes, stickers, photos, text frames, borders, and so on. Aspects subject to analysis include, but are not limited to colors used, photos used, text entered, numbers of items on a page, color distribution patterns in the product layout, color distribution patterns in inserted photos and so on. Analysis may also consider size or aspect ratio of an item; the depth of the item on its canvas in relation to other items; size or aspect ratio of surrounding items; and any effects currently applied to an item or surrounding items such as drop shadow and its associated properties; or otherwise comparing the item with surrounding items.

After a page is analyzed, potentially considering some or all of the analyzing points mentioned above, the algorithm chooses the best areas to raise and the best depths to raise the pixels in raised areas. The algorithm may then indicate to the user as described further above which areas will be raised in preview. The user may ultimately have the option of accepting the "system recommendation" or not. Various methods could be utilized to determine areas that should be raised over other areas of a photo, item, or page. The system might determine the most common color on a page and may raise all of the pixels exhibiting that color to a specified depth. The system stores the "height" of various items on a per-pixel basis. A dimensional attribute is added to the normal pixel data so instead of red, green, blue, and alpha (opacity/transparency ratio) (RGBA) the pixel is defined as RGBA and pixel depth (D). Every item having raised pixels on a page will have its own depth map that will document the data so that it may be transmitted to an end printer operated by a print partner for end fulfillment. The depth D may be different for pixels in separate raised items and for pixels within a same item.

Rules for auto-raising elements of a project might include raising lighter areas of a texture over darker areas. All text of a specific font type might be raised. Rules may be pre-configured for each type of item, for example sticker rules might be different than shape rules. Areas within stickers might be raised based on color distribution within the sticker. Frames and borders may be raised by default. The auto-dimensional print configuration algorithm will rely on the rules to generate depth maps for any items containing raised pixels. In one embodiment user experience may be fed back into the system to help designers create new default applications for dimensional print configurations.

In addition to enabling efficient utilization of assets available within the system, designers pre-build projects from starting projects. When a user starts a project, the system saves the starting version of the book to the database. Many copies of the project are then prebuilt for users. When a user begins a project, we start them off with a book that looks exactly like the project that the designers created (minus the photos). The resulting project is prebuilt so all the system has to do is update the foreign keys to reference the projects new owner, making the process very efficient to the end user. Another unique optimization is encouragement of copying projects.

The system allows users to create a copy of a project and allow the "copier" to modify all the contents of that project and (optionally) use all the photos in the new project. Remixing a project means to take a current project and create another digital copy of it on the system. In this way new users can quickly and efficiently make an existing project their own. The publishing interface portion of the Mixbook Editor™ has controls that allow users to gauge the level of collaboration, viewing access, and "copy" rights of their projects. The system enables "open" projects where any other members can view contribute and copy.

Response to Monitored Pre-Transactional Behaviors

In one embodiment of the present invention, the system is enabled by software to track and monitor client navigation history, including real time navigation of the service online. Among other uses for the data gleaned through pre-transaction behavioral analysis is to determine when it is appropriate to incentivize clients to make purchases in a manner that is good for business and the client. Many current systems have incentive programs for clients, but these are generic in nature and come in the form of coupons or standing discount offers communicated to all clients as opposed to direct targeting clients that are statistically most likely to engage in a transaction based on the summation of their behaviors. In one embodiment one or more purchasing triggers are identified and defined as rules. Such rules may be stored for service in a data repository associated with one or more servers of the system.

Figure 33:
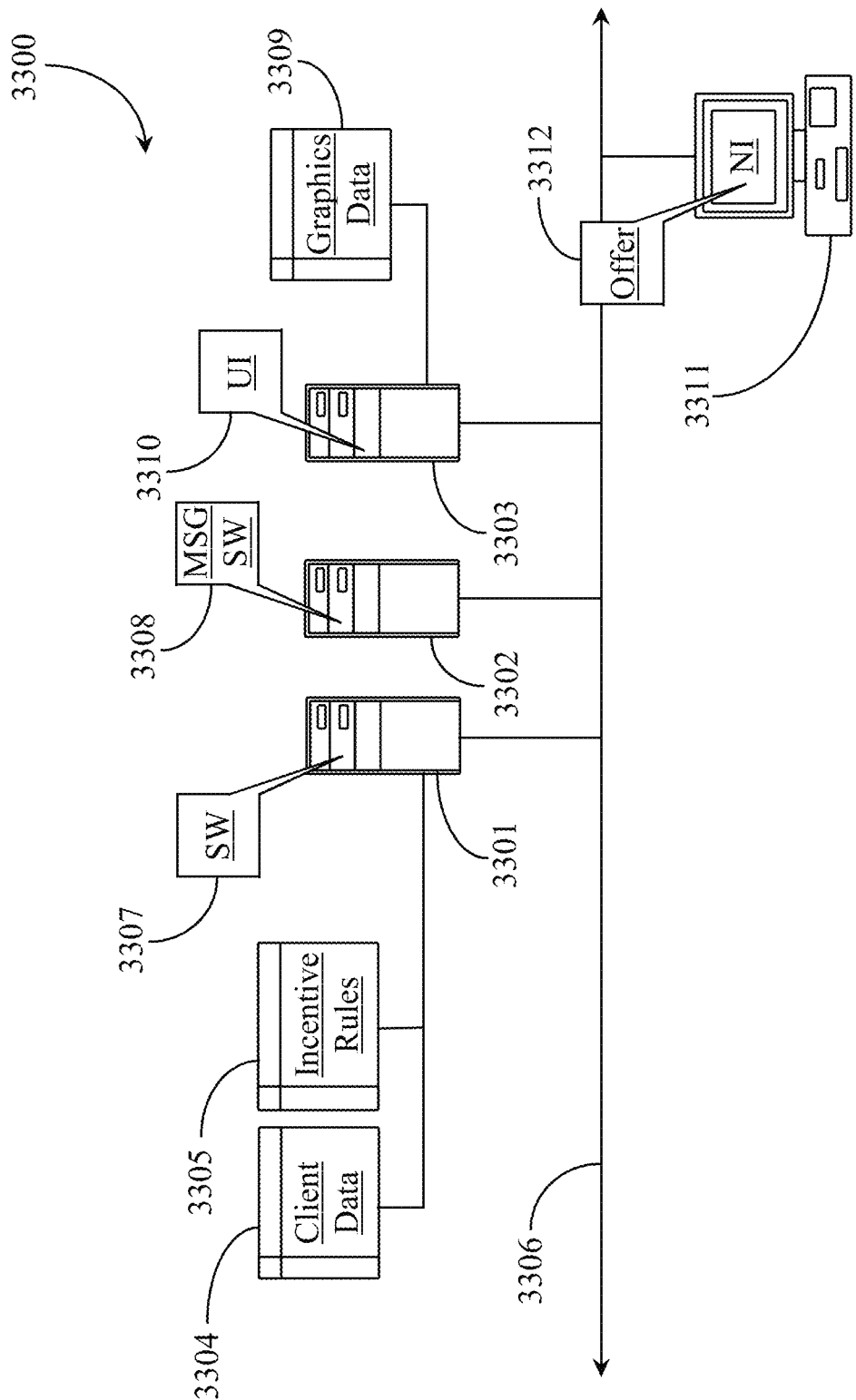
FIG. 33 is a block diagram depicting an incentive determination and delivery network according to an embodiment of the present invention.

FIG. 33 is a block diagram depicting an incentive determination and delivery network 3300 according to an embodiment of the present invention. Network 3300 includes the Internet network, denoted herein by network backbone 3306 and any connected sub-networks.

The system with the aid of the software 3307 may track and report traditional aspects of an intelligence model for a client such as gender, age, profession, etc. More importantly, when the client operating a computing appliance, such as appliance 3311 is online and engaged in interaction with the service, the system may track and report behavioral patterns or tendencies, and navigation patterns and tendencies each time the client accesses the service. In a preferred embodiment, the data collected is maintained in a client repository 3304 or section of memory in a database. The system may choose to run an analysis on a client, most preferably when the client is online, using the service, and can logically engage in a transaction. Data previously tracked and recorded and stored in repository 3304 may be pulled from storage along with fresh data taken while the user is currently engaged with the service.

In one example, a client may be working on an image-based project consisting of wedding invitation to the client's wedding. Along with other data, the system may note and store the wedding date. When the client returns to the site after the wedding date, the system may perform an analysis of the client data on record to determine if it is appropriate under the current business model to incentivize the client to purchase a photo wedding book. Such a wedding book might be currently in process or might not yet have been initiated by the client. Other data such as the client's transaction history might also be tapped to help determine an incentive amount to offer the client for agreeing to transact with the system for the wedding book. If the client has contributed steady revenue to the site over time, the system may use that data to help determine a monetary amount to offer the client.

In practice, once an active session is underway with the client, a monitoring and recording function captures the working behaviors including content contributions of all or individual ones of the users operating through the at least one GUI. Working behaviors may include but are not limited to site navigation, click pattern, social interaction, content contribution, and transacting. The data may be analyzed against a set of incentive rules stored in a repository 3305. Incentive rules may be based on an incentive model for clients. A server 3301 is provided and connected to backbone 3306. Server 3301 hosts SW 3307 adapted to monitor and track client behavior (navigation, purchase history, actions, etc.) of individual ones of clients or of client groups collaborating on a project. SW 3307 tracks and monitors user behavior while in the domain of the system, such as while creating and editing a project or visiting other projects, etc. SW 3307 also determines for each client if there should be an incentive-based offer, such as offer 3312 sent to and displayed on computing appliance 3311 relative to a network interface (NI), which could be any connected network application including an active user interface 3310 used to create, edit, and order projects like a wedding book, for example.

In determining whether or not to initiate an offer, SW 3307 relies on client information held in repository 3304 for input along with any fresh data collected but not yet stored. An algorithm runs the input values for a particular client against incentive rules 3305. The analysis may lead to generation of a score or an active threshold value. The threshold value or score resulting from analysis may help determine a yes or no answer relative to offering the client some incentive toward a purchase based on the collected and analyzed data. In one embodiment, the software determines, after analysis, a specific time window during one or more subsequent and active data sessions (client connected to service), that the client should be incentivized to purchase a particular product based in part on analysis of all or a portion of data recorded. SW 3307 dynamically determines a monetary amount for the incentive based at least in part on the collected pre-transactional data. This determination could be made based in part on the parameters of the particular product identified for most likely or possible purchase and in part on the results from analysis of the data recorded before and during the current session.

Once it has been determined through analysis that the client should receive an offer such as offer 3312 tied to a purchase and what value the offer should be worth to the client, the system provides notification (3312), at a dynamically determined point in time during the instant active session, or at some point after the session. Offer 3312 may be a cash incentive such as five dollars toward the purchase of two wedding photo books, for example. The client may receive such an offer via an instant message (IM), a short message service (SMS) message, an email, a multimedia message (MM), a computer screen pop-up message, or a verbal cue or prompt through the network interface (NI) if so enabled. The offer could be an added credit, a discount, or some other offer of value to individual ones or to the group of users of the availability of and the amount of the cash incentive.

In one embodiment, pre-transactional data 3304 may be pulled and analyzed by SW 3307 against rules 3305 at such time when the client is not online. It is not required that the client be logged into the service to receive an offer like offer 3312. A messaging server 3302 is illustrated in this example and may be an email server or a server adapted to handle other types of text messaging such as short message service (SMS) or instant message (IM), for example. Messaging SW 3308 is depicted as running on server 3308. In this embodiment, SW 3307, with the aid of server 3301, may contact and utilize messaging SW 3308 to deliver a pre-prepared message containing an offer for the client relative to one or more projects. A runtime server 3303 is illustrated in this example and represents any server or group of servers responsible for hosting UI 3310 enabling clients to access their projects and perform other activities relevant to the overall experience.

Server 3303 is connected to a graphics repository 3309 that contains all of the project related data including graphics, asset contributions, and data. It is noted herein that assets may be stored in other network locations as long as they may be accessed by the system on behalf of the client.

It is noted herein that pre-transactional data collected about a client may include historical behavior, transaction history, and demographic information. Client behavior may include navigation paths, click patterns, published comments made by the client, the types of projects created by the client, and other tasks that can be tracked monitored and attributed to a client while the client is interacting with the site. In one embodiment, SW 3307 may be enabled to map or compare a client's behavioral patterns to patterns determined for other clients whom have used the service in the past. Value determination may also be tied to such mappings or comparisons. For example, if X number of clients all have a similar pattern of sending out wedding invitations, initiating a wedding photo book, but have not sought to purchase the books, a higher cash incentive might be offered to all of those clients than what might be offered to just one or two clients. Notifications (offers) may be delivered to clients while they are interacting with the service or after the fact when they are offline or otherwise not engaged with the server.

Creation and Management of Fractal Images

Referring now back to FIG. 21, shapes 2104 may be photo slots that are adapted to contain images or photos. The terms image and photo shall be deemed synonymous in this specification. In one embodiment the system with the aid of an algorithm may produce a fractal image effect from a single photo placed into any one of photo slots 2104. In one embodiment, this may be accomplished through a right click action on any photo dropped into any photo slot 2104. In another embodiment, a pull down menu command or a keyboard command may accomplish the same function. In this case, a fractal image is shared by photo slots 2104 with each slot displaying its own portion of the entire image.

The algorithm runs automatically for any photo that a user decides to use in a fractal image display using two or more photo slots. In one embodiment, the system determines how many photo slots of what shape and size to create on a canvas to accommodate the fractal parts of the photo selected by the user for the fractal image effect. In another embodiment, the client or user determines the shape, size, and location of the photo slots on the canvas used to display the fractal image effect.

For panning, when you move a photo in one of slots 2104, the corresponding positions of the photos in the remaining photo slots also move in the same direction along the X, Y coordinates. This gives the effect that there is only one continuous photo being displayed. In the algorithm, code binds the fractal items (separate portions of the photo) together based on X, Y coordinates. When a user moves one photo in one slot 2104, translation instructions are extended to the other photo slots to reproduce the same movement with respect to their fractal views of the photo. It is noted herein that this effect may be performed for a single photo (different photo portions displayed in each slot) or for separate photos (different photo for each slot). For example, if a photo in one photo slot is moved by an X, Y position, then the SW translates the same movement to the other items in the fractal group. In one embodiment, other actions besides panning can be translated to all of photo slots such as zooming in, zooming out, stretching, resizing, rotating, and application of special effects.

In one embodiment, animation may be applied to a movement so that the movement is repetitive and automated when the photo canvas is being displayed. In the event of printing, the final print version captures the last displayed positions before print of the photo items in the animated embodiment. The algorithm may display parts of an image in all of the slots in a fashion as to capture the entire image using all of the slots. In this case, no part of the original image displayed in one slot is reproduced in any of the remaining slots. Boundary limits may also be imposed by the algorithm to ensure that movement in one slot does not result in another slot displaying, for example, the edge or border of an image. Other operations are possible such as zooming by an amount in one slot resulting in the same zoom amount to be translated to the items in the other slots. Zooming in by an amount in one slot may also translate to the reverse effect (zooming out) on the other items. In still another embodiment photo slots may be assigned functions relative to displaying their fractal parts of an image or of a group of images.

Simulated Force Dynamics between Digital Assets

Referring now to FIG. 29, runtime server 2904 includes a physics simulation engine (PSE) 2907. PSE 2907 may be any physics simulation engine adapted to deliver motion dynamics resulting from detection of a trigger relative to one or more objects or items that have been configured for interaction such as having interactive boundaries that attract or repel objects with polar or similar boundaries. There are many such simulations engines available for rendering motion dynamics for digital objects that are assigned certain properties and include trigger criteria such as having interactive boundaries. In one embodiment, items include any digital graphics that may be added to a project canvas such as stickers for example.

Figure 34:
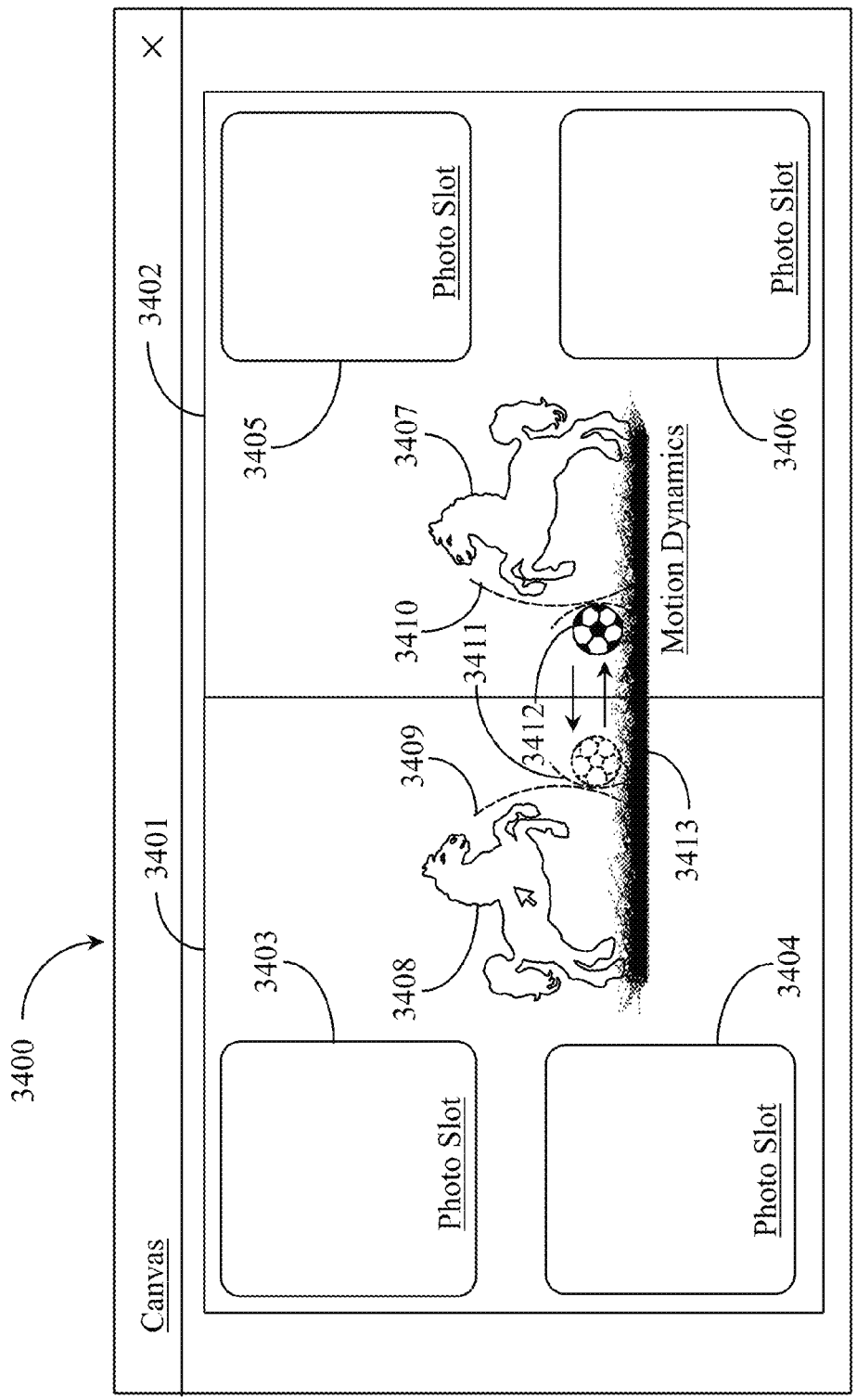
FIG. 34 is a screen shot of a photo book project that is open and displaying two pages, generally referred to herein as canvas.

FIG. 34 is a screen shot 3400 of a photo book project that is open and displaying two pages, generally referred to herein as canvas. Canvas may include any workspace for rendering graphics. In this example, there is a first canvas page 3401 and a second canvas page 3402. Each page contains at least two photo slots for containing digital photos. These are photo slots 3403 and 3404 on page 3401 and photo slots 3405 and 3406 on page 3402.

In this embodiment, a client has arranged digital items 3407 (horse) and 3408 (horse) in opposing positions on top of a bed of grass 3413. Horse 3407 and horse 3408 are facing each other. Each horse includes an interaction boundary, boundary 3409 for horse 3408, and boundary 3410 for horse 3407. In this example, a soccer ball 3412 is provided with an interactive boundary 3411. In this case, boundary 3411 triggers motion dynamics for soccer ball 3412 when it comes into contact with another boundary it recognizes like boundaries 3407 and 3408. Grass 3413 is not interactive and has no interactive boundaries other than providing a stable floor for the interaction between the soccer ball and the horses. However in another embodiment, grass 3413 may have an interactive boundary.

In this embodiment, a user clicks on horse 3408 and moves or drags the horse along the grass until it interacts with soccer ball 3412 (boundaries touch). Thus, motion dynamics for soccer ball 3412 are triggered, namely that the ball rolls or bounces away from horse 3408. The motion dynamics may be calibrated according to the nature of the contact, for example a soft touch or a harder touch may affect the speed and distance that the ball moves away from horse 3408. Horse 3407 is positioned in the path of soccer ball 3412 facing horse 3408. When soccer ball 3412 collides with horse 3407, it is repelled back in the direction from whence it came according to the force of the contact (boundaries 3410, 3411). The motion dynamics are such that the ball is kicked back and forth by the horses on top of the grass.

The motion is initiated in this case by a client selecting one of the horses and making moving it towards the ball until the boundaries intersect. In this case the boundaries are repellant boundaries. The lighter weight of the soccer ball (physics attribute) causes the ball to move and not the horses resulting in the desired effect. The motion dynamics are simulated by a physics engine as previously described above. The items (horses and ball) are linked together algorithmically with respect to the boundaries and desired physics effects. In this particular example, the items and interaction between them span both pages of the editable canvas 3400. However, items and interaction between then may be confined to a single page. Moreover, boundaries may repel or attract relative to motion, or may trigger some other preprogrammed physics when making contact with another recognized boundary. An item may have a boundary that does not interact with a boundary of another item.

Figure 35:
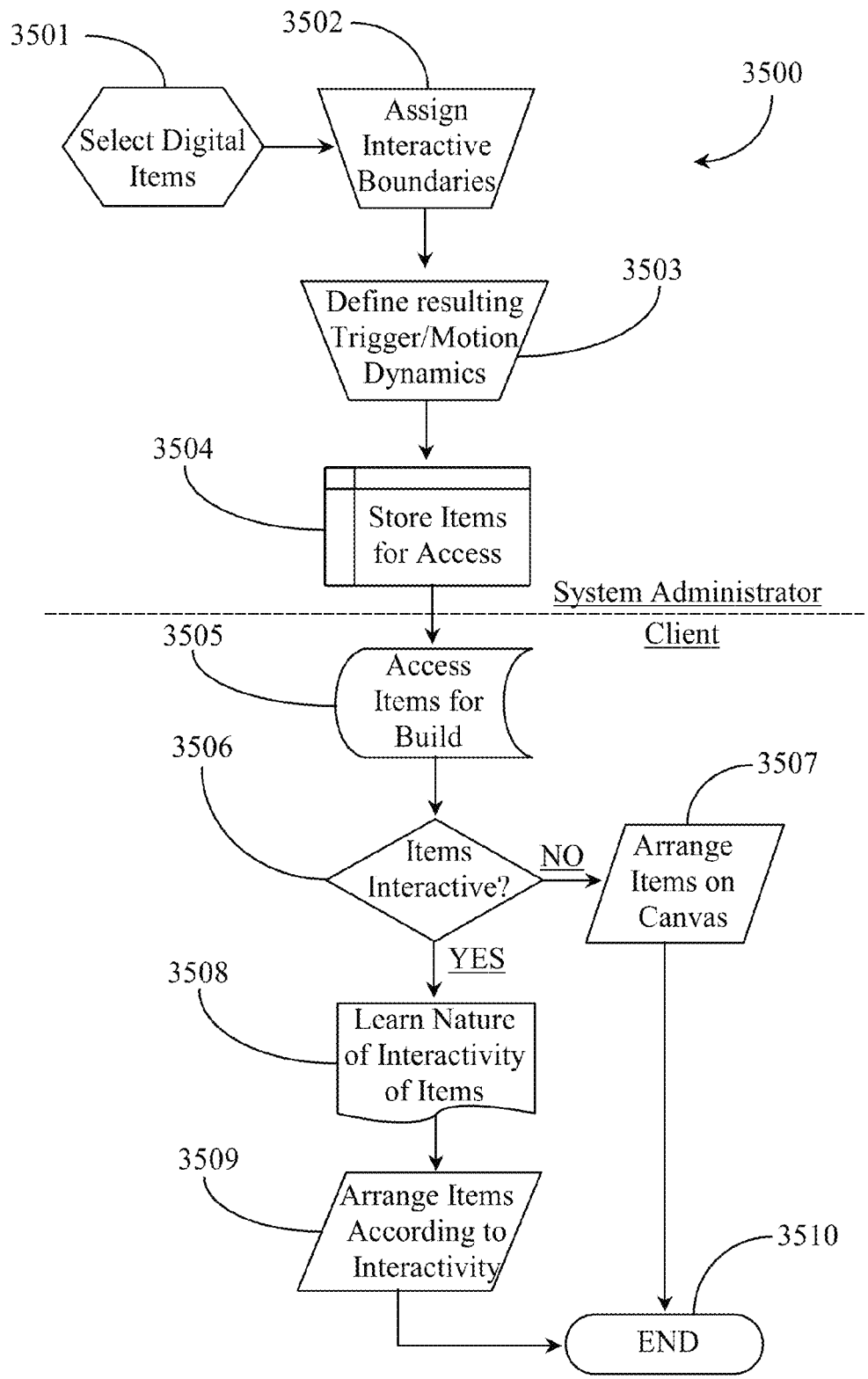
FIG. 35 is a process flow chart depicting steps for configuring items for interactivity according to an embodiment of the present invention.

FIG. 35 is a process flow chart 3500 depicting steps for configuring items for interactivity according to an embodiment of the present invention. The process begins on the system side with step 3501 wherein an administrator selects digital items for configuration. The administrator assigns interactive boundaries and their properties to the items at step 3502. At step 3503, the administrator defines the trigger mechanism, in this case, intersecting boundaries, and the resulting motion dynamics that are desired. Once triggered, an algorithm may determine the motion dynamics and in more complex interactions, a physics engine may be employed. The process may be aided by or may be performed by software (SW) in a semi-automated or wholly automated fashion. At step 3504, the administrator or SW stores the items for client access when online and working on a project.

In the case of SW, the SW includes a function for establishing interactive boundaries between items in a collection of items placed on an editable canvas, a function for detecting, upon movement of at least one of the items, the intersection of one or more of the interactive boundaries established, and a function for dynamically implementing physics assigned to the items upon confirmation of intersection of the interactive boundaries. The latter function may rely on a physics engine such as one typically used in video gaming for rendering physics.

At step 3505 a client assumed to be online and working on or editing a project accesses items for building onto the project. In some embodiment, interactive items are already part of a template and may be kept, removed and replaced with different items. For each item accessed, the client may determine by observation, or may receive visual indication which items selected are interactive and which other items certain items may interact with. The client may therefore decide at step 3506 if items are interactive or not. Typically, step 3506 occurs before items are added to the canvas at step 3506, if the client determines that the item or items are not interactive, the client arranges the items on the canvas without regards to animation at step 3507. The process then skips to end at step 3510 for those items. In one embodiment, items may be grouped according to interaction and may be presented to users in such groups or item sets.

If the client determines that the items selected are interactive with each other or other items at step 3506, then the client may investigate the exact nature of the interactivity including review of any sub-options for editing the motion dynamics if allowed by the system at step 3508. The exact nature of the interactivity of an item might be garnered by right clicking on the item and selecting interaction summary. In one embodiment, a client may further expand the summary to produce more granular details and options if they exist for a particular item.

At step 3509, the client may arrange the items on the canvas according to the interactivity data to ensure that the motion dynamics work correctly on the canvas. The process may then end for those items at step 3510. In one embodiment, users may be empowered to access a build kit to create items with motion dynamics and interactive boundaries or points. It is noted herein that motion dynamics plays out only while the project is being edited or reviewed online connected to the runtime server. The online version of the project may contain many animations and motion dynamics between objects or items on each page.

Managing Print Order Distribution Among Multiple Printing Service Vendors

Figure 36:
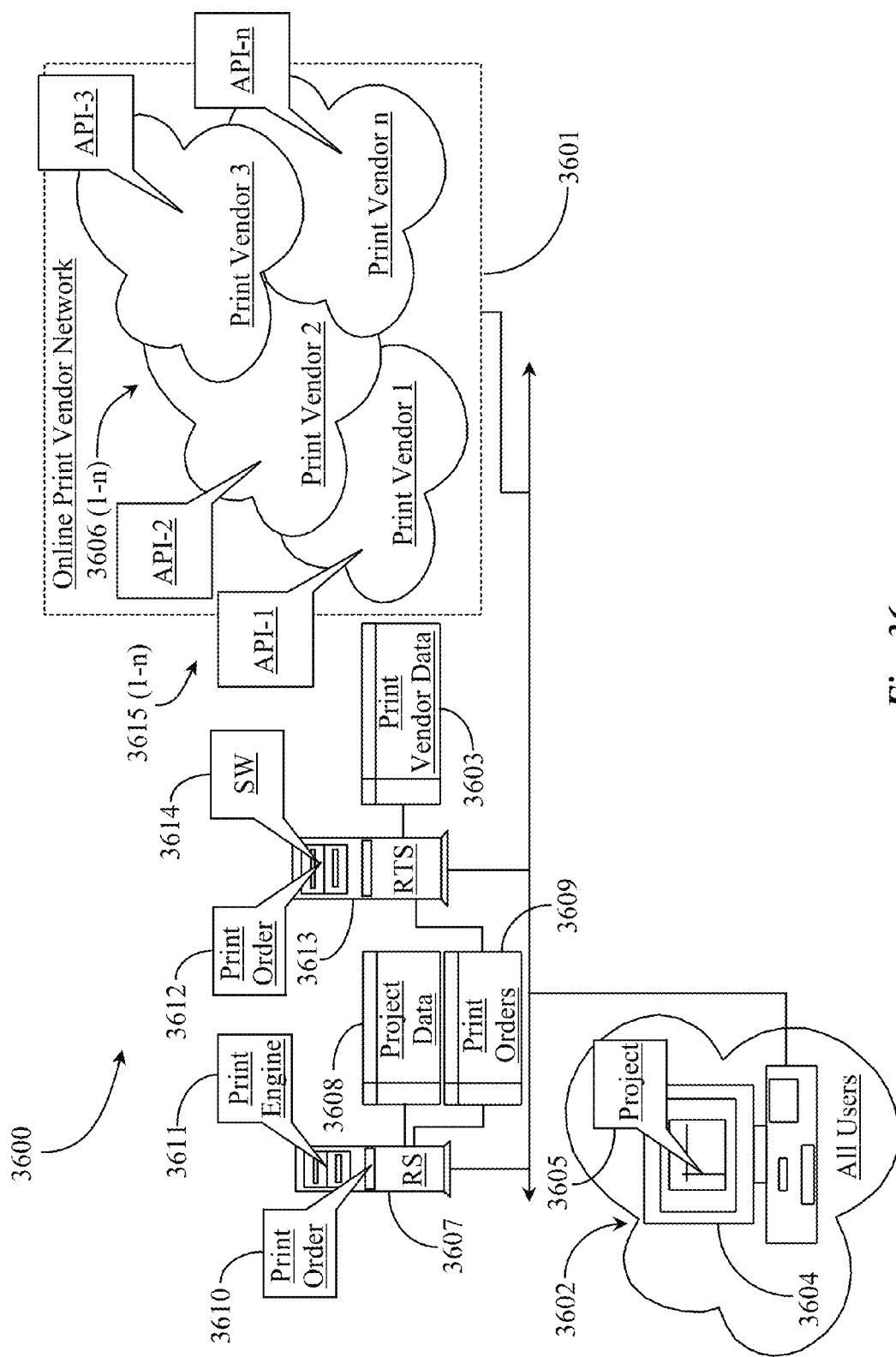
FIG. 36 is an architectural view of a service network 3600 supporting management of print order distribution according to an embodiment of the present invention.

FIG. 36 is an architectural view of a service network 3600 supporting management of print order distribution according to an embodiment of the present invention. Network 3600 is, in one embodiment, an Internet network. Network 3600 includes a runtime server (RS) 3607 for hosting a network interface for users to use in creating image and or text-based projects like a photo book, for example. Server 3607 includes at least one processor and a data repository, the server including a non-transitory physical medium.

Network 3600 includes connected users, illustrated herein logically as user or client network 3602, labeled All Users. Network 3602 includes any communications network available for connecting computing appliances to the service. A computing appliance 3604, a desktop computer in this example, represents a user finishing a project 3605 while connected to runtime server 3607. Project 3605 represents any printable project that might be created by a client using the service. One objective of the service is to take print orders from users for printing and delivery (typically by shipping) to those users that ordered and paid for products.

RS 3607 has connection to a data repository 3608 adapted to contain user project data presented in a finished project for printing. It is noted herein that some project data may be sourced or stored elsewhere on the Internet including user-registered sites such as social interaction sites and photo bucket-type sites not affiliated directly with the service. RS 3607 also has connection to a data repository 3609 adapted to contain active print orders submitted to the service for printing such as print order 3610. All print orders are prepared for printing using a print engine 3611. Print engine 3611 formats and otherwise prepares a project for submission to one of multiple available print vendors operating throughout the network. Print order 3610 is received by RS 3607 and prepared for printing by print engine 3611 before it is stored or queued in repository 3609. In one embodiment an active first-in-first-out queue system is provided for queuing print orders for distribution. In this example, such queuing is represented by repository 3609.

Network 3600 includes a routing server (RTS) 3613. Server 3613 includes at least one processor and a data repository, the server including a non-transitory physical medium. Routing server 3613 has connection to repository 3609 containing print orders for processing. Print orders contained in repository 3609 have already been prepared for printing by print engine 3611. Routing server 3613 includes software (SW) 3614 running from the non-transitory physical medium. SW 3614 includes a first function for acquiring current job capacity capabilities, delivery time estimates, historical production times, and current cost estimates for printing and shipping relative to one or more products resulting from completion of the one or more electronic print orders.

This first function may be performed as an ongoing or periodic task. Routing server 3613 has connection to a data repository 3603. Repository 3603 contains print vendor data such as current job capacity, delivery time estimates, historical production times, and current cost estimates for every print vendor available to the service.

Network 3600 has access to an online print vendor network 3601 in this embodiment. Vendor network 3601 is a logical network representing the network paths and network access to all print vendors available to the service. In this example, print vendors 3606 (1-n) are represented by network cloud icons. Each print vendor 3606 (1-n) has an application program interface (API), the collection represented as APIs 3615 (1-n). Print vendor APIs may be shipping and production status APIs adapted to integrate with SW 3614 to provide the necessary information for the service to determine which print vendor is the best one to handle any particular print order or batch of print orders according to economics and logistics that may be favorable to the service. The determination is made algorithmically using one or more than one algorithm. Therefore, print vendor data 3603 is constantly being updated with older obsolete data being continually dumped or discarded with the exception of historical data. SW 3614 includes data routing software for dynamically routing one or more of the electronic print orders according to the results of scoring of the print vendors available to the service.

Intelligent Capacity Planning

SW 3614 includes one or more algorithms providing a function applying scores associated with the combined values for each of the print vendors, and then comparing those scores among the available print vendors in determining which vendor is currently the best vendor to use for an order or batch of orders. In a use case example, assume that each available print vendor 3606 (1-n) guarantees a particular production capacity that the service can utilize on any given day of order fulfillment. Looking at cost factors, printer 3606 (1) guarantees printing a particular product for ten dollars whereas print vendor 3606 (3) guarantees printing the same product for only five dollars. If cost were the only criterion, routing server 3613 would route print order 3612 directly to print vendor 3606 (3). Conversely, if more data is evaluated and compared between the vendors such as current production capacity, and consideration of a second product (print order) ready for distribution, the determination may be different.

Print vendor 3606 (1) may guarantee printing of a second product type represented by an additional print order at four dollars compared to ten dollars for the second product if printed by vendor 3606 (3). Capacity data may indicate that vendor 3606 (3) is only one print order away from reaching it's maximum printing capacity for the day, the service might select print vendor 3606 (1) to print the first and second products, keeping print vendor 3606 (3) open if another print order is predicted to be ready that day that may be routed to that vendor. The service saves one dollar and reserves print vendor 3606 (3) for the next predicted order. In one embodiment, print vendor data repository 3603 includes pre-negotiated rate tables submitted by print vendors in the auspices of competition.

In one embodiment, SW 3614 may also access customer history data for customers ordering printing services for their created projects. In such an embodiment, customer loyalty and historical activity may garner some priority in selection of an available print vendor for printing an order for that particular customer and shipping the finished product to that customer. The concept here is that if a customer can receive a printed product sooner than later, the customer may experience a higher level of customer satisfaction that may lead to further patronage.

In one embodiment wherein SW 3614 is integrated with the print vendor APIs (3615 (1-n), or where pre-negotiated cost tables are available, the service has intimate knowledge of the up-to-date costs to ship products to the customers from any given print vendor. However, greater customer satisfaction that might result from more expedient shipping resulting in more expensive shipping costs could yield a margin back to the service over a reasonable time period that is greater than the original investment in the more expedient shipping of product. In this way predictive analysis may play a role in calculating which print vendors to use for particular customer orders. In this embodiment, routing server 3613 and SW 3614 has access to historical customer records such as purchase history and activity history at the service site. A customer may be identified as one who would likely create and purchase more products in a reasonable time because of enhanced satisfaction resulting from more expedient shipping of a last order. A threshold score could be established and customers exhibiting a level of activity that surpasses this threshold value could be candidates for enhanced shipping wherein additional revenue generated over future orders more than makes up for the increase in shipping costs laid out by the service.

Real-Time Bidding by Print Vendors

In one embodiment, print vendors 3606 (1-n) may compete with one another for business by adjusting their prices according to an auction model governing printing costs. In this embodiment, a portal might be provided for the print vendors to log into to adjust their printing costs in a bid to pick up more immediate business from the service. The service could institute maximum constraints based on the pre-negotiated prices from each print vendor. For example, if print vendor 3606 (2) has some extra capacity because of a slow period or day, that print vendor could log into the print vendor portal supplied by the service and manipulate a slider bar that may produce different stock keeping units (SKUs) describing product types and costs. One component of integration may be a preview of added business that could result from a modest change in pricing. Therefore, as a print vendor operates the slider bar, the corresponding increase in volume of print orders they might receive at those adjusted prices would also appear in the interface.

Figure 37:
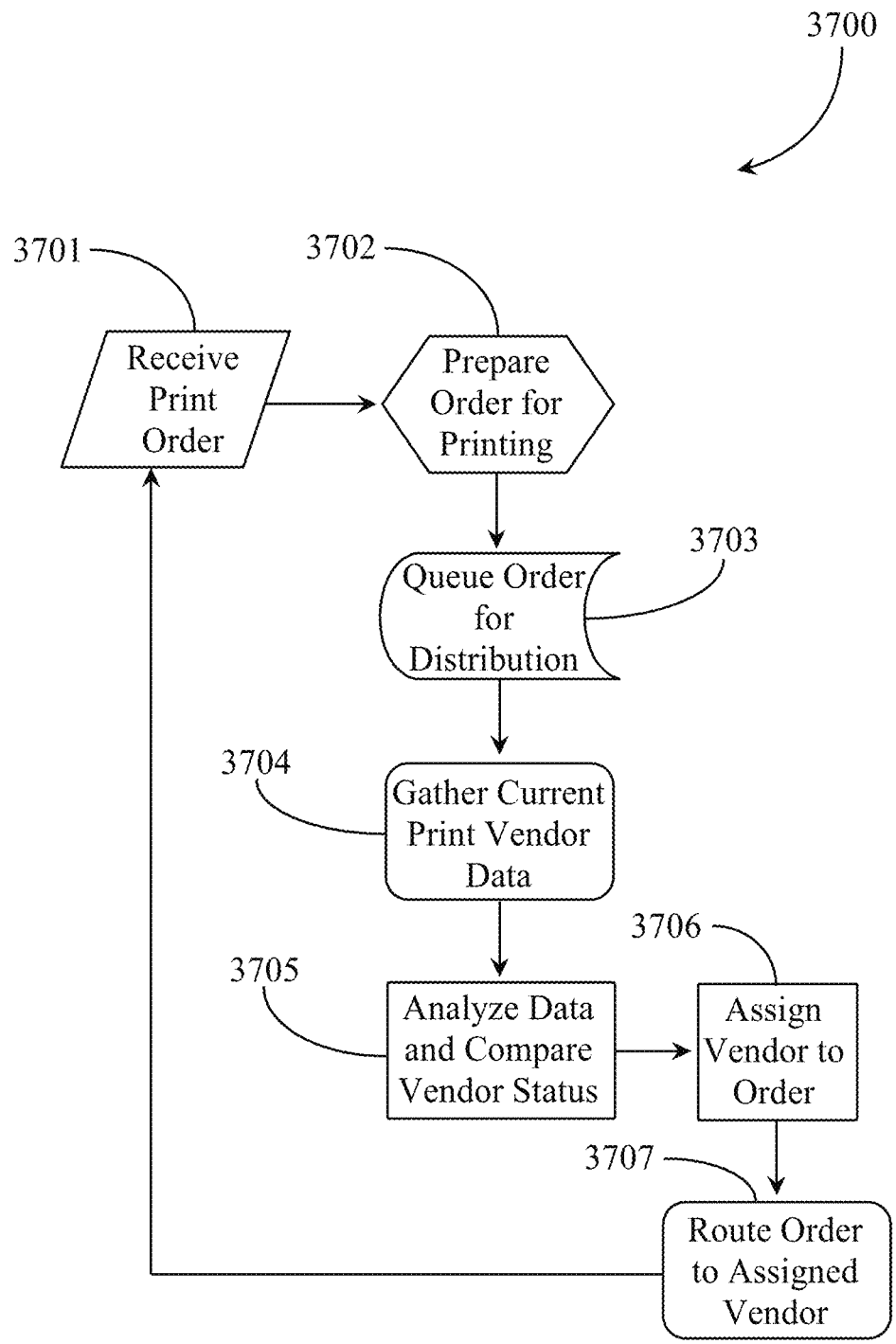
FIG. 37 is a process flow chart depicting steps for routing a print order based on analysis of data.

FIG. 37 is a process flow chart 3700 depicting steps for routing a print order based on analysis of data. At step 3701, the system receives a print order over a network, the print order submitted by a customer through a graphics user interface (GUI). At step 3702, the system with the aid of a printing engine prepares the project subject to the order for printing by one of multiple available print vendors accessible through the network. Once the print order is prepared and optimized for printing, the print order is queued for routing of distribution to one of the available print vendors at step 3703.

At step 3704, the system gathers current print vendor data such as current job capacity capabilities, delivery time estimates, historical production times, and current cost estimates. The system then analyzes the data for each of the available print vendors and compares the scores to determine the best print vendor to handle the print order. At step 3706, the system assigns the best print vendor as the recipient of the print order. At step 3707, the system routes the print order to the designated print vendor. The process then resolves back to step 3701 for treating the next print order. It is noted herein that a best print vendor may be determined for a ready print order or for a batch of ready print orders without departing from the spirit and scope of the present invention. A batch of print orders may contain projects that are structurally and graphically similar, or projects that are different from one another without departing from the present invention. Likewise, a batch or ready print orders may be split and distributed to more than one print vendor as determined by data analysis and scoring without departing from the spirit and scope of the present invention.

Intelligent Reverse Invoicing

In one embodiment, chart 3700 includes a step after step 3707 or generating and sending a reverse invoice to the print vendor assigned to the print order at step 3706. For example, if the print vendor confirmed a price for a print order at 9 am, but changed the price for a similar print order received at 11 am, it would be possible for the vendor to mistakenly charge the 9 am price for the later order. By invoicing the print vendor at assignment of the vendor for an order where the vendor has confirmed the price at the time of the order, the system ensures that the correct invoicing prices are adhered to. In this way the system, with the aid of software running from a non-transitory medium on the server may secure a current price from dynamically changing pricing for an electronic print order among a grouping of two or more print vendors operating over the network.

In one embodiment, the current pricing associated with the print order routed to the assigned vendor is recorded for subsequent data population on a generated digital invoice covering the print order including shipping, etc. The invoice is sent electronically over the network along with the print order to the vendor. In one embodiment, time stamps or time tags may be used as a mechanism to confirm the current pricing at the time of routing of an electronic print order to a selected print vendor. The time stamp or tag can be used at the vendors end to double confirm the appropriate pricing that was in effect at the time the order arrived in the vendor system.

Prioritizing Graphical Digital Assets

With reference to FIG. 29, ARE 2905 may leverage a number of statistical genres to help prioritize creative assets that are presented to customers for possible inclusion into their projects. Network 2900 supports a statistics server 2908. Statistics server 2908 includes at least one processor, data repository, and a transitory medium. Server 2908 hosts SW 2909, labeled Activity Monitor. Activity monitor 2909 may be hosted on runtime server 2904 and may be integrated with ARE 2905 without departing from the spirit and scope of the present invention.

ARE 2905 may also communicate with a separate activity monitor 2909 as shown in this example distributed to server 2908 to better aid discussion of separate functions. Activity monitor 2909 is adapted to monitor activities of customers and non-registered site visitors for the purpose of gathering data to create useable statistics across multiple categories relative to the activities of customers and, in some embodiments, relative to the activities of non-service-registered friends and family members of those customers who may visit the site to look at projects or otherwise browse published projects created by those customers. Activity monitor 2909 may monitor all of the activity occurring within the service domain, such as at the service Website (not illustrated), and during project creation, editing, and transaction processes through a graphics user interface (GUI).

Server 2908 has connection to a data repository 2910 adapted to contain, at least, client navigation and usage statistics. In one embodiment navigation and usage statistics may be gathered from non-registered users such as friends and family of registered users who visit the service domain such as a Website, portal, social interaction page, project publication page, and so on. Activity monitor 2909, in this embodiment, works in the background independently from ARE 2905 to monitor all users and to collect data about those users and activities they engage in at the service site domain. Activity monitor 2909 includes a processing component for creating statistics formulated under several categories. One such category is usage of assets such as repetitively used content contributions, themes, stickers, frames, styles, etc. Another possible category of data relates to a user actively liking or disliking an asset or contribution. Site navigation patterns of users through the service domain represent another possible category for gathering data and forming statistics. Still another data category is sales data relative to projects created at the service, for example, the current best-selling themes.

Activity monitor 2909 creates statistical information about data it has collected and store the information in data repository 2910. As activity monitor 2909 creates new statistics, the data in repository 2910 is updated and older data that is obsolete under any category may be purged. A time window for keeping data may be imposed as some categories may fluctuate widely in the amount of and relevancy of statistics depending on season, trend factors, or other like factors of change. For example, the theme "Mothers Day" and related creative assets and usage statistics would not be relevant during the time just before "Fathers Day", but become relevant again around the next "Mother's Day" season.

In prioritizing creative assets, the system, which may leverage ARE 2905, attempts to present to the customer the best-fit assets the system can offer for what the customer's goals are in the way of project creation. ARE 2905 may run for each user who is actively creating and or editing a project. In one embodiment, ARE 2905 may communicate with a customer, making pre-project recommendations before the customer initiates a project if there is some indication of the intent of the customer. When ARE 2905 is called to recommend assets to a user, it may access data repository 2910 to obtain statistics relative to a theme, theme category, layout, and associated individual assets like stickers, photos, etc. that may be presented in prioritized fashion for that user. If the best, most likely accepted items are presented to the user first, less work will be required of the user to create a project.

The system may determine, for example, which existing template would be best for the user by looking at statistics formed from sales data and numerical analysis. In one example, assume that there are two photos arranged on a user's page for remixing. A category for data gathering could be data about history of all purchased books having layouts with 2 landscape photos arranged on them. Candidate layouts then may be prioritized further to narrow the field down to a few layouts that would best serve the customer. Template or layout categories may be filtered further by narrowing the selection criteria based on related themes to the current project being worked on.

Prioritized assets may be presented to a user in a sidebar of the graphics user interface. Activity monitor 2909 includes at least a function for assessing and recording the usage statistics of digital assets used by the overall client base. Activity monitor 2909 also includes a function for monitoring and recording the navigation behaviors, usage patterns, and content contributions of all or individual ones of users operating through the at least one GUI or visiting the service domain. ARE 2905 functions to gather the prioritized digital assets for presentation according to analysis of statistical data recorded by activity monitor 2909.

In one embodiment, a layout fabrication engine (LFE) 2911 is provided to run on RS 2904. LFE 2911 is adapted to dynamically create or remix the layout of a canvas based on input from asset recommendation engine 2905. In this way, a user may see the recommended assets and a preview of what the layout will look like using the highest prioritized assets like background, photos, stickers, frames for photo slots, text box styles, and other items. One component of such an engine is a machine learning routine that learns from a library of prioritized assets including photos, stickers, and other prioritized assets and is adapted to study page layouts containing these assets. The routine aids layout fabrication by providing intelligence relative to how best to position those assets such as photos, for example, and how best to compliment those assets with other assets like stickers. One example of such an optimization is mining metadata from prioritized assets like photos to create relevant captions for those photos. In one embodiment, location data and time data might be leveraged to provide a relevant caption for a photo, for example, if a photo is taken in New York City at 12:00 PM, then a relevant caption might be "New York City at night", or "Midnight in New York City".

Dynamic Application of Style and Photo Effects

Figure 38:
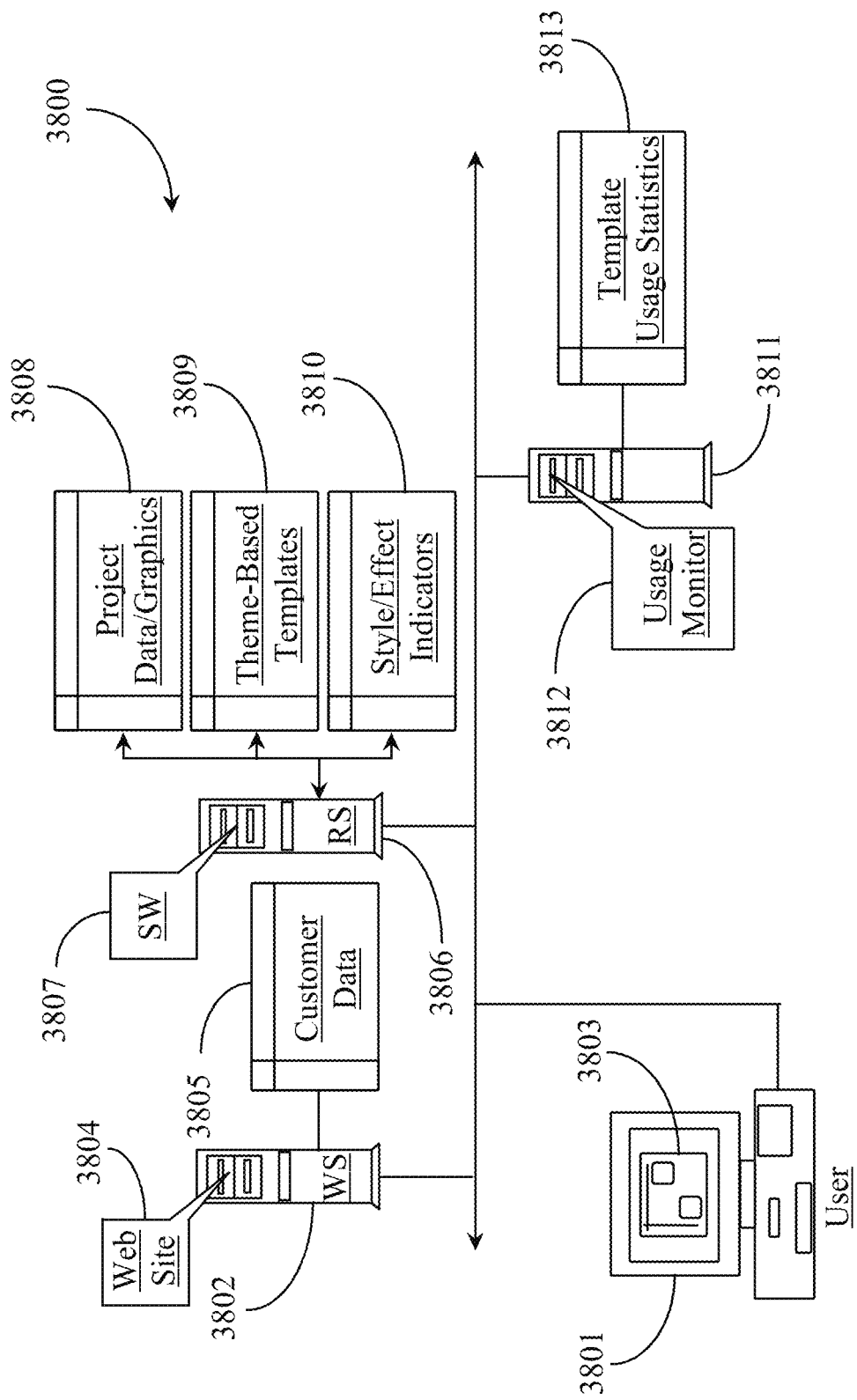
FIG. 38 is an architectural overview of a customer project creation and fulfillment network supporting default and dynamic styling of photos contributed to image and or text based projects.

FIG. 38 is an architectural overview of a customer project creation and fulfillment network 3800. Network 3800 supports default and dynamic styling of photos contributed to image and or text based projects. Network 3800 includes a Web server 3802 hosting a service Web site 3804. Server 3802 has connection to a data repository 3805 containing customer data such as username and password combinations for logging into the Web site, address information, billing information and the like.

A user operating a computing appliance 3801 has connection to network 3800 and is assumed a customer of the service and registered with Web site 3800 for the purpose of creating, editing and purchasing image and or text based projects like a wedding photo book, for example. Computing appliance 3801 is a desktop computer in this example; however other computing appliances with network access capability may be used to practice the invention without departing from the spirit and scope of the present invention. Computer 3801 has an initiated project 3803 displayed on a computer display screen. Project 3803 is an image-based project containing photos uploaded to or otherwise provided to or accessed by the system for insertion into project embedded photo slots for displaying the photos on a canvas style layout that is template-based and associated with a project theme.

The user operating computing appliance 3801 accesses project 3803, at least in this example, by being redirected to a runtime server (RS) 3806 adapted to host the graphics user interface (GUI), online editing tools, and other services to registered users. RS 3806 includes at least one processor, a data repository, and a non-transitory physical medium. RS 3806 has connection to a data repository 3808 containing project data and graphics including photos for all of the projects currently initiated and existing on the system. RS 3608 has connection to a data repository 3809 containing theme-based templates created and many times reused in projects by customer of the service.

RS 3806 has software (SW) 3807 running from the non-transitory medium on the server. SW 3807 is adapted, in one embodiment, to create digital tags that specify certain stylistic effects and photo-enhancing effects that can be applied automatically by default or automatically and dynamically to photos inserted into a theme-based template in the background and transparently to the user. In one embodiment, SW 3807 includes a data parsing component that is able to compile and read all of the data in a project including metadata associated with contributed photos.

When a user, such as one operating appliance 3801 selects a template for a project that is not tagged for stylistic and photo-enhancing effects, SW 3807 may, with the aid of the parser, determine the theme of the template, for example, a template decorated with assets like stickers and photo slots associated with the theme "family reunion". As the user begins creating the project, the parser may parse titles, captions, and other data contributed to the project by the user and any others who are collaborating with the user or helping with the project. When the user selects a photo for addition to a page, the parser gets the metadata associated with the photo. SW 3807 uses the data to generate a style/effect indicator or tag that can be used to tag all of the pages and or individual photo slots in the project template. In this case, the style effect indicators are digital tags that specify a list of photo-enhancement effects and special stylistic effects that may be applied to each photo used in the project.

Style/effect indicators may be stored after creation in data repository 3810 for reuse in other templates. In one embodiment, SW 3807 tags pages and or photo slots in theme-based templates based only on the original data available in the template and any data subsequently provided by a user using the template as a basis for a project. This may be accomplished automatically and dynamically by analyzing the parsed data against a set of rules that point to pre-written sets of effects to apply. Photo-enhancement effects are those effects that might be applied to improve the way the photo looks such as brightness, contrast, hue, color saturation, etc. Stylistic effects include such special photo masking effects like sepia, antique, embossing, smoothing, mosaic, Gaussian, tile, and many other special effects.

A tag will specify one or more photo-enhancement effects, perhaps by default and whether or not they are necessary like removing red eye and adjusting brightness and contrast. The tag may specify the required effects but not the level of application of those effects. Image algorithms may be provided and utilized by SW 3807 to apply the photo-enhancing effects at the dynamically determined levels for each photo inserted into a project. A tag will, in some cases, specify certain special stylistic effects akin to those effects describe above. Such stylistic effects may be pre-written effects that are applied automatically and by default to a photo if the photo slot or template page is tagged with stylistic indicators containing one or more identifications of the effects. While the list of effects for a tag may be static, the level of application of those effects may be dynamically determined using image algorithms that operate against a set of rules. Typically, the stylistic effects may be applied after the photo-enhancing effects are applied so that the image algorithm has the updated photo data to use as input for setting the level of any stylistic effects applied. Once a theme-based template is tagged for certain stylistic indicators for each photo, it may be saved as a theme-based and tagged template in repository 3809 for reuse by customers.

Network 3800 includes a statistics server 3811. Server 3811 includes at least one processor, data repository, and a non-transitory physical medium. Server 3811 hosts software running from the non-transitory physical medium of the server, the software adapted as a usage monitor 3812. Usage monitor 3812, in one embodiment, is specifically adapted to monitor customer usage of tagged project templates. Usage monitor 3812 stores usage data in data repository 3813 containing template usage statistics. In one embodiment, SW 3807 accesses template usage statistics from server 3812 to aid in determining what types of stylistic indicators or tags might be best for dynamic application to photos inserted in a similar theme-based template used as the basis for a project.

The system is self learning and may refine sets of effects specified in tags based on usage. For example, if users seem to prefer one theme-based template over others based on the effects generated for the photos, those effects may be recommended when a new template based on the same or very similar theme is tagged. In one embodiment, the system relies both on data gleaned from a user selecting a theme-based template and usage data relative to similar theme-based templates tagged in the past to determine which stylistic indicators to use.

In one embodiment, a user may preview the automated settings for the photo effects on any tagged template and modify or tweak those settings, including adding and deleting or activating and deactivating certain effects. When the template is saved, it is a new tagged template. If the tag has been changed, it may also be saved as a new stylistic indicator associated with a certain theme of the template. Such indicators may be reused in other templates provided that they become popular with users. Indicators that exhibit rejection by users may be purged from the system.

In one embodiment, a single template may have more than one theme such as first a wedding theme and then a reception theme. Likewise, there may be a tag specifying a set of effects for all photos in the weeding portion of the project followed by a tag specifying a different set of photo effects for the reception portion of the project. There are many different possibilities. If a user selects a template and does not like the automated default photo effects, the user may select another template or, in some embodiments, change or modify the effects on one photo manually and then save the changes to the remaining tags in the template.

It is noted herein that the stylistic indicators may vary from page to page in a template or from photo to photo in a template without departing from the spirit and scope of the present invention. For example, if a customer is working on a project that uses a template with the theme "personal tribute" or "life and times" relative to a person, a page dedicated to the early life of the person may have a stylistic indictor of gray scale or black and white for photos of the person on that page while a page dedicated to the most recent life of the person may have a stylistic indicator that specifies a rich color saturation of the photos on that page.

In one use case scenario, assume a user decides to work on a vacation book to a tropical island. The template theme might be "Vacation" and the theme category might be "Tropical Island". The stylistic indicator tag for the template pages or photo slots might specify among other effects, a specific mask or filter that gives the impression of older pictures with cracked or worn edges. The tags can be partly relative to theme and partly relative to theme category so a user who selects a theme-based template may have different tags than another template of the same theme if the theme categories are different. For example, a template titled "Vacation" with the category "Tropical Island" may have different stylistic indicators that the same template with the category "Himalayas". Moreover there may be many different categories for a single broader theme such as "Vacation" then categories including every country. The stylistic indicators may include stylistic effects that reflect the country the user vacationed in.

Dynamic Application of Font Style and Size Effects

Figure 39:
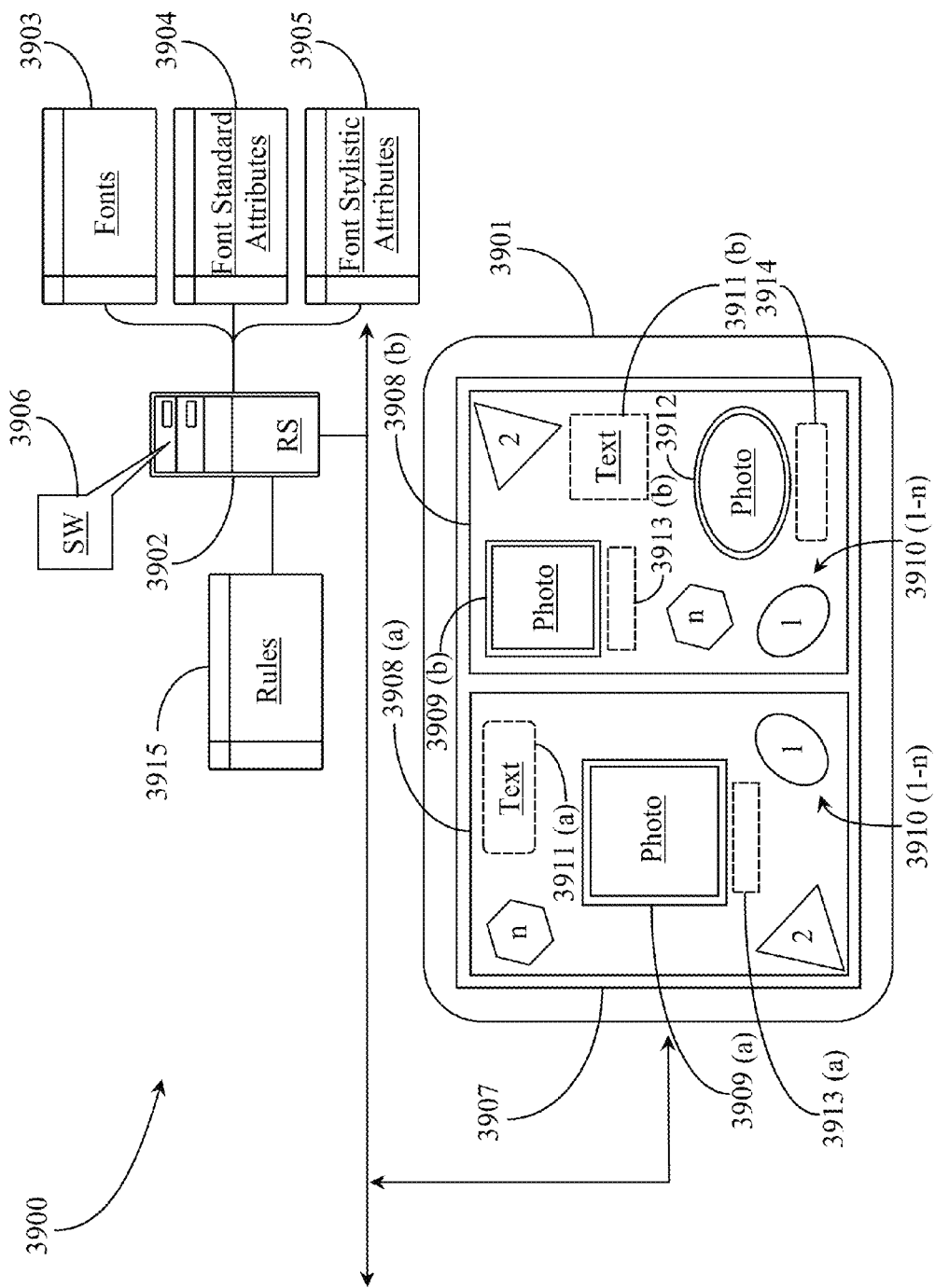
FIG. 39 is a block diagram depicting a fulfillment network supporting automated font style and size application during remixing of a page layout.

FIG. 39 is a block diagram depicting a fulfillment network 3900 supporting automated font style and size application during remixing of a page layout. Network 3900 may be the Internet network in one embodiment. Network 3900 is accessed by a user operating a mobile computing appliance 3901, such as a smart phone or android device. Appliance 3901 has a display screen 3907 depicting a page layout 3908 (a) and a remix preview page 3908 (b).

Appliance 3901 is assumed logged into the service and having connection to runtime server (RS) 3902. RS 3902 includes at least one processor, a data repository, and a non-transitory physical medium. RS 3902 hosts SW 3906 running from the non-transitory medium. SW 3906 may be integrated with other SW applications hosted on RS 3902 that are critical to the users' experience in creating and editing an image and text-based project represented by pages 3908 (a) and preview page 3908 (b). When a user remixes a page, SW 3906 records the position and other specific size and style attributes of font associated with, text boxes, text inserts, and photo captions as displayed before a page like 3908 (a) is remixed.

RS 3902 has connection to a data repository 3903 containing all of the available fonts that can be used in creating an image and text-based project. RS 3902 has connection to a data repository 3904 containing all of the standard attributes of the available fonts in repository 3903. Standard attributes include size, referred to as "point" attributes, font colors, and font presentation styles, for example, italics, bold, cursive, etc. RS 3902 has connection to a data repository 3905 containing font stylistic attributes like drop and other shadow effects, fill effects, inset, three dimensional effects, and any other special stylistic attributes that can be attributed to fonts for printing.

When a page layout of content is remixed, often the content must be rearranged and resized to fit into a new layout that may include some content and possible different core aspect dimensioning that that of the original page. In this example, page 3908 (b) is a remix page preview that may be shown to the user before the user commits to finality of the remix action. It is important that items caught up in the mix like photos, text boxes, stickers, and other content be orientated and associated correctly on the remixed page, which may also include content if desired by a user. For example, a page with one photo may be remixed to a page that contains more than one photo, etc.

In this example, page 3908 (a) includes a photo 3909 (a) that is centered on the page layout. Photo 3909 (a) has a caption 3913 (a). Page 3908 (a) also includes a text block or box 3911 (a) containing some description. Page 3908 (a) further includes stickers 3910 (1-n) arranged about the centralized photo. The user operating appliance 3901 has ordered a page remix where the user desires the addition of a photo and associated caption. In this example, the new layout is at the same core aspect ration as the original layout. However, in some cases the remixed page will be remixed according to a different core aspect ratio.

SW 3906 is integrated with SW for remixing a page and handles any changes to font that might be made to optimize the font presentation in the remixed page. SW 3906 records all of the positions of items on the page before remixing and all of the current font attributes of all of the font on original page layout 3908 (a). In preview page 3909 (b), original photo 3909 (a) is resized to a smaller size and moved from center to left upper corner of page layout 3909 (b), in part to accommodate addition of a new photo 3912 and associated caption 3914. Caption 3913 (b) represents caption 3913 (a) modified by SW 3906 at least in size and position to accommodate photo 3909 (b) in a new size and position on the remixed version of the original page layout. Photo 3912 and caption 3914 are added during the remix operation. SW 3906 controls the size, position and presentation of caption 3914. SW 3906 has knowledge of the initial remixed position of any item associated with font like captions associated with photos, for example.

Text block or box 3911 (*a*) is modified in position and size boundary and rendered as text box 3911 (*b*) on remix preview page 3908. In other changes, sticker items 3910 are not modified in terms of size, but are modified relative to original positions on the remixed page 3908 (*b*). In addition to modifying text box sizes, such as text box 3911 (*a*) (original) to 3911 (*b*) (size boundary modified), the font within the text block or box may be automatically resized to work better with the new boundary size. In original page 3908 (*a*), there are two font locations, text box 3911 (*a*) and caption 3913 (*a*). SW 3906, in general, looks at the current fonts and analyzes how current text boxes, captions, etc. currently fit around the other content on the page before remix. In some cases, the SW makes certain font sizes smaller or larger to accommodate other elements on the canvas. In other cases, the SW adjusts the font's colors, inset, drop shadow, or any other stylistic elements available to the fonts.

If the font styles for the font in text box 3911 (*a*) and in caption 3913 (*a*) are different in the original page, SW 3906 may unify the font styles for both the font in the text box and font in the caption to the same font style for presentation on page 3911 (*b*). SW 3906 looks at the current font styles on the page before remix and can then determine a primary font style to use across the whole page. In this way, SW 3906 also controls the font attributes and presentation of the font in new caption 3914 to be consistent with the other fonts on the preview page to achieve uniformity.

The automated remixing and changes to existing font relieve the user of much added work in manually changing font sizes and styles. During remixing, the system or the user may add or withhold items from or ad additional items to a preview page depending on necessity and a goal of consistency throughout many possible pages in a project. Uniformity is often a good paradigm in design and aids in more cohesive page layouts.

Layer Management Across Multiple Pages

One of the aspects of building and remixing canvas pages of a project is layering where a user creates two or more layers, each layer capable of accepting items for display (see FIG. 10). For example, when one item overlaps another item, there are two layers involved, one holding the top item and another holding the underlying item. One nomenclature for determining the proper layer of an object or item is a Z-index. For instance, if the user dragged a photo spanning two pages, to a single page, then back to two pages, the z-index of the photo relative to other items may not be its original z-index.

Figure 40:
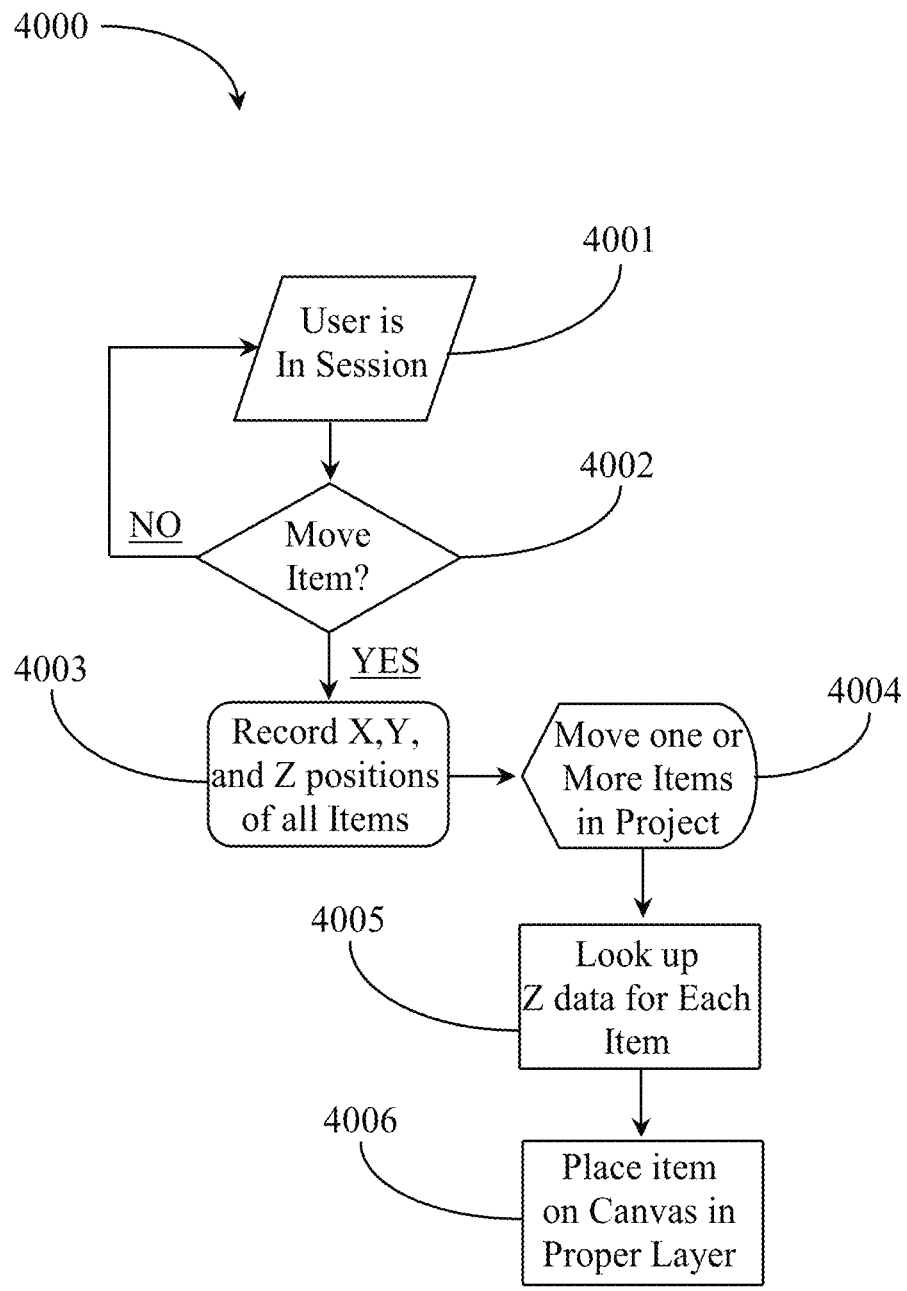
FIG. 40 is a process flow chart depicting steps for preserving layer depth for an item moved between pages in a layout.

FIG. 40 is a process flow chart 4000 depicting steps for preserving layer depth for an item moved between pages in a layout. At step 4001, the user is assumed in session with the server through a graphics user interface (GUI). In this step, the user is actively working on a project such as a photo book, for example. At step 4002, the user may decide whether to move one or more items like photos from one page to another page. If the user decides not to move an item at step 4002, the process resolves back to step 4001. If at step 4002, the user decides to move an item or more than one item, the system records the original positions including the Z position that indicates which layer of two or more layers the item or items to be moved is occupying.

At step 4004, the user moves one or more items within the project to new locations. At step 4005, the system looks up the Z data for each item moved. At step 4006, the system places the items in their new positions on the proper layers. In one embodiment, the user may reverse the decision by command or edit button and the system will replace the items to their original positions. In this way the system always remembers the positions of items including depth in layers. The system preserves the original depth (Layer) of an item by default. However, a user may change the layer of the item by interacting with the item such as by right clicking on the item to change layers.

In one embodiment, the items include photos, text boxes, captions, and stickers. In one embodiment, z-index positioning of an item is preserved during automated remixing of a page resulting in moved items. In one embodiment, the snapshot is taken periodically during interaction with a project page layout.

In this embodiment, the system, aided by software functions to take a snapshot of each item in a group of items arranged on a multi-layer canvas comprising at least one page. Then the system looks up the positional data, including depth, associated with the snapshot data of any of the group of items that will be moved and that were included in the snapshot resulting from execution of the previous function. Finally, the system preserves the original depth position (layer) of any of the items included in the snapshot upon movement of the item or items between pages or from a two page span to a single page.

PDF File Generation Using Vectors and Raster Data

Referring now to FIG. 30, the system employs a print engine like print engine 3007 to prepare print orders, typically in a PDF format for distribution to a networked printer such as a third party printer 3003. Printing engine 3007 is a flash based print engine that is enhanced to produce high resolution output files to print.

Referring now to FIG. 31, the process for printing involves steps for detecting when a page is too large for snapshot resulting in a limit error on the print engine process. The print engine splits the page into smaller tiles and relies on a stitching component to reconstruct the page for printing.

In another embodiment, the system using a print engine like engine 3007 creates output files containing both rasterized data and raw un-rasterized vector data for a printer like printer 3003. The system has access to multiple disparate print vendors. These print vendors all accept PDF file formats for printing, however many print vendors differ in how the content is interpreted and translated into actual instruction for the printer. Therefore, the PDFs are rasterized to make them easily interpretable to those print machines, more specifically by the machines raster image processor (RIP). However, compressing raster images using a Joint Photographic Experts Group (JPEG) compression algorithm or a JPEG 2000 compressor can reduce image quality.

By contrast, if a lossless compression algorithm is used such as Portable Network Graphics (PNG), then the file sizes for the final PDF for printing can be very large for certain assets. To illustrate, for a 100-page book that is 12"×12", each page would be 3600×3600 pixels. Calculating approximately 30 megabytes (mb) for each of these pages, the total size for the PDF is ~3 GB which is very large and will take printers extra time to download and procure these orders. Moreover, compressing images with fonts in them even the slightest bit can leave a lot of undesirable artifacts which will be noticeable in print.

Figure 41:
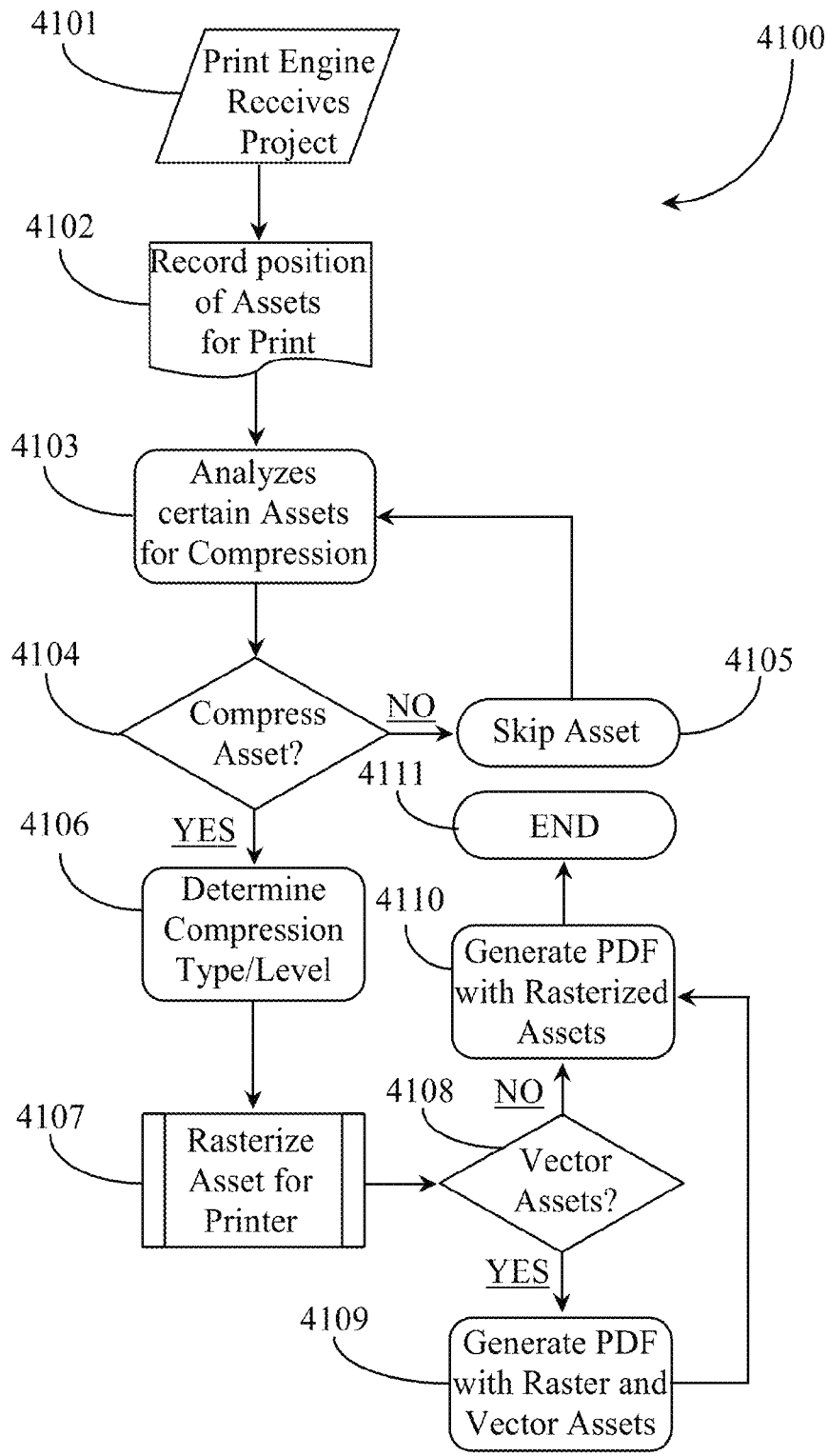
FIG. 41 is a process flow chart depicting steps for preparing graphic and text assets in a project for printing.

FIG. 41 is a process flow chart 4100 depicting steps for preparing graphic and text assets in a project for printing. Process 4100 represents a combination different compression techniques applied to selected assets coupled with other printable assets represented in their native vector format to reduce file size while preserving image quality. It is assumed for purposes of discussion that a user has initiated and created an image and or text-based project with graphics, and has transacted with the system to procure a printed version of the project.

At step 4101, the print engine that is responsible for preparing the project for printing receives a project for staging. A project may have a background image or layer with photos, stickers, text boxes, and captions. Assets may include images with or without text embedded in them. Moreover, printable assets may occupy layers such that some assets overlay other assets on the canvas of the project.

At step 4102, the print engine analyzes the project and records the positions of all of the printable assets including X, Y positioning and Z-index or layer position. At step 4103, the print engine selects certain assets or groups of assets and analyzes each asset to determine if the asset should be compressed. For example, the software provided to determine this may look at digital file size and other factors of the asset, such as whether there is text embedded in the asset to determine whether the asset is suitable for some type of compression (lossless or lossy) and level or tier of such compression. If at step 4104, it is determined that an asset should not be compressed, the system skips the asset and the process resolves to analyze a next asset at step 4103.

If at step 4104, the system determines that an asset should be compressed, the system determines compression type and compression level under that type for the selected asset at step 4106. For example, if an image is large in file size and contains text, the system might determine that a light lossy compression using JPEG, or JPEG 2000 might suffice to reduce the file size, retain the image quality, and reduce artifact and possible undesired artifacts in print. An asset may be a sticker with much smaller file size and resolution than a corresponding high-resolution image. The system might determine a lossless compression type may suffice such as portable network graphics (PNG) compression. Likewise, another asset type may be a text asset or an asset that is predominately text based. Such as asset is already thin compared to file size and therefore may not be compressed at all but rather left in vector format if need be.

The system may rasterize each compressed asset for the raster image processor of the printer at step 4107. The system aided by software may then determine at step 4108, if there were any vector assets that were skipped at step 4105. If there were no vector assets in the project, the system generates a PDF with rasterized assets at step 4110. These assets may include several different file types in addition to JPEG and PNG. However, it is important that the file types are compatible with the printer processes of multiple different print vendors. It is also important that the resulting overall project size is small enough that any of the multiple print vendors can handle printing the project without undesired delays or bottlenecks in printing while preserving a minimum print quality for the assets in the projects printed. After generating the rasterized PDF file for print, the process ends at step 4111.

If the system determines that there were vector assets that were skipped at step 4105, the system generates a PDF with both rasterized and compressed assets and vector assets. The process then ends at step 4111. The final PDFs are likely to contain two or more layers and vectors. In a simplified use case, consider a project page having a background, a text box and a sticker overlaid over the text box. The file reconstruction might be a JEPG background, followed by vectorized text, followed by a PNG representing the sticker. There are many combinations possible.

Project Data Storage Optimizations

Referring now to FIG. 25, design templates that become canvas layouts are created in markup language from a designer tool (2502) having access to the language known to the inventor as MBML. Fields in the structure of the template are auto populated when a project is initiated by data previously entered in a project wizard (2504) presented to clients through the project interface (GUI).

The current structure used for storing projects couples the view with the content. For example, currently, a page photo item entails both the positioning data of where the item is located on the canvas as well as the actual content (the photo). A limitation in that approach works against scalability due to redundancies in replication of data and speed of access to actual content delivered to the project when it is executed for display and editing.

Figure 42:
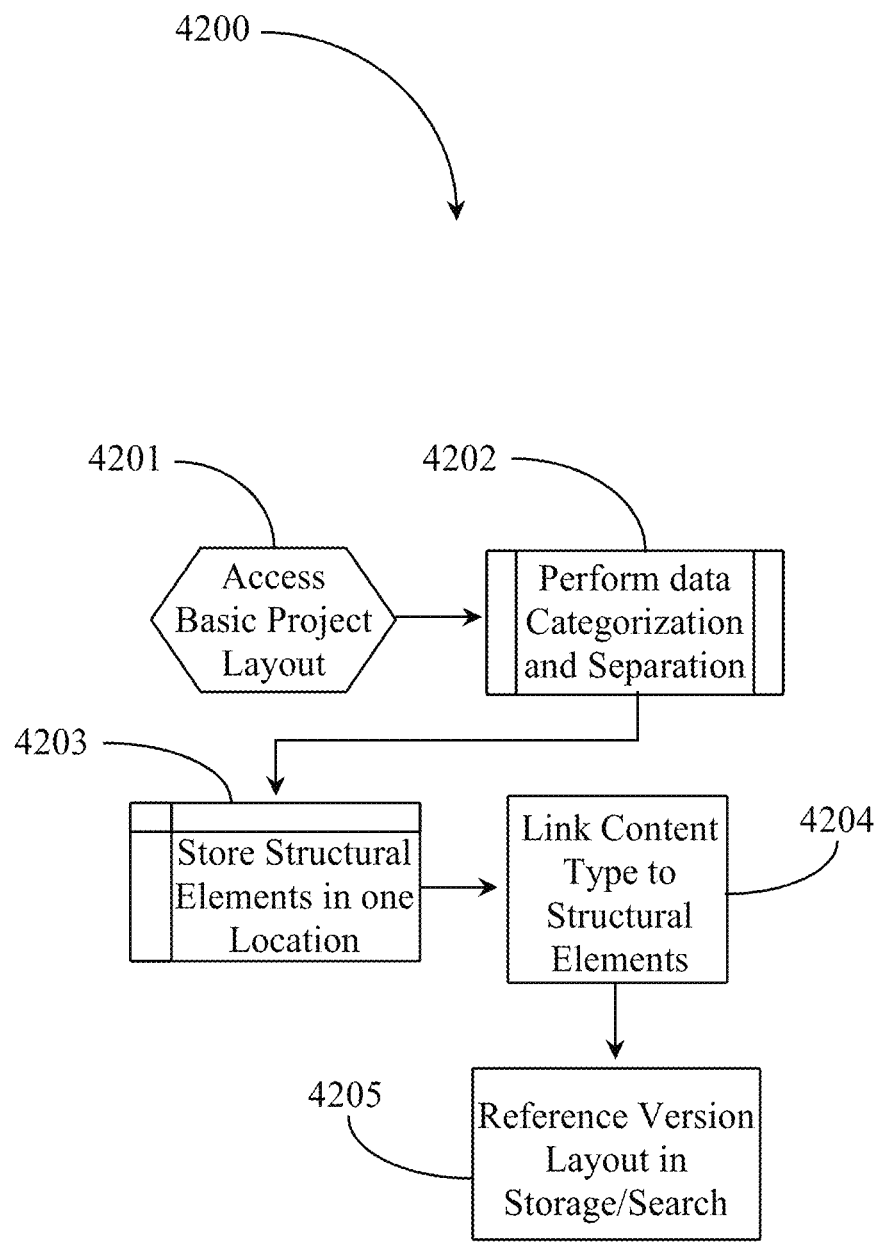
FIG. 42 is a process flow chart depicting steps for optimizing storage space and data reproduction performance relative to an image or text-based layout with content.

FIG. 42 is a process flow chart 4200 depicting steps for optimizing storage space and data reproduction performance relative to an image or text-based layout with content. At step 4202, a designer accesses a basic project layout (template). There may be several different types of basic layouts, for example, one layout for each different project type available. A basic layout for a 12"×12" photo book will be substantially different than a layout for a 4"×6" invitation card. All of the basic templates may be stored for designer access.

At step 42, the designer aided by software performs data categorization and separation for all of the actual structural data making up the layout and content data that would be displayed within the layout and provided by a client and by the system on behalf of the client (auto populated content). Structural data refers to data making up the template including static photo slots, title bars, content anchors, some static text boxes, some static caption bars, and any other mostly static data structures. In this step, there may be one or more degrees of separation relative to the structural data. A single degree might be simply to isolate all structural data and separate it from being stored with content data. Another degree of separation might be a separation of structural data according to always static structural data and sometimes dynamic structural data.

At step 4203, the designer stores the structural data elements in one location for centralized access. At step 4204, the designer aided by software links content type to appropriate data structures from the layout. For example, certain content types are linked to the books front cover, front inside cover, spine, back cover, inside back cover, and to a layout page. Cont type may include user-supplied content and system supplied content. For example, a basic layout before first use contains only structural data and has no content. Assigning a theme to a template adds content to the template in the form of text, background elements and graphics such as stickers. Data added to the template fields by default is content that is originally supplied by the user, but retained by the system for reuse. Dynamic content are data provided dynamically by the user like new photos or other graphics, new structural elements inserted into the canvas such as an added photo slot, or new text entered into existing text fields either manually or through system innovation such as automatically adding captions to photos from photo metadata.

At step 4205, the designer references the version of the original layout in storage and in search engines provided to locate templates and layouts. It is noted herein that an original layout may host multiple different themes without any structural changes or modifications to the template. By separating the layout from the content, new layouts might be created only when the presentation of the content changes or structural elements are added. For example, if a user moves an item on the page, then the structural layout of the page is modified. Thus a new layout may be created and saved to represent this change. However, if a user simply pans a photo in a photo slot or swaps a photo for another photo, this could be categorized as a change in only the content-layer of the page. Thus, the same structural layout data can be used for all projects where the structure of the layout was not modified.

Figure 43:
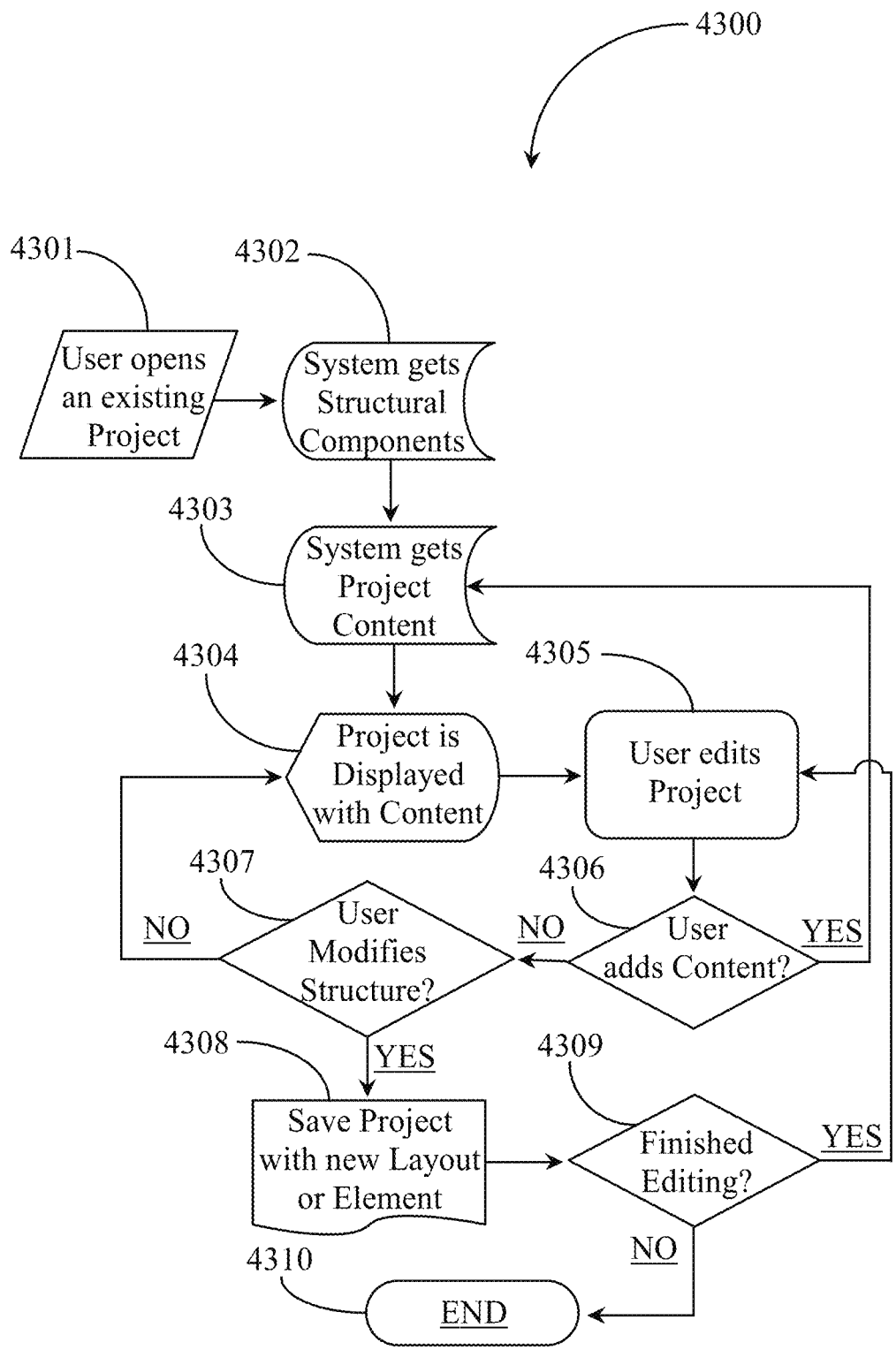
FIG. 43 is a project flow chart depicting steps for optimizing performance in content delivery using a template with different data layers.

FIG. 43 is a project flow chart 4300 depicting steps for optimizing performance in content delivery using a template with different data layers. At step 4301, a user opens an existing project such as a photo book, for example. At step 4302, the system aided by software gets the structural components of the layout from a data source dedicated to storing such components. It is assumed in this example that the project executed at step 4301 has structural components that are separated in data storage from content following at least one degree of separation (structure vs. content). It is noted however that more degrees of component separation can be observed such as classifying certain structural components in more than one class such as static components (those that cannot be changed), and dynamic structural components (those that can be modified by a user).

At step 4303, the system gets the project content to present in display in the project. Content may be stored in multiple different locations that are accessible to the system over the network. Some photos representing project content, for example, may be accessed from centralized content storage while others may be accessed from other sites dynamically and displayed in the project without necessitating system control over the content. At step 4304, the project is displayed in the user's interface with all of the current content for editing.

At step 4305, the user edits the project. A user may edit a project by deleting or adding content, moving content such as by remixing a page and in some cases adding, deleting, or modifying structural components in the layout. At step 4306, the system determines if during editing the user adds content. If the user ads or replaces existing content, the process resolves back to step 4303 where the system gets the new project content and displays the content for the user at step 4304. At this point with no structural modifications, the new project display includes pointers to all of the same structural components. The new content is added dynamically within the content layer separated from the structure of the layout. The system may process content that is supported by structural components like sizing photos to fit photo slots and the like.

If the user does not modify or add new content at step 4306, the system determines if the user has made any changes or modifications to one or more structural components of the project layout. At step 4307, if the user has made no changes to the underlying structure of the layout, then the process resolves back to step 4303 and the project is displayed with the content at step 4304. The process may loop through the editing, content acquisition and display steps. If the user does not modify structure within the structural layer of the layout, then the same structural components are continually accessed from a single source.

If the user has modified a structural component at step 4307, the system may save the project with a new layout customized for the user by the fact that one or more structural components in the original layout were changed. The new layout is stored for that user separately from the original layout. The next time the user executes the project, the system points to the newly saved layout and does not reuse any of the original components. In another embodiment where structural components are separated from one another by class, versions of these components might be created. When the user executes the project at next opportunity, the system will still get all the original components that have not changed (version 0) and it will access any modified components having a new version number (version 1). In one embodiment, the new components that were modified are written to storage in the form of a new addressed data source mapped to or indexed to the parent data source reflecting either content data changes to the image-based layout, structural data changes to the image-based layout, or both.

In one embodiment, all templates have a set of basic components that are static components (read only) and may not be deleted or modified. In this regard, all users having projects that depend on the same original template are pointed to the basic original layout (structural components only) to these components need not be duplicated in storage. Custom structural components like added photo slots, modified text boxes, etc. may be written to storage separately from the original layout and versioned so the system may access the same components for the user's evolving projects.

In some cases, users may create a new component that can now be reused by other users making identical modification requests. The system is able to determine the exact nature of the modification of one or more structural components of a layout by a user and can perform a lookup to see if there are any components stored for reuse that match exactly or even closely to the modification made by the user. In preview mode, the system may aggregate data and display one or more suggested components that were modified by other users and saved for reuse based on any particular user request. If the user accepts a previously modified component then that component is used and the version is saved for that user pointing the system to the new resource the next time the user executes the project using the same component.

In one embodiment, data separation in a layout to separate structure from content to a first degree may be accomplished using a markup language such as MBML described further above and content presentation markup language similar in some respects to cascading style sheet (CSS) script used to separate content from structure in hypertext markup language (HTML).

Enhancing Color options for Content

Referring now back to FIG. 10, the system provides a color reading module or color analyzing tool 1008 for users to read the colors of assets displayed in their projects. This tool may also be used to apply a color to an asset, save a color, and blend colors to create new colors. Certain assets provided to a layout as colored assets like photos, stickers, and the like may have very different color attributes like color saturation, color range, etc. One goal of the present invention is to enhance the overall experience of editing colors in assets individually and in groups.

Figure 44:
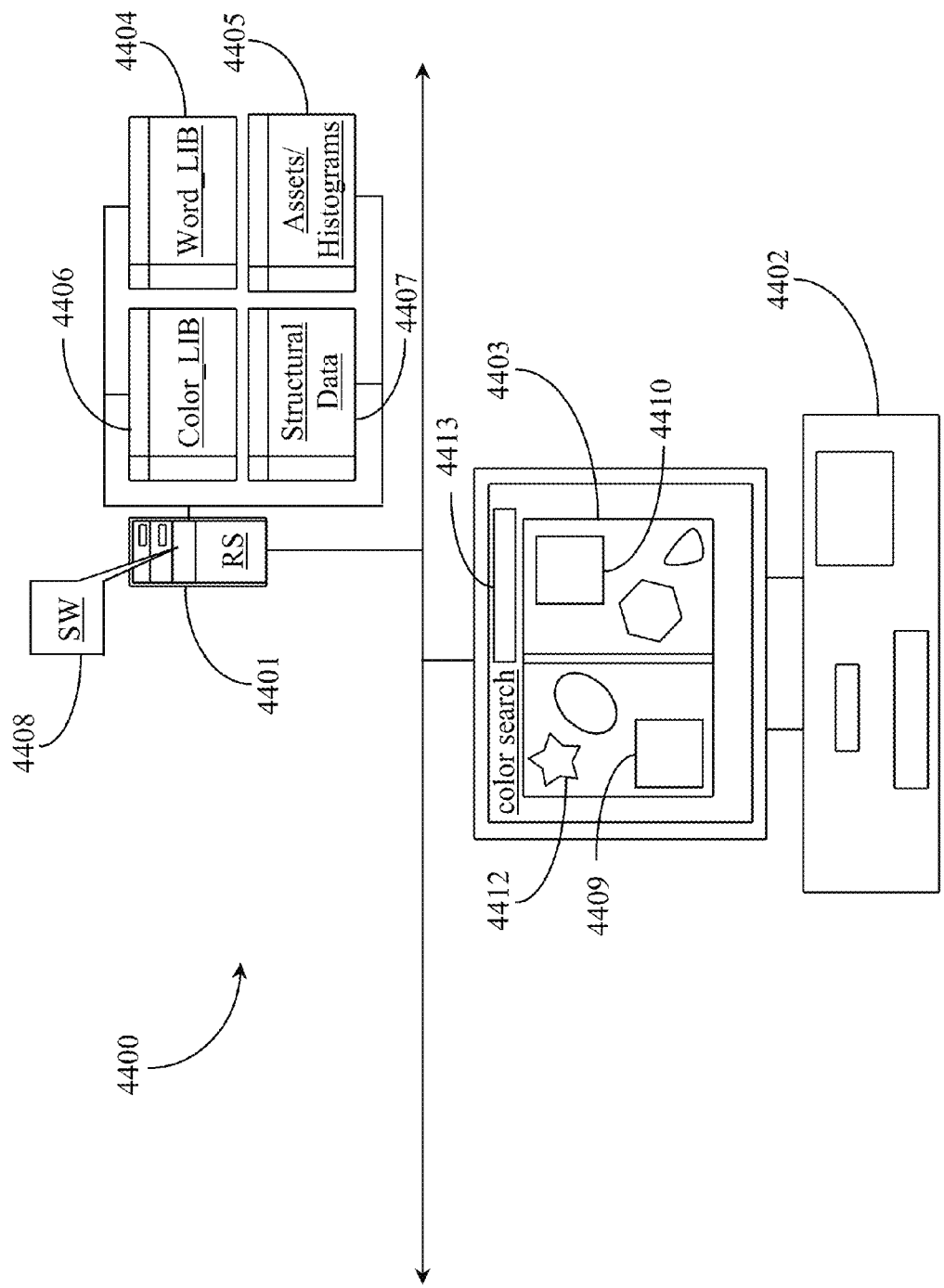
FIG. 44 is an architectural overview of a network supporting enhanced color options for displayed content.

FIG. 44 is an architectural overview of a network 4400 supporting enhanced color options for displayed content. Network 4400, is the Internet network in this example. However, network 4400 may be a corporate wide-area-network (WAN), local area network (LAN), or the Internet and any connected sub-networks. Network 4400 supports a runtime server (RS) 4401. RS 4401 includes at least one processor and a data repository, the server including a non-transitory physical medium. Server 4400 hosts software (SW) 4408. SW 4408 includes all of the components required to enable active editing of image and or text-based projects. SW 4408 also includes components for enhancing color options for both the system and user, including provision of search functionality for matching colors and contributing new colors to a project asset.

Server 4401 has connection to a repository 4407 adapted to contain all of the structural data relative to users' existing projects including template data. Server 4400 has connection to a repository 4405. Repository 4405 is adapted to contain all of the existing assets for display in users' projects. Assets include photos, stickers, text, theme components, and the like. RS 4401 has connection to a repository 4404 and to a repository 4406. Repository 4404 is adapted to contain a library of words, which may correlate to certain colors. Repository 44065 is adapted to contain a library of numerous colors. Separate physical structures for the repositories are meant only for discussion purposes in separating function. In one embodiment, all of the data classes might be stored in a same data location. Moreover, such data may be stored and served from a data cloud or a content delivery network (CDN).

Network 4400 supports a client depicted herein as a desktop computing appliance 4402. Appliance 4402 will hereinafter be referred to in this specification as computer 4402. Computer 4402 is presumably operated by a user and has, in a state of display, a current project 4403 the user is in the process of building and or editing. Therefore it is assumed herein the user operating computer 4402 has connection to RS 4401 over network 4400. Project 4403 may be a photo book and contains several assets that are typically rendered in color (unless black and white) on the display. In this example, the assets include a photo 4409, a photo 4410, and stickers such as sticker 4412. Project 4403 may also include background assets, text boxes, caption boxes and so on.

SW 4408 performs, among other tasks, color analysis of assets relative to projects stored on the system. In a preferred embodiment the function analyzes color in at least three dimensional values to determine all of the colors of an asset presented in image-based project 4403. SW 4408 creates a histogram for each asset analyzed based on the findings of the color analyzer component. SW 4408 may augment the histogram by adding new color contributions to the histogram enabling enhanced color control options for the asset. Color contributions may be added by users or by the system without departing from the spirit and scope of the present invention. Once a histogram is created for an asset, each time the asset is stored the histogram is also stored with that asset.

In one embodiment, the color analyzing component of SW 4408 utilizes a 120 color scheme from high performance photo gallery (HPPG) color_palette.txt. In another embodiment, the analyzer relies on name module and color_hex_names.yml (140 colors from w3 supported color list). In a preferred embodiment, SW 4408 enables a color search covering hue saturation and luminance (HSL) using histogram-based indexing to look up relevant data. In a preferred embodiment, the system uses "color distances" in Commission Internationale de l'Eclairage (CIE) lab or (CIELAB) as known to the inventor to calculate the relevancies of colors.

For example, to round a color, say a color C, the SW takes the color C and compares it to each of the colors in the color scheme or palette. The closest color via cie00 distance is the top color returned for the C round. Neighboring colors are those that are closest to one another, having a relatively small cie00 distance. Names of colors like red or light blue, for example, are stored on disk in color_hex_names.yml. Colors may also be matched to words, in one embodiment, and word can be assigned or tagged to colors.

In one embodiment, a process is provided for checking if a word (W) is a valid color in the system. ColorAnalyzer:: Name extends CacheContentstore::Memcache and is a hash of ["color_name"=>color_hex], for instance W is submitted into a search function find_by_name in the system to determine whether the word is a valid color or not. If W is valid, a hex is returned. If W is invalid, nil is returned. The hexcode of a color is the hexadecimal representation of the colors red green blue (RGB) values. In the process, relevance of one color to a colored asset is a float between 0.0 and 1.0. The float value represents the proportion of which the asset, like an image for example, is comprised of a given color. A float value of 1.0 means the asset is all that color. A float value of 0.5 means the color comprises 50 percent of the asset color. A float value of 0.0 means the color is not found in the asset.

The histogram generated for each asset is a hash of [color_hex=>than relevance] for that asset and represents the distribution of colors in the asset. In one embodiment, the system is able to facilitate blending of colors. In this embodiment, SW 4408 leverages a fast (open sourced) word search platform called SOLR pronounced soh-lar created by Apache™. For example, if an asset like an image A is 75 percent "red", the query may ask for "dark red", "light red", or even "orange". Though these colors do not match red, it is desired that they are returned in the search results, albeit with a lower score that "red".

SW 4408 gets the histogram for "red" and sees that {"red"=>0.75. The SW then reads all the other colors in the histogram. For each color found in the histogram, the SW calculates all the neighboring colors and their respective CIELAB from the target color "red". Orange is 5 away from red while light red is 2 away. Therefore outputs for red-similar colors [["red", 0], ["lightred", 2], ["orange", 5]]. Each of these data are included in with the relevance of the original histogram, for example, [lightred", 2, 0, 0.75]. Therefore each of the entries represents an added color to the new "blended" histogram. A generalized formula, contribution=original relevance/distance. For example, a combination of "lightred"=0.75/2.0. SW 4408 adds up the contributions in a hash to generate the new blended histogram. It is noted herein that a blended_histogram may have values (blended/relevancies) exceeding 1.0.

In one embodiment, the system uses a library, analogous to word_lib 4404, of thesaurus terms broken up by nouns and verbs. These words are used to expand queries to return additional color results for users. The preferred format for the search platform is java script object notation (JSON), however, other formats or languages may be used instead of JSON without departing from the spirit and scope of the present invention. An example entry might look like <pre> {"yelp":{"verb":"squeal", "shriek", "howl", "yowl", "yell", "cry", "shout", "bark", "bay", "woof", "holler"}}</pre>. These terms occupy one line or string in the data file.

Parts of speech that might provide utility include nouns, verbs, adjectives, prepositions, adverbs, exclamations, pronouns, conjunctions, in plural and cardinal forms. The values corresponding to each keyword or part of speech comprise nested arrays. The values returned may also be augmented using a multiplier in the original string of words. For example, <pre> {"words":{"part_of_speech:" related word 1", "related word2": 0.5", "related word3:1.5"} </pre>. In this example, related word 2 has a multiplier of 0.05, therefore it will have half of the relevancy of a normal related word. Related word 3 is multiplied by 1.5 so its relevance will be increased by a factor of 50 percent. Words that are not multiplied have a 1.0 relevancy by default. In this way, relevancies of related words may be adjusted from the baseline enabling tweaking of the system for very popular search terms.

SOLR and Sunspot, a component that enables searching through SOLR, are both leveraged in one embodiment of the present invention. SOLR uses an index data structure for search functionality. A represented asset in the index is termed a document and is associated or stored with its own blended or original histogram. SOLR runs searches against the terms as described above. Example terms might include color names and other words (nouns or verbs) like "red", "dog", "blue", and or "car". SOLR scores each document using a formula involving the summation of a document's term_scores. At the end, the results are ranked by highest score with scores of zero being omitted from result set.

A term_score is the contribution to a documents (asset) score from the match of a given term in the document. Payloads are custom fields within the index which can vary from document to document. They allow for a specific document to augment the score for a specific term match, which may not happen for other documents matching the same term. A payload entry comprises three elements; the term itself, a separator, and the payload value, for example "red"/1.0. Payloads are used in browse_assets to supply a relevance value for a given color in an image so it can be scored later on. A sunspot query is a user-supplied string that sunspot formats then hands off to SOLR.

The system of the invention leverages a couple of other SW tools, namely ImageMagick and swrender which as off the shelf tools known to the inventor. For an asset such as a raw image, the system aided by SW 4408 generates a histogram by detecting the file extension of the asset, for example.swf. The preferred format for an asset is .png. Therefore, the asset is converted to .png using swrender. A temporary file is created from the .png asset for working with the asset without directly affecting the original asset. The alpha channel of the asset is removed (opacity layer) using ImageMagick and color reduction is performed to reduce the colors in the asset down to 50 colors.

Each of the 50 colors are "rounded" as described further above to the closest respective colors in the system color scheme that includes at least 120 colors. Rounding produces a hash of the color and pixel count of the asset. The hashes for each color are normalized to turn the pixel counts into percentages of color for the entire asset. All colored assets in the database have a histogram including a color list expressed as color_list in code. For each key value (Kv) in the stored histogram for an asset a tag is created in the color list. The tag value can be expressed as tag.value=color, tag.relevance=normalized_proportion_of_color_in_image.

Blending relevance refers to both color and term tags. The contribution of related "colors" or "terms/words" for a particular asset is calculated. The blended relevancies are calculated during index-time for SOLR, into a "payload" field. The contribution score consist of contribution=t.relevance/distance where t is tag terms or tag colors. For colors, a histogram is used to derive the relevancies for the assets and distance. In the case of terms, the particular order in which related words were parsed from a dictionary source determines the "distance" away from the term. Blending is then the sum of all contributions>=0.01, which is the value (or weight in SOLR) for the "payload" field for a given "tag".

The query syntax for a search query uses the special operators OR denoted internally by—and default joining operator AND denoted internally by*. For example, red car=>return documents which match both red and car red OR car=>return either documents which match red or car (higher score if both match since sub scores are added). Red blue car=>returns documents which match red and car and blue red OR blue car=>returns documents which match red and car or blue and car. This is more efficient than running two searches, one for red car and the other for blue car. Red blue OR car=>returns documents which match red and blue or red and car. Fields include attributes like tag count, width, etc. For example, [width:15 height>10 usage_count<2], [color_count.between (10,20) file_ext.any_of (jpg, gif, png) basis_template_ids.al-l_of (1,2,3). Search terms can be boosted in relevancy by multiplier, for example, grass^5.0 car^22.0. Boost terms are set to 1.0 by default. In scoring a document, the formula used is document.score=∑ (matching_term.boost* payload_tags-.payload).

The system of the invention includes several contexts in which tags may be added. The contexts may include styles, categories, colors, and tags. Color tags are predetermined before entering them into the system. Color tags are therefore not edited by users. Styles and categories are also predefined in list form. All other tags or labels will go into the tag context, which is open-ended. In a preferred embodiment, tags may also have relevance to an asset. When adding tags, the relevance of that tag to that asset may optionally be input as well, on a scale, in one embodiment from 1-10. If the relevance is not added, it defaults to 10 in this embodiment. If a tag contains multiple words like "New York", for example, it is stored in the database as "New York". When that tag is indexed, additional tags of "New", "York" are added to "New York" to account for all possible search possibilities.

Assets (HostedImageAsset) in the system may have a lifetime from 0 to searchable. Given the asset data can reside locally or at another network source such as a hypertext transport protocol (http) source, we can reanalyze the color tags (#reanalyze_color_tags) on the assets to get the colors into an indexable state. For example, when an asset is created, the after_create hook is triggered and puts the asset identifier (id) in the analysis_queue and index_queue for the class of the asset. A scheduled rake task then flushes the analysis queue and calls a routine analyze_color_tags! for every tag in the queue. If an error is raised relative to an asset during the process, the asset is put on an error list (analyze_error_list) to be reanalyzed later.

The routine analyze_color_tags! calls the color analyzer component to retrieve a new histogram hash from the asset raw data. In this routine {palette_color is =>relevance} where palette color is 1 of the at least 120 colors, and 0<relevance<1. The histogram generated is then passed to Tagtical or some similar tool to create Tag::AssetColor for each of those colors with the relevance values provided in the hash. All of these tags are saved to the database.

In one embodiment, an administrative interface is provided and adapted to be used to check whether or not a color analysis was acceptable and to enable manual term tagging of assets. In manual term tagging, the asset is examined using the administration interface and the administrator uses the interface to create a string of term values and their relevancies. For example, if an asset is a picture of a tree, the administrator may just type in "Tree" and then hit enter. If the administrator wants to control relevancy with a multiplier, the administrator may enter, for example, 'tree:5' for a tag relevance to the asset of 50 percent. Relevancies are stored according to a float from 0 to 1, but when displayed, the data is normalized to from 0 to 10 for the user. When the user types in and enters the tag string, the system recognizes whether the tag is a category tag or a style tag and will display it in the appropriate category or style subclass section of the tag.

In one embodiment during tag indexing, a routine termed ActiveRecordMixins::Indexer gives the tag the method reindex!. A scheduled rake task flushes the index_queue calling reindex! on batches of the index_queue. If batch fails to reindex!, then the entire batch is placed on index_error_list to be re-indexed later. Within the indexer, it is specified that the asset is searchable based on all of the terms and colors specified previously for that asset. The routine #payload_tag converts it into a useable string for SOLR search functionality. The routine #payload_tag calls a routine #tags_to_hash for all tag types (color, term, style, category, etc.) of a given asset such as a sticker, for example. #tags_to_hash analyzes all tags applied to an asset according to all specified tag types or classes. In one embodiment for each analyzed tag, a routing similar_values returns a collection of values that are similar to the original tag value along with their respective "distances" from that tag value. In one embodiment, the distance values are normalized to 100 so that the distances returned by the similar_terms routine emulate the similar_colors distance scoring in CIELAB.

In a preferred embodiment, the platform includes various and sundry search filters that can be used alone or in conjunction with each other by employing OR and AND operators. Search filters may include a file extension (file_ext) filter for returning assets of specified file extensions such as file_ext: jpg. A filter for width and height dimensions may be provided that can be used with the < or > operators, for example, width >400. In one embodiment a usage count (usage_count) filter is provided to search for an asset based on the number of times it has been used in all projects in the system. The operators < and >can be used as well as a definitive number, for example, usage_count:10 or usage_count>10. Another filter might be one adapted to search for an asset based on a count of attributes such as color_count <10. This applies to asset classes, style color, category, and tag.

Simulating Motion Dynamics for Digital Assets Based on User Input

Referring now back to FIG. 29, the system, in some embodiments, includes a physics simulation engine 2907 for simulating motion dynamics for items placed in a canvas layout.

Referring now to FIG. 34, motion dynamics are simulated for digital items 3407, 3408, 3412, and 3413 based on pre-configured interactive boundaries attributed to each item. When pre-assigned physical boundaries of the items on the canvas intersect as a result of one item being moved in close proximity of another item, motion dynamics are triggered according to pre-assigned physics of the boundaries, for example one object repelling another object.

In one embodiment, motion dynamics may be triggered for a digital item or asset placed on canvas based on physics properties assigned to the asset and the nature of user input relative to interaction with the digital asset. In this embodiment, the motion dynamics may occur independently of the proximity of other objects. In another embodiment, the motion dynamics may occur in conjunction with different motion dynamics triggered by boundary intersection between two or more items.

Figure 45:
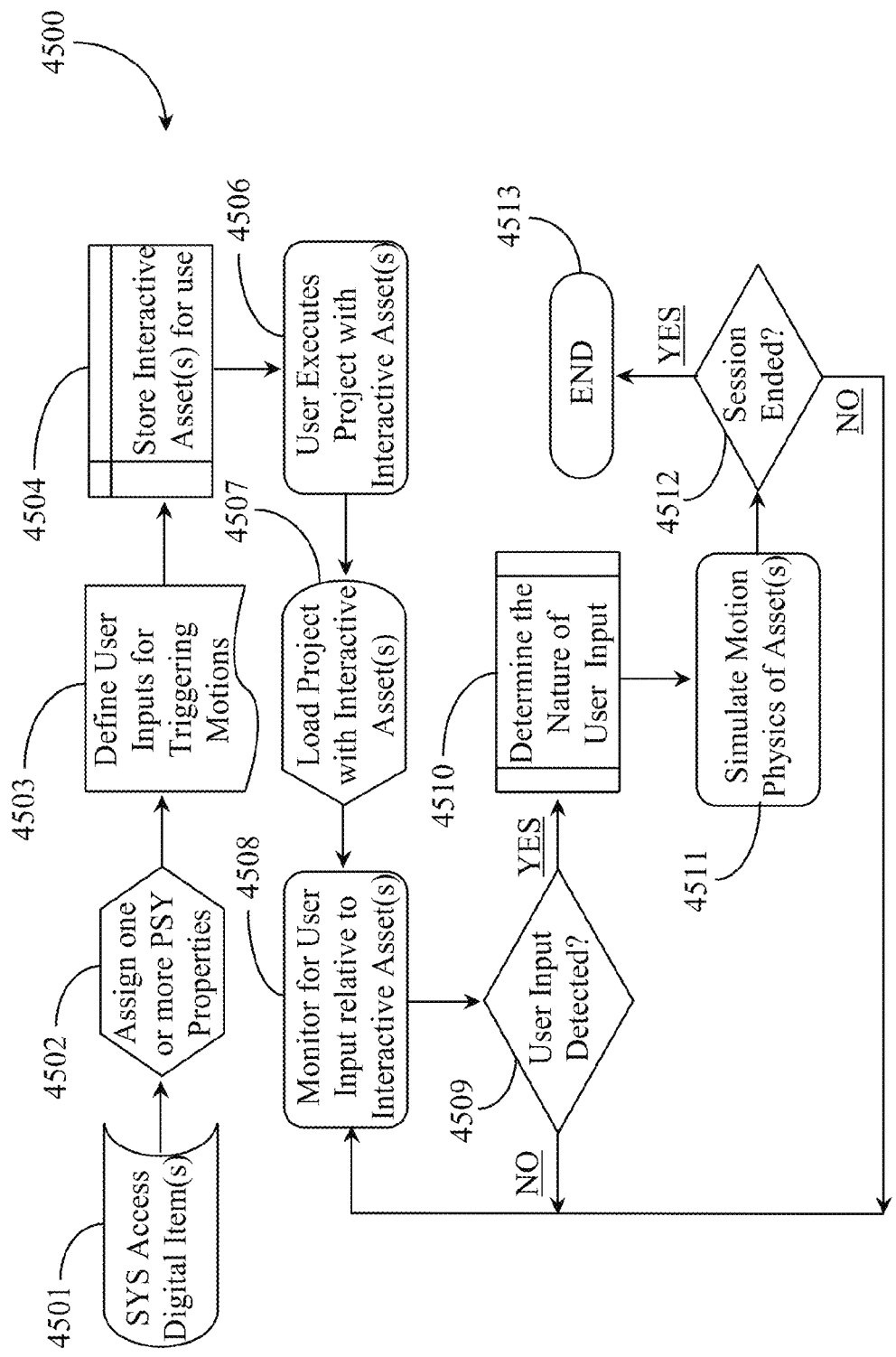
FIG. 45 is a process flow chart depicting steps for applying motion dynamics for digital assets.

FIG. 45 is a process flow chart 4500 depicting steps for applying motion dynamics for digital assets. At step 4501, the system accesses one or more digital assets. The digital assets might be photos, theme graphics, photo slots, text boxes, stickers, or any other digital items that may be added to the canvas of an image and or text-based project. There are numerous ways in which the system may access or obtain such digital items.

In one embodiment, the system accesses the items from local or remote repositories adapted to host or store such assets. In one embodiment, the system obtains the digital assets directly from a user via digital upload of the assets by the user to the system server. Typically, this might occur while the user is building a project and uploading items for use in the project. In another embodiment, the system accesses the assets from a remote network-connected source such as a user's social interaction account.

At step 4502, the system assigns one or more pre-specified physics properties to the digital asset or assets. Pre-assigned physics properties are designed to facilitate free-flowing movement of the digital assets based on the nature of user input in interacting with the assets. In one embodiment the physics properties are pre-written by a system knowledge worker or administrator. In this case, the system may apply such attributes to assets in an automated and dynamic fashion as assets are analyzed. Assets may be accessed cardinally, or in batches without departing from the spirit and scope of the present invention. In one embodiment, the system server leverages a physics engine to render motion dynamics for certain digital assets. In another embodiment computer animation techniques are leveraged to emulate the function of a physics engine for animating certain assets.

At step 4503, a knowledge worker or system administrator defines user inputs for triggering simulation of specific motions according to the pre-assigned physics properties of specified assets. The attributes including types of motions and types of inputs that trigger simulation of motion for assets may be stored with the assets or stored in a location apart from the assets but tagged to the assets. In step 4504, the system stores the assets configured for motion simulation for later use. In one embodiment, the assets are public assets that are available to all users. In one embodiment, the assets are private assets available only to certain users authorized to use them. Interactive assets that are publicly available may be triggered for motion by any actively connected users that might be working with those assets in a project. Interactive assets that are private assets may be triggered for motion by users whom are authorized to use those assets in one or more projects.

It is noted herein that in one embodiment, the assets are prepared for motion simulation manually and such assets exhibit motion upon subsequent interaction with the asset by a user based on the system-recognized type of input. In one embodiment, motion dynamics and input triggers are pre-defined by the system before accessing any assets. In one embodiment, the system may dynamically prepare an asset for motion dynamics based on some indication from the user or from the system that the particular asset should exhibit some type of motion upon certain types of input actions.

Input actions may include traditional inputs like mouse movements such as drag and drop, which represent inputs from a single point of control (mouse, trackball, mouse pad, etc.). Input actions may also include those that are possible on a touch screen or touch pad such as sweeping motions, expanding motions, reducing motions, and other input actions that are representative of inputs from multiple points of control (touch screen, touch pad, etc.).

At step 4506, a user executes a project associated with interactive assets. At step 4507, the system loads the project with the interactive assets. Loaded assets may remain motionless until triggered by a system recognized form of user input in interaction with one or more of those interactive assets. While the project is displayed, the system monitors the user or users for input relative to interaction with one or more of the interactive assets at step 4508. Interactive assets may include those assets preconfigured for interactive boundaries and those preconfigured for simulated motions.

At step 4509, the system determines if a user input recognized as a motion triggering input relative to an interactive asset has occurred. If no user input for triggering motion simulation of an asset is detected, the process resolves back to step 4508 where monitoring continues. If the system has detected a user input recognized as a trigger for simulated motion for one or more assets at step 4509, the system determines the nature of the input at step 4510. The system simulates the motion physics of the interactive asset at step 4511 based on the determination made at step 4510.

In one embodiment, the system detects a subsequent selection of the asset for positional modification on the layout from the perspective of at least one predetermined aspect of user input control, for example, selecting and moving an asset using a mouse operation. The predetermined motion might be an inertia property where the asset continues to slide across the canvas when the user drops the item during the positional modification. In another embodiment, a user may expand the size of the asset using a touch screen input such as one that zooms in content using multiple fingers. The predetermined motion might be to slowly expand the object until the user taps out to stop the expanding motion. In another embodiment using multiple point of control, the user may make a sweeping motion across multiple interactive assets to sweep them around and have them bump into one another or partially overlap one another.

In one embodiment there may be a layer assignment property attributed to an asset such as this asset is always in the top layer. A second asset may be assigned always to a next layer down such that a user may slide the asset in the second layer to have it slide under the asset assigned to the top layer only. In one embodiment using multiple points of control such as multiple fingers on a touch screen, a user might simultaneously slide multiple objects around on the canvas using a finger for each object. In a variation of this embodiment, a user might move, rotate, or expand an asset using a combination of fingers recognized as a specific touch screen input. In still a further embodiment, certain hand gestures might access different behaviors in the user interface such as panning, zooming, sliding, bouncing, rotating, flipping, and otherwise moving assets. In one embodiment, assets may be configured with interactive repulsive boundaries and motion dynamics so that a user may propel one asset into another or a group of assets and what secondary motion dynamics for the other assets triggered by boundary interactions where all of those assets occupy the same canvas layer. There are many possibilities.

Auto-Recognition of New Photos

In one embodiment of the invention, the system can access client assets that are stored at remote network locations on behalf of the client.

Figure 46:
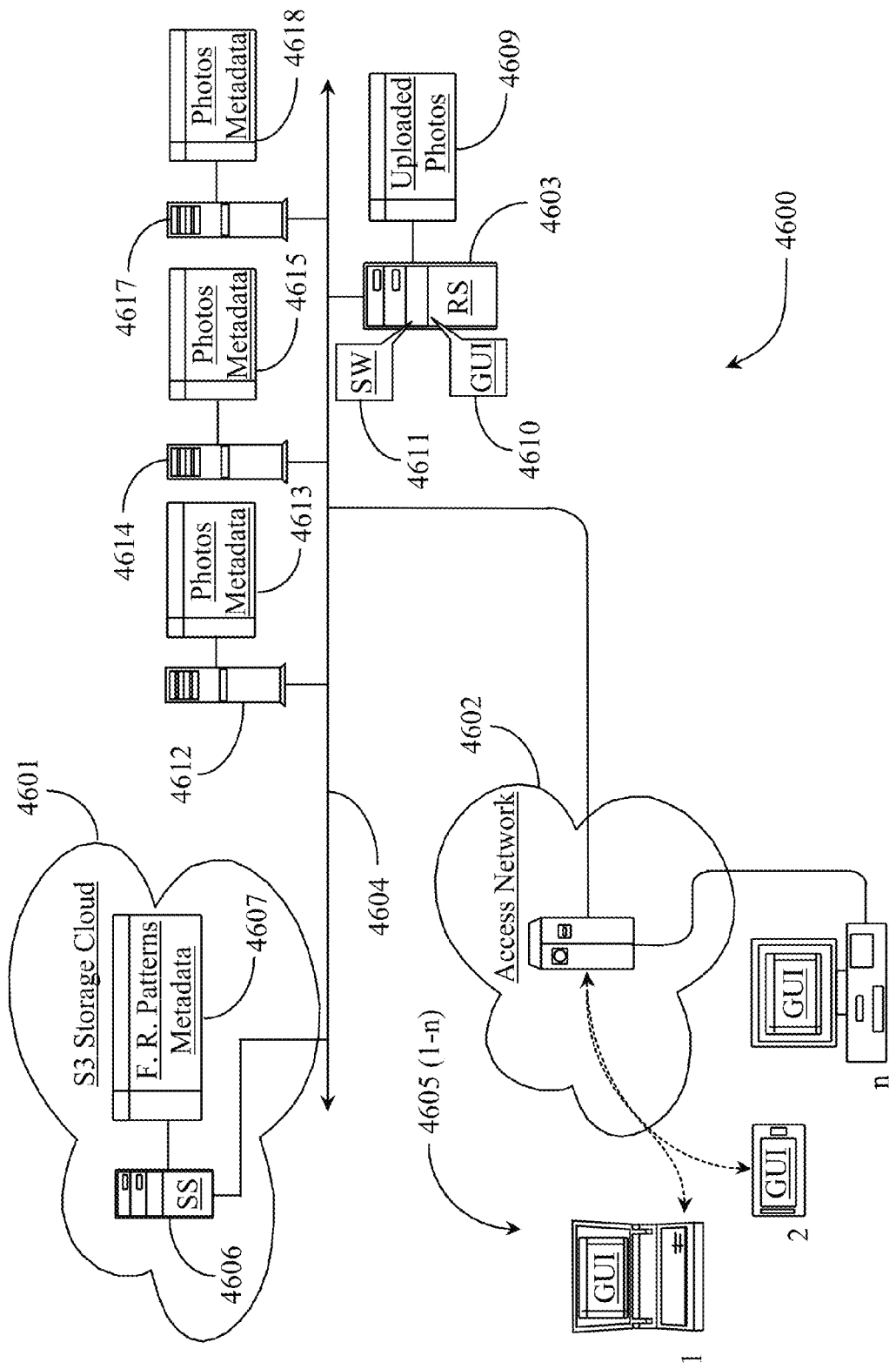
FIG. 46 is an architectural overview of a fulfillment network that supports automatic recognition of and captioning of photos contributed by clients building or editing an image and or text-based project through a graphics user interface (GUI).

FIG. 46 is an architectural overview of a fulfillment network 4600 that supports automatic recognition of and captioning of photos contributed by clients building or editing an image and or text-based project through a graphics user interface (GUI). Network 4600, which is the Internet network in one embodiment, includes an access network 4602. Access network 4602 may be any digital sub-network having access and connection to network 4600, also denoted herein by network backbone 4604. Backbone 4604 represents all of the lines, equipment, and access points that make up the Internet network as a whole.

Access network 4602 supports network access for users operating computing appliances 4605 (1-n). Users 4605 (1-n) are assumed connected, in this embodiment, to a runtime server 4603. In one embodiment, the users are redirected to RS 4603 via a service Website (not illustrated). RS 4603 hosts a graphics user interface (GUI) adapted to facilitate building, editing, and purchasing image and or text-based projects such as a photo book, for example. Instances of GUI 4610 are displayed on each of the user's devices further illustrating network connectivity with the server.

RS 4603 hosts software 4611 executed from a non-transitory medium on the server. SW 4611 is adapted to access social interaction accounts and photo site accounts of authorizing members for the purpose of collecting data including photo or image data about friends and family of those members, whose photos may be hosted on the network and accessible to the members. Backbone 4604 supports social interaction and photo sites represented herein by network servers 4612, 4614, and 4617. Each server has connection to at least one data repository, repository 4613 for server 4612, repository 4615 for server 4614, and repository 4618 for server 4617. Repositories 4613, 4615, and 4618 are adapted to contain images that are hosted by such social interaction and photo site services patronized by users 4605 (1-n).

In the system of the invention, users that are in session and working on one or more projects may upload images or photos to those projects from their devices. In other embodiments, the user may tag or otherwise specify and authorize the system to get images or photos from any service site the user specifies and where the images or photos are hosted on the network. Therefore in a project display, there may be photos uploaded by the user and photos accessed from elsewhere on the network displayed in the project viewable through the GUI. In this example, user assets including project photos or images are stored in data repository 4609, which is connected to RS 4603.

SW 4611 includes an image-based facial recognition system encapsulated in an automated browser instance capable of navigating to a site universal resource locator (URL) and logging into a social interaction account or a photo sharing or hosting account on behalf of the user. SW 4611 is trained to perform the functions mentioned above using data provided by the members and under sanction by the members to access their sites. In one embodiment, members may have photos hosted at a public site or elsewhere on the network where no authentication is required for access. However, many of these sites are password protected requiring system access to the user's passwords and other required authentication data for those sites. SW 4611 may operate on behalf of a user whether or not that user is online. SW 4611 accesses user images of friends and family and evaluates them for facial recognition possibilities. Of all photos that might be posted in a user account, many will not be of interest to the system due to a lack of discernable facial features that might be leveraged to "recognize the same or a similar photo added to a user's project.

In a preferred embodiment and for each authorizing user, SW 4611 navigates, during session and or in the background for offline users, with the aid of browser functionality to one or all of servers 4612, 4615, and 4618. For each user, SW 4611 browses the photos hosted on the server such as the photos stored in repositories 4613, 4615, and 4618. SW 4611 is adapted with the aid of a facial recognition component to determine if a photo or image being looked at has a recognizable face in it or not. If not, for example, the photo may be of a dog or of a cat, or of scenery, a building, or any other thing other than an image having at least one recognizable face of a family member or friend. When SW 4611 comes across a photo that has at least one face, SW 4611 accesses the image for further processing. A facial recognition pattern is created for each qualifying photo or image. Likewise, SW 4611 collects any descriptive photo data (metadata, data) about a qualifying photo.

Facial recognition patterns and associated data/metadata are stored in a data repository 4607 connected to a storage server 4606 in a data storage cloud 4601. It is noted herein that it is not required that data be stored in a data storage cloud or island in order to practice the present invention. Distributed computing and data storage offered through cloud services is a convenient and readily scalable storage and access solution.

Users 4605 (1-n) typically contribute photos to their own projects and often to projects initiated by others. Photos contributed to projects are illustrated in data repository 4609. GUI 4610 is integrated with a monitor component that detects images or photos uploaded to the system by users. Typically, the photos are uploaded and then placed within the user's project at the control and direction of the user or on behalf of the user such as in a remix.

SW 4611 is further adapted to monitor user activity relative to photo contribution and may intercept any photo contributions the user makes. SW 4611 intercepts such photo contributions while the user is in session and has just made the contribution(s). SW 4611 first determines if a contributed photo qualifies for facial recognition. If so, SW 4611 generates a facial recognition pattern of at least one face in the photo. SW 4611 may also collect any photo data and metadata such as added description or caption text attributed to the photo and any tag data associated with the photo. For example, a photo containing a frontal rendering of a person should have face data visible to SW 4611, which may recognize basic facial features to first qualify the photo for processing. Tag data, such as when a friend tags another friend in a photo is also collected for the name data.

SW 4611 attempt to match facial recognition patterns taken from new photo contributions against facial recognition patterns stored in repository 4607. If a sufficient match is made between a facial recognition pattern taken from a new contribution and a facial recognition pattern stored in repository 4607, the SW may then create a caption and or description from the metadata and data stored with the original facial recognition pattern. Therefore, the likelihood that the contributed photo is the same individual whose photo was earlier analyzed, can be controlled by threshold (percentage of matching features in the pattern) and can be further validated by matching metadata and data from the contribution to data and metadata taken earlier and stored in repository 4607.

In this example, the system may "suggest" a caption, name tag, or other descriptive indicator that includes a name for the person or persons in the photo contributed to the project by sending notification to the user through the GUI that includes such recommendations or suggestions for caption or other description for the photo in the project. The user might accept or reject the recommendation. If the system is correct, the user may save time by adopting the system recommendation for captioning etc. If the system is not correct, the user may disregard the notification and recommendation. In one embodiment, the contributed photos are auto-tagged with name data and or other data based on a match and the availability of the earlier data/metadata.

If a user Jim has a single photo of a friend Jane on Facebook™ and Jane has a sister Joan that Jim happens to have a single photo of on another site, for example, the single photos of Jane and Joan are pre-analyzed for facial recognition and any associated data/metadata such as the names Jane and Joan. Later, the user uploads a photo containing a frontal view of two people Jane and her sister Joan. That photo may be intercepted and analyzed for facial recognition patterns to use those patterns to see if they match any patterns previously generated and stored for the user. In this case, the system would take the facial recognition patterns of both Jane and Joan, using them as input to search against all of the patterns taken from photos at one or more sites of the user.

The system would identify both Jane and Joan in the project contribution photo, and may have some metadata that reveals the relationship between them. The suggested caption could be "Jane and her sister Joan" or "Joan and her sister Jane". The system may have data indicating the importance of both to the user where Jane is dominant in Jim's online life lending to the first recommendation. If there is any photo data or metadata already associated with the user's contribution like place name, time, date, or the like, the caption or suggested description for the contribution may contain the added information such as "Jane and sister Joan at Dune State Park in July". Therefore, using a combination of facial recognition and associated descriptive data, the system can manage identification of more than one person in a photo contribution.

Figure 47:
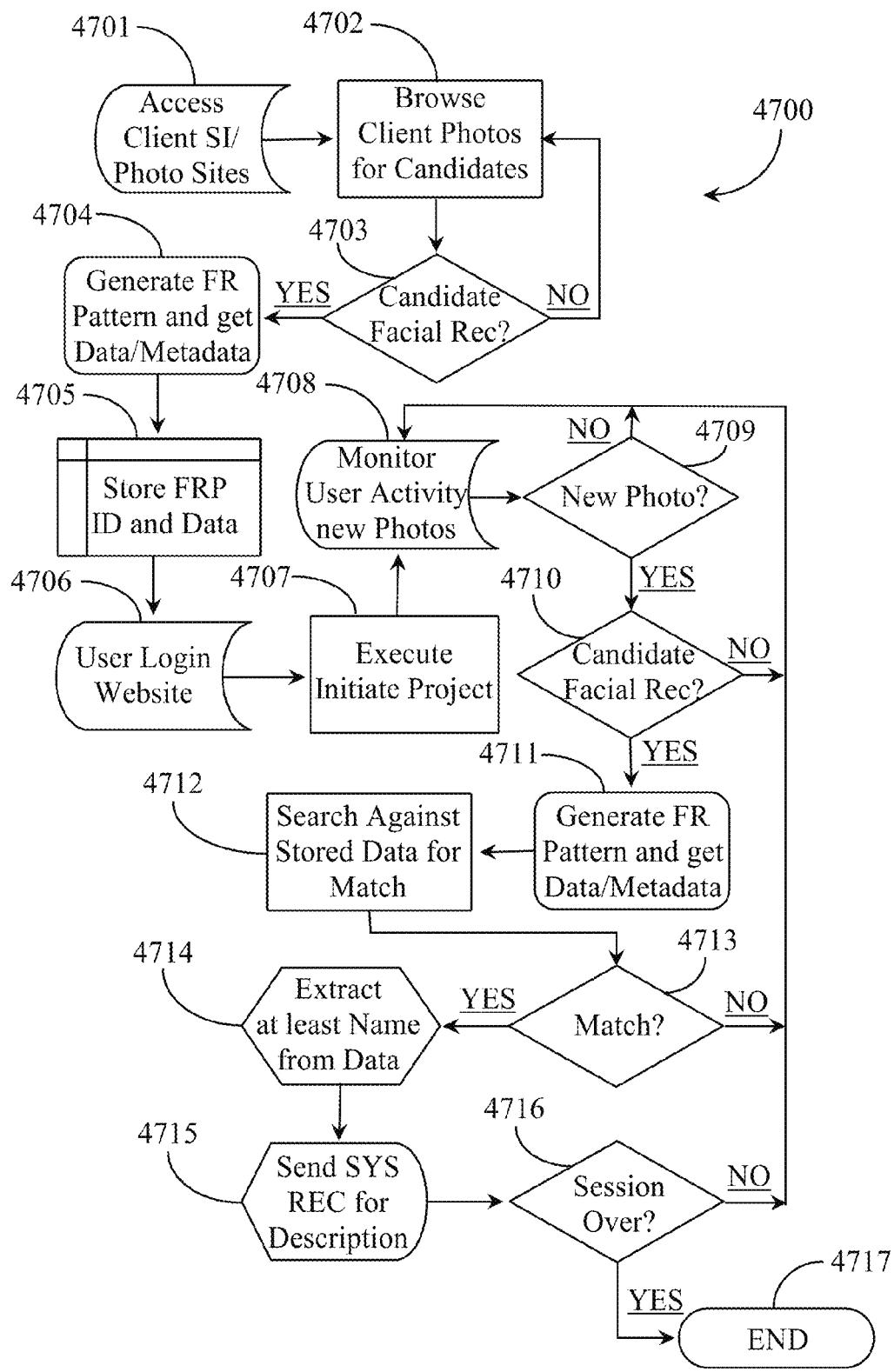
FIG. 47 is a process flow chart depicting steps for matching facial recognition patterns in photos to pre-identify photo contributions to a project.

FIG. 47 is a process flow chart 4700 depicting steps for matching facial recognition patterns in photos to pre-identify photo contributions to a project. At step 4701, the system aided by SW, accesses social interaction (SI) sites and photo hosting sites patronized by the client or user. In this process, the SW requires user authentication information and permission to access the photos on behalf of the user. The information provided by the user is leveraged in an automated login procedure to gain access to user sites. In this step, the SW may access the user's profile photos, posted photos on the user's social interaction feed or wall, and any photos previously uploaded by the user to photo hosting sites like Facebook, or Flickr™.

At step 4702, the system browses client photos looking for candidate photos that include one or more face shots that are of sufficient quality to generate a facial recognition pattern for one or more faces in the photo. Photos that do not qualify as a face photo are skipped. At step 4703, the system determines if an accessed photo is a candidate for facial recognition. If a photo is not a candidate for facial recognition at step 4703, the process resolves back to step 4702 where the system continues to browse user photos. If a photo is determined to be a candidate at step 4703, the SW generates a facial recognition pattern and collects any photo data and metadata that may already be associated with the photo. If the photo shows a single person's face and data associated with the photo includes a name, the system may infer that the name is that of the person in the photo. If the photo metadata includes a place name, then the system may infer that the place in the photo is the named place. If there are two faces in a single photo, the system may attempt to generate facial recognition patterns for each face documented.

At step 4705 for each candidate photo processed, the system stores the facial recognition patterns generated from photos and the associated data and metadata associated with the photos in a connected repository or other storage location that is accessible to the server and that may be searched using pattern matching and keyword matching. The data that is stored is attributed to the client by identification (ID) such as client name, number, password, etc. In a preferred embodiment, the photos themselves are not taken or copied from user sites. In one embodiment, the system may keep a thumbnail of each processed photo for visual identification purposes. Other data about photos collected may include file information like photo resolution, size, date created, and image number like (DSC11287), for example. Depending on the location of the photos including the venue of posting, the data associated with the photos may be minimal or very rich, for example, a simple caption verses a paragraph of description for a photo.

Steps 4701 through 4705 may be taken by the system in the background whether a user is online or not online. The process may be undertaken periodically, by schedule, or by direction from a user. Data processed on behalf of a client are stored with client ID and are not used for any other non-authorized purposes. Older data or obsolete data may be purged.

At step 4706, a client may log into the Website hosting the photo services. At step 4707, the client executes a project for editing, or initiates a new project for build. At step 4708, the system monitors user activity during session looking for new photos added or in the process of being added to the project. A step 4709, the system determines if a new photo is added to the project. A new photo might be one not previously documented by or used in the system. If no new photos are detected at step 4709, the process loops back to step 4708 for continued monitoring. If the system notices that the user is introducing one or more photos to the project at step 4709, the system determines for each photo if that photo is a candidate for facial recognition. If the system determines that there is no new photo at step 4710, the process loops back to step 4708.

At step 4709, if the system determines a photo is a new photo, the system checks at step 4710 whether the new photo is a candidate for facial recognition. This step is analogous to step 4703 for remote photos and photos already in the system. If the photo is not a candidate for facial recognition, then the process resolves back to step 4708. If the new photo is a candidate for facial recognition at step 4710, then the system aided by SW generates at least one facial recognition pattern and collects data and metadata associated with the new photo at step 4711. In one aspect, the photo may not have rich data associated with it if it has not yet been posted anywhere on the network. However, if the photo is a remote photo that the user wants to include in the project without direct submission, then the photo may have rich data associated with it.

Step 4711 occurs while the user is uploading the new photo or after the user has submitted the location of the photo for use in the project. At step 4712, the system conducts a search against the stored facial recognition patterns and data taken previously from photos the user has permitted access to. The system uses the facial recognition pattern of the photo generated in step 4711 as primary search criteria. Any data or metadata associated with the photo may also be used in the search, possibly to match data and metadata associated with a previously stored facial recognition pattern.

At step 4713, the system determines if a significant match was found in the search of step 4712. A significant match includes matching facial recognition patterns to a satisfactory degree since if it is not the exact same photo, the patterns might differ somewhat. If the system finds no match at step 4713, the process resolves back to step 4708 where the activity of the user is continually monitored during the session. If the system determines a match at step 4713, then the system extracts at least a name from the stored data at step 4714 to attempt to identify the subject of the matching facial recognition patterns. The subjects name and other data might be included in the data associated with the matching facial recognition pattern.

Notwithstanding minor pattern variations that may occur between two face shots of a same person, matching data may help the system to better confirm identity at least of the person subject to pattern recognition. For example, two patterns are close but do not match exactly where the name data for both sets of data collected is the same. This may occur with to separate photos of the same subject. If the new photo intercepted at step 4711 were the exact same photo previously stored, the patterns would match identically, perhaps within a very small system error margin.

At step 4715, the system sends a recommendation to the client for a photo caption or for a photo description. The recommendation stems from the data and metadata associated with the stored facial recognition pattern. The user may accept the recommendation or not in one embodiment. In one embodiment, the system auto-populates caption or description fields and the user may change or edit the fields if desired. The caption or description might include the names of one or more people in the photo, the place in the photo, the data the photo was taken, and other data if available. At step 4716, the system determines if the session is over. If the session is or has ended at step 4716, the process ends for that client at step 4717. If the system determines that the session is ongoing, the process resolves back to step 4708 for activity monitoring.

It is noted herein that a subject (person) in a photo contributed to a project might be known to the client and to family and friends of the client. Therefore, pre-stored data may be made available for search purposes to more than one client if those clients are friends outside of the system and, perhaps within the system such as collaborators, etc. In this way a pool of available photos and information might be shared by several clients without departing from the spirit and scope of the present invention.

In a further aspect, a client may have a pool of photos that are tagged and already used in projects. These photos may be processed as described earlier for facial recognition pattern and data/metadata where the information is stored as described at step 4705. However, instead of doing a search to obtain identification of a person or persons in a new contribution, the search may be conducted for any matching photos that could be posted at several different locations accessible to the user. The photos returned become a pool of possible photos the user may browse through to select photos to add a project. In this embodiment, the actual photos may be retrieved or simply the Universal Resource Indicators (URIs) of the photos with thumbnails of sufficient quality that the user can asses them.

Managing Snap Features

Snap features refer to canvas grids configured for snap-to so that items placed on the grid align to one another more easily. Digital assets like photo slots, text boxes, stickers, and other digital graphics are, in certain instances, configured with snap guides that snap the item to a grid line or anchor. The inventor provides a snap-to prioritization method that aids in arranging certain items on a canvas layout and that provides visual feedback to the user which gridlines and items or sets of items have priority for snapping to the grid, to one another, or to one another and the grid.

Figure 48:
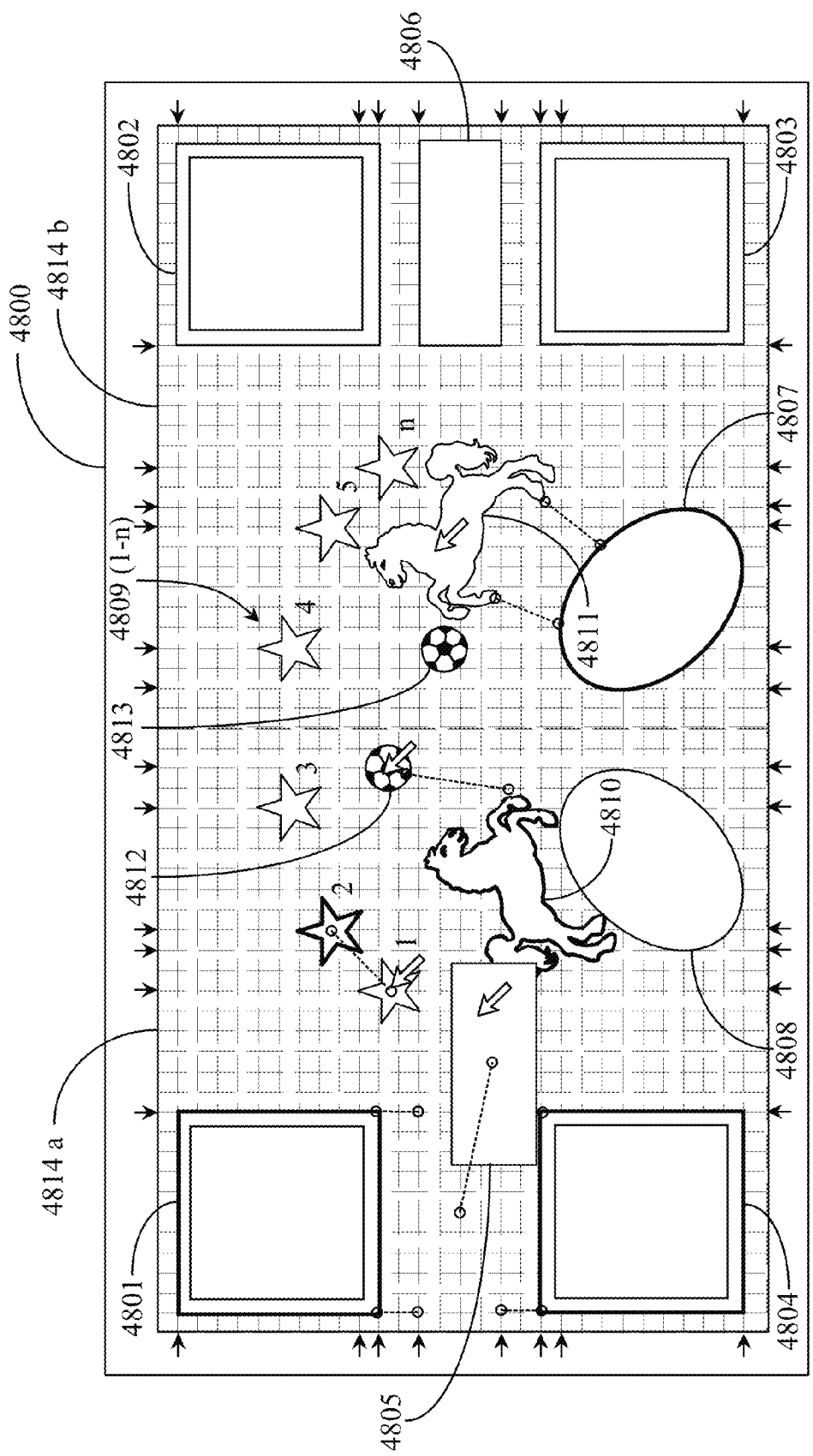
FIG. 48 is an elevation view of a double page canvas layout supporting dynamic control over gridline snap-to functionality.

FIG. 48 is an elevation view of a double page canvas layout 4800 supporting dynamic control over gridline snap-to functionality. Layout 4800 is analogous to a project such as a photo book served to a client from a server connected to a network, the server having access to least one processor and a data repository, the server including a non-transitory physical medium including software running from the non-transitory physical medium.

In addition to establishing a client-server connection between the server and at least one user-operated computing appliance connected to the network, and initiating and maintaining an active data session between one or more users involved in project creation and or in project editing through a graphics user interface (GUI), the software, in this embodiment, provides functionality to enable dynamic system control of grid line assignments for snapping to certain items.

Canvas layout 4800 includes two pages, each exhibiting a grid 4814*a* and a grid 4814*b* composed of horizontal and vertical gridlines. Grid 4814*a* or *b* is analogous to grid 2103 of FIG. 21 described further above in this specification. In this example, certain grid lines are prioritized for snapping to certain assets placed on the canvas. A pattern of black arrows surrounding the perimeter of grids 4814 (*a,b*) indicates horizontal and vertical gridlines that are prioritized as described above.

Grid 4814*a* spans the first page of layout 4800, while grid 4814*b* spans the second page. In this example, grids 4814*a* and 4814*b* are aligned and prioritized relative to snap-to gridlines uniformly as a single layout. That is to say that the pattern of snap-to gridlines identified by the arrows is uniform and symmetrical across the layout. This is indicative of a two page spread where the same number of identical sets of assets is placed on both pages and in a mirror image arrangement relative to both pages. It is noted herein that in other embodiments, grid 4814*a* may be prioritized differently than grid 4814*b* without departing from the spirit and scope of the present invention.

Grid 4814*a* supports a photo slot 4801 and a photo slot 4804. Grid 4814*b* supports a photo slot 4802 and a photo slot 4803. In this example, photo slots 4801 and 4804 are snapped to the grid and in alignment with one another. The photo slots also occupy symmetrical positions on the grid relative to the overall grid space. To position photo slot 4801, a user may drag photo slot 4801 towards the upper outside corner of grid 4814*a*. Photo slot 4801 has snap-to guides provided on at least two sides in this example. As photo slot 4801 is dragged nearer to the corner, visual indication of the prioritized grid lines would become highlighted and a target line extending from the center of the highlighted grid pattern and the center of the photo slot might appear indicating to the user that the photo slot will snap into that position on the grid. Photo slot 4804 is prioritized to occupy the same space in the lower outside corner of grid 4814*a*. Thus, the photo slots are symmetrically aligned and spaced apart from one another relative to the overall grid space.

The same thing is true at the opposite end of the layout relative to photo slots 4802 and 4803. The system aided by software may dynamically assign snap-to priority to the appropriate gridlines based in part of the size and shape of the photo slots. For example, two identical photo slots are logically laid out in a symmetrical pattern, occupying a space that is prioritized for those slots. Photo slot 4801 is aligned with and spaced apart from photo slot 4802 relative to prioritized grid lines of both grids where the gridlines are aligned at the grids intersection in the center of layout 4800. The mirror image effect is produced in this example with the prioritized arrangement of four photo slots placed on the canvas.

In one embodiment, the system knows the exact number of identical photo slots that will be placed on the two-page canvas. In this embodiment, certain theme-based layouts have a default number of identical photo slots. During an automated remix, however, that number and photo slot attributes may change. The system dynamically reassigns the priority to the gridlines for a new special pattern of photo slots. For example, photo slots 4801 and 4804 might occupy space in the inside corners of grid 4814*a* instead of the outside corners. In another example, they might occupy opposite diagonal corners. Moreover, addition of other assets may subsequently cause the system to reassign gridline priority for enabling another arrangement that includes prioritized assignment for snapping the new items to the same grid.

Grid 4814*a* includes a text box 4805. Grid 4814*b* supports an identical text box 4806. Text boxes 4805 and 4806 provide caption space for describing the photos in photo slot pair or set 4801 and 4804, and photo slot pair or set 4802 and 4803. In this example, a user is dragging text box 4805 toward the outside edge of grid 4814*a*. In one embodiment, two horizontal grid lines are prioritized as targets for snap-to guides (not illustrated) on the top and bottom edges of the text box. In this embodiment, at least one additional vertical grid line is prioritized to snap to the inside edge of the text box to secure its position both horizontally (vertical grid line) and vertically (horizontal gridlines). Text box 4806 is snapped into position between photo slots 4802 and 4803. Text box 4806 has vertical alignment and the same width as the photo slots and is equally spaced between them.

In one embodiment, certain items are configured to snap to other items, which may or may not be gridline dependant. Photo slot 4801 and photo slot 4804 may have corners configured as snapping targets for snap to guides on the corners of text box 4805. The snap-to interface in this case includes a distance or space to maintain between the assets, for example, the spacing of the text box between photo slot 4801 and photo slot 4804 to attain equal spacing. This distance or space is calculated for the position assignment based on the dimensions of the assets and the overall grid space hosting the assets.

As the user moves the box in-between the photo slots, the corners of the photo slots may light up or exhibit snapping "lines" as a visual indication of where the text box should rest in snapped position. In this case the snap lines include a distance specification along the grid so that text box 4805 snaps in a position that is centered between photo slots 4801 and 4804. If the user is building the layout from scratch, the grid assignments may be dynamically changed depending on item type and item number. A change in number of identical items may force the system to adapt a different pattern for displaying the items. In this case there are only two identical text boxes and a user may understand intuitively where box 4805 should go by looking at the "snapped" position of box 4806.

In one embodiment, text box 4805 has a snap-to guide in the center of the box. As the user drags the box, when it comes close to photo slots 4801 and 4804, a snap-to guide line appears indicating the snap-to position for the center of the box. In another embodiment, a combination of gridline targets and asset targets may be prioritized for snapping an asset with corresponding snap guides on the asset.

In one embodiment, gridlines of grids 4814*a* and 4814*b* are all or mostly snap-to targets when a user begins adding assets to layout 4800. As more assets of differing type are added, some gridlines may be de-prioritized, de-targeted, or deleted altogether to prevent snapping for certain lines. In one embodiment, the system begins "turning off" certain gridlines for snapping based on breach of a population threshold of assets added to layout 4800. This activity may coincide with selection of different arrangement patterns suggested by model for certain assets. Arrangement or display patterns of assets on layout 4800 may vary widely according to different numbers and overall footprints of assets. For example, certain gridlines may be targeted for snap-to based on the number of assets that are considered a set of assets. A set of assets might be a number of identical assets or a number of complimentary assets, or even a mix of identical and complimentary assets.

In one embodiment, grid 4814*a* supports a sticker 4808. Sticker 4808 is annular and therefore includes no points or flat edges. An asset with an annular profile may be somewhat more difficult to snap to grid 4814*a*. In this case, sticker 4808 is snapped at the bottom and top peripheral edges at a specific angle of rotation. An identical sticker 4807 occupies the inside corner space on the second page or grid 4814*b* of layout 4800. A sticker 4810 in the shape of a horse sits atop sticker 4808 and is snapped in position on sticker 4808. In this case, stickers 4808 and 4810 "snap together" at a specific location. Referring now to sticker 4807, snap-to guidelines become visible as a user drags the horse sticker closer to sticker 4807. Stickers 4810 and 4811 do not snap to a gridline in this example, rather, to another sticker.

A sticker 4812 in the form of a soccer ball is configured with a snap-to guide to snap to a front hoof of horse sticker 4810. In this example, as a user drags sticker 4812 closer to horse sticker 4810, the perimeter of sticker 4810 becomes highlighted or otherwise more visible to the user and a guideline appears between the ball and the snap-to position for the ball on the horses hoof. An identical sticker 4813, in the form of a soccer ball, is illustrated in snapped position on horse sticker 4811. Grids 4814*a* and 4814*b* support a pattern of stickers 4809 (1-n), which are in the form of stars.

Stars 4809 (1-n) are configured to snap to grid and to snap to one another to maintain an equal spacing in pattern arrangement. As a user drags star 4809 (1) toward the pattern, a guideline appears snapping keeping the item a specific distance from star sticker 4809 (2). Stars 4809 (1-n) may be configured to snap to horizontal or vertical gridlines as illustrated by the gridline arrows. Snap-to guides may be positioned on the bottom points of each star for snapping to horizontal gridlines. In another embodiment, a snap-to guide may be provided on the top point of each star for snapping to vertical gridlines. In this embodiment, the system aids the user in generating a pattern of assets on layout 4800. In still another embodiment, a snap-to guide may be positioned at the center of an item. Different symmetrical and asymmetrical patterns for arranging assets on layout 4800 are, in one embodiment, modeled by the system.

In one embodiment, different patterns for asset placement using snap-to are modeled for theme-based templates using corresponding theme-based assets. As a user places assets in the layout, an emerging pattern becomes apparent to the user by visual cue or indication to the user where the different assets snap onto the canvas and to one another in some embodiments. Specific pattern modeling may account for various aspect ratios, asset numbers per page or layout, asset type, asset size, and asset combinations. As the user observes the interface, the pattern takes shape and the user learns the capabilities of the assets for snapping to create an aesthetic pattern. In one embodiment, portions or points on a gridline may be activated or deactivated as snap targets for assets.

In one embodiment, there may be assets that are not configured for snapping to grid. These asset types, including stickers with indefinite boundaries such as swirl accent may be deemed unsuitable candidates for snapping to the grid or to other items. In some embodiments, text boxes may deemed unsuited for snapping leaving graphics assets like photo slots, stickers, and images snappable to the grid and or to one another.

In one embodiment there may be multiple gridlines on a grid that are activated as targets for a number of different assets to snap to. In this case, the system may define a range of snap-to strength for gridlines and thereby give prominence to certain gridlines in attracting certain assets. Intuitively, the system may learn from a user or multiple users which types of items the users are more likely to prefer for snapping.

Photo Upload Optimizations

Referring now to FIG. 9, assets such as photos are uploaded into a project by one or more users, and or obtained by the system from sites such as a Flickr™ or Facebook™ elsewhere on the network or any account the user is authorized to access. Bandwidth dependant devices such as mobile computing appliances connect to the service wirelessly using wireless network services such as 3G network, Wireless Fidelity (WiFi), and so on. A user may upload photos to a project one at a time or in batches so that a number of photos begin uploading but compete for the available bandwidth. If batch photos have a high resolution, they may take longer to upload. Similarly, if a single photo is uploaded, the user desires to see what the photo will look like in the interface before finishing the upload, and this may be especially true for higher resolution images that may take longer to obtain through upload.

Referring now to FIG. 14, photo slot 1407 enables drag and drop photo addition, photo panning, and various forms of editing capabilities. In one embodiment, a user may interact with a control such as control 1410 in order to initiate a process to perform a single upload into an empty slot or to overwrite or overlay an existing photo in the photo slot. In one embodiment, invoking interactive control 1410 via touch screen (some devices) or mouse operation initiates an upload session associated with the photo slot. Invoking button 1410 may initiate a "single photo" browsing interface that enables the user to select a photo for upload from a local disk or peripheral device or to input a photo location or address of an asset held elsewhere on the network.

While the photo is uploading, the system aided by software detects that a user has invoked an upload control like button 1410 associated to a single photo slot like photo slot 1407. Once the user has selected a photo for upload, the system reads the file resolution of the photo. If the resolution is higher than the minimum resolution for suitable printing of the photo, the system may access or create a copy of the user-selected photo and may compress the photo to a pre-designated resolution suitable for acceptable quality in print. In this way, the system may first upload the compressed, lower resolution copy of the photo and display that copy in a decompressed state in the photo slot while the higher resolution photo is still uploading.

The user may visualize the "system copy" of the photo in the photo slot ahead of receipt and display of the original photo. The user may determine after seeing what the photo will look like at the very least resolution deemed suitable for print quality that another photo should go there instead. The user may cancel the upload and browse to another photo. Using this method, the user might see system copy photos in more than one photo slot on a canvas layout while two or more of the original photos are still uploading. In this case, the user may quickly select each of multiple photo slots on a canvas layout subsequently and initiate uploads of a single photo to each slot resulting in a multi-photo or batch upload where each uploaded photo is addressed to the appropriate targeted photo slot.

The above-described process is different than uploading a batch of photos first and then dragging and dropping photos into photo slots, for example. This flexibility is important for users operating from mobile appliances that have high resolution photos for use in a project. In this embodiment, the system aided by software, replaces each "system made copy" of each photo by the original file after it is completely uploaded and decompressed for display.

Figure 49:
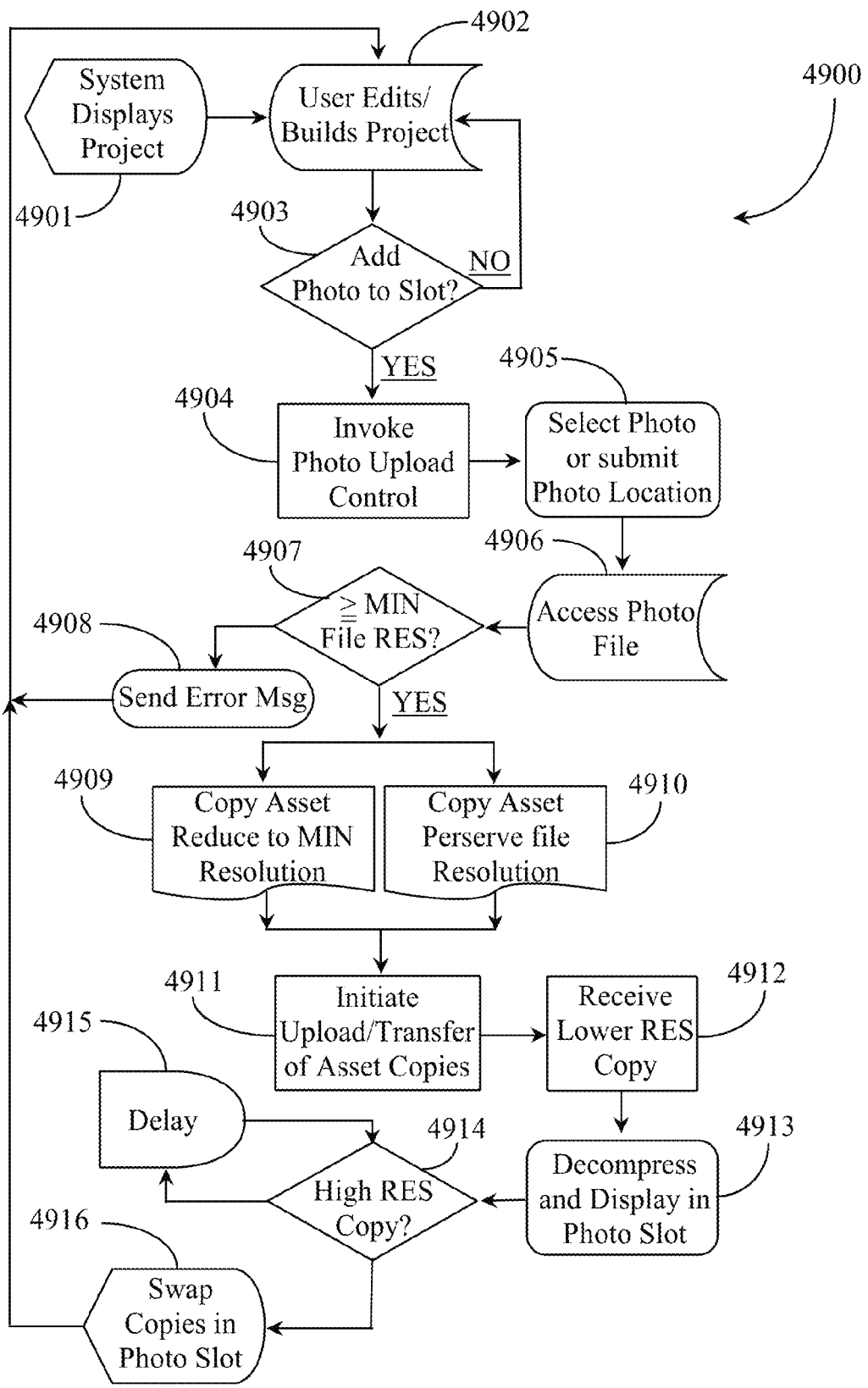
FIG. 49 is a process flow chart depicting steps for simulating display of an uploading photo according to an aspect of the present invention.

FIG. 49 is a process flow chart 4900 depicting steps for simulating display of an uploading photo according to an aspect of the present invention. Process 4900 assumes that a client is connected to the service and has executed a project to work on. At step 4901, the system displays the project executed by the client operating through a GUI. At step 4902, the user engages in editing or building on to the project. The project may be a photo book or some other project description with photos included in the project.

At step 4903, the user determines whether or not to add a photo to a photo slot. If at step 4903, the user decides not to add a photo, the process resolves back to step 4902 where the user continues in session. If the user decides to add a new photo into a photo slot, the user invokes a photo upload or insertion control at step 4904. Invoking a control associated with the photo slot similar to control button 1410 of FIG. 14 described further above, causes a browser interface to appear where the user may select a photo for upload or designate a photo for use that is hosted elsewhere on the network at step 4905.

At step 4906, the system accesses the selected photo file whether it is stored locally (client device) or hosted elsewhere on the network. If the file is hosted on a user account elsewhere on the network, the system accesses that file on behalf of the user and with user permissions. If the file is stored locally, the user allows the system access to the file on a local device. In one embodiment, a software component is previously downloaded to the user's device to enable manipulation of the file by the system while the user is connected to the server.

At step 4907, the system determines if the accessed photo has a pixel resolution that is equal to or greater than a minimum resolution required of the photo for suitable print quality. If at step 4908 the system determines that the photo resolution is not equal to or greater than the minimum value required for quality printing, an error message may be sent to the user at step 4908 that the selected photo for insertion to the project does not meet the minimum quality standards for display and print. If the system determines that the photo file is equal to or greater in resolution than the minimum value suggested for quality print at step 4907, the process moves ahead to steps 4909 and 4910, which may be performed concurrently. At step 4909, the system copies the asset and reduces the copy to the lowest possible resolution. At step 4910, the system copies the asset and preserves the photo resolution of the asset.

At step 4911, the system initiates upload or transfer of the asset copies created at steps 4909 and 4910. Both asset copies may be compressed for file transfer. One of the copies is lower in file size because of a lower photo resolution. At step 4912, the system receives the lower resolution copy while the higher resolution copy is still in progress of uploading or transferring to the system. At step 4913, the system decompresses and displays the lower resolution copy in the targeted photo slot. The user may then visualize what the photo will look like at least at the minimum pixel resolution suggested for print quality.

At step 4914, the system determines if the higher resolution copy of the asset has been received. If the system still has not received the higher resolution photo file at step 4914, the process is delayed at step 4915. During this delay, the user is free to move on to the next item in the project for editing or building. If the system has received the higher resolution copy at step 4914, the system decompresses the photo file and replaces the lower resolution copy in the photo slot with the higher resolution copy at step 4916. The lower resolution copy may be later deleted or purged from the system. The process resolves back to step 4902 where the user continues to edit and or build the project. In the case of client sourced photos, by compressing all of the images or photos on the client device to a resolution sufficient for display at the lowest acceptable print quality, the system is aided in getting all of these images uploaded before the client closes out of the application or otherwise terminates the session. If certain higher resolution copies ultimately fail to upload or are not received for any reason, the system has copies that are of acceptable quality for display and print.

In one embodiment, the process is also applicable for users on dedicated bandwidth connections with time-constrained applications. If a user has numerous high resolution photos for upload, for example 300 or more, it may take a long time even over the best bandwidth connections. Therefore, the system may compress those photos on the user device as described further above with bandwidth constrained devices, and obtain lower resolution copies of these from the user device so that the user may begin building the project immediately while the higher resolution photos are uploaded in the background. In one embodiment, the system may provide the user with a desktop application or component that enables the user to maintain a connection with the server for uploading the higher resolution photos even if they log out of or close their browser application.

Print Resolution Visualization on Digital Display

Referring back to FIG. 9, assets such as photos are uploaded into a project by one or more users, and or obtained by the system from sites such as a Flickr™ or Facebook™ elsewhere on the network or any account the user is authorized to access. Bandwidth dependant devices such as mobile computing appliances connect to the service wirelessly using wireless network services such as 3G network, Wireless Fidelity (WiFi), and so on. A user may upload photos to a project one at a time or in batches so that a number of photos begin uploading but compete for the available bandwidth. If batch photos have a high resolution, they may take longer to upload. Similarly, if a single photo is uploaded, the user desires to see what the photo will look like in the interface before finishing the upload, and this may be especially true for higher resolution images that may take longer to obtain through upload. Moreover, digital prints reveal a print resolution that computing display screen cannot deliver. It is desirable then, that users are able to visualize to some extent the higher resolution factors associated with printed materials on the display screens associated with their computing appliances.

Figure 50:
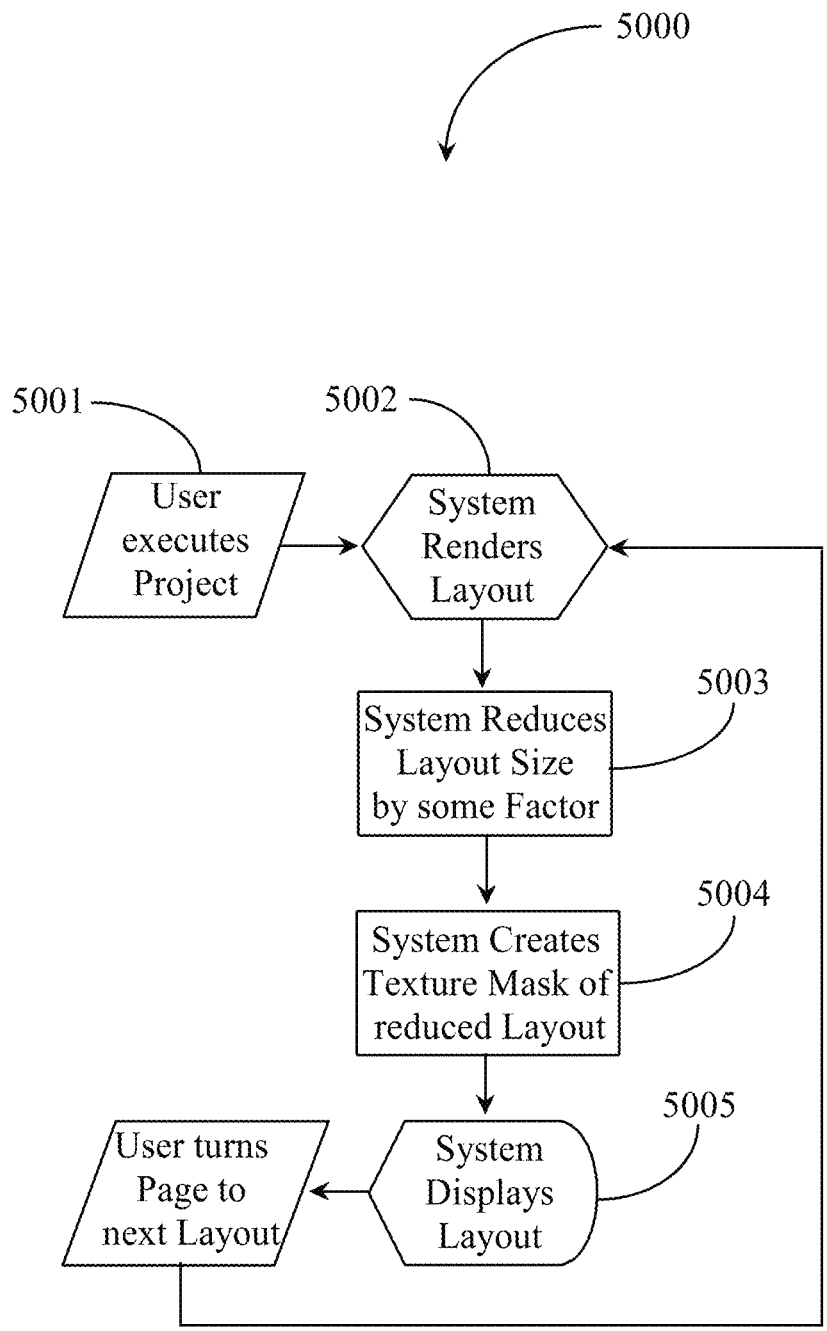
FIG. 50 is a process flow chart depicting steps for simulating higher photo resolution on a display screen for user visualization.

FIG. 50 is a process flow chart 5000 depicting steps for simulating higher photo resolution on a display screen for user visualization. It is assumed in this process that the user is connected to the service and is in session with the server through the GUI. At step 5001, the user executes a project such as a photo book, for example. At step 5002, the system renders the layout for display. Before display, the system reduces the size of the layout by some pre-determined or dynamically determined factor at step 5003.

The purpose of the size reduction at step 5003 is to simulate a higher pixel resolution than would be visualized at 100 percent or greater size factors. It is noted herein that a canvas layout incorporates one or two page spreads and there may be multiple layouts in a photo book. However, the system may upon reducing the first layout viewed, apply the reduction to the other layouts in the project. This may occur dynamically as a user turns pages in the photo book or in a pre-determined fashion in the background independent of whether or not the user will view certain pages in the project. A factor of multiplication may be used in reducing layout size such as by 0.25 or by 0.5, 0.75 etc.

At step 5004, the system creates a texture mask of the size-reduced layout for display. The texture mask functions to "ratchet up" the visual resolution simulation by adding dots and other idiosyncrasies present in the print output data. At step 5005, the system displays the layout at the reduced size with the texture mask.

Tracking Theme-Based Digital Assets

Figure 51:
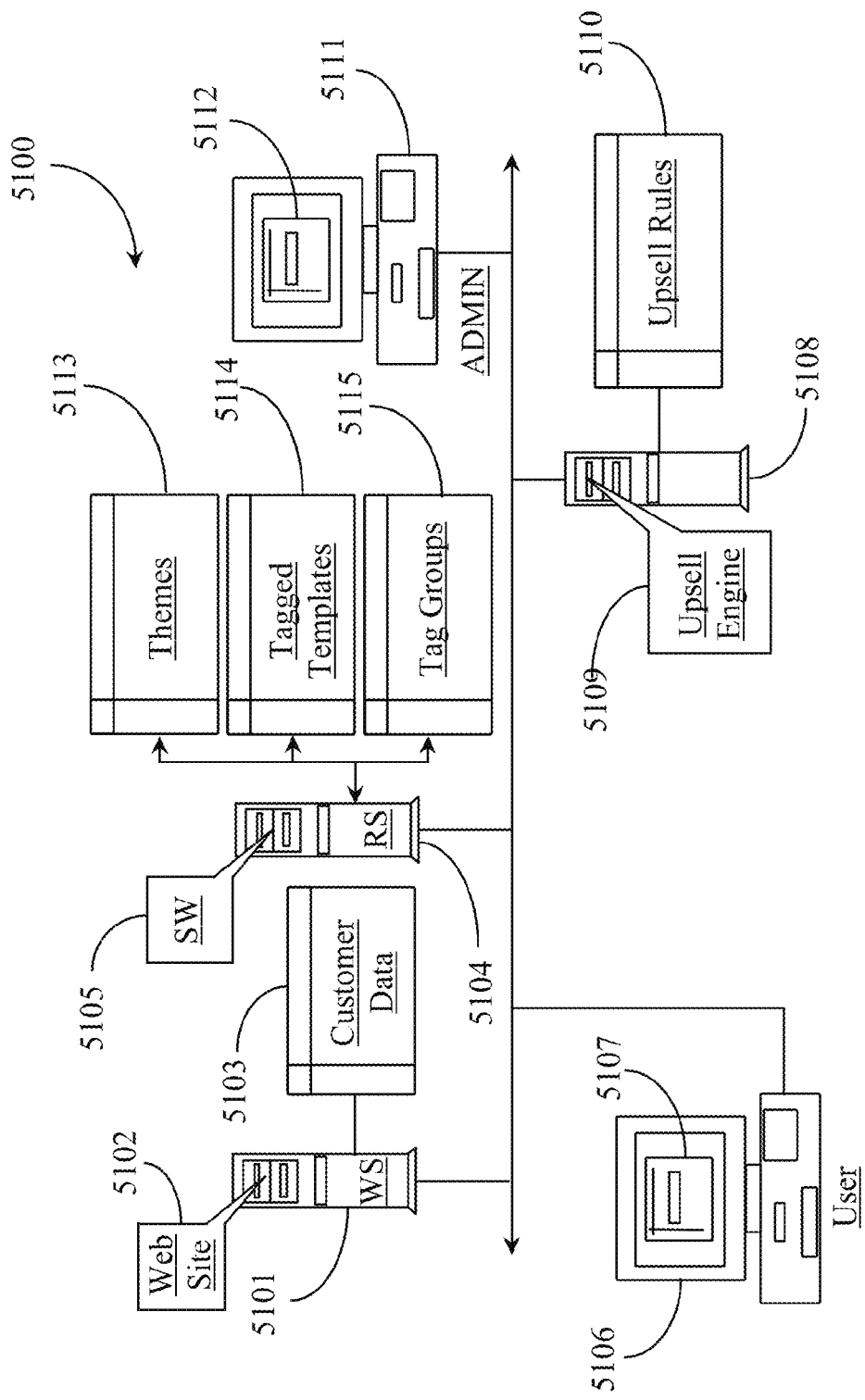
FIG. 51 is an architectural diagram of a network supporting tracking of theme-based assets according to an embodiment of the present invention.

FIG. 51 is an architectural diagram of a network 5100 supporting tracking of theme-based assets according to an embodiment of the present invention. Network 5100 is the Internet network in a preferred embodiment. Network 5100 includes any connected sub-networks including carrier networks and access networks both wired and wireless.

Users such as one operating computing appliance 5106 create custom photo products for themselves and for others. It is desirable that users such as one operating appliance 5106 can easily find templates and related products. Network 5100 includes a Web server 5101 and a runtime server 5104. Web server (WS) 5101 hosts a Web site 5102 where users may log into to begin a project or to edit, build, and purchase one or more existing products. Selection of an existing project causes a server redirect to a runtime server (RS) 5104. Runtime server 5104 includes access to least one processor and a data repository, the server including a non-transitory physical medium. SW 5105 running from the non-transitory physical medium provides several functions in addition to facilitating project creation, editing and transacting.

RS 5104 has connection to a data repository 5113 containing stylistic themes, which are not tied to or related directly to any particular use case or category of product, but are tied specifically to particular design esthetics. For example, a theme could be "Modern Swirls". RS 5104 has connection to a data repository 5114 containing templates. Each template in repository 5114 is tagged with multiple (list) tag words and is associated with a theme according to a data model described later in this specification. RS 5104 has connection to a data repository 5115 containing tags arranged in tag groups. In this embodiment, each template in template repository 5114 is associated with multiple tags, some of which may be incorporated into tag groups in repository 5114. An example of a tag group might be "Girl, Photo, Baby or Birth Announcement".

SW 5105 provides a search engine and search engine interface for users that enable a more streamlined search for digital assets, in this case, templates. Appliance 5106 has a GUI 5107 displayed on screen that includes a search engine interface in the form of a search field visible in this example. Templates in repository 5114 have an associated stylistic theme. Moreover, each template is tagged with multiple tag words relative to template content and template functions. These tags may be further formed into tag groups in repository 5115. GUI 5107 shows a search input field a user may leverage to search for templates based on tag words input into the engine. Inputting tag words may also return more tag words formed into a group of tag words that are associated with theme-based templates. Users may search for templates in template groups by using the tag words as input, for example by entering a tag word string such as "photo, girl, birth, announcements".

Network 5100 supports a computing appliance 5111 operated by an administrator (ADMIN) or knowledge worker. Appliance 5111 has a GUI 5112 and a search interface presenting a search input field. An administrator or knowledge worker may use the search interface to find templates for administrative purposes such as changing, deleting, or adding tag words to particular templates, and so on. A user searching for templates using a tag group may be served multiple different templates under a same theme, the templates matching the tag words used in the search.

In one embodiment, the data model enables cross-merchandising products (up selling) within a theme based on commonalties between the products. For example, when a user initiates a transaction, the system may offer to upsell a user purchasing a product with the tag words "pink, baby, shower, invitations" with the product "pink, baby, birth, announcements" from the same theme. Network 5100 supports a server 5108 that includes at least one processor and a data repository, the server including a non-transitory physical medium hosting software in the form of an upsell engine 5109. Server 5108 includes a data repository 5110 containing upsell rules adapted to prompt the system to make automated offers for other or additional products based on commonalties between the products evidenced by the tag word groups related to template groups of a same theme.

Figure 52:
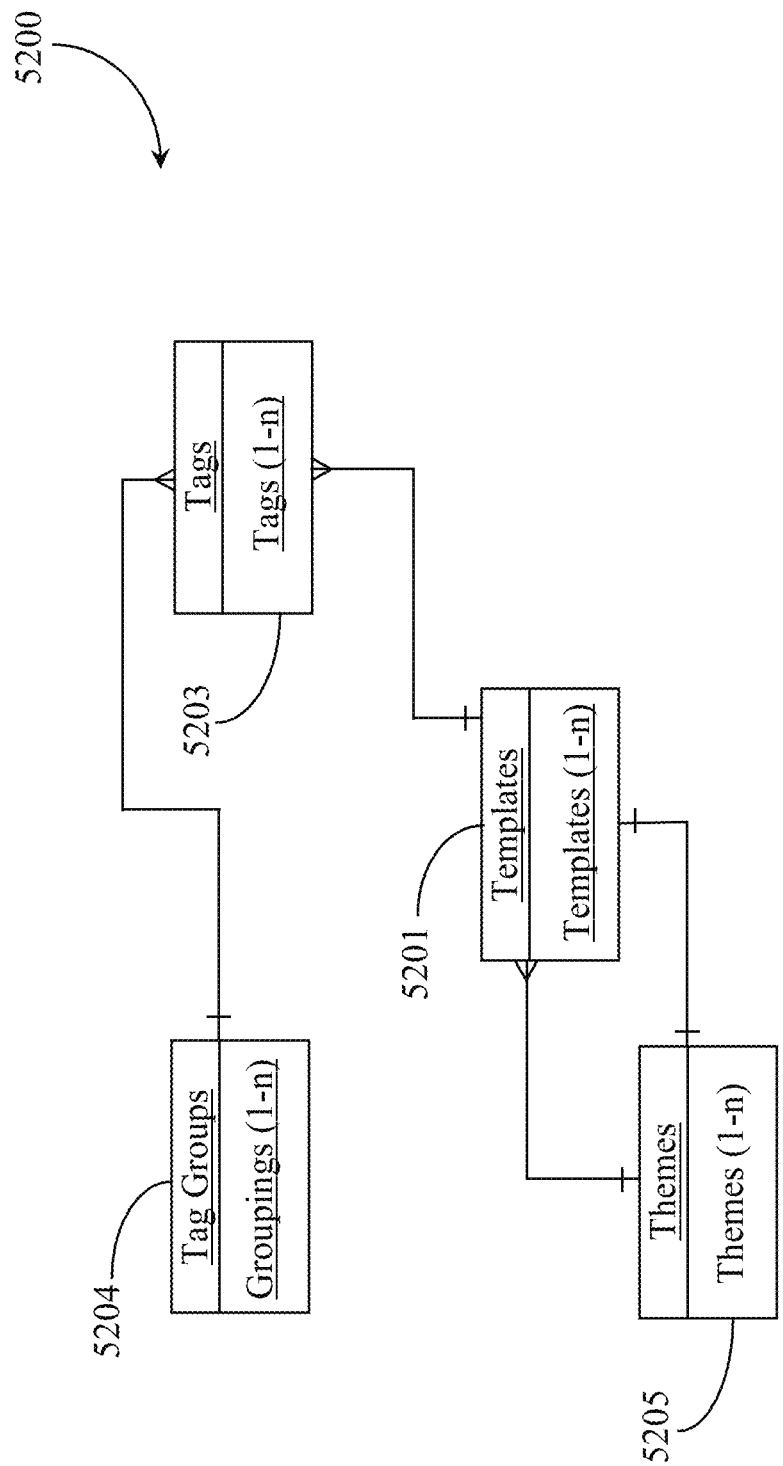
FIG. 52 is an entity relationship model depicting relationships between tags, tag groups, templates and template groups that share themes according to an embodiment of the present invention.

FIG. 52 is an entity relationship model 5200 depicting relationships between tags, tag groups, and templates that are theme associated according to an embodiment of the present invention. Templates 5201 include all templates (1-n) known to the system. The exact number of templates in the system may rise or fall based on template creation, template retiring, etc. In this example, an administrator like one operating computing appliance 5111 of FIG. 51 may create multiple tag words for a particular template, the tag words describing attributes of the template including functions of the template. Therefore, in the data model, one template 5201 may have many tags 5203. Tags 5203 (1-n) represent all current tags associated with templates known to the system.

Templates are not grouped or isolated by theme. Themes 5205 include all themes (1-n) that are known to the system. Therefore, a theme 5205 may be associated with many templates 5201. Tag groups 5204 (1-n) represent groupings of tags formed from tags 5203 (1-n). A tag group 5204 has many tags 5203.

In a preferred embodiment, an administrator or knowledge worker creates a list of tags for each individual template. The tags aid in the description of different aspects of the template. For example, a template could be related to the tags "#CCE-EFF (color), 'baby' (subject), 'announcements' (usecase)". It is noted herein that each tag reference includes the type of the tag indicated in parenthesis. Knowledge of tag type enables system software and personnel to perform data analysis across the different tagging domains. For example, the system aided by software or a knowledge worker operating from a connected computing appliance may report current revenues accrued over a period of time by the tag subjects baby, women, man, boy, and girl.

The tags may be grouped to form tag groups 5204 like a tag group containing the tags girl, photo, birth, and announcements for example. The tag groups are joined with the templates through the themes. Therefore the system may cross sell merchandise (template based) within a theme based on the tags in a group of tags. To illustrate a use case, consider that the system determines to present different color options to a user for coloring a project. The system could present user templates that match along all tagging domains except for the color tag type.

With respect to upsell engine 5109 described further above, upsell rules may be created and based on tags 5203 (1-n) and stored for later consultation like rules 5110 in repository 5110 of FIG. 1. For example, if a client is purchasing a "wedding invitation card", the system may offer an upsell based on an upsell rule that points to other products available in the same theme like a "wedding guest book" by performing a lookup or search against a subset of tags common to both product templates. Moreover, there may be multiple different templates to select from to offer an upsell, each representing a varied product adhering to the same theme and tag grouping.

Figure 53:
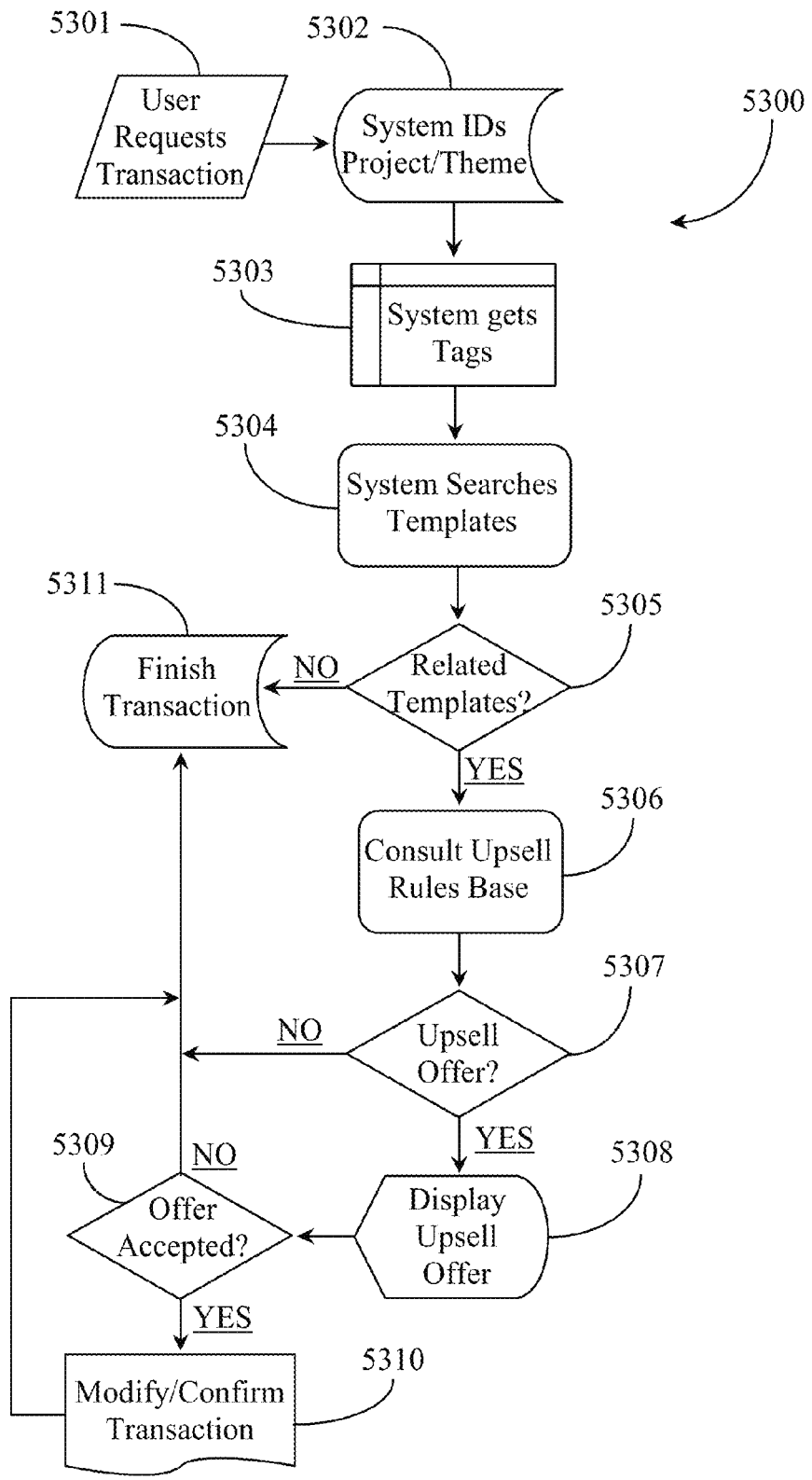
FIG. 53 is a process flow chart depicting steps for offering an upsell to a client involved in a transaction.

FIG. 53 is a process flow chart 5300 depicting steps for offering an upsell to a client involved in a transaction. At step 5301, a user requests a transaction for a product. The system, aided by software running from a non-transitory medium on the server, identifies (IDs) the project and associated theme. The system retrieves the tags associated with the project template at step 5303. The system searches for more templates of the same theme using the retrieved tag words (Tag Group) as search criterion at step 5304.

At step 5305 the system determines if there are any related templates under the same theme that match the input tag word string. If the search returns no related templates at step 5305, the process skips to step 5311 to finish the original transaction. If the system returns related templates at step 5305, the system may consult upsell rules at step 5306 to determine if an upsell recommendation should be made to the user. At step 5307, the system determines if there is an upsell offer recommendation. If at step 5307, there is no recommendation for upsell during the pending transaction, the process moves to step 5311 and the original transaction is finished.

If the system receives an upsell offer at step 5307, the system displays the upsell offer to the user or otherwise notifies the user of the upsell opportunity at step 5308. At step 5309, the system determines whether or not the offer is accepted by the user. If the upsell offer is not accepted by the user at step 5309, the process moves to step 5311 to finish the original transaction. If the upsell offer is accepted by the user, the system may modify and obtain confirmation of the modified transaction at step 5310. For example, the user purchasing a wedding invitation card may also be asked to purchase a wedding photo book. The upsell product may be discounted for early upfront purchase, or payment for the book may be delayed until the book is completed by the user and is ready for purchase and print.

Dynamic Bundling of Editing Tools

Referring now to FIG. 10 through FIG. 15, editing tools are provided within the GUI editor, also referred to as the Mixbook editor for users who are building and editing projects. Among the tools provided are novel color choosing applications, sizing applications, photo editing tools, among other useful tools that user may invoke through the editor. Notwithstanding the different levels of experience users have in editing through the GUI, users may also have preferences in certain editing tools and methods of editing and collectively, are working on very different types of projects spanning image-based and or text-based products they have initiated.

Figure 54:
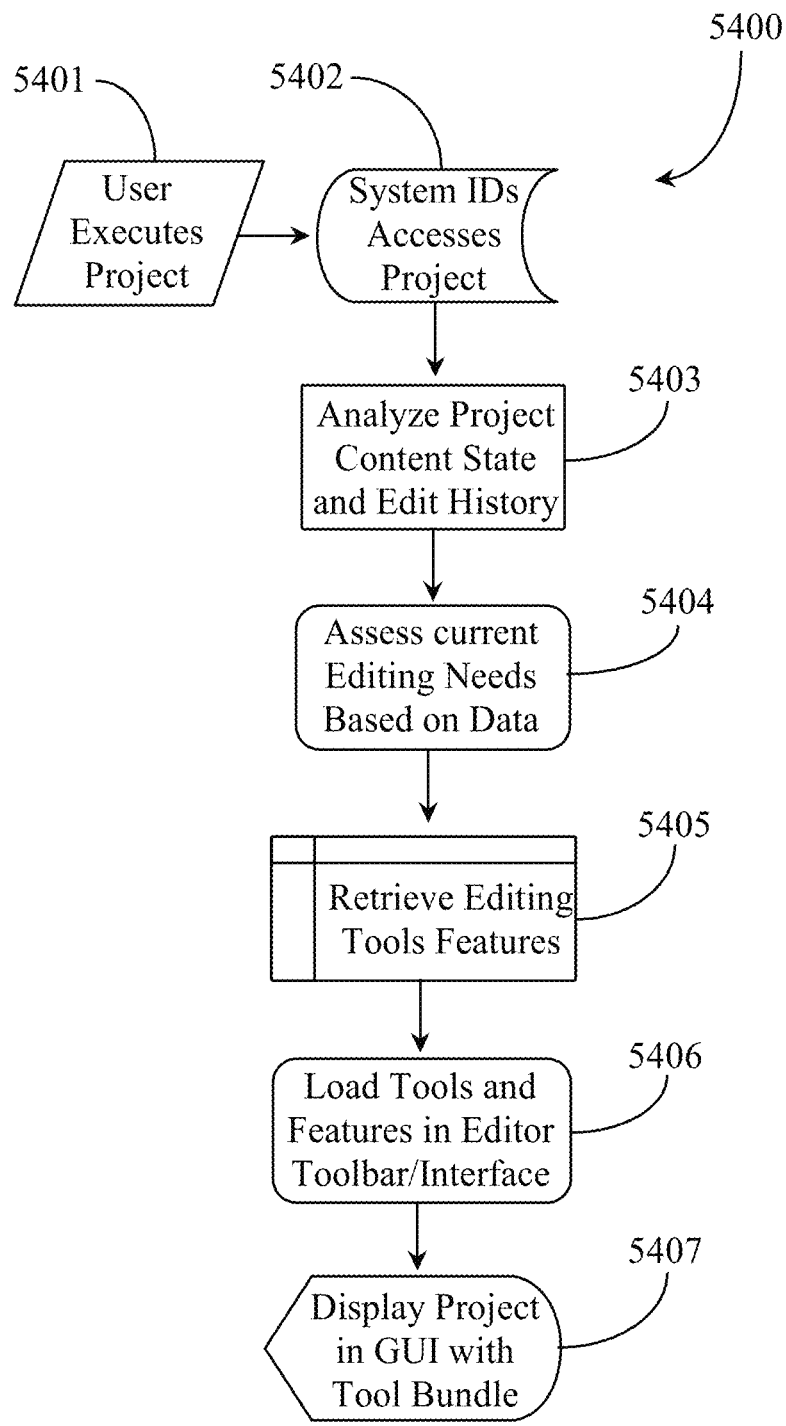
FIG. 54 is a process flow chart depicting steps for dynamic bundling and delivery of editing tools in an editor based on user preference and project analysis.

FIG. 54 is a process flow chart 5400 depicting steps for dynamic bundling and delivery of editing tools in an editor based on user preference and project analysis. Process 5400 assumes the user is logged onto the server and is in session. At step 5401, the user executes a project to work on. At step 5402, the system identifies (IDs) the project and accesses the project and project content.

At step 5403, the system analyzes the project including content state and editing history. In this process, the system analyzes the template and template functions, project content population state, and editing history. At step 5404, the system assesses current editing needs based on the analyzed data. Certain editing tools, features and functions may or may not be needed based on the type of project template underlying the project; the state of the existing content within the project; and discovery of historical norms of editing within the project spanning one or more previous editing sessions engaged in by the user relative to the project.

For example, if the project template underlies a photo book, certain tools may be indicated by default for photo book editing, whereas if the template is an invitation card, certain other editing tools and features may be indicated in a default setting. If the project is full of content that has been repeatedly edited, the system may access the list of the last editing tools and features that were bundled together and presented to the user.

In one embodiment, a user may have stated preferences for certain types of editing tools and features for specific types of projects. In this case, the system may also access these user preference settings, which may be specific to template type. In another embodiment, the system may analyze the recent history of user editing tools and feature use and analyze statistics of actual editing activities on the project and for similar projects.

At step 5405, the system retrieves editing tools and features, including plug-in components and extensions that are indicated as needed by the system as a result of analysis performed in steps 5403 and 5404. At step 5406, the system loads the retrieved editing tools and features, including any indicated plug-ins and extensions into the user's toolbar(s) and GUI interface. Plug-ins may include external tools adapted to work in the editing interface as a plug-in component. Extensions may include extensions to a posting board or text communication interface, extensions to other graphics editing programs, or extensions to social interaction pages. At step 5407, the system displays the user's project in the GUI with the customized tool bundle.

In one embodiment, the user receiving the customized bundle may further customize the editor based on planned future activity or current needs using an update feature or settings feature for adding content in the form of different editing tools and features. The variety of editing tools and features delivered to the user might vary considerable based on system findings and needs assessment. For example, if the user selects a blank template and has not yet added content, then the system may provide a fuller suite of editing tools and features in anticipation of their use on added content. On the other hand, if the user selects a project that is fully populated with content that has already been edited and the user is currently working on text for the last few sessions, perhaps photo editing tools and features would be omitted from the custom bundle.

In one embodiment, longer term editing history could be analyzed and statistics relative to tool use and feature use percentages might be compiled for use in steps 5403 and 5404. For example, if usage of photo effects filters is constantly below a certain threshold, such tools may not be bundled in by default but made available if requested by the user. In some cases a user's preferences may be for the system to set certain photo effects, text effects, and content management tasks. In such a case, those particular tools and features controlling such effects and enabling such tasks may be omitted from the custom interface, but made available through a settings configuration interface adapted for the purpose of adding, deleting, or toggling certain editor settings or features.

It is noted herein that a user may have more than one project in progress on the system. Therefore, the user may receive a different bundled editor depending in part of the project type. Likewise, if a user receives a bundled editor at 5407 and during subsequent work the system observes a need for a tool not originally delivered with the bundle, the system may suggest or recommend additional editing tools or features to the user where if accepted, the tools or features are delivered as plug-ins to the interface. There are many possibilities.

Client Cache Management of Data

Figure 55:
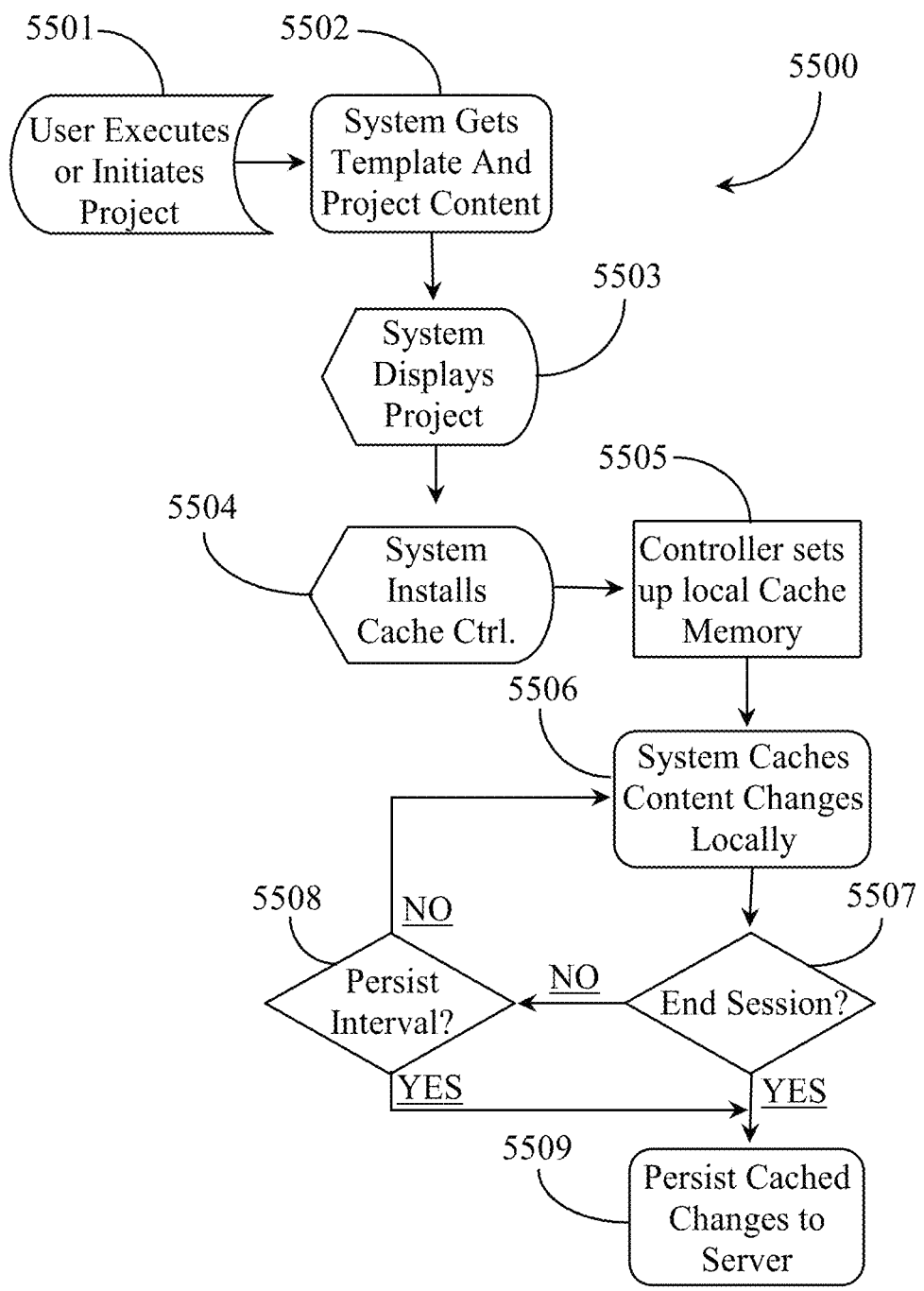
FIG. 55 is a process flow chart depicting steps for marking data for persistence according to an embodiment of the present invention.
Figure 56:
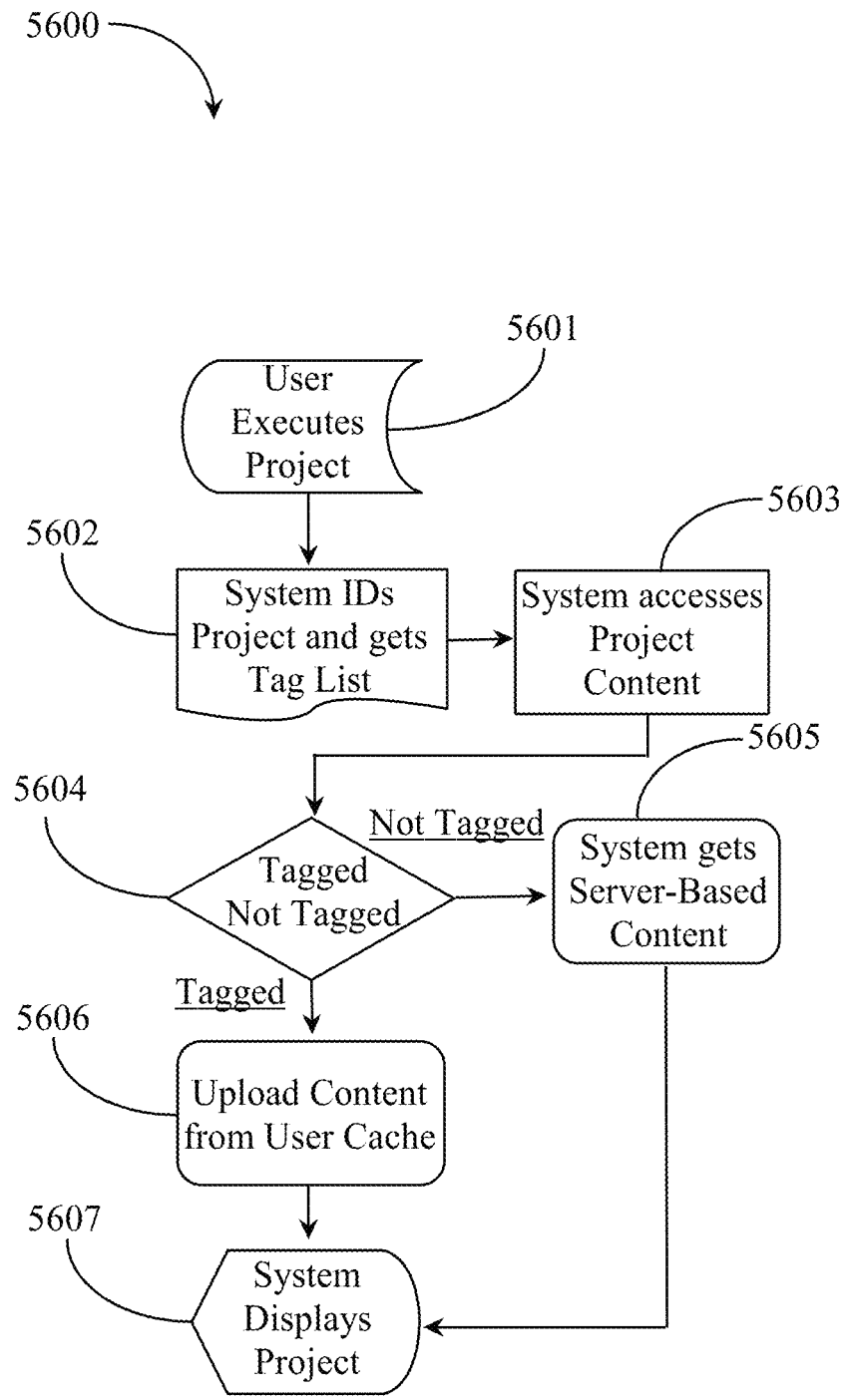
FIG. 56 is a process flow chart depicting steps for persisting data at a subsequent user session with the same project.

FIG. 55 is a process flow chart 5500 depicting steps for caching data locally on the client for persistence according to an embodiment of the present invention. FIG. 56 is a process flow chart 5600 depicting steps for persisting data at a subsequent user session with the same project.

Referring now to FIG. 55, it is desirable that users do not lose any data in the event of session termination while working on project. It is further desirable that session performance over the server/client connection established is optimal in terms of retrieving and presenting or rendering the latest assets or content in a user's project. Therefore, the inventors provide a data persistence method for optimizing content retention and content rendering that involves storing all changes a user makes that would result in a server call in local cache and persisting those changes to the server at certain intervals of time or in the event of un-planned or planned session termination.

Chart 5500 represents a user's first data session where components are established for local caching and persistence of user changes resulting from user activity in the session. At step 5501, a user initiates a new project or executes an existing project to build onto and edit. At step 5502, the system identifies and gets the project template and the associated project content. Content includes text assets and graphics assets. At step 5503, the system displays the project for the user.

At step 5504, the system may download and install a cache memory controller to aid in sequestering some cache memory for local data storage. In one embodiment, users are prompted about whether or not a user wants to store data locally for persistence in session. In another embodiment, local cache is leveraged on the client appliances by default. At step 5505, the cache controller component sets up and manages a portion of local cache memory. In one embodiment the memory allocated for a "data reservoir" is random access memory (RAM).

At step 5506, the system may cache any changes in content made by the user. For example, a user may ad a photo, a caption, may move an item, swap one photo for another, etc. In a preferred embodiment, every user action that results in a server call is cached locally in a manner that preserves the latest "version" of the data class and state in cache with older changes overwritten in cache where appropriate. This data may be persisted to the server at X intervals.

At step 5507, the system may determine if the current session will end. A session may end in a planned fashion or a session may end unexpectedly. This determination may be enabled by such as an "end of session" or a "logout" routine informing the system that the session will end or is ending by action of the user. If at step 5507, the system has determined that a session will end as initiated by a user, the system may persist (upload) the locally cached changes to the server at step 5509. If the session has ended unexpectedly at step 5507, then step 5509 may occur when the user re-establishes the session. It is noted herein that the user actions cached locally are rendered locally on the user display so that the user sees all of the changes locally even in the absence of persistence to the server.

If the system determines the session will not end at step 5507, the process may move to step 5508 where the system determines if a data persistence interval has arrived. A data persistence interval may be any interval of time the system uses to persist the data in cache to the server. If the system determines in step 5508 that a persistence interval of time has arrived during session, the server may persist the locally cached changes to the server. If the system determines that a persistence interval has not yet arrived at step 5508, the process resolves back to step 5506 where the system continues to cache the user actions locally.

In one embodiment, the system may, in addition to caching user actions resulting in server calls, cache certain project components locally on the user's machine. In this embodiment, the system may use a tagging schema to version content cached locally and stored at the server. For example, if a user's project has items that the user does not generally modify like a backdrop, stickers, or other content, that content may be cached locally and tagged for version. The user may then have a tag list cached locally that itemizes the content items and last modified versions.

Referring now to FIG. 56, the user executes a project at step 5601. At step 5602, the system gets the project identification (ID) and retrieves a project-associated tag list from user cache. The tag list represents the items cached locally and the current version and state of those items. At step 5603, the system locates the project template and associated content. In one embodiment, some assets are tagged for caching while others are not tagged for caching. System rules for what classes or types of content and how much of that content should be cached at the user appliance in-between data sessions depends in part on the project content type, available bandwidth, and the capacity of the local cache memory reserved on the user appliance. The system may rely on special asset rules for tagging and local caching.

At step 5604, the system determines against the tag list if an item inherent to the project is tagged (cached locally) or not tagged (stored at system level). If at step 5604, the system determines there is at least one item not tagged for local cache, the system gets the item or un-tagged items from server storage. However, if the system determines that one or more items are tagged, then those items are rendered locally from the user cache memory. The system may continue to tag and cache items to the user's cache depending on rules, device capacity, bandwidth, etc. For example, if background stickers for a project are tagged assets for local cache, introduction of a new sticker may result in tagging the new sticker and caching the new sticker locally with the other tagged stickers. If the new content is a text update, a style update, or size update, etc. made to text associated with a cached text asset, the system may overwrite the input in cache associated with that asset. In one embodiment, the text input may be cached while the associated asset is stored sever-side.

In one embodiment, the tag list informs the system which project content is cached and which project content needs to be served by the system. The tag list can be stored locally and retrieved by the system or it may be stored at system level without departing from the spirit and scope of the present invention. The tagging method may be practiced in conjunction with caching user actions in editing as was described further above.

At step 5604 the system determines as it accesses project content, if that project content is tagged or is not tagged. If at step 5604, the system determines that the project content is not-tagged, the system gets the server-based project content. If the system determines that project content is tagged, the system gets the content from the cache memory on the user's appliance. At step 5607, the system displays the content. In a preferred embodiment for most project types, some content is system served (not tagged) and some content is displayed from cache (tagged) and not served by the system.

It is noted herein that in one embodiment, local caching of content is made available to users who are working on projects in a non-collaborative way wherein only the user accesses the project. In another embodiment, local caching of content may be made available to multiple collaborators working on a project. To illustrate further, if there are three users working on a project A and all three have a cached version of asset C, the system might maintain the latest "version" X of asset C as modified or created as a result of an action by any one of the multiple collaborators. Upon subsequent session initiation with the same project, the collaborator that made the last modification resulting in tagged asset C version X, for example, has the asset version uploaded from cache. The previous version of asset C, which may be a tagged asset cached on the appliances used by other collaborators, may be deleted from cache as obsolete while the system serves the latest version from a system copy of asset C version X.

When the collaborators end sessions working on the project, each may have the latest version of asset C downloaded to cache if the asset is tagged for cache. Versioning enables the system to determine if the cached asset was replaced, deleted, or modified in collaborative projects. It is also noted herein that in collaboration, users may be working on different parts of a project at different periods of time. Each user that logs into the project is presented with the latest versions of the assets, from cache and or from server-accessible data sources associated with the portion of the project they are viewing in display such as the visible assets in a two-page spread of a multi-page photo book.

Content Proposals based on Gathered Information

In one embodiment of the present invention, the system may propose or recommend content to users working on projects based on current project and project content information gathered during project building and editing sessions.

Figure 57:
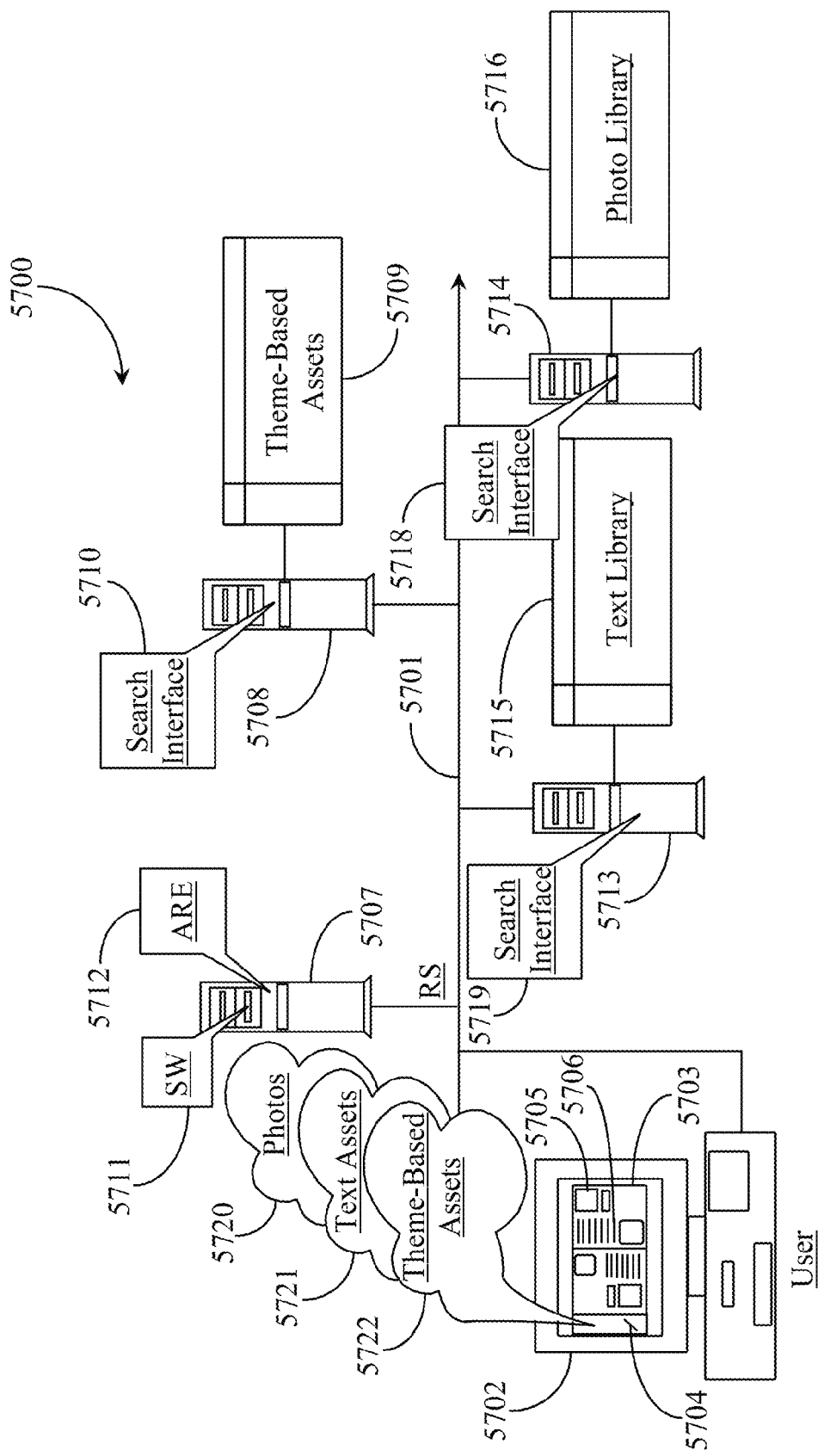
FIG. 57 is an architectural overview of a network supporting content proposals based on information gathering according to an embodiment of the present invention.

FIG. 57 is an architectural overview of a network 5700 supporting content proposals based on information gathering according to an embodiment of the present invention. Network 5700 is the Internet network in one embodiment and is further illustrated by a network backbone 5701. Backbone 5701 represents all of the lines, equipment, and access points that make up the Internet network as a whole, including connected sub-networks. Therefore, there are no geographic limitations to the practice of the present invention.

Backbone 5701 supports a user depicted as a computing appliance 5702. Appliance 5702 may be a mobile computing appliance connecting through a wireless network or a wired appliance connecting through a wired network. It is assumed in this example, that the user operating appliance 5702 has connection to runtime server (RS) 5707. Runtime server 5707 includes at least one processor, a connected data repository (not illustrated), and a non-transitory physical medium hosting an asset recommendation engine (ARE) 5712 analogous to ARE 2905 of FIG. 29.

ARE 5712 is already adapted to make content recommendations to users according to analyzed usage counts, friend relationships among the content creators, and content characteristics, like width and height, or content meta-data such as photo data. ARE 5712 may be integrated with SW 5711 running from the non-transitory physical medium of the server. SW 5711 is adapted to gather information in a project being worked on and then to analyze the information gathered to develop a primary list of keywords used in the project or relevant to the project. SW 5711 is further adapted to perform searches of one or more data sources for images and other assets using one or more of the primary keywords and to present one or more digital assets found or returned in the search to the one or more users working on the project. SW 5711 may include several components for gathering and mining information including text reader or text parsing components, snapshot components, screen scraping components, pattern recognition components, file reading components, etc.

Network backbone 5701 supports a server 5708 adapted to return theme-based assets stored in a connected repository 5709. Theme-based assets include stickers, shapes, frames, decorative borders, and other imagery available within the system that is artistically and digitally associated with a project theme known to the system. Server 5708 hosts a search interface 5710, which is machine operable via another server such as RS 5707 executing SW 5711. In one embodiment, SW 5711 may initiate a search of theme-based assets stored in repository 5709 by submitting one or more keywords from the primary list of keywords developed from information gathered from a user's project. Assets returned by server 5708 are rendered on the display of the user's appliance 5702 as theme-based assets 5722. Theme-based assets 5722 may appear as thumbnails, icons, or some other visual indication in a side bar 5704 in the GUI 5703.

In one embodiment, SW 5711 may through extension or API, access third party asset libraries to access photo and text assets for use in clients' projects. In some cases, the assets returned and kept or used by the system may be purchased from the third-party systems. In this embodiment, network backbone 5701 supports a server 5714 adapted to serve photos stored in a connected image repository 5716. Photo library 5716 may be a public or private library. Server 5714 hosts search interface 5718, which may be analogous in structure and function to search interface 5710. Server 5714 and assets stored in repository 5716 may be owned by a third-party as previously described.

Network backbone 5701 supports a server 5713 adapted to serve text assets stored in a connected repository 5715. Text library 5715 may be a public or private library. Server 5713 hosts a search interface 5719, which may be analogous in function and structure to search interfaces 5718 on server 5714 and interface 5710 on server 5708. In one embodiment, text library 5715 contains famous quotes or sayings including metadata about the quotes or sayings such as authors, time coined meaning, etc. In one embodiment, photo library 5716 includes photo metadata including, place (geo-location), time photo was taken, subject identification, and other description. In this embodiment, picture file data may also be available such as pixel resolution, height, width, file extension, etc.

SW 5711 may initiate searches for photos in photo library 5716 through search interface 5718 by submitting one or more keywords from a list of primary keywords formed from information gathered in a client's project. Photo assets returned to server 5707 may be displayed in sidebar 5704 as photos 5720. SW 5711 may likewise initiate a search of text-based assets in text library 5715 through search interface 5719 on server 5713. Text assets returned to RS 5707 may be displayed in sidebar 5704 of interface 5703 as text assets 5722. Indication of the returned text assets may be indicated by thumbnails, short title blocks, expandable summary blocks, or other visual indicators.

In this embodiment, the user operating appliance 5702 is working on a project displayed in interface 5703 as a two page spread containing project content in the form of photos like photo 5705 and associated caption boxes, and text columns, like text column 5706. Photos that might be used in a project include may include metadata like geographic location information, time and date of the photo, identification of the photo subject, etc. Text entries like captions, titles, and text descriptions or descriptive writing in a project may be mined for information that may reveal content including primary theme, repeated subject descriptions, opinions, stating of ideals or principles, and so on.

As a user works on a project and adds content, the system may mine the project content for information. This process can occur when users are building and editing a project online or it may be accomplished offline by mining the data in the project database, or both. SW 5711 mines data from project 5703 and looks for prominent subjects, ideas, themes, places that are prevalent data in the project and that might be repeated throughout the project. SW 5711 then generates a list, pool, or cloud of specific keywords or phrases that characterize the prevalent content in the project and that may be later used as search criteria by the system to return specific assets that might be relevant to various aspects of the project.

Tags and meta-tags may be included in the project data mined as well as information that is recognized such as facial recognition of persons in project photos, technical data such as styles, fonts, photo dimensions, and the like. In one embodiment, information gleaned from a project may be broadened or generalized and expanded through associating data with other data or external data providing more information that might be discovered or inferred by the system from the initial data analysis. For example, if there are several photos of places in a project about a trip to Europe, the system may analyze the photo metadata and text associated with those photos and generate prominent or primary keywords that can be used singly or in combination to retrieve more photos showing European themes or more places, famous quotes from European figures in history, or theme-based stickers or shapes that might be related to Europe.

If a project contains text that is about a subject like the museum of natural history in New York City, and the text is prevalent throughout the project, keywords might be generated from the text that can be used to search or assets the may relate in some measure to the theme museum of natural history in New York. The assets may be presented to the user as theme-based assets 5722, text assets 5721, and photo assets 5720. The user may browse and select such assets for inclusion into the project. In one embodiment, the system extends the class of mined data to audio data that might be linked to or embedded within the project.

In an offline mode, the system may routinely access project content in open projects and mine the existing data perform one or more data searches using the appropriate keywords, and have new content for presentation to the user at the next session. There are many possibilities such as accessing data from external sources and proposing audio data. In one embodiment, the system may search for background music to play along with an automated slideshow of the project where the background music selections are compiled based on information retrieved from the project. For example, in a photo book about a vacation in Hawaii, information from the project such as place names, regions, island identifications, etc. may lead to keywords that can be used to search a database of Hawaiian music that returns music clips or selections that relate to the subject and theme of the project and to more granular aspects of the project in some cases. As a project receives more and more content, the system may use the added information to search for yet additional content that might be presented to users.

Selection and Management of Image Assets

In one embodiment of the invention, a photo picker application is provided that includes a photo container or tray component that displays selected photos in an editable state, in their correct aspect ratios (portrait, landscape, square), and reveals the current order of the selected photos in the project.

Figure 58:
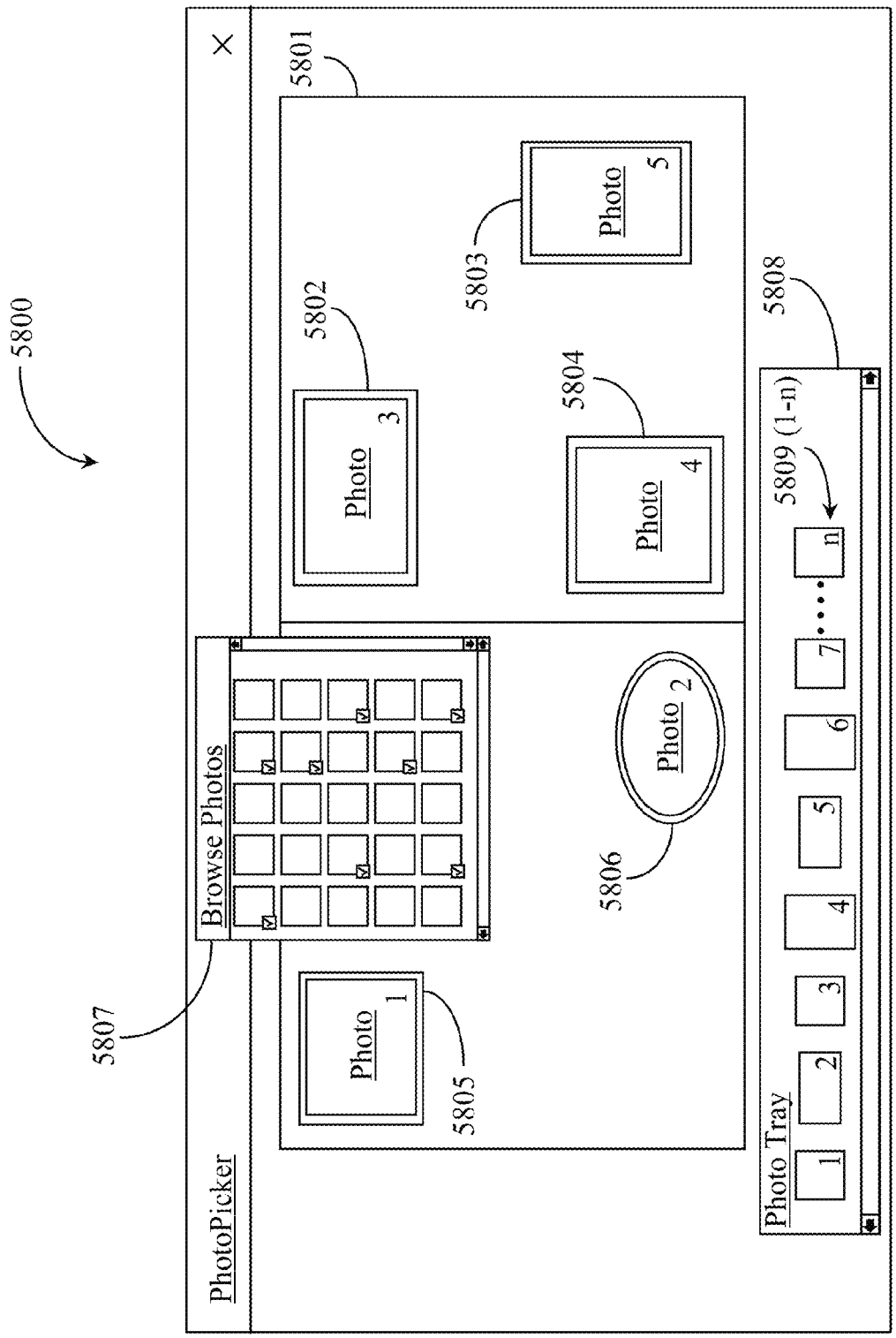
FIG. 58 is an exemplary screen shot of a graphics user interface supporting photo selection and management for project enhancement according to an embodiment of the present invention.

FIG. 58 is an exemplary screen shot of a graphics user interface 5800 supporting photo selection and management for project enhancement according to an embodiment of the present invention. GUI 5800 has an image-based project 5801 opened and displayed within the interface. It may be assumed in this example, that project 5801 is a multi-page photo book opened to the first two pages. Project 5801 includes a number of photo slots arranged on the first two pages of the project. These are a photo slots 5805 and 5806 on the first page and photo slots 5802, 5803, and 5804 on the next page in this view. Photo slots 5802 through 5806 are adapted to contain photos for display.

In current tradition photo pickers enable a user to select photos for addition to a photo project, however the user has to engage in additional steps to preview the selected photos, and to add those photos into a project. In one embodiment of the invention, a photo picker application is provided that includes a photo container or tray 5808. Photo tray 5808 is adapted to contain and display photos that have been selected by a user from a list or pool of available photos displayed in a photo browser interface 5807. Browser interface 5807 may display photos that are held locally on the user's computing appliance, on a peripheral memory card, flash stick, or other portable medium, or photos located elsewhere on the network.

Window 5807 displays 25 photos in this example and is scrollable to reveal additional photos. In this case, each displayed photo includes a small selection box that may be checked by a user to indicate photo selection or unchecked to indicate non-selection. In this embodiment, there are eight photos selected by the user for addition to the project. The eight selected photos are loaded into photo tray 5808 as selected photos 5809 (1-n). Photo tray 5808 is scrollable to reveal more selected photos beyond what may be viewed in the tray window space. Browser interface 5807 and tray 5808 may be expanded in size to reveal more workspace and thus more photos.

In one embodiment, selecting photos for addition to an image-based project leads to a default order of photos that will be added into the available photo slots in the default order page by page in the project until all of the photo slots contain a photo. In this example, the photos 5809 are numbered 1 through n. In this example, the top-left selected photo in interface 5807 correlates to photo 5809 (1) in photo tray 5808, the selected center photo in the next column of photos correlates to photo 5809 (2) and so on. Other default sequence orders for photos added to project 5801 may be observed without departing from the spirit and scope of the present invention.

In one embodiment, the SW may include logic for suggesting an order of presentation of the selected photos in the project based on certain attributes or a combination of several attributes of the selected photos. All of the photos are displayed as thumbnails in browser interface 5807, but in tray 5808, they are displayed in their correct aspect ratios. In one embodiment, aspect ratios might be considered in photo order as suggested by the system during a remix. In one embodiment, browser interface 5807 (photo selector) and tray 5808 (photo container) are adapted for use on mobile computing appliances such as a smart phone, android device, or similar appliance that may have somewhat limited display screen dimensions. However, the same configuration may also be used in the case of full size displays typical with larger laptop and desktop appliances.

In practice, when a user selects a photo from within interface 5807, that photo is copied and transferred into photo tray 5808 as an editable thumbnail. A user may manually change the order of photos in tray 5808 by selecting them and dragging them out of line and dropping them into another position in the line, or by cutting them and pasting them at another position in the line of photos. In this example, no photos have been added yet to project 5801. However, each photo slot may be adapted to reveal the default order of the photos relative to the photo slots on each page. In this example the five photo slots will contain the first 5 selected photos 5809 (1-5) by default order. If the user adds another photo slot to one of the pages, the SW detects the addition and readjusts the order of selected photos. For example, if the user adds a new photo slot to the first page beneath photo slot 5805, then it would be the target receptacle for photo number 5809 (2) and photo slot 5806 would then be assigned to display photo 5809 (3), etc.

In one embodiment, a user may mouse over or right click any of the photos in tray 5808 in order to view properties like aspect ratio, photo dimensions, pixel resolution, main color theme, color saturation, and other similar properties or attributes of the photo. In one embodiment, a user may right click any of photos 5809 (1-n) in order to bring up the photo in a photo editing application. In one embodiment, the user may view a larger image of any of the photos 5809 (1-n) by right clicking on the photo and selection that option from the right-click menu. The combination of components (browser list and tray) enables users to choose photos as well as preview photos and always see the photos they have selected even if they scroll past them in the browser list interface.

Mosaic Design Patterns for Project Covers

Figure 59:
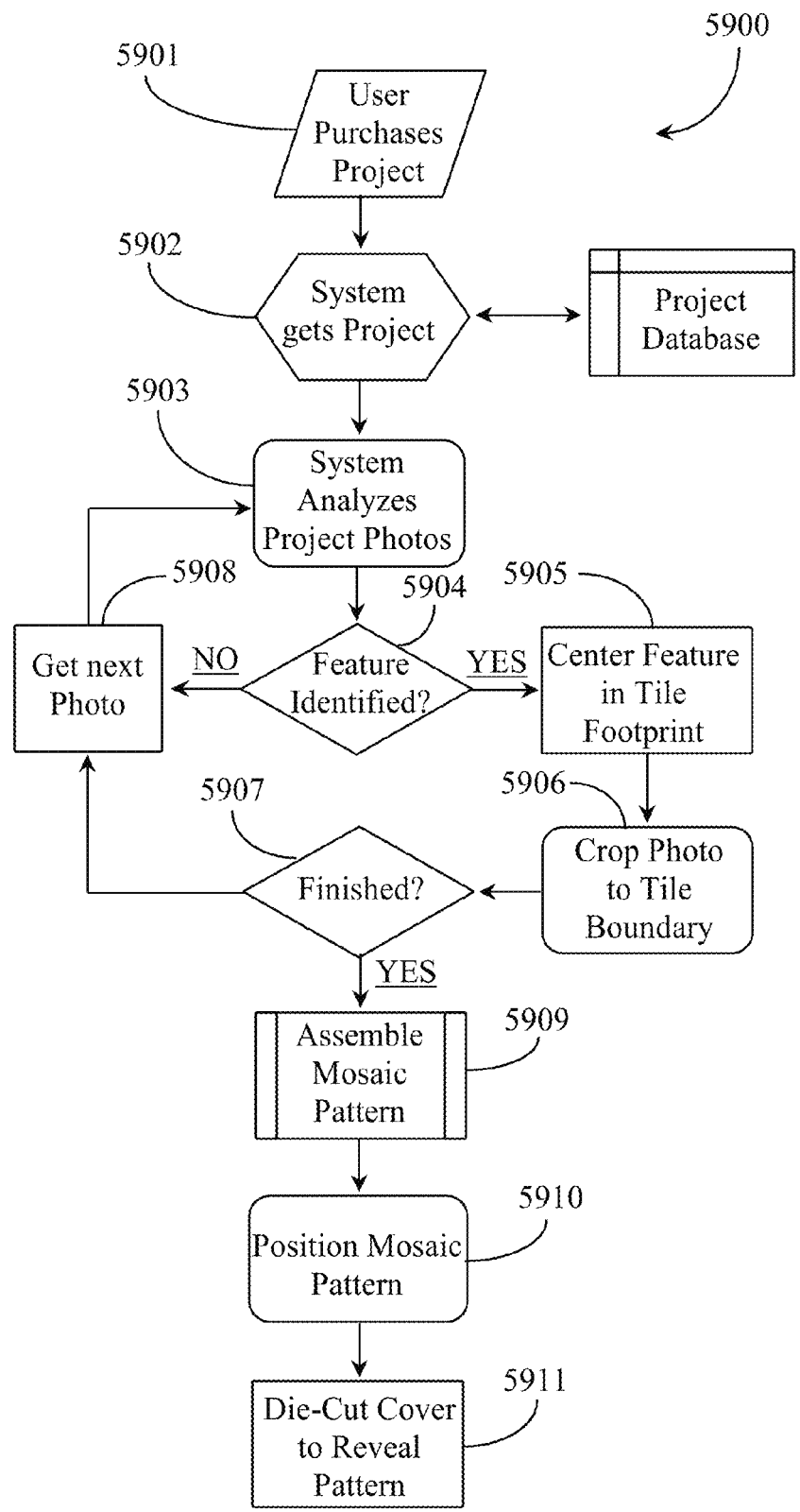
FIG. 59 is a process flow chart depicting steps for generating a mosaic pattern of photos for an image-based project according to an embodiment of the present invention.

FIG. 59 is a process flow chart 5900 depicting steps for generating a mosaic pattern of photos for an image-based project according to an embodiment of the present invention. Process 5900 assumes that a user has built and edited an image-based project online and is ready to order the finished product. At step 5901, the user purchases the project. This step is not specifically required to practice the present invention, but because this process involves die-cutting, likely the die-cutting process and printing process would be performed by a same vendor after product purchase. In both instances (die-cutting and printing), the system prepares the project before routing a digital order for final processing (die-cutting and printing).

At step 5902, the system retrieves the project from the project database or other suitable storage. An image-based project includes a number of images, each typically presented in a photo slot, photo well, or in some similar image container. At step 5903, the system analyzes the project photos. It is noted herein that each photo presented in a photo slot or photo container may not be cropped to fit the container boundaries. That is to say that the portion of the photo extending outside the boundaries of the container is not visible to the user. However, in one embodiment, a photo may be cropped to fit within the container boundaries without departing from the spirit and scope of the present invention.

At step 5903, the system "looks" for features that are visible within the photo container boundaries and that might be central to that particular photo. For example, if the photo is of a person, the system may focus on the face of the person as the most important feature of that photo to use in a mosaic pattern. If the photo is of a church, perhaps the system will focus on the entry way of the church or the signage or name placard of the church. If the photo is of an animal, the system may attempt to focus on the entire animal or a part of the animal.

At step 5904, the system determines if a distinguishing feature of an analyzed photo has been identified. In one embodiment, the system is limited in that it may only focus on features of a photo that are visible (user's perspective) within a given photo slot. If at step 5904, the system does not identify a specific feature in a photo analyzed at step 5903, the process may move to step 5908 where the system may get a next photo and skip or "forget" the photo for which a feature was not identified. It is noted herein that a mosaic pattern might be created of a few photos in a project, several photos in a project, or all of the photos in a project.

The number of photos used in a mosaic design depends on the pool of available photos in the project that have identifiable features. In one embodiment, a photo that has no system-identifiable feature might still be used in a mosaic design without departing from the spirit and scope of the present invention. Identification of primary features in photos is practiced for aesthetic purposes. Pattern recognition of shapes can be used as one method for optically identifying the image features supported generically in a database. For example, a pattern recognition database can be used to store shapes for comparison in photo analysis.

If the system identifies a primary feature in a photo at step 5904, the process moves to step 5905 where the system centers the feature according to the mosaic tile footprint of the tile of the mosaic pattern that will present the feature of that particular photo. In one embodiment, the mosaic pattern of tiles represents the compilation of the selected photos centered in the photo slots or photo wells used in the project. In this case, a tile is a photo container with the photo inside. The photo-containers may be presented at specific core aspect ratios such as portrait, landscape, or square. A combination of these aspect ratios might be incorporated into a mosaic design.

In another embodiment, the photos selected for the mosaic design are centered in mosaic tiles that function as photo containers but are not the same photo slots used in the project. The tiles capture the desired features identified in the photos and that are centered with respect to the tile boundaries at step 5905. In one embodiment the photos are cropped to fit the respective tile footprints at step 5906. In another embodiment, the photo portion extending past the tile boundaries is masked and is transparent to the user.

At step 5907, the system determines if it is finished applying the photo features to the mosaic tiles. If the system is not finished at step 5907, the process resolves back to step 5908 where the system gets the next photo for processing. If at step 5907, the system is finished with all the design tiles, the system assembles a mosaic pattern using the processed "photo tiles" at step 5909. In one embodiment, the system may have several pre-conceived design models for mosaic patterns and may select one of those designs based on the number of photos successfully processed in the project. A pattern may contain only a few photos or it may contain many photos without departing from the spirit and scope of the present invention.

In one embodiment, the system may use theme-based images that are system sourced and therefore not photos submitted by a user in combination with photos submitted by the user in a same mosaic pattern. Motivation for using filler images might be that a given mosaic pattern has X number of tiles but the user only has Y number of photos in the project where Y is <X. It is noted herein that the die-cutting service vendor, whether it is the print vendor or not must have the applicable dies for cutting the mosaic pattern through the book cover.

At step 5910, the system positions the mosaic pattern on a canvas page (digital) dedicated for the purpose facing the inside cover of the book. If the pattern is large it may be centered on the cover. If the pattern is small it may be moved to an off-center coordinate. In one embodiment more than one mosaic pattern may be generated for a same project. It will be apparent to one with skill in the art of die-cutting that the method of the invention can be practiced with image-based products other than photo books, such as photo cards, photo posters, photo calendars, etc. without departing from the spirit and scope of the present invention. It will also be apparent that the pattern may be presented on another page in a product other than the front cover such as an internal page or the back cover, for example.

Mobile Application

Referring now to FIG. 1, the present invention may be practiced on a mobile appliance such as on laptop computing appliance 122 or on smart phone 124. Bandwidth dependant devices may be optimized to better practice the present invention, in one embodiment, through provision of a mobile application that is tailored for such mobile appliances.

Figure 60:
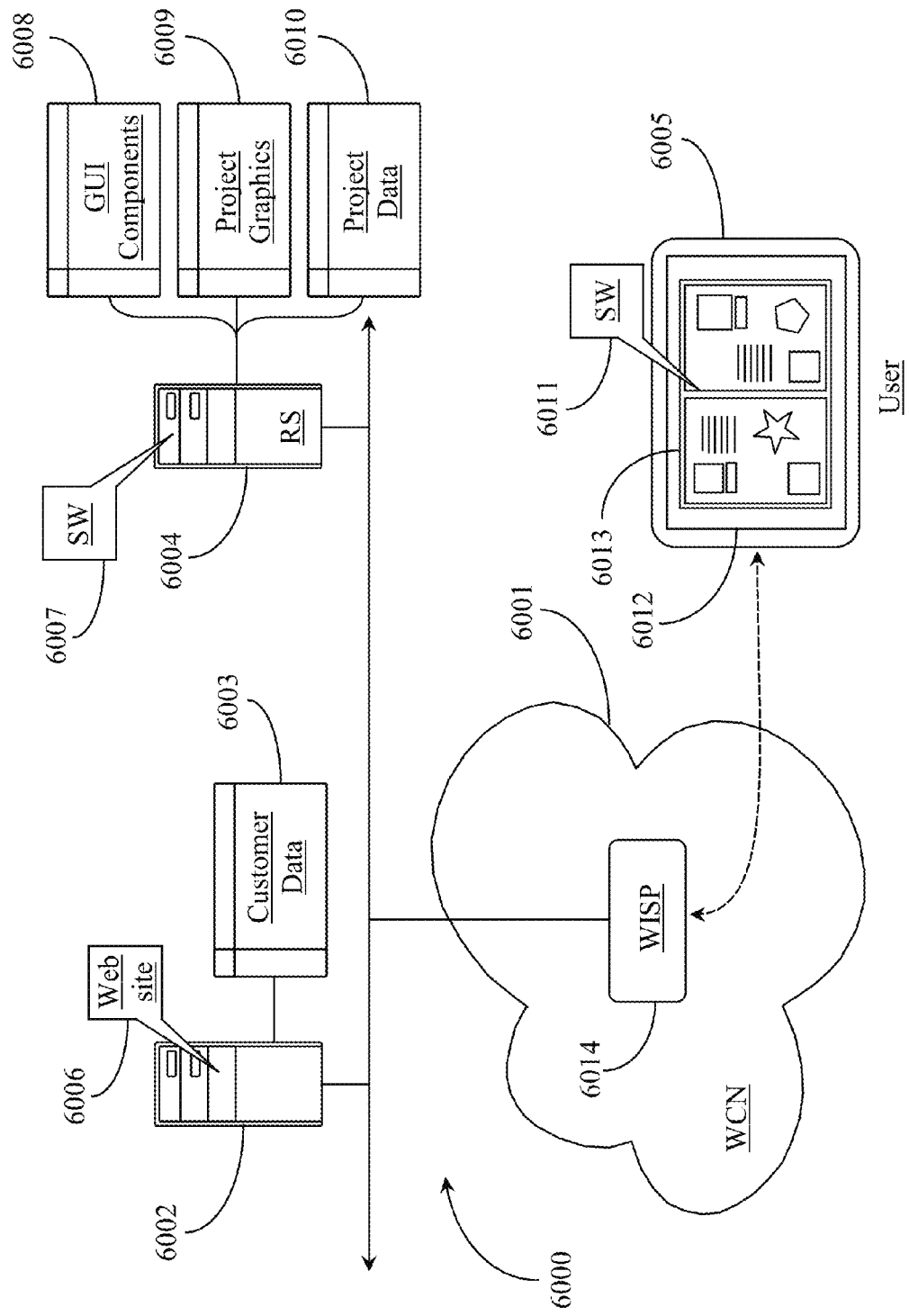
FIG. 60 is an architectural overview of a fulfillment network supporting the initiation, building, and editing of image and or text-based projects from a wireless computing appliance.

FIG. 60 is an architectural overview of a fulfillment network 6000 supporting the initiation, building, and editing of image and or text-based projects from a wireless computing appliance. Network 6000, which may be the Internet in one embodiment, supports a Web server (WS) 6002 hosting a Website 6006 where users such as one operating a wireless computing appliance 6005 may register with a service to initiate, build, edit, and eventually purchase image and text-based projects like photo books, calendars, cards, posters, and other products. WS 6002 has connection to a data repository 6003 adapted to contain customer data of customers of the service.

Customer data may include customer identification such as name, address, and contact information. Customer data may also include log-in data, billing information, and transaction history. In one embodiment, when a user registers for the service at Website 6006, that user may register to access the service from a wireless appliance like wireless computing appliance 6005. Wireless computing appliance 6005 may be a smart phone, an I-pad, notebook, nook, or android device with a display and input mechanism such as a physical "dock-able" keyboard or touch screen.

In this embodiment, a user operating appliance 6005 connects to Website 6006 hosted on server 6002 through a wireless carrier network (WCN) 6001 and a wireless Internet service provider (WISP) 6014. Wireless mobile appliances may experience some bandwidth limitations from time to time that are inherent with many wireless methods of connecting to the Internet. Mobile computing appliances are many-times referred to as "light" devices, which may rely on "light" operating systems, wireless application protocol (WAP) Internet page service protocols, and so on to help optimize Internet services made available through such appliances. During the registration process at Website 6006, the user may request and register for a special "light" service for wireless appliances such as appliance 6005.

Network 6000 supports a runtime server (RS) 6004 that facilitates project initiation, build, edit, preview, and fulfillment. Server 6004 hosts software (SW) 6007 that includes all of the functional software components for facilitating the service for both wired and wirelessly connected computing appliances. Computing appliance 6005 includes a display 6012. In this embodiment, display 6012 may be a touch screen display. In this embodiment, display 6012 includes an open image- and text-based project 6013. Project 6013 may be a photo book or a similar type of image and or text-based project.

The user operating appliance 6005 logs into Web site 6006 and is redirected to RS 6004 to engage in project services. In this regard, Web site 6006 may offer a mobile application to the user, which is operable on a lightweight operating system (OS) and browser version. In one embodiment the user downloads the mobile application indicated in this example as software (SW) 6011 executing from computing appliance 6005. SW 6011 includes at least a user interface (UI) for enabling at least preview of project 6013. The UI may include some build tools such as a photo selector component similar to photo browser interface 5807 and a photo management tray like photo tray 5808 described above with reference to the description of FIG. 58.

The browser interface for selecting photos (5807) enables the user operating appliance 6005 to select their photos from a device library of photos contained in internal or peripheral memory. The image or photo management tray (5808) enables the user to organize and preview the selected photos including visualizing the correct aspect ratios and properties of the selected photos and visualizing the order that the selected photos will appear in project 6013. The UI may also include links to server-hosted editing tools for font, graphics, etc.

SW 6011 may also include one or more components to support purchasing transactions and order tracking of purchased projects. Such a component or components may include an interface for entering shipping information and payment information and an update interface for tracking the order relative to production and shipping of the order. In one embodiment, the mobile application is first downloaded from Web site 6006 and installed on computing appliance as SW 6011. In another embodiment, the user registers to receive the application download, but the mobile application is actually downloaded from server 6004 when the user first engages the server to initiate a project. In one embodiment, the mobile application includes identification of a proxy server and a bandwidth optimizer for compressing images and graphics for faster download to and upload from mobile computing appliance 6005.

In use of the present invention, a user operating appliance 6005 connects to Web site 6006 and registers for services including service to a wireless mobile appliance such as a smart phone, for example. At project initiation, server 6002 or server 6004 downloads the mobile application (SW 6011) to mobile computing appliance 6005. RS 6004 has connection to data repositories 6008 containing GUI components including components for wireless applications, 6009 containing project graphics, and 6010 containing project data such as text and templates, etc.

Once SW 6011 is installed on appliance 6005, the user may re-connect to RS 6004 and initiate a project for build. Project 6013 is in display on appliance 6005. The user may build edit, order, preview, and track the progress of the order. Wireless application 6011 may also benefit from various bandwidth saving optimizations described previously in this specification like processes revealed in the flow charts of FIG. 49, FIG. 50, and FIG. 55 of this specification relative to image processing and local caching of assets on the client device.

Text Input on Space-Limited Displays

Space limited displays, such as those on mobile phones for example, are not large enough to facilitate form filling on multi-line forms. The inventors provide a method for populating multi-line forms on a device that has a space-constrained display.

Figure 61:
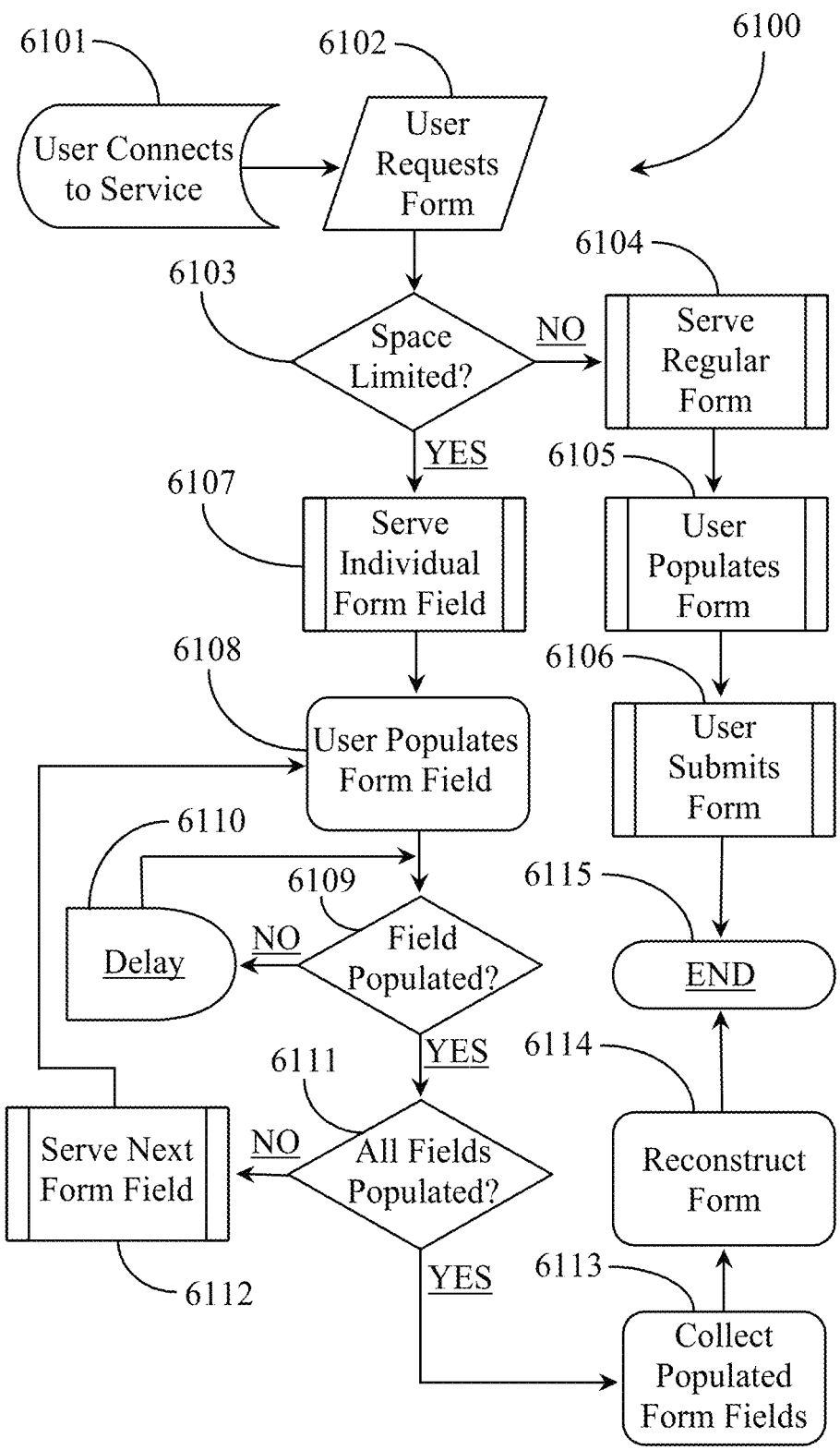
FIG. 61 is a process flow chart depicting steps for form field population on a space-constrained device according to an embodiment of the present invention.

FIG. 61 is a process flow chart 6100 depicting steps for form field population on a space-constrained device according to an embodiment of the present invention. With respect to chart 6100, it is assumed that the user has logged into the service and has initiated a process that involves form filling. It is noted herein that digital forms might be required to be populated for processes like user registration for services and, in certain circumstances, when a user is involved in project creation. A digital form is an electronic form or text interface that includes more than one form field for data population.

At step 6102, a user requests a digital form for population. Such a request may be a direct request where the form is specified or a general request for initiation of a process where populating a digital form is required for process initiation or in process resolution. At step 6103, the system makes a determination whether the user is operating an appliance with limited display space such as a cell phone, smart phone. If the system determines that the user is not operating a display or space limited appliance, the system serves the regular complete digital form for data population at step 6104. In this case, the user populates the form at step 6105 and submits the populated form at step 6106. The process for the user then ends at step 6115.

If the system determines that the user is operating a space-limited appliance at step 6103, the system may serve an individual form field of the digital form at step 6107. The individual form field represents a digital form field that is modular and that can be docked to and undocked from the parent form. Typically, the first form field served to the user is the first form field appearing in the digital form that requires some data population. In one embodiment, the parent digital form may be viewed as an object container and the individual form fields are objects that can be transferred over the network as single objects tracked to the parent object or object container such as by tagging or other indicative marking methods.

At step 6108, the user receives and populates the individual form field using a physical or touch screen enabled key pad, key board. In one embodiment, the individual form field may be auto populated using data already known to the system when served to the user at step 6107. In this case, the user may simply preview the individual form field and make any manual data corrections that may be necessary at step 6108. At step 6109, the system determines if the individual form field has been populated. The system may determine this in one embodiment by monitoring the process on the user's appliance through the server/client connection.

If the system determines that the individual form field is not populated at step 6108, the process experiences a delay at step 6110 before the process resolves back to step 6109 where the system again attempts to make the determination. If the system determines that the individual form field is populated at step 6109, the system checks at step 6111 whether all of the individual form fields have been populated with respect to the parent digital form. In one embodiment, the user invokes a command such as "next" or "enter" when the user has finished entering data into an individual form field telling the system to serve or display the next individual form field for data population. In one embodiment, the system simply accounts for any un-served form fields of the digital form waiting for service to the user appliance. In another embodiment, the system might have served all of the individual form fields of the digital form to the user at step 6107 but displays only one form field at a time to the user, such as from the user's local cache memory.

If the system determines that all of the form fields associated with the digital form requested at step 6102 have not been populated at step 6111, the system may serve the next unpopulated individual form field at step 6112. In a case where all of the form fields are in user cache, the system may simply display the next unpopulated form field for data population. In one embodiment, once a form field is populated, the system displays the next form field over the last populated form field. In another embodiment, the previous form field may be minimized or moved out of the display space to make room for the next form field. In a preferred embodiment, the individual form fields contain "helper text" that is instructive of the type and form of data required in the form field such as a label or an example text. Such helper text disappears when the user begins populating the form field.

The process then loops back to step 6108 where the user fills out the individual form field displayed. The process then repeats steps 6109 and 6111 until the system makes a determination that all of the individual form fields served in steps 6107 and 6112 have been populated. In this case, the process moves to step 6113 where all of the populated form fields may be collected from the user appliance (uploaded to the server). In one embodiment, the system may collect populated form fields serially as they are populated using an automated upload feature that automatically uploads finished form fields.

At step 6114, the system reconstructs the parent digital form containing all of the populated form fields in their correct docking points in the parent form. The system may, in one embodiment, reconstruct the digital form on the client appliance before uploading the entire form. In another embodiment, the system may collect all of the populated form fields in one data upload session and reconstruct the parent form at the server. The process then ends at step 6115. In one embodiment, when the user is populating the last unpopulated form field, a system pop up notification may appear informing the user that there are no more fields to populate with a submission button for the user to initiate upload of all the populated form fields or form if it is reconstructed on the client appliance.

Pre-Filling Address Based on Zip Code Entry

Form population on a mobile device is more time consuming and tedious than on a desktop or notebook computing appliance as was described further above. The inventors provide a method for auto population of certain address information for clients whom are required to submit such information relative to form processing.

Figure 62:
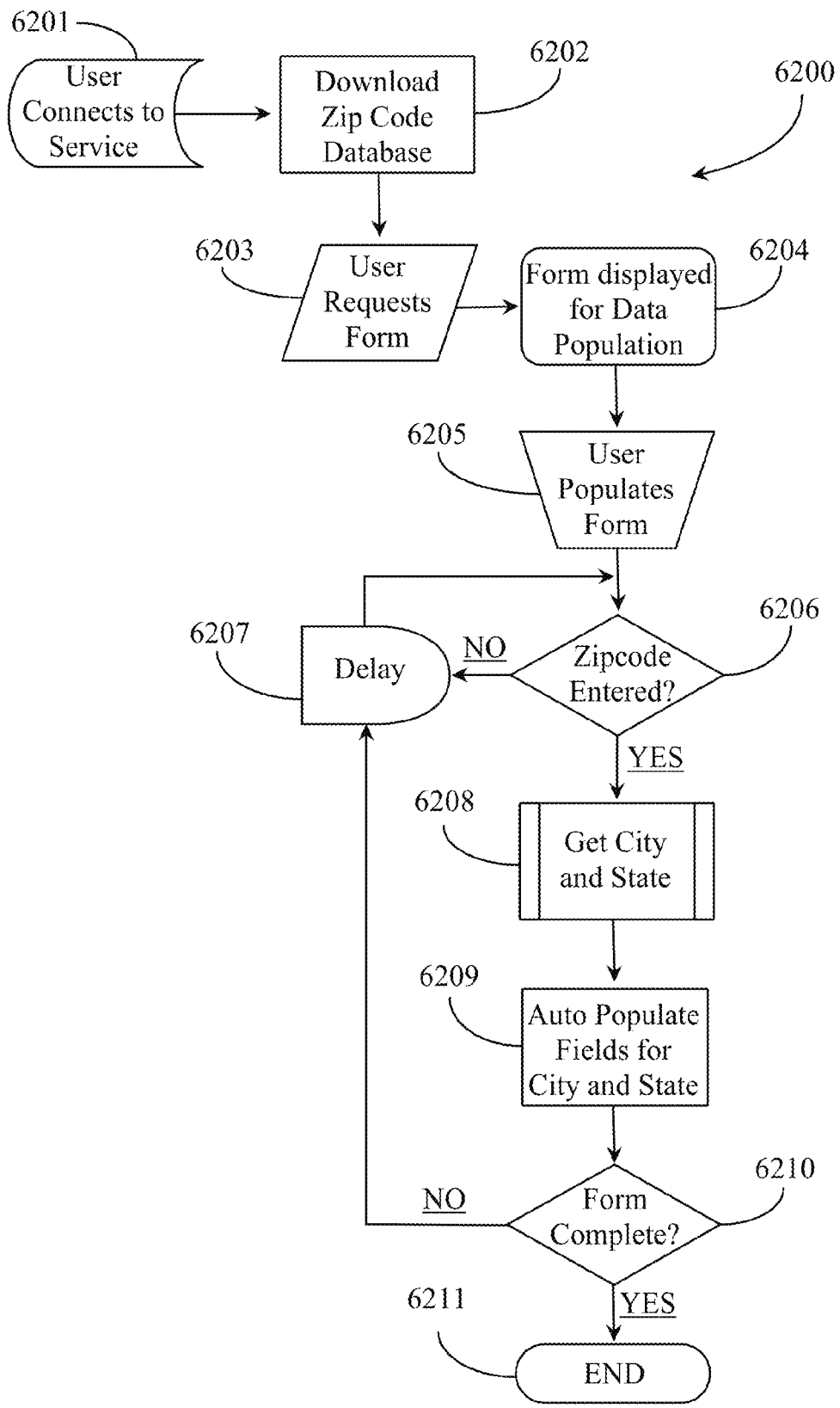
FIG. 62 is a process flow chart depicting steps for auto-populating address information for clients filling out forms according to an embodiment of the present invention.

FIG. 62 is a process flow chart 6200 depicting steps for auto-populating address information for clients filling out forms according to an embodiment of the present invention. At step 6201, a user connects to the service. Typically, the user will connect to a web site to access the service. At step 6202, the service downloads a United States zip code database onto the user's connected computing appliance. The database includes the zip code and correlating city, county, and state.

At step 6203, the user requests a form. The request may be tied to initiation of a process like user registration, a transaction, or some other process requiring form filling as part of the interaction. At step 6204, the form is displayed on the user's appliance display screen. The form may be server-hosted or downloaded to the appliance and displayed. At step 6205, the user populates the form with the required data. During this process, the system monitors the activity of the user and therefore may detect when the user enters a zip code onto the form. In a preferred embodiment, the form field for containing the zip code is presented in the form before fields requiring other address information.

At step 6206, the system determines if the user has entered a zip code. If the system determines at step 6206 that a zip code has not yet been entered onto the form, the process moves to step 6207 for a short delay or pause and resolves back to the determination step 6206. If the system determines that a zip code was entered onto the form, the system uses the zip code to perform a lookup on the user appliance to get the associated city and state, and if required the associated county at step 6208.

At step 6209, the system auto-populates the appropriate form fields with the city, state, and county (if required). At step 6210, the system determines if the form has been completed. If at step 6210, the system determines that the form is not complete, the process resolves back to step 6207 for a short delay or pause, and then back to step 6206 where the system continues to look for a next zip code entry. In one embodiment, the system is aware how many fields on the form are adapted to accept a zip code. If the nature of the form is such that there is only one field for a zip code, the process ends before step 6210. If the system determines that the form is complete at step 6210, the process ends at step 6211.

Referring to steps 6206 through 6210, if a form is presented that may require multiple zip code entries like a shipping form documenting multiple different addresses, for example, the process continues to loop through until the system determines the form is complete. In one embodiment, zip codes are correlated to area codes as well as to city, county, and state. In this case, any telephone field may be automatically populated with the correct area code. In a situation where a zip code area includes more than one area code, the system may wait for the user to input a street name into an address field. The system may then use this data to obtain the correct area code for the user's telephone number.

It is noted herein that in one embodiment the process works whether or not the user is connected to a server while filling out the form. In this case, the zip code database is stored on the user's appliance, and a downloaded system component functions independently from the online server to perform the data lookups on the user's system and auto populates the form with the returned data. In another embodiment, the user must be connected to the server for the system component to monitor the process of filling in the form and to retrieve data from the user's appliance for auto-population into the form fields.

In an embodiment where there is more than one field on the form that requires the same zip code relative to the user's location, the system automatically populates the associated city and state data for all of the locations or fields on the form that require the information based on the single lookup using the user-entered zip code. If the user changes a zip code in the field, the system detects the change and gets the associated city and state data overwriting previous data if required. In one embodiment, the system may use global positioning satellite (GPS) data if available to inform the user of the correct zip code before the form is filled. In this case, if the user confirms the system finding of the correct zip code, the system will perform the lookup; get the associated city and state information; and auto-populate the form ahead of the user interacting with the form.

Order Preview on Mobile Appliance

In many instances, users who conduct transactions receive some textual indication of the transaction order such as an order number, confirmation number, or some other text data that may provide little or no contextual information relative to the transaction and the associated information like shipping data, subject matter, content, etc. Therefore, the inventors provide order confirmation indicia that a user may interact with, through touch screen interface, to preview the transaction and associated data.

Figure 63:
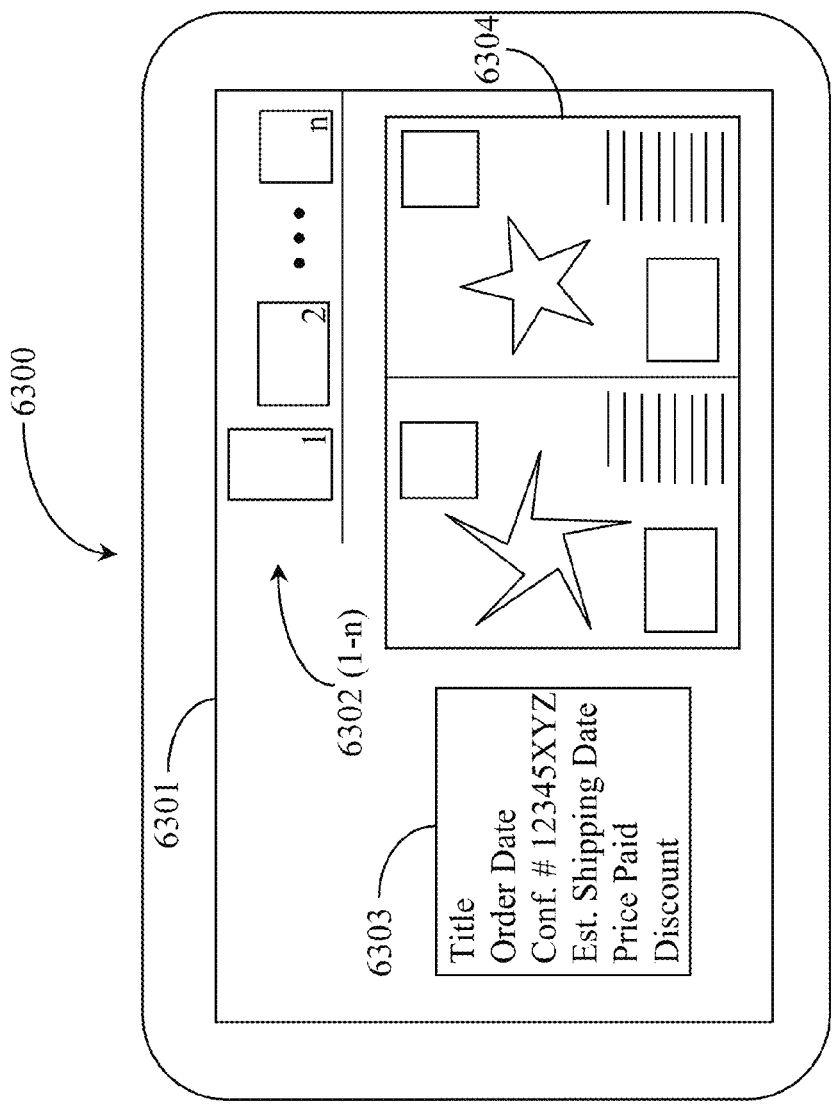
FIG. 63 is a block diagram illustrating a mobile appliance supporting preview of an order for an image and or text-based product created from a mobile application according to an embodiment of the present invention.

FIG. 63 is a block diagram illustrating a mobile appliance 6300 supporting preview of an order for an image and or text-based product created from a mobile application according to an embodiment of the present invention. Mobile appliance 6300 may be an I-pad device, an android device, a notebook, or a smart phone having a touch screen interface. Mobile appliance 6300 includes a touch screen-enabled display 6301. Mobile appliance 6300 may include a close proximity wireless interface technology for communicating with a local transaction server or a transaction machine interface in order to synchronize with the runtime server to obtain relevant order information relative to orders placed for image and or text-based products created using appliance 6300 or created using another computing appliance such as a desktop or laptop computing appliance.

In this embodiment, the transaction service provides visual indicia 6302 (1-n) in the form of interactive icons that provide visual indication of products ordered by the user in the past. Indicia 6302 (1-n) provide visual indication to the user of which products were ordered. In this embodiment, the correct aspect ratio of the associated product is visually represented by each icon. In one embodiment, the icons are arranged in a chronological order revealing an order history starting with the most recent order reading from the left to the right. Indicia 6302 (1-n) may be downloaded from a transaction server during a transaction process, or obtained through a wireless session operation with any enabled transaction terminal having access to the data.

During the order process, the service may capture the likeness of the image- and or text-based project ordered such as core aspect ratio, and an interactive thumbnail view of the front cover of the ordered project. A user may select and interact with an icon 6302 (1-n) using touch screen input to preview at least order and shipping information for any product ordered. For example, touching one of icons 6302 (1-n) may cause an information window 6303 to appear in an unused portion of display 6301. Information window 6303 provides at least a title, order date, order confirmation order, estimated shipping date, total price paid by the user, and indication of any discounts applied to the purchase.

Other information may also be included in information window 6303 without departing from the spirit and scope of the invention such as shipping address, identification of drop ship recipients and their addresses, and information about what other products are typically ordered by users that ordered this product. In one embodiment, a user may further interact with an icon 6302 (1-n), such as by double tapping the icon to cause a preview interface 6304 to appear in touch screen interface 6301. In one embodiment, preview interface 6304 provides a read-only preview of the ordered product at a reduced size and resolution for convenient preview of the project on the mobile appliance.

Preview interface 6304 enables at least limited (read only) navigation of and digital expansion of one or more ordered projects indicated in display 6301 as indicia 6302 (1-n). In one embodiment, a user may further interact with preview interface 6304 to navigate to the server and access the actual server-hasted version of the project for continued editing of the project in session. In this case, the preview may transform to a fully editable display of the project expanded in display to utilize the full footprint of display 6301.

Facilitating Photo Contributions

Figure 64:
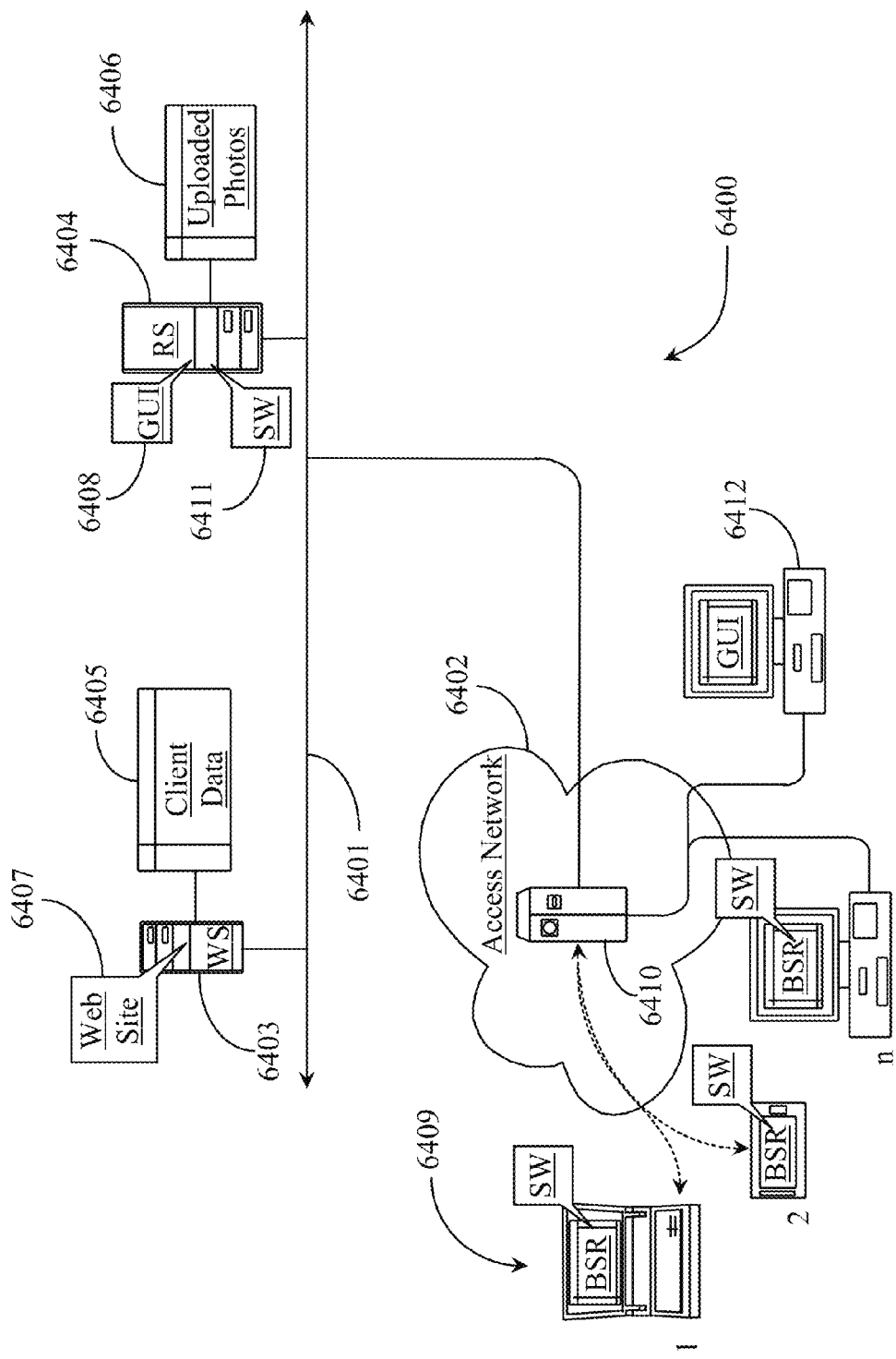
FIG. 64 is an architectural overview of a fulfillment network supporting photo contribution to image-based projects created through a graphics user interface.

FIG. 64 is an architectural overview of a fulfillment network 6400 supporting photo contribution to image-based projects created through a graphics user interface. Network 6400 includes the Internet network depicted herein by a network backbone 6401. Network backbone 6401 represents all of the lines, equipment and access points that make up the Internet network as a whole, including any connected sub-networks. Therefore, there are no geographic limitations to the practice of the present invention.

Backbone 6401 supports a Web server (WS) 6403. Web server 6403 hosts a Web site 6407. Web site 6407 serves as a client access point to the service of the invention. Web server 6403 has connection to a data repository 6405 adapted to contain client data. Client data 6405 may contain information about clients of the service including, but not limited to, identification, billing data, account information, purchase records, security information, log-in information, project information, and any other data deemed important to record for clients of the service.

Backbone 6401 supports a runtime server (RS) 6404. Server 6404 includes at least one processor and a data repository and software (SW) 6411 running from a non-transitory medium on the server. Server 6404 includes a graphics user interface (GUI) 6408 adapted to enable project creation in a server-hosted embodiment. RS 6404 has connection to a data repository 6406 adapted to contain photos that are uploaded from users and friends and family of those users.

In this example, a user operating a computing appliance 6412 has connection to RS 6404 through access network 6402, a data switch or bridge 6410, and backbone 6401. The user operating appliance 6412 has a project being created through the GUI displayed on appliance 6412. In typical fashion, the user connects with Web site 6407 running on sever 6403 and logs in to see their projects. When a project is executed, a server redirect connects the user with RS 6404 hosting the GUI used to build and display projects.

A user that is building or editing a project hosted on server 6404 may not want to collaborate with other users. However, the user may desire to incorporate photos from one or more family and or friends whom are known to the user, but whom may not be active collaborators and might not have an account registered at the service. Such friends and or family members of the user operating computing appliance 6412 are depicted herein as computing appliances 6409 (1-n).

When the user operating appliance 6412 is in session with RS 6404 and building a project, the system using a monitoring component that detects the operational state of the user, may prompt the user to determine if the user wants to get friends and family members to contribute photos the project the user has open. If the user agrees, SW 6411 generates at least a digital notification or message that can be delivered to users 6409 (1-n), for example via email address cell phone number (SMS, MMS), with a browser link to server 6404. The notification or message may contain a description of the project and an invitation to the user to contribute one or more photos to the project. The notification may include system requirements for photo dimensions, pixel resolution, and content. In one embodiment, the user may re-distribute the software to the other users instead of the system.

SW 6411 may include a light-weight component distributed as SW on appliances 6409 (1-n) that might function as a browser (BSR) plug-in or extension that provides a photo uploading interface for the contributors to use to gather and vet the photos. As photos are contributed to a project, the project owner may be notified that there are new photos available from friends or family members. In one embodiment, SW 6411 may also cause distribution of a lightweight order interface to the potential contributors along with an interface for directly uploading photos to server 6404.

The order interface may allow the contributors to directly purchase a completed project that they contributed photos to. In one embodiment, the interfaces may also provide incentive to contributors to register with the service to create their own projects. Potential contributors may also re-distribute the interface to other friends and family. The photo contribution interface and order interface may be distributed to any online social interaction accounts owned by friends or family members instead of sending them directly to their end devices. In this case, the interface(s) may be downloaded and installed for use in photo contribution and product ordering.

In one embodiment, when the original user opens a project, they may browse through photos that were contributed to a pool of available photos and metadata about the photo contributions may include the contributor identifications. Photos uploaded to the server by contributors may be stored in repository 6406 for use by project builders.

Colorable Assets

Figure 65:
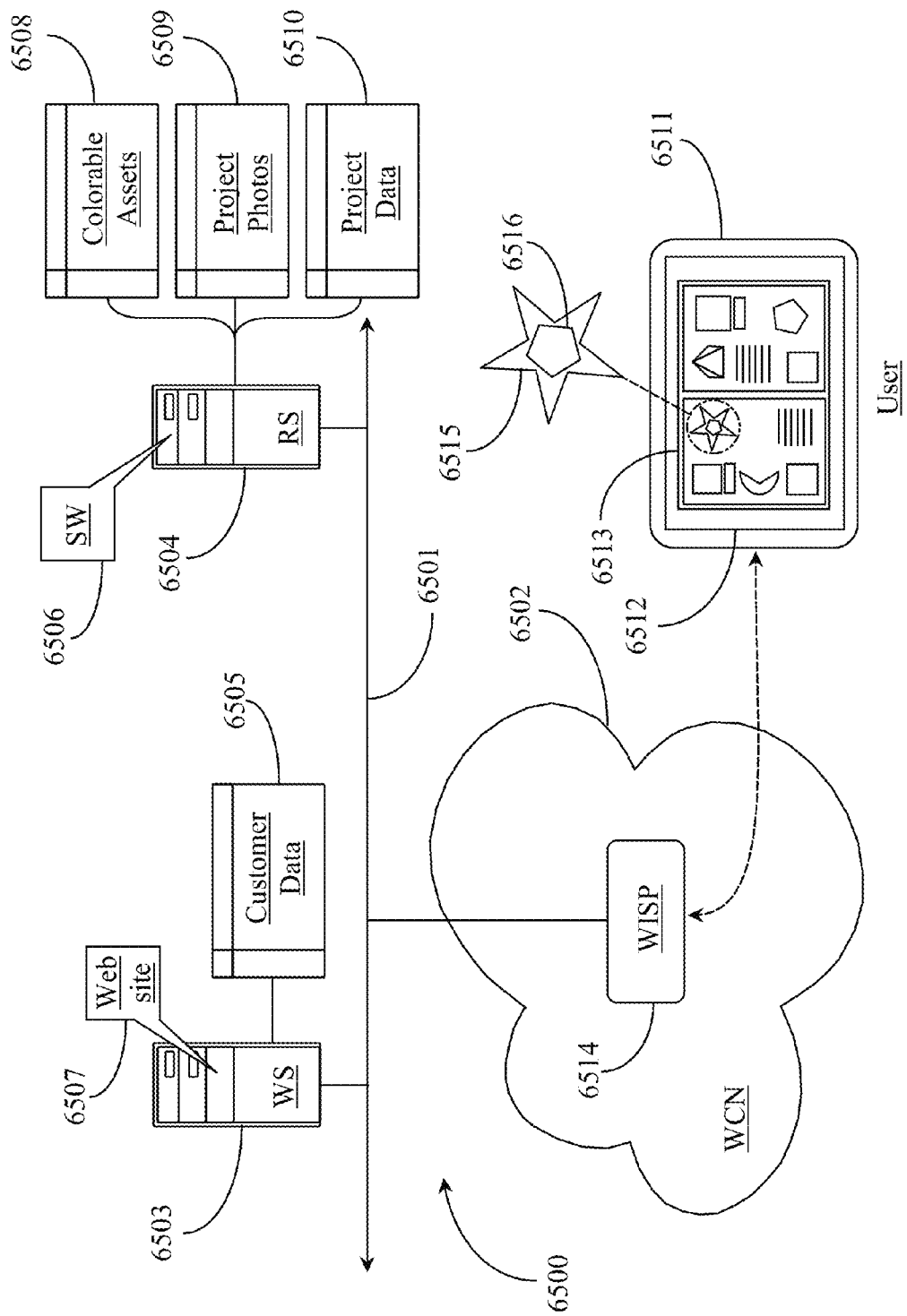
FIG. 65 is an architectural overview of a fulfillment network supporting provision of colorable assets to users engaged in building and editing image-based projects through a graphics user interface (GUI).

FIG. 65 is an architectural overview of a fulfillment network 6500 supporting provision of colorable assets to users engaged in building and editing image-based projects through a graphics user interface (GUI). Network 6500, which may be the Internet in one embodiment, which is further illustrated by a network backbone 6501. Network backbone 6501 represents all of the lines, equipment, and access points that make up the Internet network as a whole, including any connected sub-networks. Therefore, there are no geographic limitations to the practice of the invention.

Network backbone 6501 supports a Web server (WS) 6503 hosting a Website 6507 where users such as one operating a wireless computing appliance 6511 may register with a service to initiate, build, edit, and eventually purchase image and text-based projects like photo books, calendars, cards, posters, and other products. WS 6507 has connection to a data repository 6505 adapted to contain customer data of customers of the service.

Customer data may include customer identification such as name, address, and contact information. Customer data may also include log-in data, billing information, and transaction history. Wireless computing appliance 6511 may be a smart phone, an I-pad, notebook, nook, or android device with a display and input mechanism such as a physical "dockable" keyboard or touch screen.

In this embodiment, a user operating appliance 6511 connects to Website 6507 hosted on server 6503 through a wireless carrier network (WCN) 6502 and a wireless Internet service provider (WISP) 6514. Appliance 6511 may be a desktop computing appliance, or a laptop computing appliance connected to the network through a wired connection without departing from the spirit and scope of the present invention.

Network backbone 6501 supports a runtime server (RS) 6504 that facilitates project initiation, build, edit, preview, and fulfillment. Server 6504 hosts software (SW) 6506 that includes all of the functional software components for facilitating the service for both wired and wirelessly connected computing appliances. Computing appliance 6511 includes a display 6512. In this embodiment, display 6512 may be a touch screen display. In this embodiment, display 6512 includes an open image- and text-based project 6513. Project 6513 may be a photo book or a similar type of image and or text-based project.

RS 6505 has connection to a data repository 6510 containing project data about user projects registered with the system. RS 6504 has connection to a data repository containing project photos provided by users for inclusion into their projects. RS 56504 has connection to a data repository 6508 containing theme-based assets like stickers, shapes, backgrounds, and general clipart assets that are system designed assets for inclusion into projects. The term colorable assets refers to system designed graphics that contain regions that are color neutral whereby a user may choose which color to fill into the color neutral regions of the asset.

Project 6513 includes photos, text, and system designed assets referred to as stickers or shapes that are available to users for decorating project pages along with user-supplied photos. System designed assets may also include borders, backgrounds, photo slots, and any other system designed graphics that are made available to users through the system.

In this example, a sticker 6515 in the shape of a star is illustrated in an expanded view from project 6513. Sticker 6515 contains a colorable region 6516 consisting of a five-sided region central to the star shape and geometrically aligned with the five star points. Region 6516 may be defined and assigned to asset 6515 as a color neutral region that a user may color in by selecting a color and filling the region with that color. Region 6516 may be designed according to any geometric pattern and such design incorporates the shape and dimensions of the asset to which it is assigned. In one embodiment, a substantially large color neutral region is assigned to or attributed to an asset while a very small area of the asset may be reserved for default coloring.

There may be more than one colorable region attributed to asset 6515 without departing from the spirit and scope of the present invention. Likewise, there may be more than one default colored region representing the area of the asset that does not include the color neutral region or regions. Colorable regions and default colored regions may coexist on the asset in a symmetrical relationship. For example, the five star points of assert 6515 may be colored by default while the center region is color neutral and where the center color neutral region is symmetrically complimented by the default colored regions. Coloring the central region may be accomplished using a color picker and selecting a color to use. The region may then be selected by the user and a fill operation may be used to color the region with the selected color. In a more complicated example, a background graphic of grass, sky, and flowers may have colorable regions representing the flower petals. In this case the user may select the flowers and color the flower petals with a color chosen by the user.

In one embodiment of the present invention, there may be more than one colorable region provided on an asset where the user may be enabled to color those regions with different colors, for example, one region red, the adjacent region blue, etc. In this way, assets are not predisposed to limited application because of a default color that cannot be changed by the user. In one embodiment, a user is prompted if they want to have access to colorable assets for their project. If they agree, these assets might be served to the user for consideration. In one embodiment, the user selects a mode that tells the server to present colorable assets to the user because the user has selected a manual coloring mode during the project building or editing process. A color neutral region of an asset might be filled with a single color, a blended color, or a range of colors that may be added according to certain effects like color separation or saturation effects. To illustrate, consider region 6516 colored red at one end where the color red slowly changes to blue at the far end with the gradient shades between red and blue disposed in between.

In one embodiment, a user may color a color neutral region by hand using a color picker and scribble tool or writing tool that allows the user to write graffiti or other hand written shading or marking using one or more than one color. In one embodiment, the user may be enabled to switch color designation between colorable regions and default colored regions of an asset by selecting a tool to invert the color assignments after the colorable region is filled in. In one embodiment, color-customized assets are retained by the system and may be reused by other users. In one embodiment, a user working on a canvas containing multiple colorable assets might color the asset regions and save a snapshot of the result to use in comparison to other colors that might be selected or suggested by the system based on a color matching algorithm. There are many possibilities.

It will be apparent to one with skill in the art that the system of the invention may be provided using some or all of the mentioned features and components without departing from the spirit and scope of the present invention. It will also be apparent to the skilled artisan that the embodiments described above are specific examples of a single broader invention which may have greater scope than any of the singular descriptions taught. There may be many alterations made in the descriptions without departing from the spirit and scope of the present invention.

What is claimed is:

1. A non-transitory physical storage medium for storing program code, the program code executable by a hardware processor to perform a process for creating and editing a media-based project, the program code executable by the hardware processor to perform:
   automatically determine whether a user has inserted data into the media-based project, wherein the media-based project is associated with a set of digital asset recommendations;
   in response to determining that the user has inserted data into the media-based project:
      automatically mine the user-inserted data in the media-based project to identify prominent subjects, ideas, themes, and/or places that reflect prevalent content used in the media-based project, wherein the prevalent content is repeated throughout the media-based project;
      automatically generate a pool of primary keywords that characterize the prevalent content in the media-based project;
      automatically search one or more data sources for one or more additional digital assets using one or more of the primary keywords generated as search criteria;
      automatically update the set of digital asset recommendations with the additional digital assets found through the search; and
      display the updated set of digital asset recommendations with the media-based project being created and edited.

2. The non-transitory physical storage medium of claim 1, wherein the mined user-inserted data comprises tags and meta-tags that are included in the media-based project.

3. The non-transitory physical storage medium of claim 1, wherein the mined user-inserted data comprises meta-data associated with photos inserted by the user into the media-based project.

4. The non-transitory physical storage medium of claim 1, wherein the mined user-inserted data comprises text inserted by the user into the media-based project.

5. The non-transitory physical storage medium of claim 1, wherein the mined user-inserted data comprises information that is recognized by photo analysis performed on photos inserted by the user into the media-based project.

6. The non-transitory physical storage medium of claim 5, wherein the information recognized by the photo analysis comprises facial recognition of persons in the photos.

7. The non-transitory physical storage medium of claim 1, wherein the mined user-inserted data comprises technical data of the media-based project, the technical data selected from the group consisting of styles, fonts, and photo dimensions of the media-based project.

8. The non-transitory physical storage medium of claim 1, further comprising program code to perform:
   generalize the mined user-generated data through utilizing associated data.

9. The non-transitory physical storage medium of claim 1, further comprising program code to perform:
   generalize the mined user-generated data through utilizing external data.

10. The non-transitory physical storage medium of claim 1, wherein a combination of the primary keywords is used to retrieve candidate images for presentation to the user.

11. The non-transitory physical storage medium of claim 1, wherein a combination of the primary keywords is used to retrieve famous quotes for presentation to the user.

12. The non-transitory physical storage medium of claim 1, wherein a combination of the primary keywords is used to retrieve theme-based stickers and/or shapes for presentation to the user.

13. The non-transitory physical storage medium of claim 1, wherein components used to mine the user-inserted data include text parsing components, snapshot components, screen scraping components, pattern recognition components, and/or file reading components.

14. The non-transitory physical storage medium of claim 1, wherein the one or more data sources searched are third-party data sources.

15. The non-transitory physical storage medium of claim 1, wherein the digital assets comprise at least audio assets.

16. A method executable from a non-transitory physical storage medium storing program code, the program code executable by a hardware processor to perform a process for creating and editing a media-based project, the method comprising:
   automatically determining whether a user has inserted data into the media-based project, wherein the media-based project is associated with a set of digital asset recommendations;
   in response to determining that the user has inserted data into the media-based project:
      automatically mining the user-inserted data in the media-based project to identify prominent subjects, ideas, themes, and/or places that reflect prevalent content used in the media-based project, wherein the prevalent content is repeated throughout the media-based project;
      automatically generating a pool of primary keywords that characterize the prevalent content in the media-based project;
      automatically searching one or more data sources for one or more additional digital assets using one or more of the primary keywords generated as search criteria;
      automatically updating the set of digital asset recommendations with the additional digital assets found through the search; and
      display the updated set of digital asset recommendations with the media-based project being created and edited.

17. A computing appliance comprising a hardware processor and a non-transitory physical storage medium storing program code executable by the hardware processor, the program code when executed by the hardware processor providing a process for creating and editing a media-based project, the process comprising steps to:
   automatically determine whether a user has inserted data into the media-based project, wherein the media-based project is associated with a set of digital asset recommendations;
   in response to determining that the user has inserted data into the media-based project:
      automatically mine the user-inserted data in the media-based project to identify prominent subjects, ideas, themes, and/or places that reflect prevalent content used in the media-based project, wherein the prevalent content is repeated throughout the media-based project;
      automatically generate a pool of primary keywords that characterize the prevalent content in the media-based project;
      automatically search one or more data sources for one or more additional digital assets using one or more of the primary keywords generated as search criteria;
      automatically update the set of digital asset recommendations with the additional digital assets found through the search; and
      display the updated set of digital asset recommendations with the media-based project being created and edited.

18. The computing appliance of claim 17, wherein the mined user-inserted data comprises tags and meta-tags that are included in the media-based project.

19. The computing appliance of claim 17, wherein the mined user-inserted data comprises meta-data associated with photos inserted by the user into the media-based project.

20. The computing appliance of claim 17, wherein the mined user-inserted data comprises information that is recognized by photo analysis performed on one or more photos inserted by the user into the media-based project, and wherein the information recognized by the photo analysis comprises facial recognition of persons in the photos.

* * * * *